(12) United States Patent
Isono et al.

(10) Patent No.: US 6,431,662 B2
(45) Date of Patent: Aug. 13, 2002

(54) VEHICLE BRAKING PRESSURE SOURCE DEVICE WHEREIN FLUID COMMUNICATION BETWEEN PRESSURIZING AND BACK-PRESSURE CHAMBERS OF MASTER CYLINDER IS CONTROLLED BASED ON VEHICLE RUNNING STATE AND/OR ROAD SURFACE CONDITION

(75) Inventors: Hiroshi Isono, Toyota; Yasuji Mizutani, Susono, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/778,809

(22) Filed: Feb. 8, 2001

(30) Foreign Application Priority Data

Mar. 1, 2000 (JP) ........................ 2000-056295
Jun. 19, 2000 (JP) ........................ 2000-183596

(51) Int. Cl.⁷ .................................................. B60T 8/44
(52) U.S. Cl. ............................. 303/114.3; 303/113.1; 303/113.4; 303/113.3; 60/582
(58) Field of Search .................... 303/113.1, 113.2, 303/113.3, 113.4, 113.5, 114.1, 114.3, 122.11, 115.4; 60/582, 574

(56) References Cited

U.S. PATENT DOCUMENTS

| | | | | |
|---|---|---|---|---|
| 4,750,788 A | * | 6/1988 | Seibert et al. | 303/113.2 |
| 4,856,852 A | * | 8/1989 | Ocvirk et al. | 303/114.3 |
| 4,914,917 A | | 4/1990 | Schonlau | 60/545 |
| 5,066,073 A | * | 11/1991 | Frigger et al. | 303/122.09 |
| 5,362,140 A | * | 11/1994 | Burgdorf | 303/113.2 |
| 5,531,509 A | | 7/1996 | Kellner et al. | 303/114.1 |
| 6,183,049 B1 | * | 2/2001 | Oka et al. | 303/114.1 |
| 6,334,655 B2 | * | 1/2002 | Tanaka et al. | 303/113.4 |

FOREIGN PATENT DOCUMENTS

| | | |
|---|---|---|
| WO | WO 97/28031 | 8/1997 |
| WO | WO 98/00321 | 1/1998 |
| WO | WO 98/57833 | 12/1998 |

* cited by examiner

Primary Examiner—Jack Lavinder
Assistant Examiner—Mariano Sy
(74) Attorney, Agent, or Firm—Oliff & Berridge, PLC

(57) ABSTRACT

A vehicle braking pressure source device including (a) a master cylinder having a pressurizing piston cooperating with a cylinder housing to define a pressurizing chamber and a back-pressure chamber on front and rear sides of the piston, and an input rod which slidably extending through a rear end wall of the cylinder housing such that the piston is advanced by a brake operating force of a brake operating member transmitted thereto through the input rod, to pressurize a working fluid in the pressurizing chamber, (b) a communication passage for communication between the pressurizing and back-pressure chambers, (c) a control valve device disposed in the communication passage for controlling the communication between the pressurizing and back-pressure chambers through the communication passage, and (d) a control valve control device for controlling the control valve device, on the basis of at least one of an operating state of the brake operating member, a running state of the vehicle and a state of a road surface on which the vehicle is running.

43 Claims, 54 Drawing Sheets

FIG. 13A

| | $F \geq F1$<br>○: $PFM1 \geq Pth1$<br>○: $PRM1 \geq Pth1$<br>X: $PFM1 < Pth1$<br>X: $PRM1 < Pth1$ | | | |
|---|---|---|---|---|
| FRONT BRAKING SUB-SYSTEM | ○ | ○ | X | X |
| REAR BRAKING SUB-SYSTEM | ○ | X | ○ | X |
| NORMAL OR DEFECTIVE | NORMAL | NORMAL BOOSTER | | UNKNOWN DEFECTS |
| | | REAR BRAKING SUB-SYSTEM IS DEFECTIVE. | FRONT BRAKING SUB-SYSTEM IS DFECTIVE. | |
| TREATMENT | | NO TREATMENT | STEP S9 CONTROL | FURTHER DIAGNOSIS BASED ON PFM2, PRM2 |

PFM1, PFM2: FRONT MASTER CYLINDER PRESSURE
PRM1, PRM2: REAR MASTER CYLINDER PRESSURE

FIG. 13B

| | F ≥ F2 (WHERE FRONT AND REAR BRAKING SUB-SYSTEMS ARE BOTH DEFECTIVE WHEN F ≥ F1) ○: PFM2 ≥ Pth2    ○: PRM2 ≥ Pth2    X: PFM2 < Pth2    X: PRM2 < Pth2 | | | |
|---|---|---|---|---|
| FRONT BRAKING SUB-SYSTEM | ○ | X | ○ | X |
| REAR BRAKING SUB-SYSTEM | ○ | ○ | X | X |
| NORMAL OR DEFECTIVE | BOOSTER IS DEFECTIVE | BOOSTER AND FRONT BRAKING SUB-SYSTEM ARE DEFECTIVE, | BOOSTER AND REAR BRAKING SUB-SYSTEM ARE DEFECTIVE. | AT LEAST FRONT AND REAR BRAKING SUB-SYSTEMS ARE DEFECTIVE. |
| TREATMENT | STEP S5 CONTROL | VEHICLE RUNNING IS INHIBITED. | | |

PFM1, PFM2: FRONT MASTER CYLINDER PRESSURE
PRM1, PRM2: REAR MASTER CYLINDER PRESSURE

FIG. 17A

| VALVE 262 | NORMAL | | | |
|---|---|---|---|---|
| VALVE 292 | NORMAL | STUCK CLOSED | STUCK OPEN | ABNORMAL CHR. |
| NORMAL<br>PM INCREASE | ○ | ○ | ○ | ○ |
| PM REDUCTION | ○ | ☆ | ○ | ○ |
| DEFECTIVE BOOSTER<br>PM INCREASE | ○ | ○ | Δ (SC-INHIBIT) | ○ |
| PM REDUCTION | ○ | ☆ | ○ | ○ |
| DEFECTIVE FRONT<br>BRAKING SUB-SYSTEM<br>PM INCREASE | ○ | ○ | Δ (SC-INHIBIT) | ○ |
| PM REDUCTION | ○ | ☆ Δ | Δ | Δ |

○: NORMAL    X: POSSIBLE TO INCREASE AND REDUCE

Δ: IMPOSSIBLE TO CONTROL BUT POSSIBLE TO INCREASE AND REDUCE

☆: POSSIBLE TO REDUCE IF SO ARRANGED    "SC-INHIBIT": SPECIAL CONTROL INHIBIT

"ABNORMAL CHR.": PERSSURE REDUCING CHARACTERISTIC OF VALVE 292

FIG. 17B

| VALVE 262 | STUCK OPEN | | | |
|---|---|---|---|---|
| VALVE 292 | NORMAL | STUCK CLOSED | STUCK OPEN | ABNORMAL CHR. |
| NORMAL<br>PM INCREASE | △ | △ | X (VR-INHIBIT) | △ |
| PM REDUCTION | ○ | ○ | ○ | ○ |
| DEFECTIVE BOOSTER<br>PM INCREASE | ○ | ○ | X (VR-INHIBIT) | ○ |
| PM REDUCTION | ○ | ○ | ○ | ○ |
| DEFECTIVE FRONT BRAKING SUB-SYSTEM<br>PM INCREASE | △ | △ | X (VR-INHIBIT) | △ |
| PM REDUCTION | ○ | △ | △ | △ |

○: NORMAL   X: POSSIBLE TO INCREASE AND REDUCE

△: IMPOSSIBLE TO CONTROL BUT POSSIBLE TO INCREASE AND REDUCE

"VR-INHIBIT": VEHICLE RUNNING INHIBIT

"ABNORMAL CHR.": PERSSURE REDUCING CHARACTERISTIC OF VALVE 292

FIG. 17C

| VALVE 262 | STUCK CLOSED | | | |
|---|---|---|---|---|
| VALVE 292 | NORMAL | STUCK CLOSED | STUCK OPEN | ABNORMAL CHR. |
| NORMAL<br>PM INCREASE | ○ | ○ | ○ | ○ |
| PM REDUCTION | ○ | X (VR-INHIBIT) | ○ | ○ |
| DEFECTIVE BOOSTER<br>PM INCREASE | △ | △ | △ | △ |
| PM REDUCTION | ○ | X (VR-INHIBIT) | ○ | ○ |
| DEFECTIVE FRONT<br>BRAKING SUB-SYSTEM<br>PM INCREASE | △ | △ | △ | △ |
| PM REDUCTION | ○ | X (VR-INHIBIT) | △ | △ |

○: NORMAL   X: POSSIBLE TO INCREASE AND REDUCE

△: IMPOSSIBLE TO CONTROL BUT POSSIBLE TO INCREASE AND REDUCE

"VR-INHIBIT": VEHICLE RUNNING INHIBIT

"ABNORMAL CHR.": PERSSURE REDUCING CHARACTERISTIC OF VALVE 292

FIG. 17D

| | VALVE 262 STUCK OPEN, VALVE 292 STUCK CLOSED, AND ELECTRIC POWER SOURCE DEFECTIVE |
|---|---|
| NORMAL<br>PM INCREASE | △ |
| PM REDUCTION | ☆ |
| DEFECTIVE BOOSTER<br>PM INCREASE | ○ |
| PM REDUCTION | ☆ |
| DEFECTIVE FRONT BRAKING SUB-SYSTEM<br>PM INCREASE | △ |
| PM REDUCTION | ☆   △ |

○ : NORMAL

△ : IMPOSSIBLE TO CONTROL BUT POSSIBLE TO INCREASE AND REDUCE

☆ : POSSIBLE TO REDUCE IF SO ARRANGED

FIG. 39A

| VALVE 262 | NORMAL | | | |
|---|---|---|---|---|
| VALVE 292 | NORMAL | STUCK CLOSED | STUCK OPEN | ABNORMAL CHR. |
| NORMAL<br>PM INCREASE | ○ | ○ | ○ | ○ |
| PM REDUCTION | ○ | ○ | ○ | ○ |
| DEFECTIVE BOOSTER<br>PM INCREASE | ○ | ○ | Δ (SC-INHIBIT) | ○ |
| PM REDUCTION | ○ | ○ | ○ | ○ |
| DEFECTIVE FRONT<br>BRAKING SUB-SYSTEM<br>PM INCREASE | ○ | ○ | Δ (SC-INHIBIT) | ○ |
| PM REDUCTION | ○ | Δ | Δ | Δ |

○: NORMAL    X: POSSIBLE TO INCREASE AND REDUCE

Δ: IMPOSSIBLE TO CONTROL BUT POSSIBLE TO INCREASE AND REDUCE

"SC-INHIBIT": SPECIAL CONTROL INHIBIT

"ABNORMAL CHR.": PERSSURE REDUCING CHARACTERISTIC OF VALVE 292

FIG. 39B

| VALVE 262 | STUCK OPEN | | | |
|---|---|---|---|---|
| VALVE 292 | NORMAL | STUCK CLOSED | STUCK OPEN | ABNORMAL CHR. |
| NORMAL<br>PM INCREASE | △ | △ | X (VR-INHIBIT) | △ |
| PM REDUCTION | ○ | ○ | ○ | ○ |
| DEFECTIVE BOOSTER<br>PM INCREASE | ○ | ○ | X (VR-INHIBIT) | ○ |
| PM REDUCTION | ○ | ○ | ○ | ○ |
| DEFECTIVE FRONT<br>BRAKING SUB-SYSTEM<br>PM INCREASE | △ | △ | X (VR-INHIBIT) | △ |
| PM REDUCTION | ○ | △ | △ | △ |

○: NORMAL   X: POSSIBLE TO INCREASE AND REDUCE

△: IMPOSSIBLE TO CONTROL BUT POSSIBLE TO INCREASE AND REDUCE

"VR-INHIBIT": VEHICLE RUNNING INHIBIT

"ABNORMAL CHR.": PERSSURE REDUCING CHARACTERISTIC OF VALVE 292

FIG. 39C

| VALVE 262 | STUCK CLOSED | | | |
|---|---|---|---|---|
| VALVE 292 | NORMAL | STUCK CLOSED | STUCK OPEN | ABNORMAL CHR. |
| NORMAL<br>PM INCREASE | ○ | ○ | ○ | ○ |
| PM REDUCTION | ○ | X (VR-INHIBIT) | ○ | ○ |
| DEFECTIVE BOOSTER<br>PM INCREASE | △ | △ | △ | △ |
| PM REDUCTION | ○ | X (VR-INHIBIT) | ○ | ○ |
| DEFECTIVE FRONT<br>BRAKING SUB-SYSTEM<br>PM INCREASE | △ | △ | △ | △ |
| PM REDUCTION | ○ | X (VR-INHIBIT) | △ | △ |

○: NORMAL   X: POSSIBLE TO INCREASE AND REDUCE

△: IMPOSSIBLE TO CONTROL BUT POSSIBLE TO INCREASE AND REDUCE

"VR-INHIBIT": VEHICLE RUNNING INHIBIT

"ABNORMAL CHR.": PERSSURE REDUCING CHARACTERISTIC OF VALVE 292

FIG. 39D

| | VALVE 262 STUCK OPEN, VALVE 292 STUCK CLOSED, AND ELECTRIC POWER SOURCE DEFECTIVE |
|---|---|
| NORMAL<br>PM INCREASE | ○ |
| PM REDUCTION | ○ |
| DEFECTIVE BOOSTER<br>PM INCREASE | △ |
| PM REDUCTION | ○ |
| DEFECTIVE FRONT BRAKING SUB-SYSTEM<br>PM INCREASE | △ |
| PM REDUCTION | △ |

○ : NORMAL

△ : IMPOSSIBLE TO CONTROL BUT POSSIBLE TO INCREASE AND REDUCE

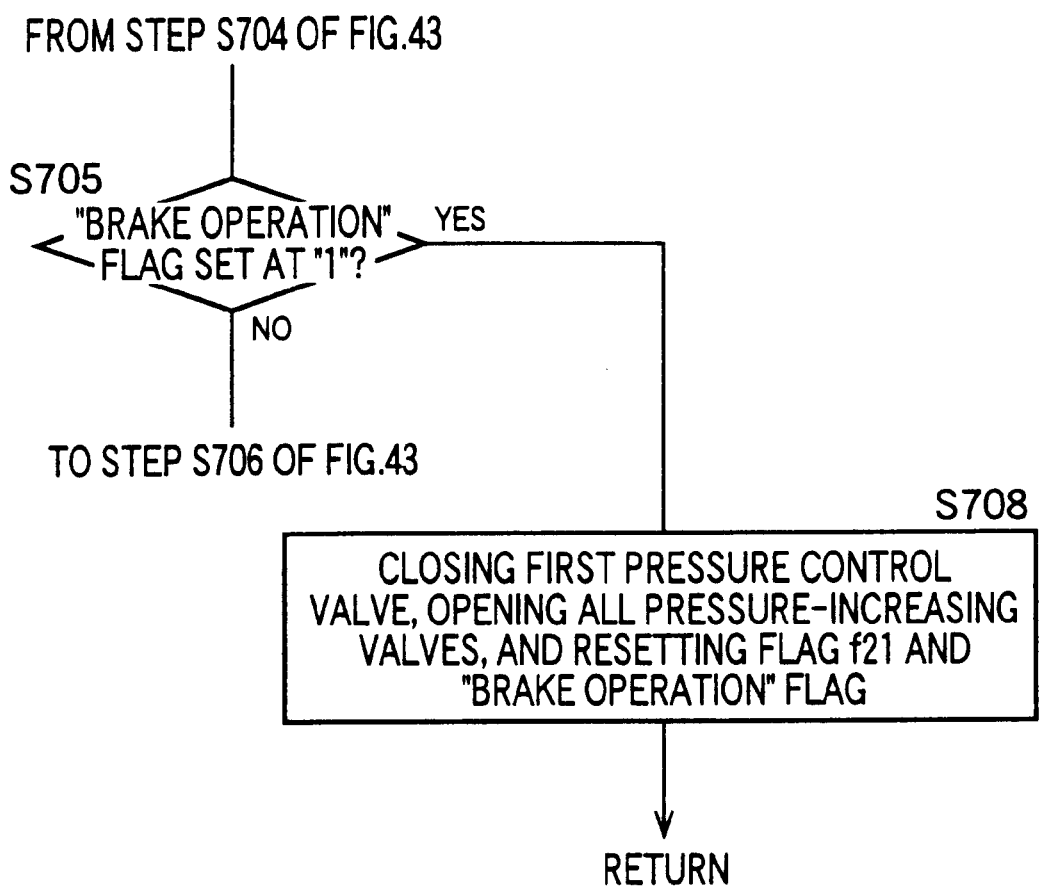

VEHICLE BRAKING PRESSURE SOURCE DEVICE WHEREIN FLUID COMMUNICATION BETWEEN PRESSURIZING AND BACK-PRESSURE CHAMBERS OF MASTER CYLINDER IS CONTROLLED BASED ON VEHICLE RUNNING STATE AND/OR ROAD SURFACE CONDITION

This application is based on Japanese Patent Applications No. 2000-056295 filed Mar. 1, 2000 and No. 2000-183596 filed Jun. 19, 2000, the contents of which are incorporated hereinto by reference.

BACKGROUND OF THE INVENTION

1. Field of the Invention

The present invention relates in general to a braking pressure source device for an automotive vehicle, and more particularly to a braking pressure source device including a master cylinder wherein a pressurizing piston partially defines a pressurizing chamber and a back-pressure chamber on opposite sides thereof so that the pressure in the back-pressure chamber acts on the pressurizing piston.

2. Discussion of Related Art

Japanese Patent Application No. 10-364575 filed by the assignee of this invention but not laid open at the time the present invention was made discloses one type of a braking pressure source device which includes a master cylinder wherein a pressurizing piston partially defines a back-pressure chamber on a rear side thereof so that a back pressure in the back-pressure chamber acts on the pressurizing piston in an advancing direction of the pressurizing piston. In this type of braking pressure source device, the pressurizing piston is fluid-tightly and slidably received in the cylinder housing of the master cylinder, and cooperates with the cylinder housing to define a pressurizing chamber and the back-pressure chamber on respective front and rear sides thereof, and an input rod is formed integrally with the pressurizing piston fluid-tightly and slidably extends outward through the rear end wall of the cylinder housing which partially defines the back-pressure chamber. In operation, a working fluid in the pressurizing chamber is pressurized by an advancing movement of the pressurizing piston on the basis of a brake operating force acting on a manually operable brake operating member. Further, the pressurizing chamber and the back-pressure chamber are connected to each other through a communication passage, in which is provided a normally closed solenoid-operated shut-off valve.

In the braking pressure source device described above, the back-pressure chamber is supplied with the working fluid pressurized by a power-operated hydraulic pressure source, which includes a pump and an accumulator. The pressure of the pressurized fluid delivered from the pump or accumulator is controlled by a pressure control valve device, and the fluid having the thus controlled pressure is supplied to the back-pressure chamber. The pressurizing piston receives a force based on the brake operating force and a force based on the back pressure, namely, the pressure of the pressurized fluid supplied to the back-pressure chamber, so that the fluid in the pressurizing chamber is pressurized to a pressure higher than a level that is established by only the brake operating force. Thus, the brake operating force is boosted by the pressurized fluid in the back-pressure chamber. When the power-operated hydraulic pressure source becomes defective, for instance, when the accumulator suffers from a fluid leakage preventing a supply of the pressurized fluid from the power-operated hydraulic pressure source to the back-pressure chamber, the back-pressure chamber is disconnected from the power-operated hydraulic pressure source, and the solenoid-operated shut-off valve provided in the communication passage is opened, permitting a flow of the fluid from the back-pressure chamber into the pressurizing chamber. When the pressurizing piston is advanced in this state, the fluid pressurized in the pressurizing chamber is fed into the back-pressure chamber, so that the effective surface area in transverse cross section or effective diameter of the pressurizing piston is reduced to that of the input rod. Accordingly, the pressure in the pressurizing chamber (hereinafter referred to as "master cylinder pressure" where appropriate) corresponding to a given amount of brake operating force acting on the input rod is made higher when the pressurizing chamber and the back-pressure chambers are communicated with each other than when these chambers are not communicated with each other. Thus, the master cylinder pressure generated when the pressurized fluid cannot be delivered from the power-operated hydraulic pressure source to the back-pressure chamber is as high as that when the pressurized fluid is delivered to the back-pressure chamber.

SUMMARY OF THE INVENTION

It is therefore an object of the present invention to provide a braking pressure source device including a master cylinder in which a pressurizing chamber and a back-pressure chamber formed on the respective front and rear sides of a pressurizing piston are connected to each other through a communication passage provided with a communication control valve device including a solenoid-operated valve, and wherein the communication control valve device is controlled in a manner different from that in the braking pressure source device described in the above-identified Japanese Patent Application.

The above object may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combination thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A braking pressure source device provided in a braking system for an automotive vehicle, the braking system including a brake operating member manually operable with a brake operating force applied thereto, the braking pressure source device comprising:

a master cylinder including a cylinder housing, a pressurizing piston fluid-tightly and slidably received in the cylinder housing and cooperating with the cylinder housing to define a pressurizing chamber and a back-pressure chamber on a front and a rear side of the pressurizing piston, and an input rod which fluid-tightly and slidably extends through a rear end wall of the cylinder housing, the pressurizing piston being advanced by the brake operating force of the brake operating member transmitted thereto through the input rod, to pressurize a working fluid in the pressurizing chamber;

means for defining a communication passage for communication between the pressurizing chamber and the back-pressure chamber;

a first control valve device disposed in the communication passage for controlling the communication between the pressurizing and back-pressure chambers through the communication passage; and a first control valve control device for controlling the first control valve device, and wherein the first control valve control device controls the first control valve device on the basis of at least one of an operating state of the brake operating member, a running state of the automotive vehicle and a state of a road surface on which the automotive vehicle is running.

The operating state of the brake operating member includes, for example, an operating force and an operating stroke of the brake operating member, and rates of change of these operating force and stroke. The operating force can be directly detected, or indirectly detected by detecting a physical quantity which changes with the operating force of the brake operating member, such as a fluid pressure in the pressurizing chamber. The state of the road surface includes, for instance, a friction coefficient and a gradient of the road surface, and the presence or absence of recessed, raised and/or stepped areas in the road surface. The running condition of the vehicle includes, for instance, slipping states of the vehicle wheels, and running or turning stability, speed and acceleration of the vehicle. The running or turning stability of the vehicle may be represented by a difference between a desired yaw rate determined by an angle of a steering wheel of the vehicle and the vehicle running speed, and an actual yaw rate detected by a yaw rate sensor, or represented by a rate of change of the above-indicated difference.

The brake operating member may be brake pedal operable by foot by the vehicle operator, or a brake lever operable by hand by the vehicle operator.

When the first control valve device is controlled to effect fluid communication between the pressurizing and back-pressure chambers through the communication passage, the pressurized fluid is delivered from the pressurizing chamber to the back-pressure chamber, so that the fluid pressure in the back-pressure chamber is increased. The first control valve device may be principally constituted by a solenoid-operated shut-off valve or a solenoid-operated pressure control valve. In the former case, the solenoid-operated shut-off valve is opened to reduce the effective diameter of the pressurizing piston to that of the input rod of the master cylinder, so that the fluid pressure in the pressurizing chamber (master cylinder pressure) corresponding to a given value of the operating force of the brake operating member (brake operating force) is made higher than when the solenoid-operated shut-off valve is in the closed state disconnecting the pressurizing and back-pressure chambers from each other. In the latter case, the solenoid-operated pressure control valve may be a linear solenoid valve whose amount of opening is linearly variable by continuously controlling the amount of electric current applied thereto. In this case, the relationship between the brake operating force and the master cylinder pressure can be controlled as desired. That is, by controlling the solenoid-operated pressure control valve, a back pressure is generated in the back-pressure chamber, so that the master cylinder pressure is increased to a sum of the fluid pressure generated in the pressurizing chamber by only the brake operating force and the back pressure generated in the back-pressure chamber. The back pressure generated in the back-pressure chamber can be controlled as desired by controlling the amount of electric current to be applied to the solenoid-operated pressure control valve, so that the master cylinder pressure in the pressurizing chamber can be controlled as needed. In this case, too, the effective diameter of the pressurizing piston is partially reduced owing to partial communication between the pressurizing and back-pressure chamber. This reduction of the effective diameter of the pressurizing piston may be considered to be "partial reduction" or "incomplete reduction" of the effective diameter, as distinguished from "complete reduction" of the effective diameter which is effected when the two chambers are fully communicated with each other.

In the present braking pressure source device, the relationship between the brake operating force and the master cylinder pressure can be changed as needed, without the provision of a power-operated hydraulic pressure source including a power-operated pump adapted to deliver a pressurized fluid to the back-pressure chamber. Accordingly, the present braking pressure source device is available at a relatively low cost. By controlling the first control valve device on the basis of at least one of the operating state of the brake operating member, the state of the road surface and the running condition of the vehicle, it is possible to facilitate an anti-lock braking pressure control for slipping wheels, so as to maximize the overall vehicle braking force, possible to facilitate the braking operation during running of the vehicle on a road surface having a relatively low friction coefficient, and possible to perform various controls of the vehicle braking force upon detection of a requirement for an abrupt or emergency brake application to the vehicle, upon detection of a defect of a booster or a braking sub-system associated with a vehicle wheel brake, or upon detection that the boosting limit of the booster has been reached.

However, the principle of the present invention does not inhibit the provision of a power-operated hydraulic pressure source for supplying the back-pressure chamber with a pressurized fluid. Where the power-operated hydraulic pressure source is provided, this power-operated hydraulic pressure source is used to supply the back-pressure chamber with the pressurized fluid as long as the power-operated hydraulic pressure source is normal, and the first control valve device is controlled for fluid communication between the pressurizing chamber and the back-pressure chamber where the power-operated hydraulic pressure source is defective. Further, the first control valve device may be controlled for fluid communication between the pressurizing and back-pressure chambers, while the power-operated hydraulic pressure source is normal. Where the braking system has mutually independent two or more braking sub-systems, for instance, two braking sub-systems, the power-operated hydraulic pressure source may be operated for operating a normally operable one of the two braking sub-systems when the other braking sub-system is defective. If the vehicle operator's vehicle braking effect cannot be obtained even when the pressure of the pressurized fluid delivered from the power-operated hydraulic pressure source has reached the upper limit, the first control valve device is controlled for fluid communication between the pressurizing and back-pressure chambers to reduce the effective diameter of the pressurizing piston.

(2) A braking pressure source device according to the above mode (1), further comprising:

a reservoir for storing the working fluid at a pressure substantially equal to an atmospheric pressure;

a connecting passage connecting the reservoir and the back-pressure chamber; and a check valve disposed in the connecting passage which permits a flow of the fluid in a first direction from the reservoir toward the back-pressure chamber and inhibits a flow of the fluid in a second direction opposite to the first direction.

In the braking pressure source device according to the above mode (2), the fluid is delivered from the reservoir into the back-pressure chamber when the pressurizing piston is advanced while the back-pressure chamber is disconnected from the pressurizing chamber. In other words, a supply of the fluid from the reservoir to the back-pressure chamber permits an advancing movement of the pressurizing piston. Accordingly, it is possible to easily control the relationship between the master cylinder pressure and the brake operating force, while preventing the back-pressure in the back-pressure chamber from being lowered below the atmospheric level.

(3) A braking pressure source device according to the above mode (1) or (2), wherein the first control valve device includes a solenoid-operated pressure control valve capable of controlling a fluid pressure difference across the solenoid-operated pressure control valve, according to an amount of electric current applied thereto, and the first control valve control device includes a current control portion operable to control the amount of electric current to be applied to the solenoid-operated pressure control valve on the basis of at least one of the operating state of the brake operating member, the running state of the automotive vehicle and the state of the road surface.

In the braking pressure source device according to the above mode (3), the relationship between the master cylinder pressure and the brake operating force can be controlled as desired.

The solenoid-operated pressure control valve may be a normally open valve which is open for fluid communication between the pressurizing chamber and the back-pressure chamber while no electric current is applied to its solenoid coil, and is closed when an electric current is applied to the solenoid coil. Alternatively, the solenoid-operated pressure control valve may be a normally closed valve which is closed for disconnecting the pressurizing and back-pressure chambers while no electric is applied to the solenoid coil, and is opened for fluid communication between the chambers when an electric current is applied to the solenoid coil.

The first control valve device may be principally constituted by a solenoid-operated shut-off valve, which may be a normally open valve or a normally closed valve. In either case, it is possible to control the relationship between the master cylinder pressure and the brake operating force by controlling the duty ratio of the solenoid coil. However, the accuracy of control of the above-indicated relationship is higher where the first control valve device is principally constituted by the solenoid-operated pressure control valve than where the first control valve device is principally constituted by the solenoid-operated shut-off valve. The solenoid-operated pressure control valve may be arranged such that the fluid pressure difference across the valve acts in the valve-opening direction or in the valve-closing direction.

(4) A braking pressure source device according to any one of the above modes (1)–(3), further comprising flow restricting provided in the communication passage.

Where the first control valve device is principally constituted by a solenoid-operated shut-off, valve, the flow restricting means is a flow restrictor provided separately from the shut-off valve. Where the first control valve device is principally constituted by a solenoid-operated pressure control valve, the flow restricting means may be a separate flow restrictor, or alternatively the solenoid-operated pressure control valve may incorporate the flow restricting means. In the latter case, the solenoid-operated pressure control valve is constructed such that the amount of opening is controlled with a change in the amount of electric current to be applied to its solenoid coil, so that the rate of flow of the pressurized fluid from the pressurizing chamber to the back-pressure chamber is controlled as the amount of electric current is changed.

The flow restricting means provided in the communication passage makes it possible to prevent a rapid flow of the pressurizing fluid from the pressurizing chamber to the back-pressure chamber when the first control valve device is opened to effect the fluid communication between the two chambers. Accordingly, the flow restricting means facilitates the control of the master cylinder pressure, and is effective to minimize an influence of the fluid flow between the chambers on the brake operating member, which influence is unexpected to the vehicle operator.

(5) A braking pressure source device according to any one of the above modes (1)–(4), further comprising:
   a reservoir for storing the working fluid at a pressure substantially equal to an atmospheric pressure;
   a connecting passage connecting the reservoir and the back-pressure chamber; and
   a second control valve device disposed in the connecting passage and capable of controlling a fluid pressure difference across the second control valve device, according to an amount of electric current applied thereto.

The second control valve device may be principally constituted by a solenoid-operated shut-off valve or a solenoid-operated pressure control valve.

Like the solenoid-operated pressure control valve of the first control valve device, the solenoid-operated pressure control valve of the second control valve device may be a normally open valve or a normally closed valve. Whether the solenoid-operated pressure control valve of the second control valve device is the normally open valve or the normally closed valve is preferably determined depending upon the construction of the solenoid-operated pressure control valve or shut-off valve of the first control valve device. In either case, the solenoid-operated pressure control valve of the second control valve device facilitates the control of the back pressure in the back-pressure chamber, by controlling the rate of flow of the working fluid from the back-pressure chamber to the reservoir with a change in the amount of electric current applied thereto. Where the second control valve device is principally constituted by the solenoid-operated shut-off valve, this shut-off valve may be simply opened and closed, or the duty ratio of its solenoid coil may be controlled. The shut-off valve of the second control valve device may also be either a normally open valve or a normally closed valve.

In the braking pressure source device according to the above mode (5), the second control valve device provided in the connecting passage further facilitates the control of the master cylinder pressure in relation to the brake operating force. (6) A braking pressure source device according to any one of the above modes (1)–(5), wherein the braking system includes a front wheel brake for braking a front wheel of the automotive vehicle, and a rear wheel brake for braking a rear wheel of the automotive vehicle, and the master cylinder includes a first pressurizing piston and a second pressurizing piston which are disposed in series with each other in the cylinder housing and cooperate with the cylinder housing to define a first pressurizing chamber and a second pressurizing chamber, respectively, on front sides of the first and second pressurizing pistons, respectively, one of the first and second pressurizing chambers being connected to the front wheel brake while the other of the first and second pressurizing chambers being connected to the rear wheel brake, and wherein the other pressurizing chamber is connected to the back-pressure chamber through the communication passage.

In the braking pressure source device according to the above mode (6), the first control valve device is controlled to effect the fluid communication between the above-indicated other pressurizing chamber and the back-pressure chamber through the communication passage, when the front braking sub-system including the front brake is defective, for instance. In this case, the fluid pressure in the above-indicated other pressurizing chamber is increased to effectively reduce the amount of reduction of the total vehicle braking force when the front braking sub-system is defective.

In a braking system for an automotive vehicle, the front wheel brake generally has a larger braking capacity than the rear wheel brake. Accordingly, the total vehicle braking capacity is considerably reduced when the front braking sub-system is defective. In the braking pressure source device according to the above mode (6), however, the pressurizing chamber connected to the rear wheel brake is communicated with the back-pressure chamber to increase the fluid pressure in this pressurizing chamber of the master cylinder, so that the reduction of the total vehicle braking force when the front braking sub-system is defective can be effectively minimized.

(7) A braking pressure source device according to the above mode (6), wherein the front wheel brake has a front wheel brake cylinder for braking the front wheel, and the rear wheel brake has a rear wheel brake cylinder for braking the rear wheel, the first control valve control device including:

a front-wheel anti-lock control detecting portion for detecting initiation of an anti-lock braking pressure control for controlling the front wheel brake cylinder so as to prevent an excessive tendency of slipping of the front wheel on a road surface which takes place, during an operation of the front wheel brake, due to a fluid pressure in the front wheel brake cylinder which is excessively high in relation to a friction coefficient of the road surface; and a communication control portion operable upon detection by the front-wheel anti-lock control detecting portion of the initiation of the anti-lock braking pressure control, to command the first control valve device to effect the fluid communication between the above-indicated other pressurizing chamber and the back-pressure chamber through the communication passage.

When the anti-lock braking pressure control has been initiated for the front wheel brake cylinder, the above-indicated other pressurizing chamber connected to the rear wheel brake is communicated with the back-pressure chamber through the communication passage, to increase the fluid pressure in the above-indicated other pressurizing chamber. The fluid pressure in the above-indicated other pressurizing chamber is increased since the above-indicated one pressurizing chamber has already been disconnected from the front wheel brake cylinder, so that the fluid pressure in the rear wheel brake cylinder (rear wheel brake cylinder pressure) is increased, whereby the total vehicle braking force is accordingly increased. If the rear wheel has an excessive slipping tendency in relation to the friction coefficient of the road surface as a result of an increase in the rear wheel brake cylinder pressure, an anti-lock braking pressure control is initiated for the rear wheel brake cylinder. The present arrangement is particularly effective in a braking system of the type which is adapted to initiate the anti-lock braking pressure control for the front wheel before the anti-lock braking pressure control for the rear wheel. However, the present arrangement may be effective also in a braking system of the type not adapted as described above, since this type of braking system may initiate the anti-lock braking pressure control for the front wheel brake cylinder before the anti-lock braking pressure control for the rear wheel brake cylinder, when the friction coefficient of an area of the road surface on which the front wheel lies is temporarily considerably lower than that of an area of the road surface on which the rear wheel lies.

(8) A braking pressure source device according to any one of the above modes (1)–(7), wherein the braking system includes a wheel brake having a wheel brake cylinder for braking a wheel of the automotive vehicle, and the first control valve control device includes:

an anti-lock control detecting portion for detecting initiation of an anti-lock braking pressure control for controlling the wheel brake cylinder so as to prevent an excessive tendency of slipping of the wheel on a road surface which takes place, during an operation of the wheel brake, due to a fluid pressure in the wheel brake cylinder which is excessively high in relation to a friction coefficient of the road surface; and a communication control portion operable upon detection by the anti-lock control detecting portion of the initiation of the anti-lock braking pressure control, to command the first control valve device to effect the fluid communication between the pressurizing chamber and the back-pressure chamber through the communication passage.

When the pressurizing chamber is communicated with the back-pressure chamber through the communication passage, the rate of increase of the fluid pressure in the pressurizing chamber (master cylinder pressure) with an increase in the operating stroke of the brake operating member is reduced, so that the master cylinder pressure can be easily controlled. Where the vehicle is braked on a frozen road surface, for example, the anti-lock braking control for the wheel brake cylinder is initiated while the master cylinder pressure is comparatively low, so that the amount of change of the operating stroke of the brake operating member is considerably reduced, resulting in hard operating feel of the brake operating member, making it difficult to intricately control the operating force of the brake operating member. The road surface is frozen as a result of freezing of water on the road surface into a layer of ice, or as a result of compaction of a layer of snow on the road surface by tires of vehicles running on the layer of snow. In the latter case, the frozen road surface may be a mirror surface having a considerably low friction coefficient, so that the vehicle operator has considerable difficulty to intricately manipulate the brake operating member during brake application to the vehicle running on such a mirror surface. The present braking pressure source device is effective to reduce this difficulty, since the fluid communication between the pressurizing and back-pressure chambers causes an increase in the operating stroke of the brake operating member to establish a given level of the master cylinder pressure.

When the pressurizing chamber is communicated with the back-pressure chamber to deliver the pressurized fluid from the pressurizing chamber to the back-pressure chamber, the total amount of the fluid discharged from the pressurizing chamber is made larger than when the pressurizing and back-pressure chambers are not communicated with each other. Accordingly, the operating stroke of the brake operating member is made larger when the two chambers are communicated with each other. The amount of increase of the operating stroke of the brake operating member is maximized when the pressurizing and back-pressure chambers are held in communication with each other so as to reduce the effective diameter of the pressurizing piston. In this case, the operating force of the brake operating member can be controlled with utmost ease.

(9) A braking pressure source device according to any one of the above modes (1)–(8), wherein said first control valve control device includes:

an abrupt-brake-application detecting portion operable to detect a requirement for an abrupt brake application to the automotive vehicle; and a communication control portion operable upon detection by said abrupt-brake-application detecting portion of said requirement for said abrupt brake application, to command said first control valve to effect the fluid communication between said pressurizing chamber and the back-pressure chamber through the communication passage.

When an abrupt brake application to the vehicle is required, it is desirable to maximize the master cylinder pressure. The present braking pressure source device is capable of meeting this desire.

The communication control portion provided in the present braking pressure source device is arranged to hold the pressurizing chamber and the back-pressure chamber in communication with each other, to reduce the effective diameter of the pressurizing piston. In principle, the communication control portion is arranged to maintain the fluid communication between the two chambers. However, the communication control portion may be adapted to hold the two chambers in communication with each other during an initial period of the abrupt brake application, until the master cylinder pressure has been increased to a predetermined level. In this case, the communication control portion is adapted to command the control of the first control valve device to initiate the control of the fluid pressure difference across the first control valve device, when the master cylinder pressure has been increased to the predetermined level, for controlling the back pressure in the back-pressure chamber so that the master cylinder pressure after the master cylinder pressure has been increased to the predetermined level is increased at a lower rate than while the pressurizing and back-pressure chambers were held in communication with each other.

(10) A braking pressure source device according to the above mode (9), wherein the communication control portion commands the first control valve device to effect the fluid communication between the pressurizing chamber and the back-pressure chamber when a rate of increase of the operating force of the brake operating member has been reduced below a predetermined threshold after the requirement for the abrupt brake application is detected by the abrupt-brake-application detecting portion.

If the pressurizing and back-pressure chambers are communicated with each other when the requirement for the abrupt brake application is detected by the abrupt-brake-application detecting portion, the operating force of the brake operating member is considerably increased. In the braking pressure source device according to the above mode (10), the two chambers are communicated with each other through the communication passage when the rate of increase of the brake operating force has been reduced below the predetermined threshold. This arrangement permits an increase of the master cylinder pressure while preventing a considerable increase of the brake operating stroke.

The predetermined threshold of the rate of increase of the brake operating force is determined such that the master cylinder pressure is increased to a level close to the level desired by the vehicle operator when the rate of increase of the brake operating force has been reduced below the threshold, that is, such that when the rate of increase has been reduced below the threshold the vehicle operator has operated the brake operating member to a position at which the master cylinder pressure is close to the level desired by the vehicle operator. When the pressurizing and back-pressure chambers are communicated with each other in this state, the amount of subsequent increase of the brake operating stroke is not so large.

(11) A braking pressure source device according to any one of the above modes (1)–(10), wherein the first control valve control device includes:

a low-friction-coefficient detecting portion operable to detect that a friction coefficient of a road surface on which the automotive vehicle is running is lower than a predetermined threshold; and a communication control portion operable upon when the low-friction-coefficient detecting portion has detected that the friction coefficient is lower than the predetermined threshold, to command the first control valve device to effect the fluid communication between the pressurizing chamber and the back-pressure chamber through the communication passage.

When the vehicle is braked on a road surface having a low friction coefficient, the operating force of the brake operating member is required to be intricately controlled. The braking pressure source device according to the above mode (11) is capable of easily satisfying this requirement. Namely, the fluid communication between the pressurizing and back-pressure chamber causes a decrease in the rate of increase of the master cylinder pressure with an increase in the brake operating force.

(12) A braking pressure source device according to any one of the above modes (1)–(11), further comprising a booster for boosting the brake operating force and transmitting the boosted brake operating force to the input rod of the master cylinder, and wherein the first control valve control device includes:

a booster defect detecting portion operable to detect a defect of the booster; and a communication control portion operable upon detection of the defect of the booster by the booster defect detecting portion, to command the first control valve device to effect the fluid communication between the pressurizing chamber and the back-pressure chamber through the communication passage.

In the braking pressure source device according to the above mode (12), the pressurizing and back-pressure chambers are communicated with each other to reduce the effective diameter of the pressurizing piston for thereby increasing the master cylinder pressure, when the booster is defective, that is, when the booster is not capable of boosting the brake operating force. Accordingly, the amount of reduction of the vehicle braking force due to the defect of the booster can be minimized.

(13) A braking pressure source device according to any one of the above modes (1)–(12), further comprising a booster for boosting the brake operating force and transmitting the boosted brake operating force to the input rod of the master cylinder, and wherein the first control valve control device includes:

a boosting limit detecting portion operable to detect that a boosting limit of the booster has been reached; and a communication control portion operable upon detection by the boosting limit detecting portion that the boosting limit of the booster has been reached, to command the first control valve device to start controlling a fluid pressure difference across the first control valve device.

In the braking pressure source device according to the above mode (13), the back pressure in the back-pressure chamber is controlled after the boosting limit of the booster has been reached, so that the master cylinder pressure can be increased at the same rate as before the boosting limit has been reached.

(14) A braking pressure source device according to any one of the above modes (1)–(13), wherein the first control valve control device controls the first control valve device on the basis of at least one of the brake operating force and a pressure of the fluid in the pressurizing chamber, and a rate of change of each of the above-indicated at least one of the brake operating force and the pressure.

The relationship between the brake operating force and the master cylinder pressure (pressure in the pressurizing chamber) can be further intricately controlled, by controlling the first control valve device on the basis of not only at least one of the brake operating force and the master cylinder pressure, but also a rate of change of the brake operating force and/or a rate of change of the master cylinder pressure. The braking pressure source device according to the above mode (10) is one example of the braking pressure source device according to the above mode (14).

(15) A braking pressure source device according to any one of the above modes (1)–(14), wherein the first control valve control device controls the first control valve device on the basis of at least one of the brake operating force and a pressure of the fluid in the pressurizing chamber, and a time which has passed after a moment of detection of: (a) initiation of an anti-lock braking pressure control for controlling a front wheel brake cylinder of the braking system so as to prevent an excessive tendency of slipping of a front wheel of the automotive vehicle on a road surface on which the automotive vehicle is running; (b) initiation of an anti-lock braking pressure control for controlling a wheel brake cylinder of the braking system so as to prevent an excessive tendency of slipping of a wheel of the automotive vehicle on the road surface; (c) a requirement for an abrupt brake application to the automotive vehicle; (d) reduction of a friction coefficient of the road surface below a predetermined threshold; (e) a defect of a booster capable of boosting the brake operating force and transmitting the boosted brake operating force to the input rod of the master cylinder; and (f) a state in which a boosting limit of the booster has been reached.

In the braking pressure source device according to the above mode (15), the first control valve control device may be adapted to command the first control valve device to effect the fluid communication between the pressurizing and back-pressure chambers through the communication passage, when the predetermined time has passed after the moment of detection of any one of the above-indicated states or events. This arrangement permits the effective utilization of the back pressure in the back-pressure chamber while reducing an increase of the brake operating stroke. The predetermined time may be a fixed time, or may be changed depending upon the rate of increase of the brake operating force or the master cylinder pressure upon, before or after detection of any one of the above-indicated states or events.

For instance, the predetermined time after the moment of detection of the requirement for an abrupt brake application to the vehicle is reduced with an increase in the rate of increase of the brake operating force or master cylinder pressure, since the rate of increase of the brake operating force or master cylinder pressure is relatively high at the moment when the abrupt brake application is required. This arrangement permits an increase of the master cylinder pressure without a delay, while reducing an increase of the brake operating stroke.

(16) A braking pressure source device according to any one of the above modes (1)–(15), further comprising a brake operating force boosting device operable to boost the brake operating force of the brake operating member and transmitting the boosted brake operating force to the pressurizing piston.

(17) A braking pressure source device according to the above mode (16), wherein the brake operating force boosting device includes a boosting ratio changing portion operable to change a ratio of boosting of the brake operating force, depending upon an operating stroke of the brake operating member.

The master cylinder pressure can be easily controlled to a level close to the desired level, by maximizing the boosting ratio of the brake operating force boosting device when the master cylinder pressure is at a predetermined level, and then reducing the boosting ratio. This arrangement assures a relatively hard operating feel of the brake operating member as felt by the vehicle operator after the boosting ratio is reduced. Further, the present arrangement is effective to reduce the maximum brake operating stroke. In addition, the master cylinder pressure can be increased in various manners, by changing the boosting ratio of the brake operating force changing portion in various patterns, in suitable combinations with the moment and manner at or in which the pressurizing chamber and the back-pressure chamber are communicated with each other by the first control valve device.

(18) A braking pressure source device according to the above mode (5), further comprising a first diagnosing portion operable to diagnose at least one of the first control valve device and the second control valve device, during reduction of the brake operating force while the automotive vehicle is stationary.

The first and second control valve devices disposed in the communication passage and the connecting passage, respectively, can be diagnosed without operator's recognition of the diagnosis, if the diagnosis is effected while the vehicle is stationary. If the diagnosis is effected while the brake operating force is being reduced, the control valve devices can be diagnosed for sticking of their valve members in the open state (a defect that the control valve devices cannot be closed). Where the first control valve device in the communication passage is open while the second control valve device in the connecting passage is stuck in its open state, the pressurizing chamber is held in communication with the reservoir. Therefore, it is desirable not to open the first control valve device in the communication passage while the second control valve device in the connecting passage is stuck in the open state. In this respect, it is particularly desirable to diagnose the second control valve device for sticking of its valve member in the open state.

(19) A braking pressure source device according to any one of the above modes (1)–(18), further comprising a second diagnosing portion operable while the automotive vehicle is stationary, to command the first control valve device to effect the fluid communication between the pressuring chamber and the back-pressure chamber through the communication passage, and diagnosing the braking pressure source device on the basis of an operating state of the braking pressure source device after the first control valve device is commanded to effect the fluid communication.

The braking pressure source device is operated with an operation of the brake operating member, or without an operation of the brake operating member. In the latter case, the braking pressure source device is operated, for example, with an operation of a power-operated hydraulic pressure source as provided according to the mode (39) of this invention (which will be described), without an operation of the brake operating member. In this case, the pressurizing piston is advanced as a pressurized fluid is delivered from the power-operated hydraulic pressure source to the back-pressure chamber, and the fluid in the pressurizing chamber is pressurized. Alternatively, the pressurized fluid is delivered from the power-operated hydraulic pressure source to the pressurizing chamber through the communication passage and the first control valve device placed in the open state, so that the braking pressure source device is operated without an operation of the brake operating member.

Where the breaking pressure source device is operated with an operation of the brake operating member, the first control valve device is controlled to effect the fluid communication through the pressurizing and back-pressure chambers through the communication passage. If the master cylinder pressure can be increased to a level which corresponds to the specific operating amount (operating force or stroke) of the brake operating member and which is expected to be established by reduction of the effective diameter of the pressurizing piston, it indicates that the first control valve device and the master cylinder are both normal. If the master cylinder pressure cannot be increased to the above-indicated level, it indicates that at least one of the first control valve device and the master cylinder is defective or abnormal.

Where the braking pressure source device is operated without an operation of the brake operating member, the first control valve device and the master cylinder are diagnosed to be normal if the master cylinder pressure can be increased to a level which is expected to be established based on the back pressure in the back-pressure chamber generated by the pressurized fluid delivered from the power-operated hydraulic pressure source to the back-pressure chamber, or based on the above-indicated back pressure and the pressure of the fluid in the pressurizing chamber generated by the pressurized fluid delivered from the power-operated hydraulic pressure source to the pressurizing chamber through the communication passage. If the master cylinder pressure cannot be increased to the above-indicated level, it indicates that at least one of the first control valve device and the master cylinder is defective.

The braking pressure source device according to the above mode (19) can be diagnosed while it is being operated. Further, the diagnosis effected while the vehicle is in a stationary state does not disturb the normal braking operation of the braking system during running of the vehicle.

(20) A braking pressure source device according to the above mode (19), wherein the second diagnosing portion commands the first control valve device to effect the fluid communication while a brake pedal as the brake operating member is not in operation, and determines that the braking pressure source device is defective if a degree of increase of the fluid pressure in the pressurizing chamber with an increase of an operating force of the brake pedal operated after the first control valve device is commanded to effect said fluid communication is smaller than a predetermined threshold.

In the braking pressure source device according to the above mode (20), the second diagnosing portion can diagnose the braking pressure source device where the electric system of the vehicle is turned on while the brake pedal is not in operation. In this condition, the pressuring and back-pressure chambers are communicated with each other while the brake pedal is not in operation, the fluid pressure in the pressurizing chamber must be increased at a nominal rate determined by an effect of the fluid communication between the two chambers, from the very beginning of the operation of the brake pedal, if the braking pressure source device is normal. Therefore, the braking pressure source device can be diagnosed on the basis of the degree of increase of the fluid pressure in the pressurizing chamber with an increase of the operating force of the brake pedal. The degree of increase of the fluid pressure may be a rate of increase of the fluid pressure or an amount of increase of the fluid pressure.

(21) A braking pressure source device according to the above mode (20), wherein the braking system includes a wheel brake for braking a wheel of the automotive vehicle, the wheel brake having a wheel brake cylinder connected to the master cylinder and operable with a pressurized fluid delivered from the master cylinder, the braking pressure source device further comprising a third control valve device operable to disconnect the wheel brake cylinder from the master cylinder, and wherein the second diagnosing portion commands the third control valve device to disconnect the wheel brake cylinder from the master cylinder when the second diagnosing portion commands the first control valve device to effect the fluid communication.

Like the first and second control valve devices, the third control valve device may be principally constituted by a solenoid-operated shut-off valve or a solenoid0operaetd pressure control valve.

The third control valve device may be provided for each of a plurality of wheel brake cylinders provided in the braking system. In this case, at least one or all of the third control valve devices corresponding to the respective wheel brake cylinders may be commanded to disconnect the corresponding wheel brake cylinder or cylinders from the master cylinder.

With the wheel brake cylinder being disconnected from the master cylinder by the third control valve device, the amount of flow of the pressurized fluid from the pressurizing chamber is zeroed or reduce. Accordingly, the amount of increase of the operating stroke of the brake pedal due to the fluid communication between the pressurizing and back-pressure chambers is reduced, making it possible to reduce a possibility of the vehicle operator feeling uneasy with the increase of the operating stroke. Where the diagnosis is effected with all of the wheel brake cylinders being disconnected from the master cylinder by the respective third control valve devices, the diagnosis does not disturb the normal braking operation of the braking system, since the diagnosis is effected in the stationary state of the vehicle. In this case, the vehicle operator is less likely to feel uneasy with an increase of the operating stroke of the brake pedal.

(22) A braking pressure source device according to the above mode (21), wherein the master cylinder is a tandem type master cylinder having two mutually independent pressurizing chambers, and the braking system has at least one first wheel brake cylinder connected to one of the two pressurizing chambers, and at least one second wheel brake cylinder connected to the other of the two pressurizing chambers, the third control valve device is disposed between the above-indicated one pressurizing chamber and the above-indicated at least one first wheel brake cylinder.

When the braking pressure source device is diagnosed, the above-indicated one of the two pressurizing chambers of the master cylinder and the at least one first wheel brake cylinder are disconnected from each other, while the other pressurizing chamber and the above-indicated at least one second wheel brake cylinder are communicated with each other. Accordingly, the diagnosis is effected while the stationary automotive vehicle is braked with the at least one second wheel brake cylinder, with a reduced amount of flow of the fluid from the master cylinder, which reduces a possibility of the vehicle operator feeling uneasy with an increase of the brake pedal operating stroke.

(23) A braking pressure source device according to the above mode (22), wherein the above-indicated at least one first wheel brake cylinder is at least one rear wheel brake cylinder for braking at least one rear wheel of the automotive vehicle.

In a braking system for an automotive vehicle, the front wheel brake generally has a large braking capacity than the rear wheel brake. In this braking system, the vehicle can be braked with a larger braking force by the front wheel brake with the front wheel brake cylinder in communicated with the master cylinder while the diagnosis is effected.

(24) A braking pressure source device according to any one of the above modes (20)–(23), wherein the second diagnosing portion determines that the braking pressure source device is defective, if the pressure of the fluid in the pressurizing chamber when the operating force of the brake pedal has exceeded a predetermined threshold is lower than a predetermined threshold.

The threshold of the fluid pressure in the pressurizing chamber is determined such that the fluid pressure in the pressurizing chamber exceeds the threshold when the operating force of the brake pedal has exceeded the threshold, if the braking pressure source device is normal. If the diagnosis is effected without depending upon the operating force of the brake pedal, it is not possible to determine whether the fluid pressure in the pressurizing chamber is lower than the threshold, because the operating force of the brake pedal is small, or because the braking pressure source device is defective. In the braking pressure source device according to the above mode (24), the second diagnosing portion determines whether the fluid pressure when the operating force has exceeded the threshold is smaller than the threshold. This fluid pressure should not be lower than the threshold if the braking pressure source device is normal, and therefore the braking pressure source device can be diagnosed to be defective, if the fluid pressure detected when the operating force has exceeded the threshold is lower than the threshold.

(25) A braking pressure source device according to any one of the above modes (20)–(24), wherein the second diagnosing portion determines that the braking pressure source device is defective, if a ratio of a rate of increase of the pressure of the fluid in the pressurizing chamber to a rate of increase of the operating force of the brake pedal is lower than a predetermined threshold.

The rate of increase of the fluid pressure in the pressurizing chamber and the rate of increase of the operating force of the brake pedal may be represented by amounts of increase of the fluid pressure and the operating force within a predetermined time, for instance, a cycle time of a diagnostic routine executed by the second diagnosing portion.

The rate of increase of the fluid pressure in the pressurizing chamber when the operating force of the brake pedal is increased at a given rate is higher when the pressurizing chamber is communicated with the back-pressure chamber to reduce the effective diameter of the pressurizing piston, than when the pressurizing chamber is not communicated with the back-pressure chamber. Therefore, the ratio of the rate of increase of the fluid pressure to the rate of increase of the operating force is not lower than the predetermined threshold if the braking pressure source device is normal. In other words, the braking pressure source device can be diagnosed to be defective if the above-indicated ratio is lower than the threshold.

(26) A braking pressure source device according to the above mode (19), wherein the second diagnosing portion commands the first control valve device to effect the fluid communication between the pressurizing chamber and the back-pressure chamber while a brake pedal as the brake operating member is in operation, and determines that the braking pressure source device is defective, if a degree of increase of the fluid pressure in the pressurizing chamber after the first control valve device is commanded to effect the fluid communication is smaller than a predetermined threshold.

The braking pressure source device according to the above mode (26) can be diagnosed where the electric system of the braking system is turned on while the brake pedal is in operation. The fluid pressure in the pressurizing chamber must be increased after the first control valve device is commanded to effect the fluid communication between the pressurizing and back-pressure chambers, if the braking pressure source device is normal. The braking source device can be diagnosed to be defective, if the degree of increase of the fluid pressure is lower than the predetermined threshold after the two chambers are communicated with each other.

(27) A braking pressure source device according to the above mode (26), wherein the second diagnosing portion determines that the braking pressure source device is defective, if the degree of increase of the fluid pressure is not equal to or larger than the predetermined threshold within a predetermined time after the first valve device is commanded to effect the fluid communication The operating state of the braking pressure source device as established when the pressurizing and back-pressure chambers are communicated with each other is not necessarily maintained for a long time. Further, the fluid communication between the two chambers is not necessarily completed immediately after the first control valve device is commanded to effect the fluid communication. In view of these possibilities, the predetermined time indicated above is determined to be longer than the time required for completing the fluid communication between the two chambers, and such that the operating state of the braking pressure source device is not likely to change within the predetermined time, for instance, such that the brake pedal is not likely to be released within the predetermined time. In the braking pressure source device according to the above mode (27), the second diagnosing portion assures an accurate diagnosis of the braking pressure source device while the pressurizing and back-pressure chambers are held in communication with each other, and without an influence of a change in the operating state of the braking pressure source device.

(28) A braking pressure source device according to the above mode (26) or (27), wherein the second diagnosing portion commands the first control valve device to effect the fluid communication while the operating force of the brake pedal is held substantially constant.

Although the diagnosis may be effected while the brake pedal is being depressed, the diagnosis is preferably effected while the brake pedal is kept in substantially the same operated position or while the operating force of the brake pedal is held substantially constant. In this respect, the second diagnosing portion preferably includes a constant-brake-operating-force detecting portion operable to detect that the operating force of the brake pedal is held substantially constant within a predetermined time, and a commanding portion operable upon detecting of this condition by the detecting portion, to command the first control valve device to effect the fluid communication between the two chambers. This arrangement permits accurate detection of the increase of the fluid pressure in the pressurizing chamber due to the fluid communication, without an influence of an increase in the operating force of the brake pedal, and assures an accurate diagnosis of the braking pressure source device.

(29) A braking pressure source device according to any one of the above modes (26)–(28), wherein the braking system includes a wheel brake for braking a wheel of the automotive vehicle, the wheel brake having a wheel brake cylinder connected to the master cylinder and operable with a pressurized fluid delivered from the master cylinder, the braking pressure source device further comprising a third control valve device operable to disconnect the wheel brake cylinder from the master cylinder, and wherein the second diagnosing portion commands the third control valve device to disconnect the wheel brake cylinder from the master cylinder when the second diagnosing portion commands the first control valve device to effect the fluid communication.

In the braking pressure source device according to the above mode (29), the pressurized fluid is not delivered from the master cylinder to the wheel brake cylinder during the diagnosis, since the wheel brake cylinder is held disconnected from the master cylinder by the third control valve device while the pressurizing and back-pressure chambers are held in communication with each other. Accordingly, the operating stroke of the brake pedal is not increased, so that if the braking pressure source device is normal, the operating force of the brake pedal becomes equal to or higher than the value when the first control valve device was command to effect fluid communication between the two chambers. Therefore, the fluid pressure in the pressurizing chamber is increased by at least an amount corresponding to an effect of the fluid communication. The present arrangement assures improved accuracy of diagnosis of the braking pressure source device on the basis of the degree of increase of the fluid pressure in the pressurizing chamber.

The operating stroke of the brake pedal is not increased since the wheel brake cylinder is disconnected from the master cylinder by the third control valve device and since the operating force of the brake pedal is held substantially constant while the pressurizing and back-pressure chambers are held in communication with each other. Accordingly, the fluid pressure in the pressurizing chamber is increased to a level corresponding to the operating force of the brake pedal, after the fluid communication between the two chambers is completed. That is, the effect of the fluid communication can be accurately reflected on the increase of the fluid pressure in the pressurizing chamber, in the above-indicated condition, so that the braking pressure source device can be diagnosed with high reliability, depending upon the degree of increase of the fluid pressure in the pressurizing chamber. Further, the present arrangement is free from the vehicle operator's recognition of the diagnosis, since the diagnosis is effected while the operating force of the brake pedal is held substantially constant by the vehicle operator. If the diagnosis were effected during a vehicle operator's effort to depress the brake pedal while the master cylinder and the wheel brake cylinders are disconnected from each other, the vehicle operator would feel uneasy with the brake pedal which cannot be depressed in the normal manner.

If the vehicle operator tries to depress the brake pedal after the third control valve device is commanded to disconnect the master cylinder and the wheel brake cylinder from each other, the vehicle operator feels uneasy with difficulty in depressing the brake pedal. In this case, the operating force of the brake pedal is usually increased, and the fluid pressure in the pressurizing chamber in relation to the brake pedal operating force is eventually stabilized when the fluid communication between the pressurizing and back-pressure chambers is completed. In this case, too, therefore, the braking pressure source device can be diagnosed with high reliability depending upon the degree of increase of the fluid pressure in the pressurizing chamber.

It is not essential to disconnect the wheel brake cylinder from the master cylinder during the diagnosis. Where the third control valve device is not provided, or when the third control valve device is placed in a state in which the master cylinder and the wheel brake cylinder are held in communication with each other, the brake pedal can be depressed with the pressurized fluid being delivered from the master cylinder to the wheel brake cylinder, and the operating force of the brake pedal may possibly be reduced due to a decrease in the reaction force transmitted from the master cylinder to the brake pedal upon fluid communication between the pressurizing and back-pressure chambers. Thus, the state in which the fluid pressure in the pressurizing chamber is increased upon fluid communication between the two chambers is likely to vary if the wheel brake cylinder is disconnected from the master cylinder during the diagnosis. In the braking pressure source device according to the above mode (29), however, the diagnosis is effected while the master cylinder and the wheel brake cylinder are held disconnected from each other, so that the braking pressure source device can be diagnosed with high reliability on the basis of the master cylinder pressure accurately detected during the fluid communication between the pressurizing and back-pressure chambers.

(30) A braking pressure source device according to any one of the above modes (26)–(30), wherein the master cylinder is a tandem type master cylinder having two mutually independent pressurizing chambers, and the braking system has at least one first wheel brake cylinder connected to one of the two pressurizing chambers, and at least one second wheel brake cylinder connected to the other of the two pressurizing chambers, the third control valve device is disposed between each of the two pressurizing chambers and the at least one wheel brake cylinder connected thereto.

In the braking pressure source device according to the above mode (30), the first control valve device is commanded to effect the fluid communication between the pressurizing and back-pressure chambers while the brake pedal is in operation, and the diagnosis is effected during an operation of the brake pedal, that is, after the brake pedal has been operated to activate the wheel brake cylinders. In this state, the vehicle is braked with the wheel brake cylinders even if all of the wheel brake cylinders are disconnected from the master cylinder during the diagnosis. Since the pressurized fluid is not delivered from the pressurizing chamber to the wheel brake cylinders during the diagnosis, the operating stroke of the brake pedal is not increased when the pressurizing and back-pressure chambers are communicated with each other, so that the vehicle operator will not feel uneasy with an increase of the brake pedal operating stroke which would take place if the wheel brake cylinders were not disconnected from the master cylinder.

(31) A braking pressure source device according to any one of the above modes (26)–(30), wherein the second diagnosing portion determines that the braking pressure source device is defective, if a ratio of an operating force of the brake pedal to the fluid pressure in said pressurizing chamber is higher than a predetermined positive threshold valve.

If the master cylinder and the wheel brake cylinder are disconnected from each other by the third control valve device and the operating force of the brake pedal is held substantially constant when the pressurizing and back-pressure chambers are communicated with each other, the fluid pressure in the pressurizing chamber (master cylinder pressure) is increased due to the fluid communication between the two chambers (owing to an effect of the effective diameter of the pressurizing piston). Since the brake pedal operating force is substantially constant, the ratio of the brake pedal operating force to the master cylinder pressure is comparatively low (positive value).

If the third control valve device is not provided or if the master cylinder and the wheel brake cylinder are not disconnected by the third control valve device when the pressurizing and back-pressure chambers are communicated with each other, the reaction force transmitted from the master cylinder to the brake pedal is rapidly reduced, so that the operating stroke of the brake pedal is increased (due to the pedal sink), and the operating force acting on the brake pedal is reduced. If the brake pedal is not further depressed by the vehicle operator in this state, the operating force of the brake pedal remains at the reduced value. Usually, the vehicle operator further depresses the brake pedal in an attempt to restore the previous operating force, so that the master cylinder pressure is eventually increased as a result of the fluid communication between the pressurizing and back-pressure chambers, so that the ratio of the brake pedal operating force to the master cylinder pressure is a comparatively small value. Even if the brake pedal operating force remains at the reduced value without a further depression of the brake pedal by the vehicle operator, the relationship between the operating force and the master cylinder pressure is the nominal relationship to be established when the effective diameter of the pressurizing piston is reduced as a result of the fluid communication. In this case, too, the ratio of the operating force to the increased master cylinder pressure is a comparatively small positive value. Where the pressurizing and back-pressure chambers are communicated with each other while the brake pedal is being depressed, the amount of increase of the operating stroke of the brake pedal as felt by the vehicle operator is not so large. In this respect, it is noted that the fluid communication between the pressurizing and back-pressure chambers is not completed immediately after the first control valve device is commanded to effect the fluid communication, so that the master cylinder pressure is increased at a relatively low rate due to the fluid communication, and therefore the reaction force indicated above is only slowly reduced with a result of a slow increase of the brake pedal operating stroke. Accordingly, the vehicle operator is less likely to feel uneasy with an increase of the operating stroke.

As described above, the ratio of the operating force of the brake pedal to the master cylinder pressure is a comparatively small value even in the absence of the third control valve device, even while the operating force of the brake pedal is held constant, or even if the diagnosis is effected during depression of the brake pedal, provided the braking pressure source device is normal. Thus, the braking pressure source device can be diagnosed depending upon whether the above-indicated ratio is larger than the predetermined threshold or not.

(32) A braking pressure source device according to any one of the above modes (28)–(30), wherein the second diagnosing portion determines that the braking pressure source device is defective, if a rate of increase of the fluid pressure in the pressurizing chamber is lower than a predetermined threshold.

The rate of increase of the fluid pressure in the pressurizing chamber may be represented by an amount of increase of the fluid pressure within a predetermined time, for instance, a cycle time of a diagnostic routine executed by the second diagnosing portion.

If the braking pressure source device is normal, the rate of increase of the fluid pressure in the pressurizing chamber (master cylinder pressure) as a result of reduction of the effective diameter of the pressurizing piston upon fluid communication between the pressurizing and back-pressure chambers is not lower than the predetermined threshold. The operating force and stroke of the brake pedal will not change as a result of the reduction of the effective diameter of the pressurizing piston, since the operating force is held substantially constant, if the master cylinder and the wheel brake cylinder are disconnected from each other by the third control valve device. Accordingly, the master cylinder pressure is increased at a rate not lower than the threshold value, when the pressurizing and back-pressure chambers are communicated with each other. Therefore, the braking pressure source device can be diagnosed on the basis of the rate of increase of the master cylinder pressure.

If the third control valve device is not provided or if the master cylinder and the wheel brake cylinder are not disconnected by the third control valve device when the pressurizing and back-pressure chambers are communicated with each other, the reaction force transmitted from the master cylinder to the brake pedal is rapidly reduced, so that the operating stroke of the brake pedal is increased (due to the pedal sink), and the operating force acting on the brake pedal is reduced. Usually, the vehicle operator further depresses the brake pedal in an attempt to restore the previous operating force, so that the master cylinder pressure is eventually increased as a result of the fluid communication between the pressurizing and back-pressure chambers, so that the braking pressure source device can be diagnosed on the basis of the rate of increase of the master cylinder pressure. This rate of increase of the master cylinder pressure changes with a change in the speed at which the brake pedal is depressed by the vehicle operator. The above-indicated threshold value of the rate of increase is determined to permit the diagnosis even when the operating speed of the brake pedal is comparatively low and the rate of increase of the master cylinder pressure is accordingly low. Where the third control valve device is provided to disconnect the master cylinder and the wheel brake cylinder from each other, the master cylinder pressure is increased at a rate irrespective of the operating speed of the brake pedal, so that the effect of the reduction of the effective diameter of the pressurizing piston can be accurately reflected on the rate of increase of the master cylinder pressure. Accordingly, the braking pressure source device can be diagnosed with high reliability.

The master cylinder pressure is increased in the process of the fluid communication between the pressurizing and back-pressure chamber, but is not increased after the fluid communication is completed, and the rate of increase of the master cylinder pressure will not be equal to or higher than the threshold, except where the brake pedal can be further depressed with an increased operating force in the absence of the third control valve device or when the master cylinder and the wheel brake cylinder are not disconnected from each other by the third control valve device. In view of the above, the determination as to whether the rate of increase of the master cylinder pressure is lower than the threshold is desirably effected within a predetermined time after the first control valve device is commanded to effect the fluid communication, namely, at a point of time relatively close to the moment at which the fluid communication (reduction of the effective diameter of the pressurizing piston ) is completed.

(33) A braking pressure source device according to any one of the above modes (19)–(32), wherein the braking system includes a wheel brake for braking a wheel of the automotive vehicle, the wheel brake having a wheel brake cylinder connected to the master cylinder and operable with a pressurized fluid delivered from the master cylinder, the braking pressure source device further comprising a third control valve device operable to disconnect the wheel brake cylinder from the master cylinder, and wherein the second diagnosing portion commands the third control valve device to connect the wheel brake cylinder to the master cylinder when the operating force of the brake operating member has exceeded a predetermined threshold, and/or when a movement of the automotive vehicle is initiated.

The automotive vehicle is moved by operation of an engine, for instance, or moved down on a downhill by gravity without an operation of the engine.

When the operating force of the brake operating member has exceeded the threshold, it indicates that the vehicle operator intends to brake the vehicle with a relatively large braking force. When a movement of the vehicle is initiated, it indicates that the vehicle may be required to be braked at any time. Therefore, the third control valve device is commanded to connect the master cylinder and the wheel brake cylinder to each other, to brake the vehicle with an increased braking force when the operating force has exceeded the threshold, or to place the wheel brake cylinder in a state ready for operation when the brake operating member is operated.

(34) A braking pressure source device according to any one of the above modes (19)–(32), wherein the second diagnosing portion commands the first control valve device to disconnect the pressurizing and back-pressure chambers from each other when the operating force of the brake operating member has exceeded a predetermined threshold and/or when a movement of the automotive vehicle is initiated.

While the pressurizing and back-pressure chambers are disconnected from each other by the first control valve device, the braking pressure source device or the wheel brake is operated in the normal braking mode wherein the wheel brake cylinder is operated with the fluid pressurized in the pressurizing chamber based on only the braking force of the brake operating member, without depending on an effect of the fluid communication between the pressurizing and back-pressure chambers. Therefore, the wheel brake is operated in the normal braking mode when the brake operating member is operated with the operating force larger than the threshold, or when the brake operating member is operated after the movement of the vehicle is initiated. Thus, the diagnosis is interrupted with the first control valve device being restored to the state before the diagnosis, when the operating force of the brake operating member has exceeded the threshold and/or when the vehicle is moved.

(35) A braking pressure source device according to any one of the above modes (19)–(34), wherein the second diagnosing portion commands the first control valve device which has been held in a state for the above-indicated fluid communication, to be placed in s state for disconnecting the pressurizing and back-pressure chambers from each other, when the brake operating member is returned to a non-operated position thereof.

In the braking pressure source device according to the above mode (35), the pressurizing and back-pressure chambers are disconnected from each other by the first control valve device, when the brake operating member is returned to its non-operated position, irrespective of whether the diagnosis is terminated or not. Where the first control valve device is normally placed in the closed state for disconnecting the pressurizing and back-pressure chambers, this first control valve device is returned to the normally established closed state in which the braking pressure source device is operated in the normal braking mode. If the diagnosis is not terminated before the brake operating member is returned to the non-operated position, the diagnosis is terminated when the brake operating member is returned to the non-operated position.

(36) A braking pressure source device according to any one of the above modes (20)–(35), wherein the braking system includes a wheel brake for braking a wheel of the automotive vehicle, the wheel brake having a wheel brake cylinder connected to the master cylinder and operable with a pressurized fluid delivered from the master cylinder, the braking pressure source device further comprising a third control valve device operable to disconnect the wheel brake cylinder from the master cylinder, and wherein the second diagnosing portion commands the to third control valve device which has been held in s state for disconnecting the wheel brake cylinder from the master cylinder, to be placed in a state for communication between the wheel brake cylinder and the master cylinder, when the brake operating member is returned to a non-operated position thereof.

In the braking pressure source device according to the above mode (36), the wheel brake cylinder and the master cylinder are communicated with each other through the third control valve device, when the brake operating member is returned to its non-operated position, irrespective of whether the diagnosis is terminated or not. Thus, the wheel brake cylinder is made ready for operation when the brake operating member is subsequently operated. If the diagnosis is not terminated before the brake operating member is returned to the non-operated position, the diagnosis is terminated when the brake operating member is returned to the non-operated position.

(37) A braking pressure source device according to any one of the above modes (19)–(36), wherein the second diagnosing portion commands the first control valve device to disconnect the pressurizing and back-pressure chambers from each other when the second diagnosing portion determines that the braking pressure source device is defective.

In the braking pressure source device, the pressurizing and back-pressure chambers are disconnected from each other when the braking pressure source device is diagnosed to be defective. It is possible to hold the first control valve device in a state for disconnection of the pressurizing and back-pressure chambers, until the defect is eliminated.

(38) A braking pressure source device according to any one of the above modes (20)–(37), wherein the braking system includes a wheel brake for braking a wheel of the automotive vehicle, the wheel brake having a wheel brake cylinder connected to the master cylinder and operable with a pressurized fluid delivered from the master cylinder, the braking pressure source device further comprising a third control valve device operable to disconnect the wheel brake cylinder from the master cylinder, and wherein the second diagnosing portion commands the third control valve device to be placed in a state for fluid communication between the wheel brake cylinder and the master cylinder, when the second diagnosing portion determines that the braking pressure source device is defective.

In the braking pressure source device according to the above mode (38), the wheel brake cylinder and the master cylinder are communicated with each other through the third control valve device, when the braking pressure source device is diagnosed to be defective.

(39) A braking pressure source device according to any one of the above modes (1)–(38), further comprising a power-operated hydraulic pressure source including a pump and a drive device for operating the pump to deliver a pressurized fluid to the back-pressure chamber.

(40) A braking pressure source device according to the above mode (39), further comprising a pressure control valve device disposed between the power-operated hydraulic pressure source and the back-pressure chamber, the pressure control valve device controlling a pressure of a pressurized fluid delivered from the power-operated hydraulic pressure source to the back-pressure chamber.

(41) A braking pressure source device according to the above mode (40), wherein the pressure control valve device includes a reservoir, a pressure-increasing valve for effecting fluid communication between the power-operated hydraulic pressure source and the back-pressure chamber to increase the pressure of the fluid in the back-pressure chamber, and a pressure-reducing valve for permitting the pressurized fluid to be discharged from the back-pressure chamber to the reservoir to reduce the pressure of the fluid in the back-pressure chamber.

(42 A braking pressure source device according to the above mode (41), wherein at least one of the pressure-increasing and pressure-reducing valves is a linear solenoid valve capable of continuously changing the pressure of the fluid in the back-pressure chamber with a change in an amount of electric power applied thereto.

(43) A braking pressure source device according to any one of the above modes (39)–(42), wherein the power-operated hydraulic pressure source further includes an accumulator for storing the pressurized fluid delivered from the pump.

(44) A braking pressure source device according to any one of the above modes (39)–(42), wherein the drive device of the power-operated hydraulic pressure source is an electric motor for operating the pump, the braking pressure source device further comprising a motor controller for controlling an amount of electric power to be applied to the electric motor to control at least one of a delivery pressure and a delivery rate of the pump.

BRIEF DESCRIPTION OF THE INVENTION

The above and other objects, features, advantages and technical and industrial significance of the present invention will be better understood by reading the following detailed description of presently preferred embodiments of the invention, when considered in connection with the accompanying drawings, in which:

FIGS. 13A and 13B are views for explaining details of the detection of the defects of the booster and the front and rear braking sub-systems in the booster and brake defect detecting routine;

FIGS. 17A–17D are views indicating whether wheel brake cylinders can be increased and reduced, in normal braking mode, and upon detection of a defect of the booster and a defect of the front braking sub-system, in relation to various combinations of defects of the first and second pressure control valves which are detected in the diagnostic routine of FIGS. 7–9;

FIGS. 39A–39D are views indicating whether wheel brake cylinders can be increased and reduced, in the normal braking mode, and upon detection of a defect of the booster and a defect of the front braking sub-system, in relation to various combinations of defects of the first and second pressure control valves which are detected in the diagnostic routine of FIGS. 7–9;

FIG. 48 is a flow chart illustrating a portion of a diagnostic routine executed in a yet further embodiment of this invention.

DETAILED DESCRIPTION OF THE PREFERRED EMBODIMENTS

Referring the accompanying drawings, several presently preferred embodiments of this invention will be described in detail.

Figure 1:
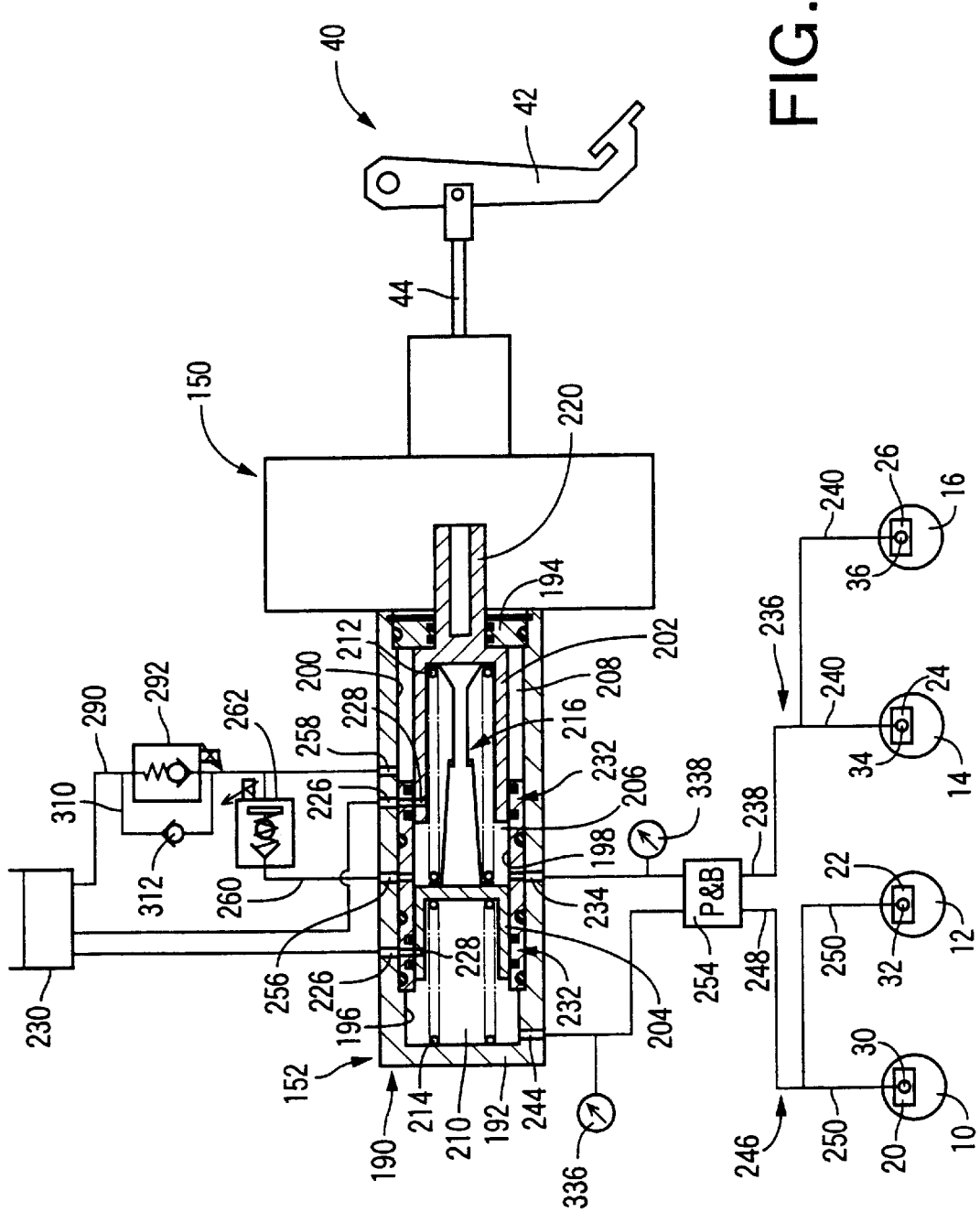
FIG. 1 is a schematic view illustrating a hydraulically operated braking system including a braking pressure source device constructed according to one embodiment of this invention.

Referring first to FIG. 1 showing a hydraulically operated braking system including a braking pressure source device according to a first embodiment of this invention, the braking system is adapted for use on a four-wheel automotive vehicle having front left and right wheels 10, 12 and rear left and right wheels 14, 16. The braking system includes two front wheel brakes 20, 22 for the respective front wheels 10, 12, and two rear wheel brakes 24, 26 for the respective rear wheels 14, 16. In the present embodiment, these wheel brakes 20–26 are hydraulically operated frictional brakes. The front wheel brakes 20, 22 include respective front wheel brake cylinders 30, 32, while the rear wheel brakes 24, 26 include respective rear wheel brake cylinders 34, 36. Each of these wheel brake cylinders 30–36 is activated with a pressurized working fluid, to force a friction member onto a rotor rotating with the corresponding wheel 10–16, so that the wheel is braked by the corresponding brake 20–26.

The brakes 20–26 for the front and rear wheels 10, 12, 14, 16 are operated when a brake operating device 40 is operated by an operator or driver of the vehicle. The brake operating device 40 includes an input member or a brake operating member in the form of a brake pedal 42, and an output member or a force transmitting member in the form of an operating rod 44. The brake pedal 42 is a generally elongate member which is pivotally attached at its upper end portion to a pedal bracket secured to the vehicle body. The operating rod 44 is pivotally connected at one of its opposite ends to the brake pedal 42.

Figure 2:
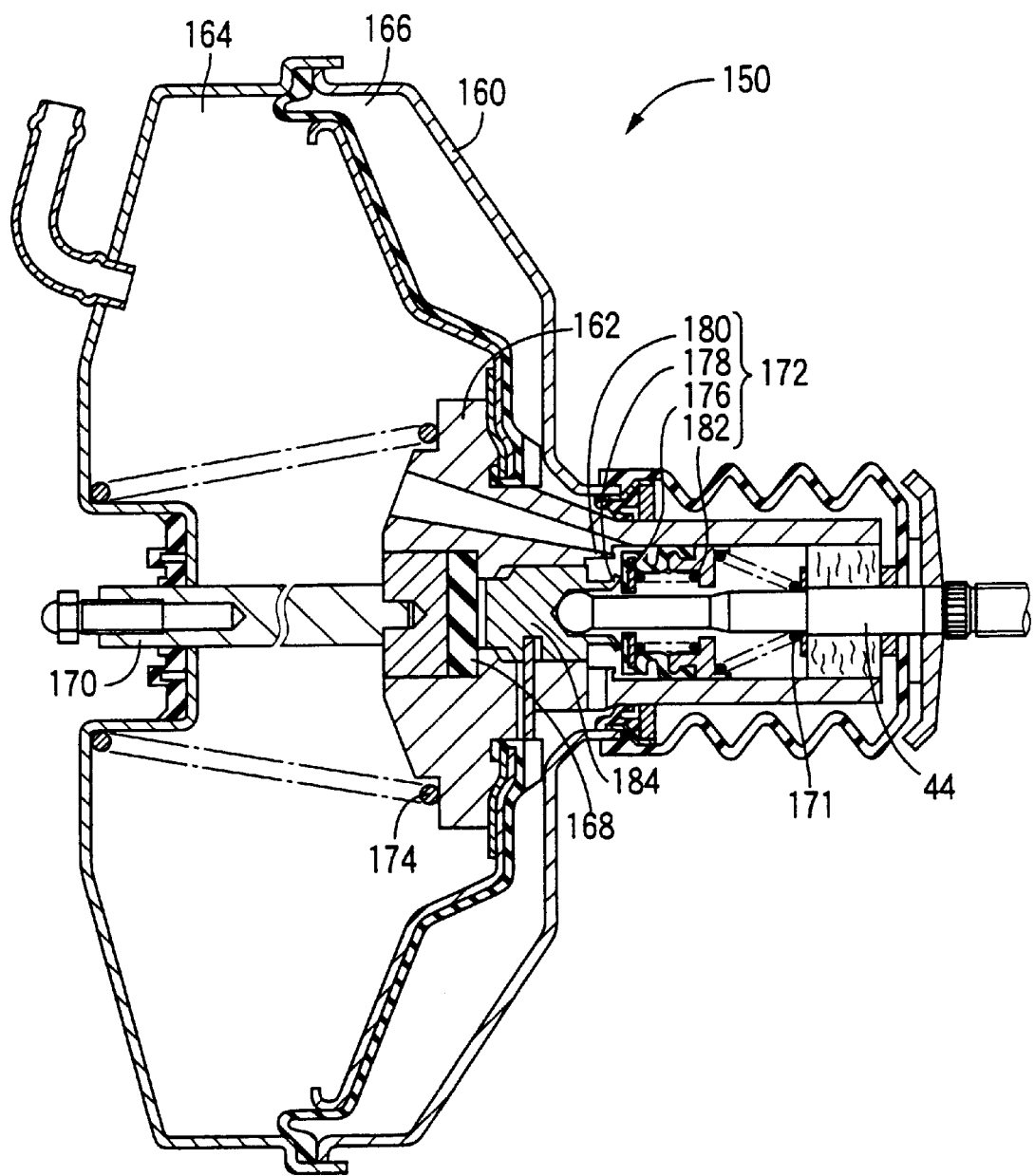
FIG. 2 is a front elevational view in cross section of a vacuum booster provided as an element of the braking pressure source device.

A brake operating force acting on the brake pedal 42 is transmitted through the operating rod 44 to an input piston 184 of a vacuum booster (herein after referred to simply as "booster") 150, which is one type of a hydraulically operated boosting device. The brake operating force is boosted by the booster 150, and the boosted brake operating force is applied to first and second pressurizing pistons 202, 204 of a master cylinder 152. As shown in FIG. 2, the booster 150 includes a hollow housing 160. The interior space of the housing 160 is divided by a power piston 162 into a low-pressure chamber 164 on the side of the master cylinder 152 and a variable-pressure chamber 166 on the side of the brake pedal 42. The low-pressure chamber 164 is connected to an air intake system of an engine of the vehicle which serves as a vacuum pressure source, more specifically, connected to a portion of an intake manifold which is located between a throttle valve and a point at which the intake manifold are branched to be connected to a plurality of intake valves for supplying these valves with air. Thus, a negative pressure is applied to the booster 150, namely, to the low-pressure chamber 164.

The power piston 162 is operatively connected, at its end on the side of the master cylinder 152, to a booster piston rod 170 through a reaction disc 168 formed of a rubber material. As described below, the booster piston rod 170 is provided to transmit an operating force of the power piston 162 to the first pressurizing piston 202 of the master cylinder 152. The operating rod 44 is held in engagement with the input piston 184, at one of its opposite end remote from the brake pedal 42. The power piston 162 is axially movable relative to the operating rod 44 and the input piston 184 by a relatively small distance. The operating rod 44 and the input piston 184 are biased by a return spring 171 interposed between these members 44, 184 and the power piston 162, in a rearward direction away form the power piston 162. On the other hand, the power piston 162 is biased by a return spring 174 interposed between the power piston 162 and the housing 160, in a rearward direction toward the variable-pressure chamber 166.

The booster 150 incorporates a switch valve 172 between the low-pressure chamber 164 and the variable-pressure chamber 166. The switch valve 172, which is operated in response to a relative movement of the operating rod 44 and the power piston 162, includes a control valve 176, an air valve 178, a vacuum valve 180 and a control valve spring 182. The air valve 178 cooperates with the control valve 176 to permit and inhibit communication of the variable-pressure chamber 166 with the atmosphere. The air valve 178 is associated with an end portion of the operating rod 44 which is remote from the brake pedal 42. The air valve 178 is formed integrally with the input piston 184 which is forced by the operating rod 44 against the reaction disc 168. The control valve 176 is biased by the control valve spring 182, with respect to the operating rod 44, in a direction that causes the control valve 176 to be seated on the air valve 178. The vacuum valve 180 cooperates with the control valve 176 to permit and inhibit fluid communication of the variable-pressure chamber 166 with the low-pressure chamber 164. The vacuum valve 180 and the power piston 162 are movable as a unit.

While the booster 150 constructed as described above is placed in the non-operated state, the control valve 176 is seated on the air valve 178 and is spaced apart from the vacuum valve 180, so that the variable-pressure chamber 166 is isolated from the atmosphere, and is held in communication with the low-pressure chamber 164. In this non-operated state, the low-pressure chamber 164 and the variable-pressure chamber 166 have the same negative pressure (lower than the atmospheric pressure). When the booster 150 is operated in response to an operation of the brake pedal 42, the operating rod 44 is advanced relative to the power piston 162, and the control valve 176 is seated on the vacuum valve 180, so that the variable-pressure chamber 166 is isolated from the low-pressure chamber 164. When the operating rod 44 is advanced by a further distance relative to the power piston 162, the air valve 178 is moved apart from the control valve 176, so that the variable-pressure chamber 166 is brought into communication with the atmosphere. In this state, the pressure in the variable-pressure chamber 166 is raised toward the atmospheric pressure, and there arises a difference between the pressures in the low-pressure chamber 164 and the variable-pressure chamber 166, so that the power piston 162 is operated by this pressure difference. An operating force acting on the power piston 162 is transmitted to the first pressurizing piston 202 of the master cylinder 152 through the booster piston rod 170, and the reaction force from the first pressurizing piston 202 is distributed by the reaction disc 168 to the power piston 162 and the input piston 184. The vehicle operator feels the component of the reaction force transmitted through the operating rod 44 to the input piston 184, as a reaction force from the master cylinder 152. In this connection, it will be understood that the operating rod 44 or the input piston 184 serves as the input member of the booster 150, while the booster piston rod 170 serves as the output member of the booster 150.

As shown in FIG. 1, the master cylinder 152 has a cylinder housing 190 which consists of a cylindrical housing body 192 closed at one of its opposite ends, and a closure member 194 which closes the open end of the housing body 192. The closure member 194 is removably fixed to the housing body 192 by suitable fixing means such as a retainer ring, so as to assure fluid tightness between the open end portion of the housing body 192 and the closure member 194.

The housing body 192 has three cylindrical bores 196, 198, 200 which have respective different diameters and which are arranged in series and coaxially with each other. The first pressurizing piston 202 and a second pressurizing piston 204 are disposed in series with each other in the cylindrical bore 198 having the largest diameter. These two pressurizing pistons 202, 204 are slidably and fluid-tightly fitted in the cylindrical bore 198, such that the first pressurizing piston 202 partially defines a first pressurizing chamber 206 and a back-pressure chamber 208 on its front and rear sides, respectively, while the second pressurizing piston 204 partially defines a second pressurizing chamber 210 on its front side. The closure member 194 constitutes the rear end wall of the cylinder housing 190, which cooperates with the first pressurizing piston 202 to define the back-pressure chamber 208 therebetween. Each of the first and second pressurizing pistons 202, 204 is a cylindrical member which is closed at one of its opposite end and which is biased by an elastic member in the form of a return spring 212, 214 disposed therein as a biasing device, in a direction toward its fully retracted position of FIG. 1. The return spring 212, 214 is a compression coil spring.

The fully retracted position of the first pressurizing piston 202 biased by the compression coil spring 212 is determined by abutting contact of the first pressurizing piston 202 with the closure member 194, and that of the second pressurizing piston 204 is determined by not only the fully retracted position of the first pressurizing piston 202 but also the initial length and load of the return spring 212 which are determined by the spring retainer 216. In the present embodiment, the spring retainer 216 includes two members which are movable relative to each other in the axial direction of the first pressurizing piston 202 and which engage each other such that the two member are not disengageable from each other. One and the other of those two members hold the return spring 212 at the respective opposite ends.

A hollow cylindrical piston rod 220 extends rearward from the rear end face of the first pressurizing piston 202 into the booster 150, and serves as an input rod of the master cylinder 152. The piston rod 220 extends fluid-tightly and slidably through the closure member 194 into the booster 150. The front end portion of the booster piston rod 170 of the booster 150 is received within the rear end portion of the piston rod 220 such that the booster piston rod 170 and the piston rod 220 are movable relative to each other in the axial direction. The operating force of the brake pedal 42 which has been boosted by the booster 150 is transmitted from the booster piston rod 170 to the piston rod 220 of the master cylinder 152. The operating force is one form of the operating amount of the brake pedal 42. The first and second pressurizing pistons 202, 204 are advanced by the brake operating force received through the piston rod 220, against the biasing forces of the return springs 212, 214, while compressing these return springs 212, 214. Thus, the operating force of the power piston 162 is transmitted to the pressurizing pistons 202, 204, so that the fluid masses in the first and second pressurizing chambers 206, 210 are pressurized to the same pressure. The pressure in the first and second pressurizing chambers 206, 210 will be referred to as the "master cylinder pressure" where appropriate.

When the first and second pistons 202, 204 are placed in their fully retracted positions, the first and second pressurizing chambers 206, 210 are held in communication with a reservoir 230 through two reservoir ports 226 formed through the housing body 192 and through two communication passages 228 formed through the respective pistons 202, 204. The reservoir 230 accommodates the working fluid under the atmospheric pressure. When the first and second pressurizing pistons 202, 204 are advanced from the fully retracted positions by a small distance, the two reservoir ports 226 are closed by the pistons 202, 204, and the pressures in the first and second pressurizing chambers 206, 210 can be raised by the advancing movements of the pistons 202, 204. Each of the two reservoir ports 226 is located between two primary cups 232 provided on the housing body 192. One of the two primary cups 232 permits flows of the fluid from the reservoir port 226 into the first pressurizing chamber 206 and the back-pressure chamber 208 through a gap between the first pressurizing piston 202 and the housing body 192, but inhibits the fluid flows in the reverse directions, thereby isolating the first pressurizing chamber 206 and the back-pressure chamber 208 from each other. The other primary cup 232 permits the fluid flows from the reservoir port 226 into the first and second pressurizing chambers 206, 210 through a gap between the second pressurizing piston 204 and the housing body 192, but inhibits the fluid flows in the reverse directions, thereby isolating the first and second pressurizing chambers 206, 210 from each other.

The first pressurizing chamber 206 is connected to the wheel brake cylinders 34, 36 of the rear wheel brakes 24, 26 through a brake cylinder port 234 formed through the housing body 192, and through a primary fluid passage 236. The primary fluid passage 236 consists of a common passage 238 connected to the brake cylinder port 234, and two branch passages 240 each of which is connected at one of its opposite ends to the other end of the common passage 238 and at the other end to the corresponding wheel brake cylinder 34, 36.

The second pressurizing chamber 210 is connected to the wheel brake cylinders 30, 32 of the front wheel brakes 20, 22 through a brake cylinder port 244 formed through the cylinder housing 190 and through a primary fluid passage 246. The primary fluid passage 246 consists of a common passage 248 connected to the brake cylinder port 244, and two branch passages 250 each of which is connected at one of its opposite ends to the other end of the common passage 248 and at the other end to the corresponding wheel brake cylinders 30, 32. Thus, the present hydraulically operated braking system has two braking sub-systems, namely, a front braking sub-system and a rear braking sub-system.

A proportioning and by-pass valve 254 is connected to the common passages 238, 248 of the fluid passages 236, 246. In FIG. 1, this proportioning and by-pass valve 254 is indicated as "P & B". The valve 254 is arranged so that the pressure as generated in the second pressurizing chamber 210, that is, the front master cylinder pressure is applied to the front wheel brake cylinders 30, 32, but the pressure generated in the first pressurizing chamber 206, namely, the rear master cylinder pressure after the pressure in the two pressurizing chambers 206, 210 has been raised to a predetermined level is controlled such that the rate of increase of the pressure to be applied to the rear wheel brake cylinders 34, 36 is made lower than that of the front master cylinder pressure to be applied to the front wheel brake cylinders 30, 32. When the front braking sub-system is defective, however, the proportioning and by-pass valve 254 does not perform its proportioning function, that is, permits the rear master cylinder pressure as generated in the first pressurizing chamber 206 to be applied to the rear wheel brake cylinders 34, 36, without reducing the rate of increase of the rear master cylinder pressure.

Figure 3:
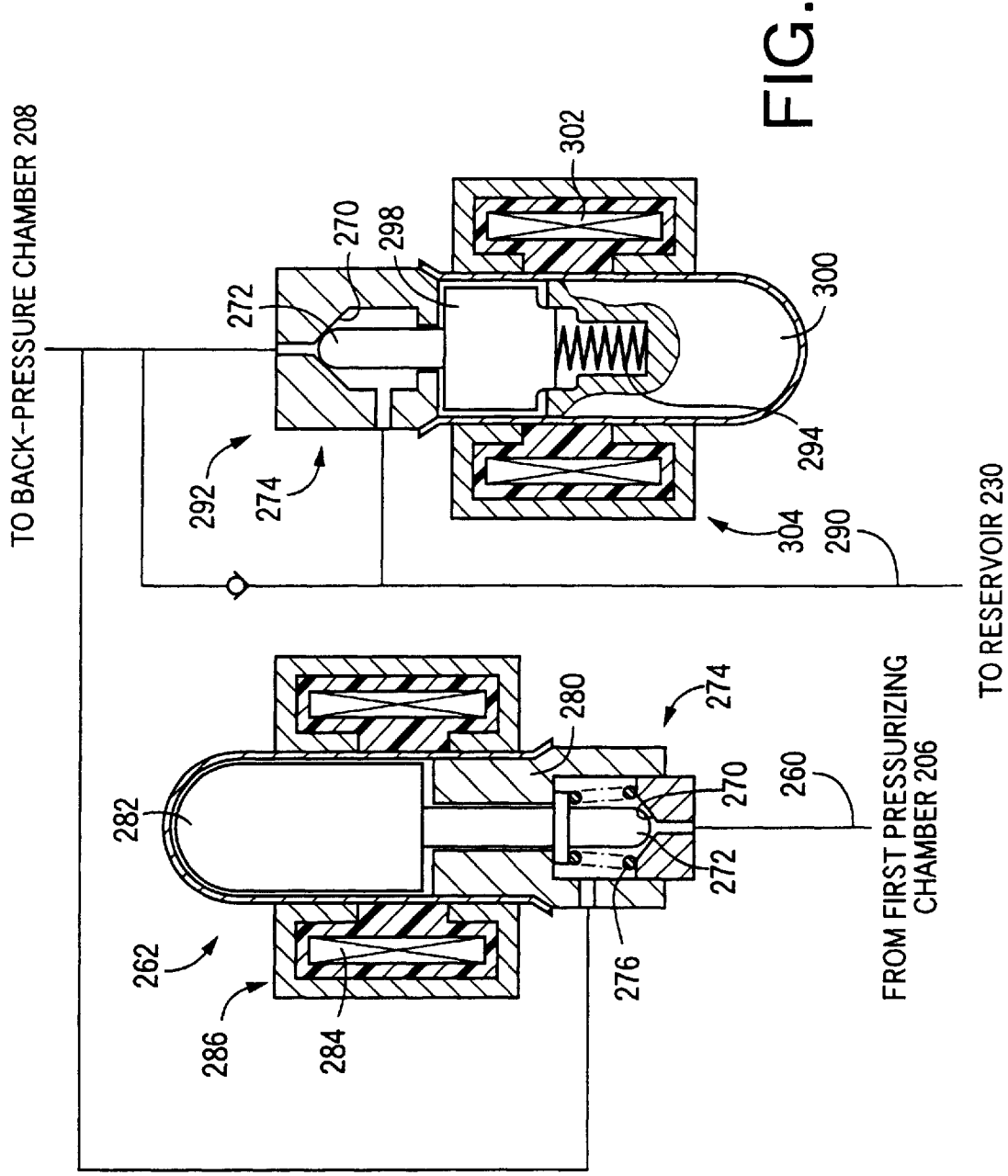
FIG. 3 is a view schematically showing a first and a second solenoid-operated pressure control valve provided as elements of the braking pressure source device.

As shown in FIG. 1, the first pressurizing chamber 206 and the back-pressure chamber 208 are normally held in communication with each other through ports 256, 258 and a communication passage 260. The communication passage 260 is provided with a first solenoid-operated pressure control valve 262 which serves as a first control valve device. The first pressure control valve 262 is a normally open seating valve having a construction as schematically shown in FIG. 3.

The first solenoid-operated pressure control valve 262 includes a seating valve 274 consisting of a valve seat 270, and a valve member 272 which is seated and unseated on and fro the valve seat 270. The valve member 272 is biased by a biasing device in the form of a spring 276 in a direction away from the valve seat 270. The seating valve 274 is constructed and oriented such that the valve member 272 is held apart from the valve seat 270 with a force acting on the valve member 272 based on the pressure difference of the first pressurizing chamber 206 and the back-pressure chamber 208, in the normal state of the braking system, that is, while the master cylinder pressure is higher than or almost equal to a back pressure in the back-pressure chamber 208.

The rear end portion of the valve member 272 extends through a through-hole formed through a stationary core 280, such that the rear end of the valve member 272 is located outside the stationary core 280. In the present first pressure control valve 262, the valve member 272 of the seating valve 274 is formed integrally with a movable core 282. The stationary and movable cores 280, 282 cooperate with an externally disposed solenoid coil 284 to constitute a solenoid device 286. When an electric current is applied to the solenoid coil 284, the stationary core 280 and the movable core 282 are magnetized, and the movable core 282 is attracted toward the stationary core 280 with an electromagnetic force, so that the valve member 272 is moved with the movable core 282 with the electromagnetic force. Thus, the electromagnetic force generated by the solenoid device 286 acts on the valve member 272 in the direction toward the valve seat 270, against the force based on the above-indicated pressure difference and the biasing force of a spring 276. When the electromagnetic force is larger than a sum of the force based on the pressure difference and the biasing force, the seating valve 274 is closed.

In the pressure control valve 262, the valve member 272 is eventually located at a position of equilibrium between the electromagnetic force generated by the solenoid device 286 and the sum of the force based on the pressure difference across the seating valve 274 and the biasing force of the spring 276. By controlling the electromagnetic force by controlling the amount of electric current to be applied to the solenoid coil 284, the amount of opening of the seating valve 274 can be adjusted, so that the rate of flow of the pressurized fluid into the back-pressure chamber 208, that is, the rate of increase of the fluid pressure in that chamber 208 can be controlled. When the sum of the force based on the pressure difference of the chambers 206, 208 and the biasing force of the spring 276 becomes slightly smaller than the electromagnetic force as a result of a decrease of the pressure difference, the valve member 272 is seated on the valve seat 270, and the seating valve 274 is closed. Accordingly, the difference between the pressures in the first pressurizing chamber 206 and the back-pressure chamber 208 can be controlled by controlling the amount of electric current to be applied to the solenoid coil 284.

In the present embodiment, the set load of the spring 276 is determined to enable the first solenoid-operated first pressure control valve 262 (seating valve 274) to be held in the open state, while overcoming the force based on the expected maximum difference between the master cylinder pressure and the back-pressure, which force acts on the valve member 272 in the direction that causes the valve member 272 to be seated on the valve seat 270, when the back-pressure is higher than the master cylinder pressure and when the amount of electric current applied to the solenoid coil 284 is zero. In this respect, it is noted that when a second solenoid-operated pressure control valve 292 (second control valve device) which will be described is kept in its closed position due to sticking of its valve member 272, the back-pressure in the back-pressure chamber 208 is made higher than the master cylinder pressure when the brake pedal 42 is released or moved toward its non-operated position while the first solenoid-operated pressure control valve 262 is closed holding the back-pressure in the back-pressure chamber 208. The set load of the spring 276 of the first pressure control valve 262 determined as described above permits the master cylinder pressure to be reduced in the above case, by fully opening the first pressure control valve 262 by zeroing the amount of electric current to be applied to the solenoid coil 284 irrespective of the level of the back-pressure. Where the above-indicated defect that the valve member 272 of the second pressure control valve 292 is stuck in the closed state is not to be dealt with, and the back-pressure is reduced by using the second solenoid-operated pressure control valve 292, the set load of the spring 276 may be determined to hold the valve member 272 at a position spaced from the valve seat 270 by a small distance.

The back-pressure chamber 208 is connected to the reservoir 230 through a connecting passage 290, which is provided with the above-indicated second solenoid-operated pressure control valve 292. The second pressure control valve 292 is a normally closed seating valve 274 having a construction as also schematically shown in FIG. 3. Like the seating valve 274 of the first pressure control valve 262, the seating valve 274 of the second pressure control valve 292 includes the valve seat 270, and the valve member 272. However, the valve member 272 of the valve 292 is biased by a biasing device in the form of a spring 294, in a direction that causes the valve member 272 to be seated on the valve seat 270. The set load of the spring 294 is determined to hold the valve 292 in the closed state even when the maximum force based on the back-pressure in the back-pressure chamber 208 acts on the valve member 270 while the amount of electric current to be applied to a solenoid coil 302 is zero. The valve member 272 is formed integrally with a movable core 298, which is opposed to a stationary core 300. Between the movable and stationary cores 298, 300, there is interposed the above-indicated spring 294 to hold those cores 298, 300 spaced apart from each other. When an electric current is applied to the solenoid coil 302, the cores 298, 300 are magnetized, and the movable core 298 is attracted toward the stationary core 300, so that the valve member 272 is moved apart from the valve seat 270 to open the seating valve 274. The second solenoid-operated pressure control valve 292 is connected to the back-pressure chamber 208 and the reservoir 230 such that the force based on the pressure difference across the valve 292 acts on the valve member 272 in the direction that causes the valve member 272 to be moved away from the valve seat 270.

In the second pressure control valve 292, the valve member 272 is eventually located at a position of equilibrium between the force based on the pressure difference across the seating valve 274 and a sum of the biasing force of the spring 294 and an electromagnetic force generated by a solenoid device 304 which is constituted by the movable and stationary cores 298, 300 and the coil 302. The amount of opening of the second pressure control valve 292 can be controlled by controlling the electromagnetic force by controlling the amount of electric current to be applied to the solenoid coil 302. Accordingly, the rate of flow of the fluid flow from the back-pressure chamber 208, that is, the rate of reduction of the back-pressure in the back-pressure chamber 208 can be controlled. The valve member 272 is seated on the valve seat 270 to close the seating valve 274 when the sum of the force of the pressure difference and the electromagnetic force becomes slightly smaller than the biasing force of the spring 294 as a result of a decrease of the pressure difference between the back-pressure chamber 208 and the reservoir 230. Accordingly, the pressure difference between the back-pressure chamber 208 and the reservoir 230 can be controlled by controlling the amount of electric current to be applied to the solenoid coil 302. Since the pressure in the reservoir 230 can be considered substantially equal to the atmospheric pressure, the pressure difference between the back-pressure chamber 208 and the reservoir 230 can be controlled by controlling the back-pressure in the back-pressure chamber 208. The first and second solenoid-operated pressure control valves 262, 292 are linear valves capable of linearly controlling the pressure difference across the valve to thereby continuously change the back-pressure in the back-pressure chamber 208, by controlling the amount of electric current to be applied to the solenoid coil 284, 302.

To the connecting passage 290, there is connected a by-pass passage 310 which by-passes the second solenoid-operated pressure control valve 292. The by-pass passage 310 is provided with a check valve 312 which permits a flow of the fluid in a direction from the reservoir 230 to the back-pressure chamber 208, but inhibits a flow of the fluid in the reverse direction. The second pressure control valve 292, the by-pass passage 310 and the check valve 312 constitute a second control valve device.

Figure 4:
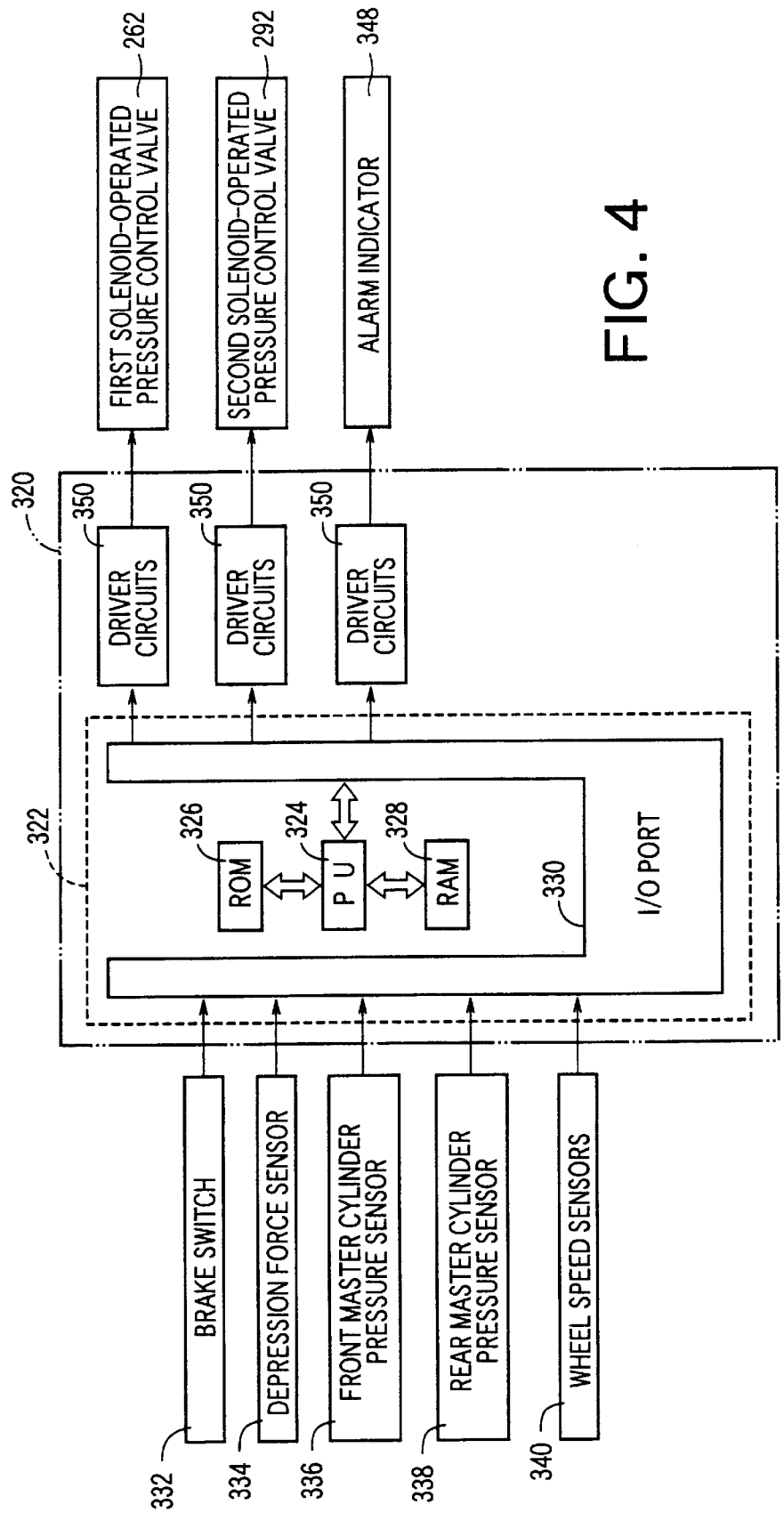
FIG. 4 is a block diagram illustrating an arrangement of an electronic control unit for the braking pressure source device.

The present hydraulically operated braking system is provided with an electronic control unit (hereinafter referred to "ECU") 320, as illustrated in FIG. 4. The ECU 320 is principally constituted by a computer 322 which incorporates a processing unit (PU) 324, a read-only memory (ROM) 326, a random-access memory (RAM) 328, and an input/output port (I/O port) 330. To the I/O port 330, there are connected various sensors such as a brake switch 332, a depression force sensor 334, a front master cylinder pressure sensor 336, a rear master cylinder pressure sensor 338 and wheel speed sensors 340, and driver circuits 350 for driving the solenoid coils 284, 302 of the first and second solenoid-operated pressure control valves 262, 292 and an alarm indicator 348. The alarm indicator 348 is provided to inform the vehicle operator of various defects of the braking system such as defects of the booster 150 and the front and rear braking sub-systems. For instance, the alarm indicator 348 is a light which is illuminated or flickers, a buzzer, or a display. The computer 322 and the driver circuits 350 constitute the ECU 320.

The brake switch 332 generates an output signal whose level changes between a first value indicating that the brake pedal 42 is in the original or non-operated position, and a second value indicating that the brake pedal 42 is operated from the non-operated position. The brake pedal 42 is normally held in the non-operated position under the biasing force of a return spring interposed between the brake pedal 42 and the vehicle body. The original or non-operated position of the brake pedal 42 pivotally biased by the return spring is determined by abutting contact of the brake pedal 42 with a suitable stop fixed to the vehicle body. In the present embodiment, the brake switch 332 is in the OFF state generating an OFF signal when the brake pedal 42 is placed in the non-operated position, and in the ON state generating an ON signal when the brake pedal 42 is in an operated position (in a depressed state) spaced from the non-operated position. An operation of the brake pedal 42 is detected by determining whether the operating state of the brake switch 332 has been changed from the OFF state to the ON state (whether the output signal has been changed from the OFF signal to the ON signal). For instance, the depression force sensor 334 includes a load detector having a strain gage such as a load cell, and generates an output signal indicative of the operating force acting on the brake pedal 42, that is, the force by which the brake pedal 42 is depressed by the vehicle operator.

The front master cylinder pressure sensor 336 is connected to the common passage 248 of the primary fluid passage 246 connecting the second pressurizing chamber 210 and the front wheel brake cylinders 30, 32, as shown in FIG. 1. The front master cylinder pressure sensor 336 generates an output signal indicative of the pressure of the pressurized fluid which is delivered from the second pressurizing chamber 210 to the front wheel brake cylinders 30, 32. The rear master cylinder pressure sensor 338 is connected to the common passage 238 of the primary fluid passage 236 connecting the first pressurizing chamber 206 and the rear wheel brake cylinders 34, 36, more precisely, to a portion of the common passage 238 between the proportioning and by-pass valve 254 and the first pressurizing chamber 206. The rear master cylinder pressure sensor 338 generates an output signal indicative of the pressure of the pressurized fluid which is delivered from the first pressurizing chamber 206 to the proportioning and by-pass valve 254, that is, the pressure of the fluid before it is reduced by the valve 254. The wheel speed sensors 340 are provided for the respective front and rear wheels 10, 12, 14, 16, and generate output signals indicative of the rotating speeds of the corresponding wheels 10–16.

Figure 9:
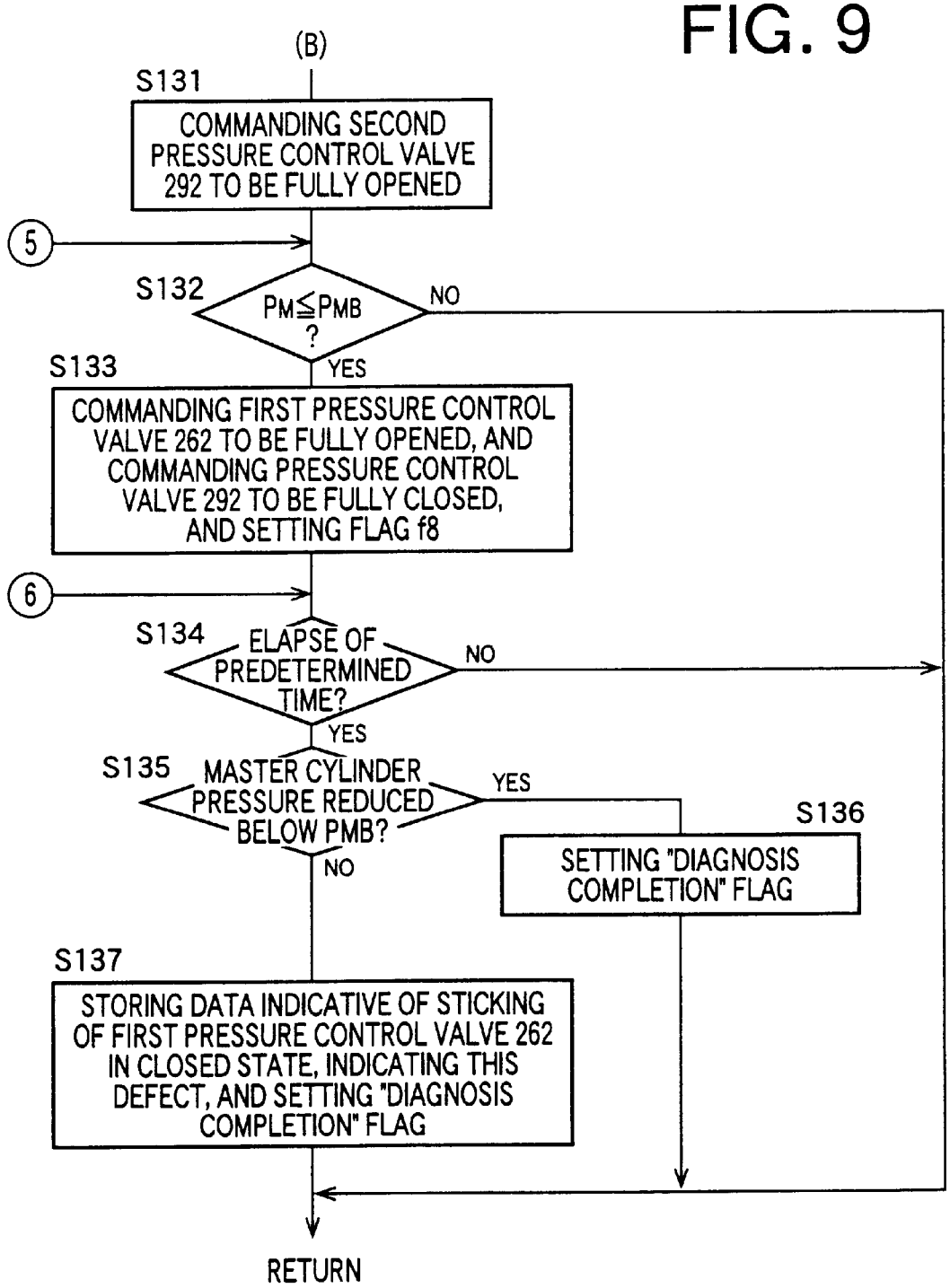
FIG. 9 is a flow chart illustrating the remaining part of the diagnosing routing.
Figure 10:
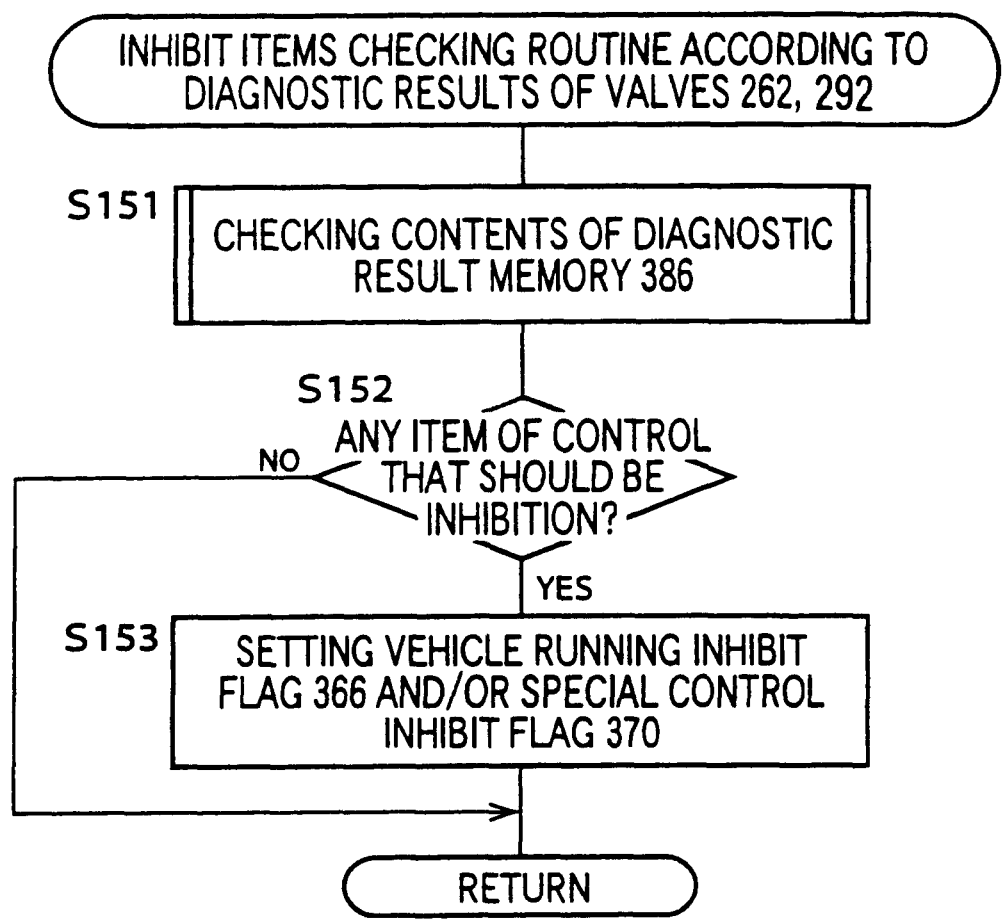
FIG. 10 is a flow chart illustrating an inhibit items checking routine executed according to a control program stored in the ROM of the computer.
Figure 11:
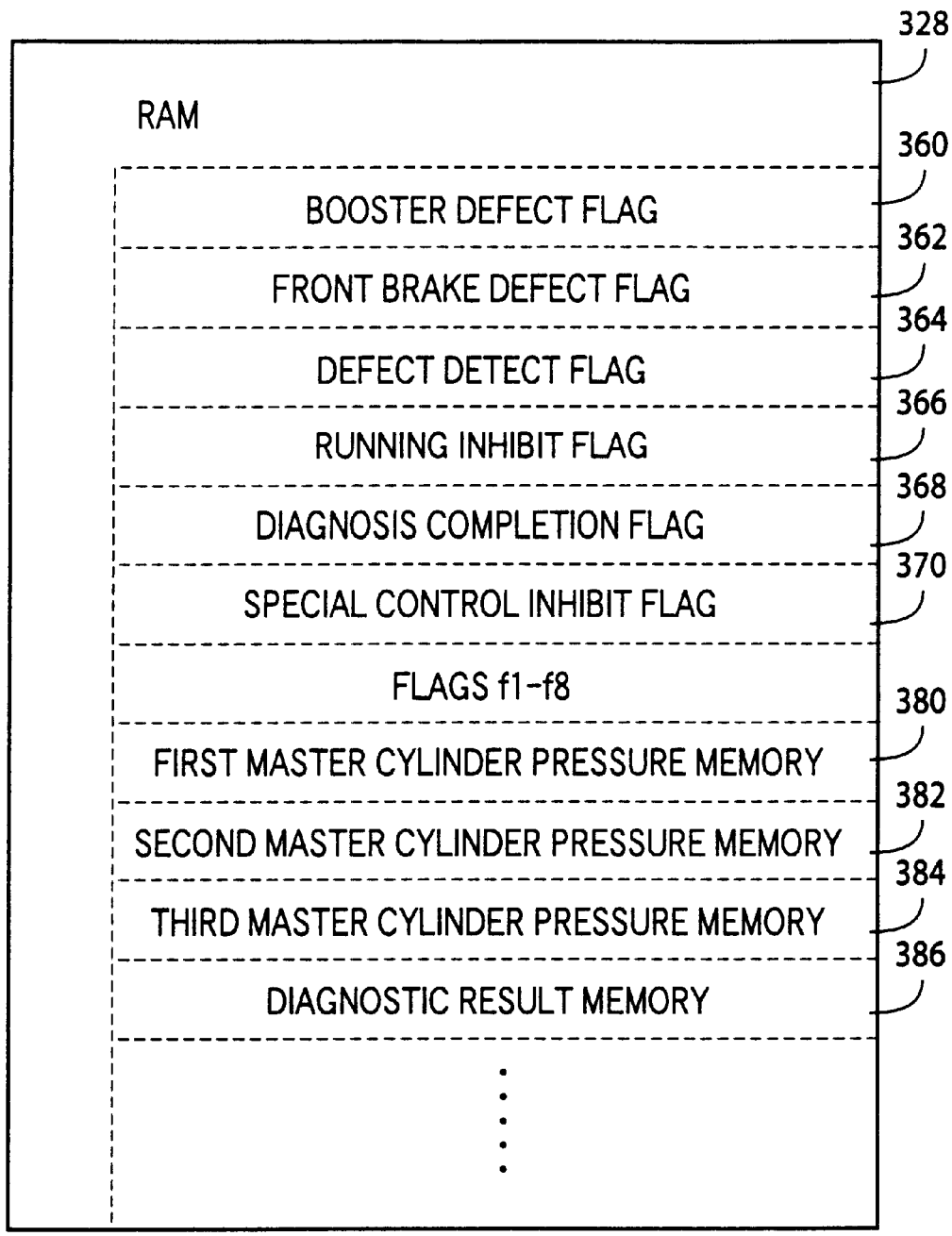
FIG. 11 is a view indicating a portion of a RAM of the computer which relates to the present invention.

The ROM 326 of the computer 322 stores various control programs including those for executing a main control routine (not shown), a braking control routine, a booster-.brake defect detecting routine, a diagnostic routine and an inhibit items checking routines, which are illustrated in the flow charts of FIGS. 5–10. The PU 324 operates to execute those routines according to the stored control programs, while utilizing a temporary data storage function of the RAM 328. As indicated in FIG. 11, the RAM 328 includes various flags such as a BOOSTER DEFECT flag 360, as well as a working memory.

There will be described an operation of the hydraulically braking system constructed as described above, when the brake pedal 42 is depressed while none of the booster 150 and the front and rear braking sub-systems are defective.

When the brake pedal 42 is depressed, the operating rod 44 is advanced by the operating force of the brake pedal 42. As a result, the operating force transmitted to the operating rod 44 is boosted by the booster 150, and the boosted operating force is transmitted to the first pressurizing piston 202, so that the first and second pressurizing pistons 202, 204 are advanced to pressurize the fluid masses in the first and second pressurizing chambers 206, 210, whereby the front wheel brakes 20, 22 and the rear wheel brakes 24, 26 are operated with the pressurized fluid masses delivered from the chambers 206, 210, for braking the corresponding wheels 10–16. The master cylinder pressure as generated in the first pressurizing chamber 206 is applied to the rear wheel brake cylinders 34, 36 until the generated master cylinder pressure has been increased to the predetermined level. After the master cylinder pressure in the first pressurizing chamber 206 has been increased to the predetermined level, this pressure is reduced by the proportioning and by-pass valve 254, with respect to the master cylinder pressure generated in the second pressurizing chamber 210, so that the rate of increase of the pressure in the rear wheel brake cylinders 34, 36 is lower than that of the pressure in the front wheel brake cylinders 30, 32, although the same master cylinder pressure is generated in the two pressurizing chambers 206, 210. This arrangement is effective to prevent an excessively large braking force for the rear wheels 14, 16 with respect to the friction coefficient of the road surface, thereby assuring an optimum control of the fluid pressures in the front and rear wheel brake cylinders 30–36.

The first solenoid-operated pressure control valve 262 is in the closed state when the brake pedal 42 is operated (when the master cylinder pressure is increased). In this state, the pressure-receiving surface area of each pressurizing piston 202, 204 is equal to the transverse cross sectional area at the rear end wall of the cylindrical piston 202, 204. Further, the second solenoid-operated pressure control valve 292 is also placed in the closed state, and the back-pressure chamber 208 is supplied with the fluid fed from the reservoir 230 through the check valve 312, so that the first and second pressurizing pistons 202 204 are permitted to be advanced, without a drop of the fluid pressure in the back-pressure chamber 208 below the atmospheric level.

When the master cylinder pressure is reduced as a result of a releasing action of the brake pedal 42 toward the non-operated position, the first and second pressurizing pistons 202, 204 are retracted under the biasing actions of the return springs 212, 214, and the fluid pressures in the wheel brake cylinders 30–34 are reduced. At this time, the second solenoid-operated pressure control valve 292 is opened, to permit the fluid to flow from the back-pressure chamber 208 back to the reservoir 230, permitting the retracting movements of the first and second pressurizing pistons 202, 204.

The present braking system is adapted to diagnose the booster 150 and the front and rear braking sub-systems for any defect or abnormality, and control the fluid pressures in the wheel brake cylinders 30–36, in an appropriate manner corresponding to the detected defect. There will next be described the braking control routine and the booster.brake defect detecting routine, by reference to the flow charts of FIGS. 5 and 6 wherein the first and second solenoid-operated pressure control valves 262, 292 are indicated as the first and second pressure control valves 262, 292.

Figure 5:
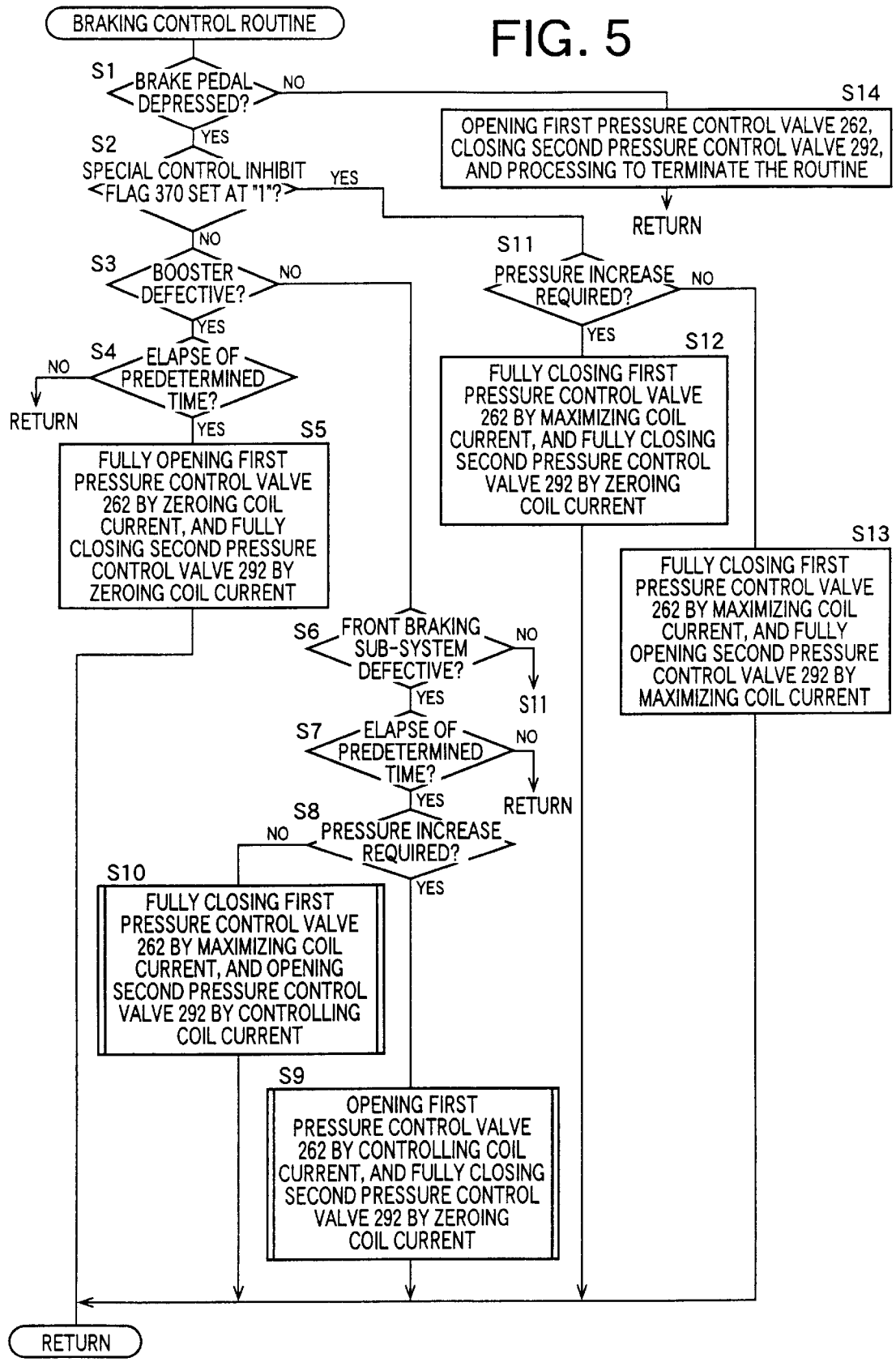
FIG. 5 is a flow chart illustrating a braking control routine executed according to a control program stored in a ROM of a computer of the electronic control unit.

The above-indicated braking control routine and defect detecting routine are initiated when an ignition switch of the vehicle is turned on. The braking control routine of FIG. 5 is initiated with step S1 to determine whether the brake pedal 42 is in operation. This determination in step S1 is effected on the basis of the output signal of the brake switch 332. If the brake pedal 42 is not in operation and the output signal of the brake switch 332 is in the OFF state, a negative decision (NO) is obtained in step S1, and the control flow goes to step S14 to hold the first pressure control valve 262 in the open state and the second pressure control valve 292 in the closed state by zeroing the amounts of electric current applied thereto, and to effect the processing operations necessary to terminate the routine, such as the resetting of the flags to "0". These operations in step S14 to restore the first and second pressure control valves 262, 292 to the initial or original states (by zeroing the amounts of current applied thereto) may be effected immediately or a predetermined time after the brake pedal 42 has been returned to the non-operated position. The second pressure control valve 292 may be closed after it is held in the open state for a predetermined time.

Figure 7:
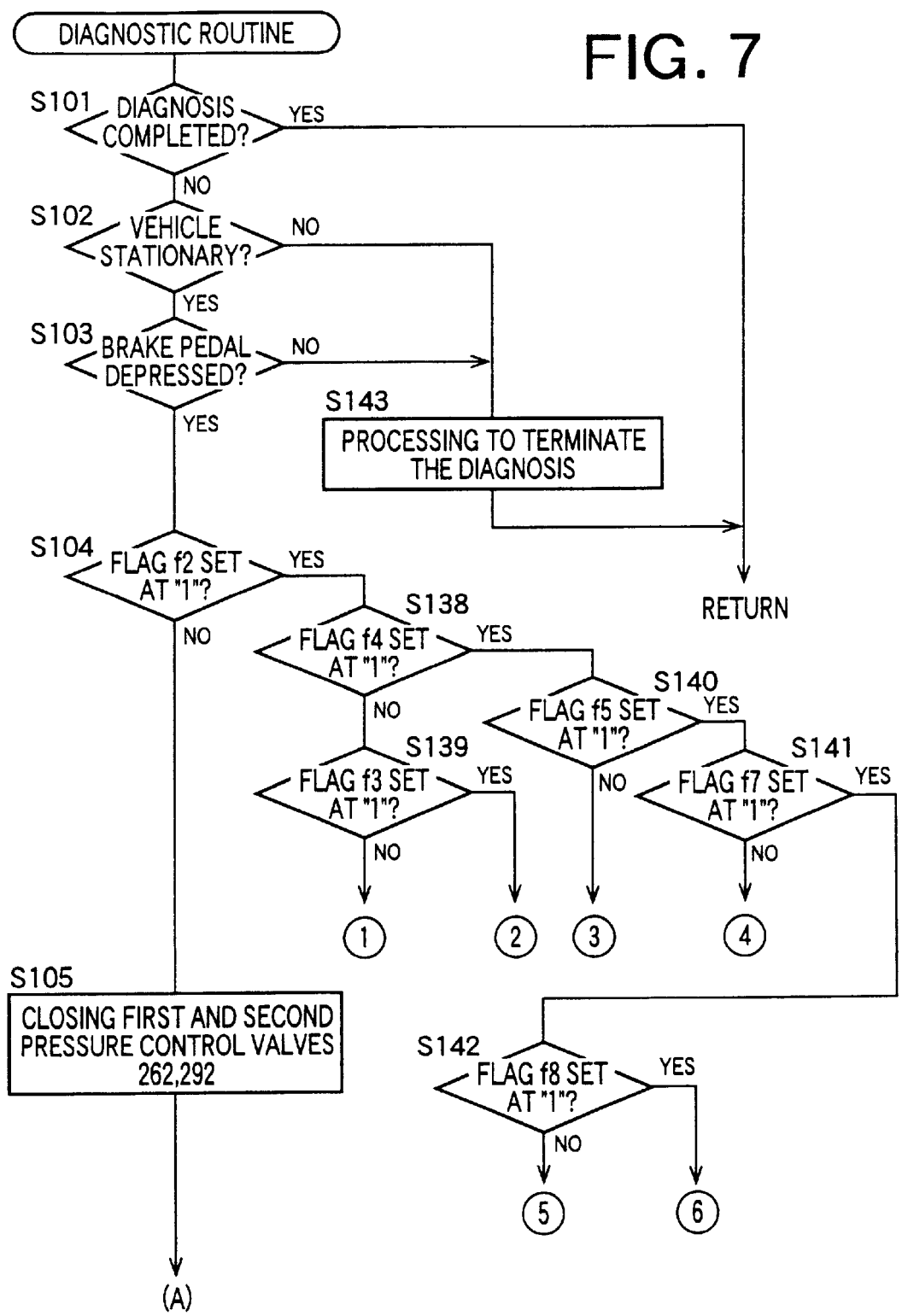
FIG. 7 is a flow chart illustrating a part of a diagnostic routine executed according to a control program stored in the ROM of the computer.
Figure 8:
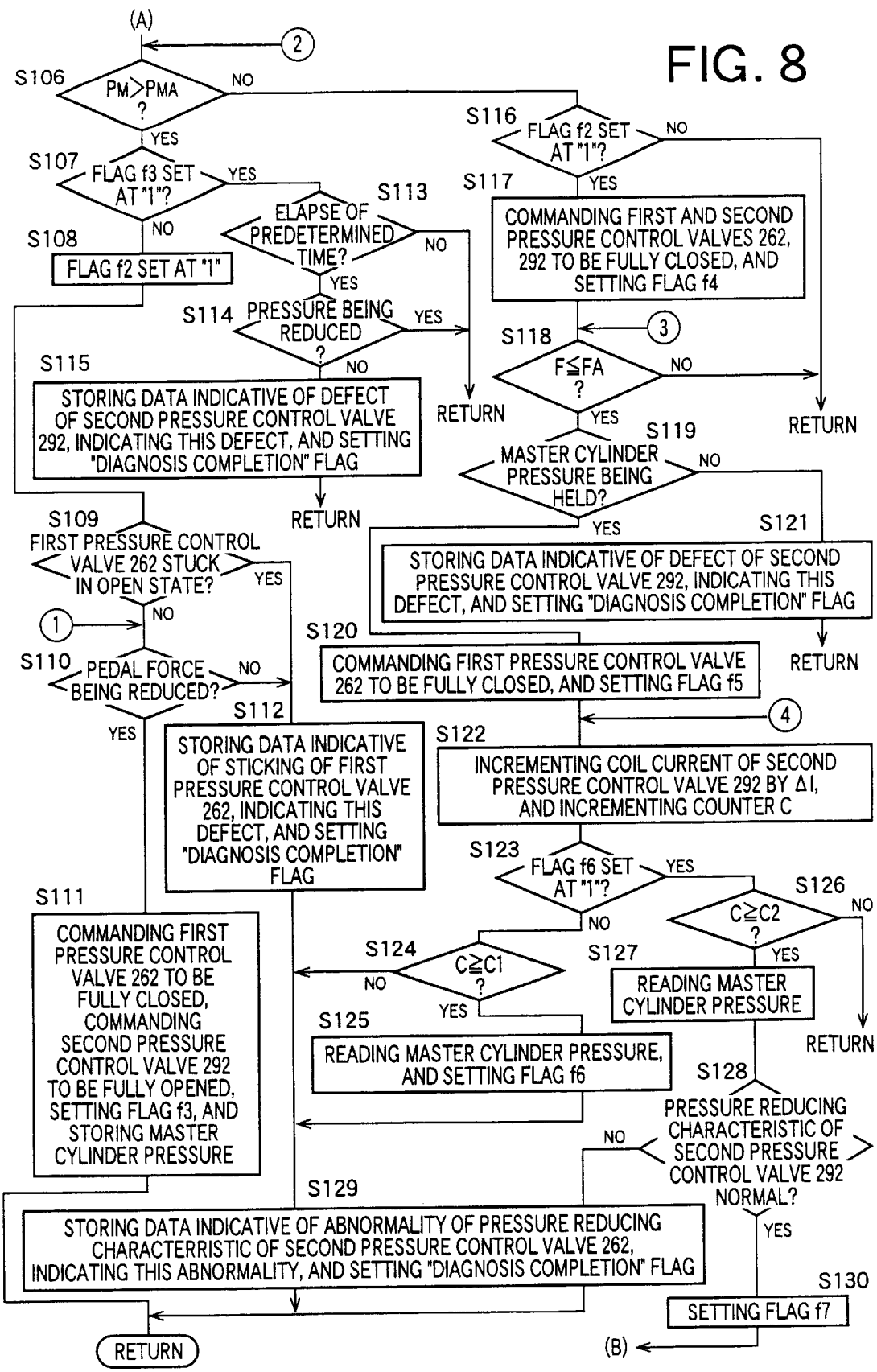
FIG. 8 is a flow chart illustrating another part of the diagnosing routine.

If the brake pedal 42 is in operation and the output signal of the brake pedal 332 is in the ON state, an affirmative decision (YES) is obtained in step S1, and the control flow goes to step S2 to determine whether any control of the braking pressure is inhibited while the booster 150 or the front braking sub-system is defective, due to the defect of the first pressure control valve 262 or the second pressure control valve 292. This determination in step S2 is effected by determining whether a SPECIAL CONTROL INHIBIT flag 370 in the RAM 328 is set at "1". For this purpose, the diagnostic routine of FIGS. 7–9 is executed to diagnose the first and second pressure control valves 262, 292, and the inhibit items checking routine of FIG. 10 is executed on the basis of results of a diagnosis in the diagnostic routine. The SPECIAL CONTROL INHIBIT flag 370 is set to "1" when it is determined in the inhibit items checking routine that any specific items of control which will be described should be inhibited. The diagnosis of the first and second pressure control valves 262, 292 and the inhibition of the controls on the basis of the results of this diagnosis will be described later.

If the SPECIAL CONTROL INHIBIT flag 370 is set at "1", an affirmative decision (YES) is obtained in step S2, and the control flow goes to steps S11–S13 to establish a normal braking mode in which the master cylinder pressure is generated by only the brake operating force of the brake pedal 42 as boosted by the booster 150, without generation of a fluid pressure in the back-pressure chamber 208. The control of the first and second pressure control valves 262, 292 in this normal braking mode upon operation of the brake pedal 42 in the absence of any defects of the booster 150 and the front and rear braking sub-systems has been described above.

Step S11 is provided to determine whether the master cylinder pressure should be increased. This determination is effected by comparing two amounts of the operating amounts of the brake pedal 42 detected at respective two points of time having a predetermined time interval. For instance, the determination as to whether the master cylinder pressure should be increased or reduced is effected by detecting the operating force of the brake pedal 42 at a predetermined time interval which is longer than the cycle time of the present braking control routine, and comparing the two successively detected values of the brake operating force with each other. To this end, for instance, the brake operating force is detected each time step S11 is implemented, and a predetermined number of the successively detected values of the brake operating force are stored in a brake operating force memory (not shown) provided in the RAM 328. The oldest and newest values stored in the memory are compared with each other. Each time the newest value (last detected value) is stored in the memory, the oldest value stored is erased. Alternatively, two average values of the plurality of values of the brake operating force stored in the memory at respective two different points of time are compared with each other. In either of these cases, the master cylinder pressure is required to be increased when the newest or last value is larger than the oldest value, or when the newly obtained average value is larger than the previously obtained average value. The master cylinder pressure is required to be reduced when the last value is smaller than the oldest value, or when the newly obtained average value is smaller than the previously obtained average value. Thus, the brake operating amount (e.g., the brake operating force) of the brake pedal 42 is detected in step S11 to determine whether the master cylinder should be increased or not.

If an affirmative decision (YES) is obtained in step S11, the control flow goes to step S12 to fully close the first and second solenoid-operated pressure control valves 262, 292. To this end, the amount of electric current to be applied to the normally open first pressure control valve 262 is maximized to hold the valve member 272 seated on the valve seat 270 against the biasing force of the spring 276 and the force based on the fluid pressure difference across the valve 262 even when the master cylinder pressure is maximum. On the other hand, the amount of electric current to be applied to the normally closed second pressure control valve 292 is zeroed to hold the valve member 272 seated on the valve seat 270.

Accordingly, the fluid is supplied to the back-pressure chamber 208 from the reservoir 230 through the by-pass passage 310 and the check valve 312, so that the pressure in the back-pressure chamber 208 is held at a level substantially equal to the atmospheric pressure. Therefore, the master cylinder pressure is generated by only the operating force of the brake pedal 42 as boosted by the booster 150.

If it is determined in step S11 that the master cylinder pressure should be reduced, a negative decision (YES) is obtained in step S11, and the control flow goes to step S13 to fully close the first pressure control valve 296 and fully open the second pressure control valve 292. To this end, the amount of electric current to be applied to the normally closed second pressure control valve 292 is maximized to hold the valve member 272 apart from the valve seat 270 against the biasing force of the spring 294. Accordingly, the fluid is permitted to be discharged from the back-pressure chamber 208 to the reservoir 230 through the second pressure control valve 292, permitting the first and second pressurizing pistons 202, 204, so that the master cylinder pressure is reduced.

If any control of the braking system is not inhibited, a negative decision (NO) is obtained in step S2, and the control flow goes to step S3 to determine whether the booster 150 is defective, namely, fails to normally function to boost the brake operating force. This determination is effected by determining whether a BOOSTER DEFECT flag 360 provided in the RAM 328 of the computer 322 is set at "1". This BOOSTER DEFECT flag 360 is set to "1" if the booster 150 is diagnosed to be defective, in the booster.brake defect detecting routine of FIG. 6.

If the BOOSTER DEFECT flag 360 is set at "0" with the booster 150 normally functioning, a negative decision (NO) is obtained in step S3, and the control flow goes to step S6 to determine whether the front braking sub-system is defective. This determination is effected by determining whether a FRONT BRAKE DEFECT flag 362 provided in the RAM 328 is set at "1". This FRONT BRAKE DEFECT flag 362 is set to "1" if the front braking sub-system is diagnosed to be defective in the booster.brake defect detecting routine of FIG. 6. If neither the booster 150 nor the front braking sub-system is defective, a negative decision (NO) is obtained in step S6, and the control flow goes to steps S11–S13 to control the first and second pressure control valves 262, 292 for brake application in the normal braking mode.

If the booster 150 is defective, an affirmative decision (YES) is obtained in step S3,, and the control flow goes to steps S4 and S5. If the front braking sub-system is defective, the negative decision (NO) is obtained in step S3, while an affirmative decision (YES) is obtained in step S7, the control flow goes to steps S7–S10. Where either of these defects is detected, a fluid pressure is generated in the back-pressure chamber 208 to raise the master cylinder pressure, in order to compensate for a shortage of the vehicle braking force due to the defect.

Figure 12:
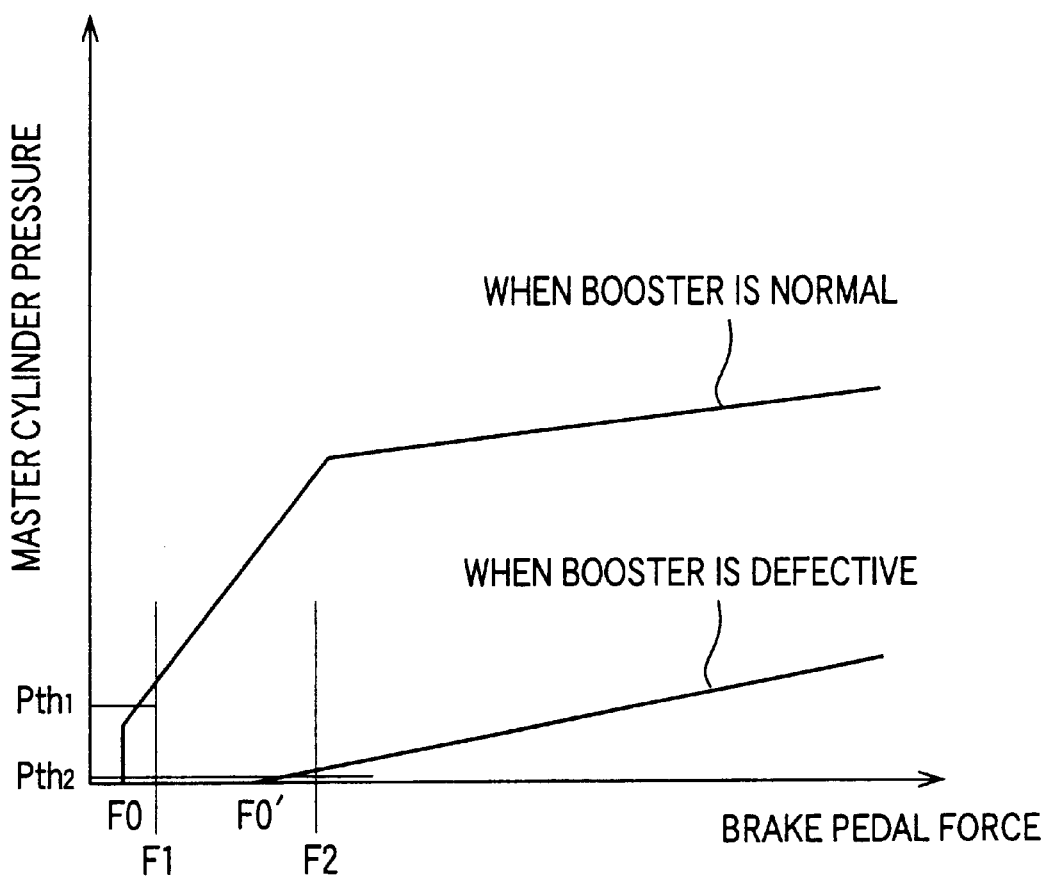
FIG. 12 is a graph for explaining for explaining setting of master cylinder pressure and brake pedal force for detecting a defect of a booster and a defect of a front braking sub-system, in the booster and brake defect detecting routine.

The manner of detecting defects of the booster 150 and the front braking sub-system will be described referring to FIGS. 6, 12 and 13.

The defect of the booster 150 may be a failure to supply the low-pressure chamber 164 of the booster with a negative pressure due to removal of a negative-pressure hose which normally connects the low-pressure chamber 164 and the intake side of the vehicle engine, for example. The defect of the front braking sub-system may be a fluid leakage from the primary fluid passage 246 which connects the second pressurizing chamber 210 and the front wheel brake cylinders 30, 32. In the event of occurrence of either of these defects, the master cylinder pressure corresponding to the operating force of the brake pedal 42 is lower than when the booster 150 and the front braking sub-system are normally functioning. Where the booster 150 is defective, the master cylinder pressure is generated on the basis of only the brake operating force, such that the master cylinder pressure increases with an increase in the brake operating force, as indicated in the graph of FIG. 12. Where the front braking sub-system is defective due to a fluid leakage from the primary fluid passage 246, substantially no fluid pressure is generated in the second pressurizing chamber 210, and the front master cylinder pressure in the chamber 210 remains low irrespective of an increase in the brake operating force. Where the rear braking sub-system is defective, the rear master cylinder pressure in the first pressurizing chamber 206 remains low. Where the booster 150 is defective, the front master cylinder pressure and the rear master cylinder pressure are both lower than normal. Where the front or rear braking sub-system is defective, only the corresponding front or rear master cylinder pressure is lower than normal.

The determinations as to whether the booster 150 and the front and rear braking sub-systems are defective are effected by comparing the front and rear master cylinder pressure values PFM and PRM with respective first and second threshold values Pth1 and Pth2. The front and rear master cylinder pressure values PFM and PRM are detected when the operating force of the brake pedal 42 are equal to respective first and second predetermined values F1, F2. In the present embodiment, the first and second values F, F2 are determined on the basis of the set loads of the return springs 171, 174, 212 included in the booster 150 and the master cylinder 152.

When the booster 150 is normal, a sum of the brake operating force and a boosting force produced by the booster 150 acts on the booster piston rod 170, and the output force of the booster piston rod 170 acts on the first pressurizing piston 202. In the booster 150, the input piston 184 is advanced against the biasing force of the return spring 171 of the input piston 184 when the brake operating force of the brake pedal 42 transmitted to the input piston 184 through the operating rod 44 becomes larger than the set load of the return spring 171. As a result, the switch valve 172 is activated to cause the power piston 162 to produce a boosting force. In the master cylinder 152, the first pressurizing piston 202 is advanced against the biasing force of the return spring 212 of the first pressurizing piston 202, when the output force of the power piston 162 transmitted to the first pressurizing piston 202 becomes larger than the set load of the return spring 212. As a result, the fluid in the first pressurizing chamber 206 is pressurized, and the second pressurizing piston 204 is advanced to pressurize the fluid in the second pressurizing chamber 210 to a level equal to the pressure in the first pressurizing chamber 206.

Where the booster 150 is defective, the power piston 162 does not produce a boosting force, so that the force acting on the first pressurizing piston 206 corresponds to the brake operating force. When the force acting on the input piston 184 becomes larger than the set load of the return spring 174 of the power piston 162, the power piston 162 is advanced. Generally, the set load of the return spring 171 of the input piston 184 is negligibly smaller than that of the return spring 174 of the power piston 162. When the force acting on the first pressurizing piston 206 becomes larger than the set load of the return spring 212 of the master cylinder 152, the first and second pressurizing pistons 202, 204 are advanced to pressurize the fluid masses in the first and second pressurizing chambers 204, 210.

It will be understood from the foregoing description that while the booster 150 is normal, the fluid masses in the first and second pressurizing chambers 206, 210 are pressurized when the force acting on the input piston 184 becomes larger than the set load F0 of the return spring 161 of the input piston 184, and that while the booster 150 is defective or abnormal, the fluid masses in the first and second pressurizing chambers 206, 210 are not pressurized as long as the brake operating force applied by the vehicle operator to the brake pedal 42 is smaller than a sum F0' of the set load of the return spring 174 of the power piston 162 and the set load of the return spring 212 of the master cylinder 152. Even while the booster 150 is defective, the fluid masses in the first and second pressurizing chambers 206, 210 are pressurized when the brake operating force becomes larger than the above-indicated sum F0'.

In view of the above, the first brake operating force value F1 is determined to be intermediate between the set load F0 and the sum F0', while the second brake operating force value F2 is determined to be larger than the sum F0' and smaller than the brake operating force when the boosting limit of the booster 150 is reached. Further, the first threshold Pth1 is determined to be smaller than the master cylinder pressure when the brake operating force is equal to the first value F1 while the booster 150 and the front and rear braking sub-systems are all normal, and the second threshold Pth2 is determined to be smaller than the master cylinder pressure when the brake operating force is equal to the second value F2 while only the booster 150 is defective. The determinations as to whether the booster 150 and the front and rear braking sub-systems are defective can be effected by comparing the front and rear master cylinder pressures PFM, PRM with the respective first and second threshold values Pth1, Pth2, when the brake operating force is equal to the first and second values F1, F2, respectively.

Table of FIGS. 13A and 13B indicates the diagnosis of the booster 150 and the front and rear braking sub-systems by comparison of the front and rear master cylinder pressures with the first and second threshold values Pth1, Pth2. Where the brake operating force F is equal to or larger than the first value F1, the booster 150 and the front and rear braking sub-systems are all normal, when the front and rear master cylinder pressures PFM1, PRM1 are both equal to or higher than the first threshold value Pth1. When either of the front and rear master cylinder pressures PFM1, PRM1 is lower than the first threshold value Pth1, the booster 150 is normal, but the braking sub-system whose master cylinder pressure is lower than the threshold value Pth1 is defective. In this case, one of the front and rear master cylinder pressures PFM1, PRM1 is equal to or higher than the threshold value Pth1, because the booster 150 is normal. Where the front and rear master cylinder pressures PFM1, PRM1 are both lower than the first threshold value Pth1, at least one of the booster 150 and the front and rear braking sub-systems is defective. At this point of time, it is not possible to determine whether the booster 150 is defective or the front braking sub-system and/or the rear braking sub-system is defective, since the front and rear master cylinder pressures PFM1, PRM1 are lower than the first threshold value Pth1, when the booster 150 is defective or when at least one of the front and rear sub-systems is defective.

Where the front and rear master cylinder pressures PFM2 and PRM2 when the brake operating forced F is equal to or larger than the second value F2 are both equal to or larger than the second threshold value Pth2, the front and rear braking sub-systems are both normal. This shows that the front and rear master cylinders pressures PFM1, PRM1 are both lower than the threshold value Pth1 because the booster 150 is defective. Where one of the front and rear master cylinder pressures PFM2, PRM2 is equal to or higher than the second threshold value Pth2, the booster 150 and one of the front and rear braking sub-systems are defective. Where the front and rear master cylinder pressures PFM2, PRM2 are both equal to or lower than the second threshold value Pth2, at least one of the front and rear braking sub-systems is defective.

Figure 6:
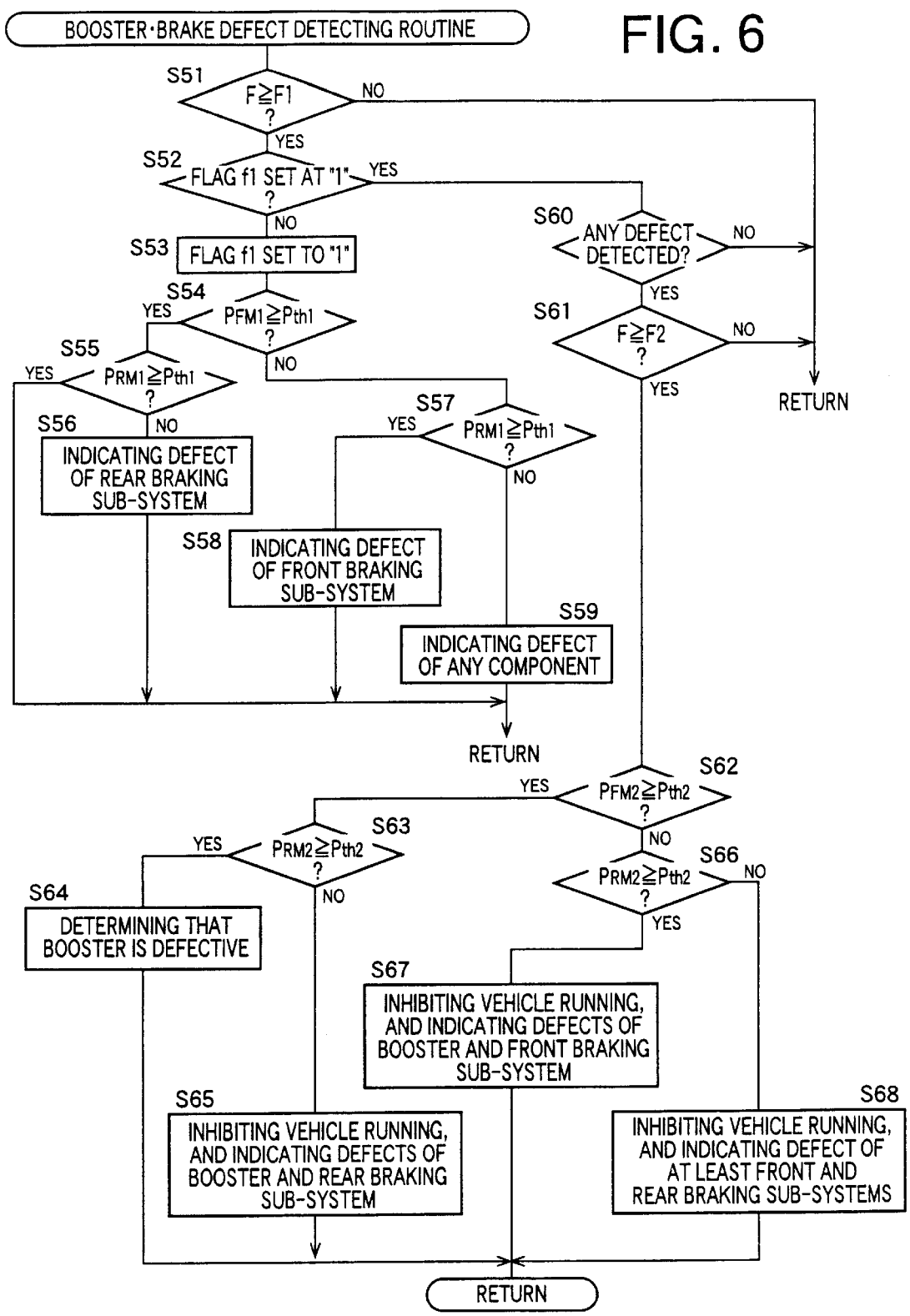
FIG. 6 is a flow chart illustrating a booster and brake defect detecting routine executed according to a control program stored in the ROM of the computer.

The booster.brake defect detecting routine of FIG. 6 is formulated to effect the diagnosis of the booster 150 and the front and rear braking sub-systems for any defects thereof, by comparison of the front and rear master cylinder pressures PFM, PRM with the respective first and second threshold values Pth1, Pth2.

The booster.brake defect detecting routine of FIG. 6 is initiated with step S51 to determine whether the brake operating force F is equal to or larger than the first value F1. If the brake operating force F is smaller than the first value F1, a negative decision (NO) is obtained in step S51, and one cycle of execution of the routine is terminated.

If the brake operating force F becomes equal to or larger than the first value F1, an affirmative decision (YES) is obtained in step S51, and the control flow goes to step S52 to determine whether a flag f1 is set at "1". The flag f1 set at "1" indicates that at least one of the booster 150 and the front and rear braking sub-systems is defective. When the brake operating force F has increased to or exceeded the first value F, the diagnosis for any defect on the basis of the state of the flag f1 is effected only once. The flag f1 is reset to "0" in the initial setting in the main control routine not shown. When step S52 is implemented for the first time, the flag f1 is set at "0", and a negative decision (NO) is obtained in step S52, and the control flow goes to step S53 to set the flag f1 to "1", and then to step S54 to determine whether the front master cylinder pressure PFM1 detected by the front master cylinder pressure sensor 336 is equal to or higher than the predetermined first threshold Pth1. If an affirmative decision (YES) is obtained in step S54, the control flow goes to step S55 to determine whether the rear master cylinder pressure PRM1 detected by the rear master cylinder pressure sensor 338 is equal to or higher than the first threshold value Pth1. If an affirmative decision (YES) is obtained in step S55, one cycle of execution of the present routine is terminated. In this case, the booster 150 and the front and rear braking sub-systems are all normal. When step S52 is subsequently implemented, an affirmative decision (YES) is obtained in step S52, and the control flow goes to step S60 to determine whether any one of the booster 150 and the front and rear braking sub-systems is defective. In the absence of any defect, a negative decision (NO) is obtained in step S60, and one cycle of execution of the routine is terminated. The determination in step S60 is effected by determining whether a DEFECT DETECT flag 364 provided in the RAM 328 is set at t"1".

Where the rear master cylinder pressure PRM1 is lower than the first threshold value Pth1 while the front master cylinder pressure PFM1 is equal to or higher than the threshold value Pth1, an affirmative decision (YES) is obtained in step S54 while a negative decision (NO) is obtained in step S55. In this case wherein the front master cylinder pressure PFM1 is equal to or higher than the threshold value Pth1, the booster 150 is normal, but the rear braking sub-system is defective, and the control flow goes to step S56 to activate the alarm indicator 348 to indicate that the rear braking sub-system is defective. In the present braking system in which the front braking sub-system has a larger braking capacity than the rear braking sub-system, the defect of the rear braking sub-system results in a comparatively small amount of reduction in the total vehicle braking force. In view of this fact, step S56 is formulated to merely activate the alarm indicator 348, without any control operation of the braking system so as to compensate for the reduction of the total vehicle braking force due to the defect of the rear braking sub-system. Where the four brakes 20–26 are all disc brakes, the braking capacity of the front braking sub-system may be made larger than that of the rear braking sub-system, by constructing the front brakes 20, 22 with a higher degree of rigidity-than the rear brakes 24, 26 and constructing the front wheel brake cylinders 30, 32 with a larger diameter than the rear wheel brake cylinders 34, 36.

When the front master cylinder pressure PFM1 is lower than the first threshold value Pth1, a negative decision (NO) is obtained in step S54, and the control flow goes to step S57 to determine whether the rear master cylinder pressure PRM1 is equal to or higher than the first threshold value Pth1. If an affirmative decision (YES) is obtained in step S57, it indicates that the booster 150 is normal, but the front braking sub-system is defective. In this case, the control flow goes to step S58 to determine that the front braking sub-system is defective, that is, to set the FRONT BRAKE DEFECT flag 362 to "1", and activate the alarm indicator 348 to indicate that the front braking sub-system is defective. In this case wherein the FRONT BRAKE DEFECT flag 362 is set to "1", the DEFECT DETECT flag 364 is not set to "1", so that a negative decision (NO) is obtained in step S60 when this step S60 is subsequently implemented, whereby one cycle of execution of the routine is terminated.

Where the rear master cylinder pressure PRM1 as well as the front master cylinder pressure PFM1 is lower than the first threshold Pth1, a negative decision (NO) is obtained in step S59, and the control flow goes to step S59 to determine that the braking system is defective, and set the DEFECT DETECT flag 364 in the RAM 328 to "1". When step S60 is subsequently implemented, an affirmative decision (YES) is obtained in step S60, and the control flow goes to step S62 to determine whether the brake operating force F has increased to or exceeded the predetermined second value F2. Where the front and rear master cylinder pressures PFM1 and PRM2 are both smaller than the first threshold value Pth2, it is not possible to determine whether the booster 150 or at least one of the front and rear braking sub-systems is defective. To make this determination, the front and rear master cylinder pressures PFM2, PRM2 when the brake operating force F is equal to or larger than the second value F2 are compared with the predetermined second threshold value Pth2.

When the brake operating force F has increased to or exceeded the second value F2, an affirmative decision (YES) is obtained in step S61, and the control flow goes to step S62 to determine whether the front master cylinder pressure PFM2 when the brake operating force F is equal to or larger than the second value F2) is equal to or larger than the predetermined second threshold value Pth2. If an affirmative decision (YES) is obtained in step S62, the control flow goes to step S63 to determine whether the rear master cylinder pressure PRM2 is equal to or higher than the second threshold Pth2. If an affirmative decision (YES) is obtained in step S63, the control flow goes to step S64 to determine that the booster 150 is defective. This determination is based on a fact that if at least one of the front and rear braking sub-systems were defective, both of the front and rear master cylinder pressures PFM2 and PRM2 when the brake operating force F is equal to or larger than the second value F2 would not be equal to or higher than the second threshold value Pth2. In step S64, the BOOSTER DEFECT flag 360 is set to "1", and the alarm indicator 348 is activated to indicate that the booster 150 is defective.

Where the front master cylinder pressure PFM2 is equal to or higher than the second threshold value Pth2 but the rear master cylinder pressure PRM2 is lower than the threshold value Pth2, an affirmative decision (YES) is obtained in step S62 while a negative decision (NO) is obtained in step S65. In this case, the control flow goes to step S65 to inhibit running of the vehicle and activate the alarm indicator 348 to indicate that the booster 150 and the front braking sub-system are defective. The vehicle running is inhibited since the vehicle cannot be braked with a sufficiently large braking force where the booster 150 and the rÏfront braking sub-system are both defective. In this case, a VEHICLE RUNNING INHIBIT flag 366 in the RAM 328 is set to "1". In response to the setting of the flag 366 to "1", the ECU 320 may command a control device for controlling the vehicle drive device including an engine, to inhibit the starting of the engine, for example.

Where the front master cylinder pressure PFRM2 is lower than the threshold Pth2, a negative decision (NO) is obtained in step S62, and the control flow goes to step S66 to determine whether the rear master cylinder pressure PRM2 is equal to or higher than the threshold Pth2. If an affirmative decision (YES) is obtained in step S66, the control flow goes to step S67 to activate the alarm indicator 348 to indicate that the booster 150 and the front braking sub-system are defective, and inhibit the running of the vehicle. When the front and rear master cylinder pressures PFM2, PRM2 are both lower than the second threshold value Pth2, a negative decision (NO) is obtained in step S66, and the control flow goes to step S68 to activate the alarm indicator 348 to indicate that at least the front and rear braking sub-systems are defective, and inhibit the running of the vehicle. When the brake pedal 42 is released to the non-operated position, the flag f1 is reset to "0", so that steps S54–S59 are first implemented and then steps S60–S68 are implemented, when the brake pedal 42 is again depressed.

The booster.brake defect detecting routine of FIG. 6 is adapted to indicate the defects of the booster and the front braking sub-system in step S67 and the defects of at least the front and rear braking sub-systems in step S68. Although this arrangement is preferable, it is possible to indicate only the presence of any defects in the braking system. For instance, steps S66–S68 may be replaced by a step which is implemented when the negative decision (NO) is obtained in step S62, to inhibit the running of the vehicle and merely activate the alarm indicator 348 for informing that the braking system has some defects. In the present embodiment wherein the master cylinder pressure is not raised even when the rear braking sub-system is defective, it is necessary indicate only the defect of the front braking sub-system, but is not necessary to indicate the defect of the rear braking sub-system. Therefore, it is possible to eliminate steps S55 and S56.

If the BOOSTER DEFECT flag 360 is set at "1" as a result of detection of the defect of the booster 150 in the booster 20 brake defect detecting routine of FIG. 6, an affirmative decision (YES) is obtained in step S3 in the braking control routine of FIG. 5, and the control flow goes to step S4 to determine whether a predetermined time has passed after the moment of detection of the defect of the booster 150. When step S4 is implemented for the first time, a negative decision (NO) is obtained in step S, and one cycle of execution of the routine is terminated. When the predetermined time has passed after the moment of detection of the defect of the booster 150, an affirmative decision (YES) is obtained in step S4, and the control flow goes to step S5 to fully open the first pressure control valve 262 and fully close the second pressure control valve 292 by zeroing the amounts of electric current to be applied to their solenoid coils 284, 302.

As a result, the first pressurizing chamber 206 and the back-pressure chamber 208 are brought into communication with each other, and the master cylinder pressure is controlled according to the following equation (1):

$$PM = F'/S2 \qquad (1)$$

In the above equation (1), "PM", "S2" and "F" respectively represent the master cylinder pressure, the transverse cross sectional area of the piston rod 220, and the force (hereinafter referred to as "master cylinder input force") transmitted from the booster piston rod 170 to the first pressurizing piston 202 through the piston rod 220. In the present embodiment, the ratio of boosting of the brake operating force F transmitted from the brake pedal 42 to the operating rod 44 is held constant irrespective of the operating stroke of the brake pedal 42, so that the relationship between the master cylinder input force F' and the brake operating force F is held constant irrespective of a change in the brake operating stroke. It is noted that the set load of the return spring 212 is ignored in the above equation (1).

Figure 14:
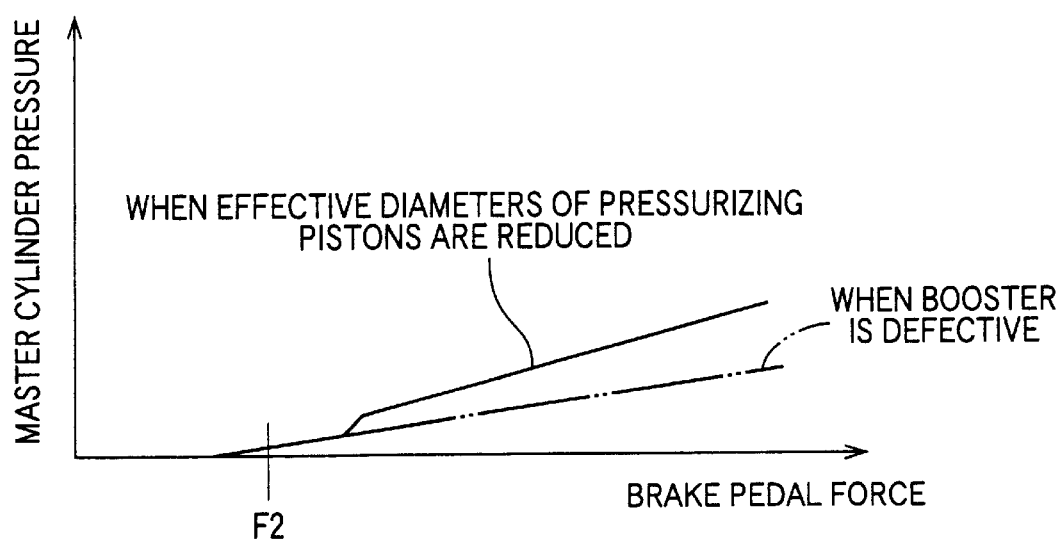
FIG. 14 is a graph indicating master cylinder pressure when effective diameters of first and second pressurizing pistons are reduced while the booster is defective.

When the first pressure control valve 262 is fully opened for fluid communication between the first pressurizing chamber 206 and the back-pressure chamber 208, an advancing movement of the first pressurizing piston 202 with an increase in the operating stroke of the brake pedal 42 depressed to increase the master cylinder pressure will cause a flow of the pressurized fluid from the first pressurizing chamber 206 into the back-pressure chamber 208 by an amount equal to an increase in the volume of the back-pressure chamber 208 as a result of the advancing movement of the first pressurizing piston 202. Accordingly, the amount of the pressurized fluid that is delivered from the first pressurizing chamber 206 to the rear wheel brake cylinders 34, 36 is equal to a volume of a portion of the piston rod 220 which has been moved into the cylinder housing 190 as a result of the advancing movement of the first pressurizing piston 202. Thus, the diameter of the first pressurizing piston 202 effective to deliver the pressurized fluid from the first pressurizing chamber 206 to the rear wheel brake cylinders 34, 36 is reduced to that of the piston rod 220, so that the fluid pressure in the first pressurizing chamber 206 which corresponds to a given value of the brake operating force F is made higher than when the effective diameter of the first pressurizing piston 202 is not reduced, that is, than when the first pressuring chamber 206 and the back-pressure chamber 208 are not communicated with each other. Further, the fluid pressure in the back-pressure chamber 208 is raised to the level in the first pressurizing chamber 206, and the fluid pressure in the second pressurizing chamber 210 is similarly raised. Thus, the effective diameter of the second pressurizing piston 204 is similarly reduced when the chambers 206, 208 are communicated with each other. Accordingly, the master cylinder pressure is made higher when the chambers 206, 208 are communicated with each other, that is, when the effective diameters of the pressurizing pistons 202, 204 are reduced, than when the master cylinder pressure is generated by only the force transmitted to the first pressurizing piston 202 while the booster 150 is defective, as indicated by solid and two-dot chain lines in the graph of FIG. 14. Thus, the present embodiment is arranged to minimize the amount of reduction of the vehicle braking force when the booster 150 is defective.

Steps S1–S5 are repeatedly implemented while the brake pedal 42 is kept operated while the booster 150 is defective. When the effective diameters of the first and second pressurizing pistons 202, 204 are reduced with the first pressure control valve 262 held fully open, the second pressure control valve 292 is held in the fully closed state. Thus, the master cylinder pressure is increased and reduced while the first pressurizing chamber 206 and the back-pressure chamber 208 are held in communication with each other. In this state in which the master cylinder pressure is equal to the pressure in the back-pressure chamber 208, the pressurized fluid is fed from the chamber 208 into the chamber 206 through the first pressure control valve 262 when the master cylinder pressure is reduced as a result of a releasing action of the brake pedal 42. This fluid flow permits a retracting movement of the first pressurizing piston 202, and therefore permits the master cylinder pressure to be reduced with a decrease of the brake operating force F, at a rate equal to a rate at which the master cylinder pressure is increased. After the amount of the fluid which has been fed from the back-pressure chamber 208 into the first pressurizing chamber 206 has exceeded a predetermined amount, the fluid is returned from the chamber 206 to the reservoir 230 through the communication passage 228 and reservoir port 226.

Where the booster 150 is normal but the front braking sub-system is defective, a negative decision (NO) is obtained in step S3 while an affirmative decision (YES) is obtained in step S6. In this case, the control flow goes to step S6 to determine whether the predetermined time has passed after the moment of detection of the defect of the front braking sub-system. When step S6 is implemented for the first time, a negative decision (NO) is obtained in step S6, and one cycle of execution of the routine of FIG. 5 is terminated. If the predetermined time has passed, an affirmative decision (YES) is obtained in step S7, and the control flow goes to step S8 to determine whether it is necessary to increase t he master cylinder pressure. This determination is effected in the same manner as in step S11. If an increase in the master cylinder pressure is required, an affirmative decision (YES) is obtained in step S8, and the control flow goes to step S9 in which the amount of electric current to be applied to the first pressure control valve 262 is determined so as to generate the back pressure in the back-pressure chamber 208, which corresponds to the brake operating force F. The determined amount of electric current is applied to the solenoid coil 284 of the first pressure control valve 262. In step S9, the amount of electric current applied to the solenoid coil 302 of the second pressure control valve 292 is zeroed, to hold the valve 292 in the fully closed state while the master cylinder pressure is increased. Thus, the first pressure control valve 262 provided in the communication passage 260 connecting the first pressurizing chamber 206 and the back-pressure chamber 208 is opened when the front braking sub-system is defective, so that the fluid pressure in the rear wheel brake cylinders 24, 26 in the normal rear braking sub-system is raised by the back-pressure in the back-pressure chamber 208, for increasing the rear wheel braking pressure to thereby reduce the reduction of the total vehicle braking force due to the defect of the rear braking sub-system.

Where the front braking sub-system is defective, the amount of electric current to be applied to the solenoid coil 284 of the first pressure control valve 262 is determined so that the back-pressure PS generated in the back-pressure chamber 208 is controlled so as to satisfy the following equation (2):

$$PM=\{PS\cdot(S1-S2)\}/S1+F'/S1 \quad (2)$$

In the above equation (2), "S1" represents the pressure-receiving surface area (transverse cross sectional area) of the first pressurizing piston 202 which partially defines the first pressurizing chamber 206.

Figure 15A:
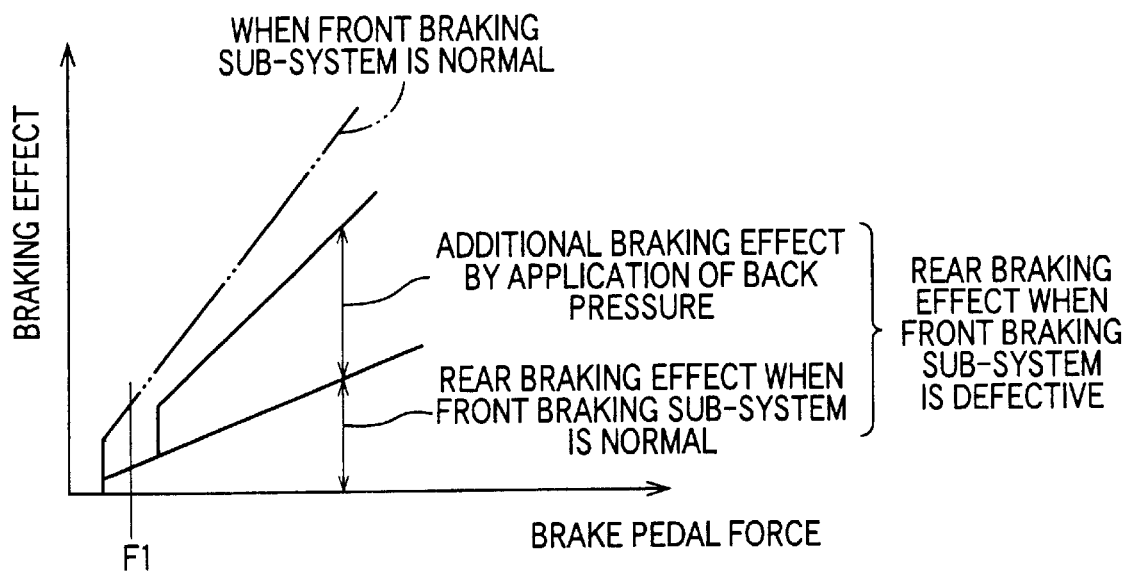
FIGS. 15A and 15B are graphs indicating braking effects when an assisting pressure (back pressure) is applied to the first pressurizing piston when front braking sub-system is defective.

It is apparent from the above equation (2) that the fluid pressure (master cylinder pressure) in the first pressurizing chamber 206 is equal to a pressure F'/S1 in the chamber 206 when the back pressure in the back-pressure chamber 208 is equal to the atmospheric pressure, plus an assisting pressure {PS·(S1–S2)}/S1 which provides an additional braking effect to be added to the rear braking effect to be provided when the front braking sub-system is normal, as indicated in FIG. 15A. The assisting pressure is determined by the brake operating force F. It is noted that when the front braking sub-system is defective, the proportioning and by-pass valve 254 does not function to reduce the rear master cylinder pressure. The rear braking effect when the front braking sub-system is defective, which is shown in FIG. 15A, is based on the rear master cylinder pressure which is not reduced by the proportioning and by-pass valve 257.

Figure 15B:
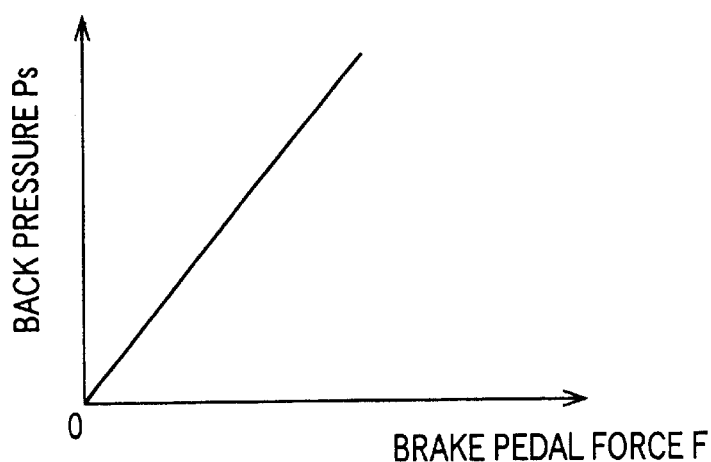

The assisting pressure {PS·(S1–S2)}/S1 is obtained by the back pressure PS generated in the back-pressure chamber 208. To generate the back pressure PS in the back-pressure chamber 208 by application of the fluid pressure in the first pressurizing chamber 206 to the back-pressure chamber 208 through the first pressure control valve 262, there should be a pressure difference (PM–PS) across the first pressure control valve 262, which pressure difference is controlled by controlling the amount of electric current to be applied to the solenoid coil 284. The master cylinder pressure PM includes the assisting pressure, and is determined by the master cylinder input force F'. The back pressure PS is obtained on the basis of the master cylinder input force F' and the master cylinder pressure PM and according to the above equation (2). The pressure difference (PM–PS) is determined by the thus determined or obtained master cylinder pressure PM and back pressure PS, and the amount of electric current to be applied to the solenoid coil 284 is determined by the pressure difference (PM–PS). In the present embodiment, the master cylinder input force F' is not detected, and the brake operating force F is detected. The braking operating force F and the master cylinder input force F' have a known relationship, and a predetermined relationship between the brake operating force F and the amount of electric current is stored in the ROM 326 of the computer 322, in the form of a stored data map. Further, the brake operating force F and the back pressure PS have a predetermined relationship as shown in FIG. 15B. The amount of electric current is determined on the basis of the brake operating force F and according to the above-indicated relationship stored in the ROM 326, so as to obtain the corresponding back pressure PS. In the present embodiment, the amount of electric current is determined so that the additional braking effect (assisting pressure) increases with an increase of the brake operating force F, as indicated in the graph of FIG. 15A. However, the additional braking effect provided by the assisting pressure may be held constant irrespective of the brake operating force F.

In step S9, the brake operating force F is determined on the basis of the output signal of the depression force sensor 334, and the amount of electric current to be applied to the solenoid coil 284 of the first pressure control valve 262 is determined on the basis of the brake operating force F and according to the above-indicated stored relationship between the force F and the amount of electric current. This relationship may be represented by a mathematical equation in place of the data map. A drive signal representing the determined amount of electric current is applied to the driver circuit 350 corresponding to the first pressure control valve 262, so that the solenoid coil 284 of this valve 262 is energized with the determined amount of electric current. The amount of electric current to be applied to the solenoid coil 284 may be instantly increased to the determined amount, or incremented at a predetermined rate up to the determined amount.

The thus determined amount of electric current is held applied to the first pressure control valve 262 while the master cylinder pressure is being increased with the brake pedal 42 being depressed. As a result, the pressurized fluid is fed from the first pressurizing chamber 206 to the back-pressure chamber 208 through the opened first pressure control valve 262, so that the back pressure PS in the chamber 208 is controlled to a level corresponding to the brake operating force F. While the front braking sub-system is defective, the additional braking effect is increased with an increase in the brake operating force F, as indicated in FIG. 15A. Since the valve 262 is a normally open valve, the amount of electric current to be applied to the solenoid coil 284 is reduced with an increase of the brake operating force F, so that the pressure difference (PM–PS) between the master cylinder PM and the back pressure PS is reduced for thereby increasing the back pressure PS and the assisting pressure {PS·(S1–S2)}/S1 based on the back pressure PS, as the brake operating force F is increased. When the brake pedal 42 is held at a given depressed position, the master cylinder pressure PM and the back pressure PS are eventually held at the levels corresponding to the constant brake operating force F, and the first pressure control valve 262 is closed while the amount of electric current necessary to maintain the back pressure PS corresponding to the brake operating force F is kept applied to the solenoid coil 284. The stored data map representing the predetermined relationship between the brake operating force F and the amount of electric current is formulated such that the amount of electric current can be determined even when the brake operating force F is extremely small and even zero. However, the brake operating force F is larger than zero when the control of the electric current to apply the fluid pressure in the first pressurizing chamber 206 to the back-pressure chamber 208 is initiated, that is when the predetermined time has passed after the moment of detection of the defect of the front braking sub-system, as indicated in FIG. 15A.

Thus, the master cylinder pressure is raised by the assisting pressure based on the back pressure PS in the back-pressure chamber 208 when the front braking sub-system is defective, so that the rear braking effect when the front braking sub-system is defective is made larger than the rear braking effect when the front braking sub-system is normal, that is, than the rear braking effect when the assisting pressure is not added to the master cylinder pressure, as indicated in FIG. 15A. Accordingly, the amount of reduction of the vehicle braking force due to the defect of the front braking sub-system is reduced. Further, the fluid pressure to be applied to the rear wheel brake cylinders 34, 36 is also increased by switching of the proportioning and by-pass valve 254 to a state in which the rear master cylinder pressure is not reduced, when the front braking sub-system is defective. In this respect, too, the amount of reduction of the total vehicle braking force due to the defect of the front braking sub-system is reduced.

The increase of the master cylinder pressure by application of the assisting pressure by controlling the amount of electric current to be applied to the first pressure control valve 262 so as to control the pressure difference across this valve 262 can be considered to be achieved by reduction of the effective diameter of the first pressurizing piston 202. In step S5 implemented when the booster piston 150 is defective, the first pressure control valve 262 is fully opened for full communication between the first pressurizing chamber 206 and the back-pressure chamber 208. In this case, the effective diameter of the first pressurizing piston 202 is considered to be reduced to the diameter of the piston rod 220 which has the transverse cross sectional area S2. In step S9 implemented when the front braking sub-system is defective, the first pressure control valve 262 is partially opened. In this respect, the partial opening of the valve 262 means partial reduction of the first pressurizing piston 202. The assisting pressure which provides the additional rear braking effect indicated above may be considered to be a boosting or auxiliary pressure which provides a boosted or auxiliary braking force to be added to the braking force which corresponds to the force F by which the brake pedal 42 is operated by the vehicle operator.

Where it is required to reduce the master cylinder pressure, a negative decision (NO) is obtained in step S8, and the control flow goes to step S10 to reduce the master cylinder pressure. The reduction of the master cylinder pressure is effected in step S10 such that the back pressure in the back-pressure chamber 208 is reduced with a decrease in the brake operating force F, at the rate at which the back pressure is increased in step S9, so that the rear braking effect while the front braking sub-system is defective is reduced at the rate of reduction of the brake operating force F. To this end, the first pressure control valve 262 is fully closed to disconnect the first pressurizing chamber 206 and the back-pressure chamber 208 from each other, while the opening of the second pressure control valve 292 is controlled to reduce the back pressure in the chamber 208. As described above, the brake operating force F and the back pressure PS have the known relationship as indicated in the graph of FIG. 15B. The electric current to be applied to the solenoid coil 302 of the second pressure control valve 292 is determined so as to establish the back pressure PS corresponding to the brake operating force F. For instance, a predetermined relationship between the brake operating force F and the electric current to be applied to the solenoid coil 302 is stored in the ROM 326 of the computer 322, in the form of a data map. In step S10, the brake operating force F is detected, and the amount of electric current to be applied to the solenoid coil 302 is determined on the basis of the detected brake operating force F and according to the stored relationship. The solenoid coil 302 is energized with the determined amount of electric current. The data map is formulated to permit the back pressure PS to be controlled until the brake operating force F is reduced to zero, such that the back pressure PS is made equal to the atmospheric level when the brake operating force F is zero. In step S10, the rear braking pressure to be applied to the rear wheel brake cylinders 34, 36 is controlled even after the brake operating force F has been reduced below the value at which the control the amount of electric current to be applied to the first pressure control valve 262 was initiated to increase the rear braking pressure. Thus, the rear braking pressure is reduced to zero at the rate at which the rear braking pressure was increased. Thus, the rear braking effect while the front braking sub-system is defective is reduced with a decrease of the brake operating force F, at the rate equal to the rate of increase. This arrangement wherein the master cylinder pressure is increased and reduced at the same rate assures a smooth increase of the master cylinder pressure when a decrease of the brake operating force F is followed by an increase of the brake operating force F. Where the front braking sub-system is defective, the master cylinder pressure is generated in a manner different from that in the normal braking mode, that is, generated with the pressurized fluid being fed from the first pressurizing chamber 206 to the back-pressure chamber 208. However, a transition from step S9 to step S10 as a result of an increase of the brake operating force F following a decrease of the brake operating force F does not cause an abrupt change in the master cylinder pressure which would be unexpected to the vehicle operator.

It will be understood from the foregoing description that the master cylinder pressure is increased, upon detection of the defect of the booster 150 or the front braking sub-system, with the back pressure in the back-pressure chamber 208 being raised based on the pressurized fluid received from the first pressurizing chamber 206 through the first pressure control valve 262, so that the insufficiency of the vehicle braking force can be avoided even in the defective state of the braking system.

It is further noted that the back pressure is generated in the back-pressure chamber 208 the predetermined time after the defect has been detected. This arrangement reduces the amount of increase of the required operating stroke of the brake pedal 42, as compared with an arrangement wherein the back pressure generated immediate after the moment of detection of the defect. The total amount of the pressurized fluid which is discharged from the first pressurizing chamber 206 is increased by an amount of the fluid delivered to the back-pressure chamber 208, and the required operating stroke of the brake pedal 42 is accordingly increased. The required operating stroke can be reduced by retarding the moment at which the delivery of the fluid from the chamber 206 to the chamber 208 is initiated. In particular, the operating stroke would be considerably increased if the first pressure control valve 262 were fully opened in step S5 immediately after the defect of the booster 150 is detected. The provision of step S4 to retard the moment at which the valve 262 is fully opened is effective to increase the master cylinder pressure while minimizing the amount of increase of the required operating stroke of the brake pedal 42.

The braking pressure source device according to the present embodiment, which is capable of increasing the master cylinder pressure when the booster 150 or the front braking sub-system is defective, is not provided with a power-operated hydraulic pressure source, and is accordingly available at a reduced cost.

The braking system including the braking pressure source device according to the present embodiment is further arranged to diagnos4 the first and second solenoid-operated pressure control valves 262, 292. To begin with, this diagnosis will be briefly described. The diagnosis is initiated when a predetermined condition is satisfied. In the present embodiment, this condition is satisfied when the vehicle is stationary with the brake pedal 42 being operated to generate the master cylinder pressure PM higher than a predetermined threshold PMA. When the predetermined condition is satisfied, the first and second pressure control valves 262, 292 are diagnosed for sticking of the valve member in the open or closed state and for abnormality of their pressure reducing characteristics. The sticking of the valve member in the open state is a defect that the valve 262, 292 cannot be closed with the valve member stuck in the open state, due to a foreign substance caught between the valve member and the valve seat, or due to fixing of the valve member in the open state of the valve, for example. The sticking of the valve member in the closed state is a defect that the valve 262, 292 cannot be opened with the valve member stuck in the closed state, due to permanent seating of the valve member on the valve seat.

To diagnose the first pressure control valve 262, a determination as to whether the valve member 272 of the valve 262 is normally or correctly seated on the valve seat 270 is effected while the valve 262 is in the closed state, by determining whether the master cylinder pressure corresponds to the brake operating force F. When the brake operating force F is reduced as a result of a releasing action of the brake pedal 42, the second pressure control valve 292 is fully opened, to determine whether the master cylinder pressure is reduced, to determine whether the valve member 292 can be normally or correctly opened. When the master cylinder pressure has been reduced to the predetermined threshold PMA, the second pressure control valve 292 is fully closed, to determine whether the master cylinder pressure can be held constant, to thereby determine whether the valve 292 can be normally or correctly closed. If the master cylinder pressure can be held constant, the amount of electric current to be applied to the valve 292 is incremented, to determine whether the master cylinder pressure can be reduced by an amount corresponding to the increment of the amount of electric current, to thereby determine whether the valve 292 is able to normally or correctly reduce the master cylinder pressure with an increase of the amount of electric current applied thereto. When the master cylinder pressure has been reduced to a predetermined threshold PMB lower than the threshold PMA, the first pressure control valve 262 is fully opened while the second pressure control valve 292 is fully closed, to determine whether the master cylinder pressure is normally reduced, to thereby determine whether the valve 262 can be normally or correctly opened.

The diagnosis of the first and second pressure control valves 262, 292 will be described in detail by reference to the flow charts of FIGS. 7–9 and the graph of FIG. 16. In the present embodiment, the diagnosis is effected on the assumption that the front and rear braking sub-systems and the booster 150 are all normal.

The diagnostic routine illustrated in the flow charts of FIGS. 7–9 is initiated with step S101 to determine whether the first and second pressure control valves 262, 292 have been diagnosed. This determination is effected by determining whether a DIAGNOSIS COMPLETION flag 368 provided in the RAM 328 of the computer 322 is set at "1". When the flag 368 is set at "1", it indicates that the diagnosis of the valves 262, 292 has been completed. Step S101 is provided to perform the diagnosis only once each time the electric system of the vehicle is turned on.

If the diagnosis has not been completed, namely, if the DIAGNOSIS COMPLETION flag 368 is set at "0", a negative decision (NO) is obtained in step S101, and the control flow goes to step S102 to determine whether the vehicle is stationary. This determination in step S102 is made by determining whether the vehicle running speed is lower than a predetermined threshold. The vehicle running speed is detected on the basis of the output signals of the wheel speed sensors 340. If the vehicle is not stationary, a negative decision (NO) is obtained in step S102, and the control flow goes to step S143 to effect a processing necessary to terminate the diagnosis, more precisely, to clear and reset various memories, flags and counters used for the diagnosis, so that the diagnosis can be initiated when the predetermined condition for initiating the diagnosis is subsequently satisfied while the electric system is held on, after the diagnosis is once interrupted due to the negative decision (NO) obtained in step S102 or S103. In this case, no control signals are applied to the first and second solenoid-operated pressure control valves 262, 292.

If the vehicle is stationary and an affirmative decision (YES) is obtained in step S102, the control flow goes to step S103 to determine whether the brake pedal 42 is in operation. If the brake pedal 42 is not in operation, a negative decision (NO) is obtained in step S103, and the control flow goes to step S143 described above. If the brake pedal 42 is in operation and an affirmative decision (YES) is obtained in step S103, the control flow goes to step S104 and the following steps to diagnose the first and second pressure control valves 262, 292. In the present embodiment, the braking control routine of FIG. 5 is not executed while the diagnosis is performed with the predetermined condition being satisfied. The braking control routine is initiated when any defect of the valves 262, 292 has been detected, or after the diagnosis is completed or interrupted. For instance, the main control routine (not shown) may be formulated to execute the diagnostic routine of FIGS. 7–9 after the completion of the initial setting, and then execute the braking control routine of FIG. 5. Before the braking control routine is initiated, determinations are effected as to whether the diagnosis has been completed, and whether the vehicle is stationary. If the diagnosis has been completed, or if the vehicle is not stationary, the braking control routine is initiated. If the diagnosis is in progress while the vehicle is stationary, the braking control routine is not initiated. If the brake pedal 42 is operated before the completion of the diagnosis while the vehicle is stationary, the diagnosis of the first and second pressure control valves 262, 292 is initiated. Alternatively, the determination as to whether the brake pedal 42 is in operation is effected while the vehicle is stationary, so that the braking control routine is initiated if the brake pedal 42 is not in operation, and is not initiated if the brake pedal 42 is in operation. Further alternatively, the diagnostic routine may be formulated to set a DIAGNOSIS INITIATION flag to "1" when the diagnosis of the first and second pressure control valves 262, 292 has been initiated with the affirmative decision (YES) obtained in steps S102 and S103, so that the braking control routine is not executed while the diagnosis is being effected. The DIAGNOSIS INITIATION flag may be reset to "0" when any defect of the valves 262, 292 is detected, when the diagnosis is interrupted, or when the diagnosis has been completed, so that the braking control routine is initiated. Since the diagnosis of the valves 262, 292 is effected during operation of the brake pedal 42, the vehicle is kept stationary with brake application even while the braking control routine is not executed.

Step S104 is provided to determine whether a flag f2 is set at "1". When this flag f2 is set at "1", it indicates that the master cylinder pressure PM is higher than the predetermined threshold PMA. The flag f2 was reset to "0" in the initial setting in the main control routine. When step S104 is implemented for the first time, a negative decision (NO) is obtained in step S104, and the control flow goes to step S105 to fully close the first and second pressure control valves 262, 292.

Step S105 is followed by step S106 to determine whether the master cylinder pressure PM is higher than the predetermined threshold PMA. In the present embodiment, the front master cylinder pressure is used for the diagnosis. However, the rear master cylinder pressure, or an average of the front and rear master cylinder pressures may be used for the diagnosis. If the master cylinder pressure PM is equal to or lower than the threshold PMA, a negative decision (NO) is obtained in step S106, and the control flow goes to step S116 to determine whether the flag f2 is set at "1". Since the flag f2 is set to "1" only after the master cylinder pressure PM has exceeded the threshold PMA as a result of the operation of the brake pedal 42, a negative decision (NO) is obtained in step S116, and one cycle of execution of the present diagnostic routine is terminated.

Figure 16:
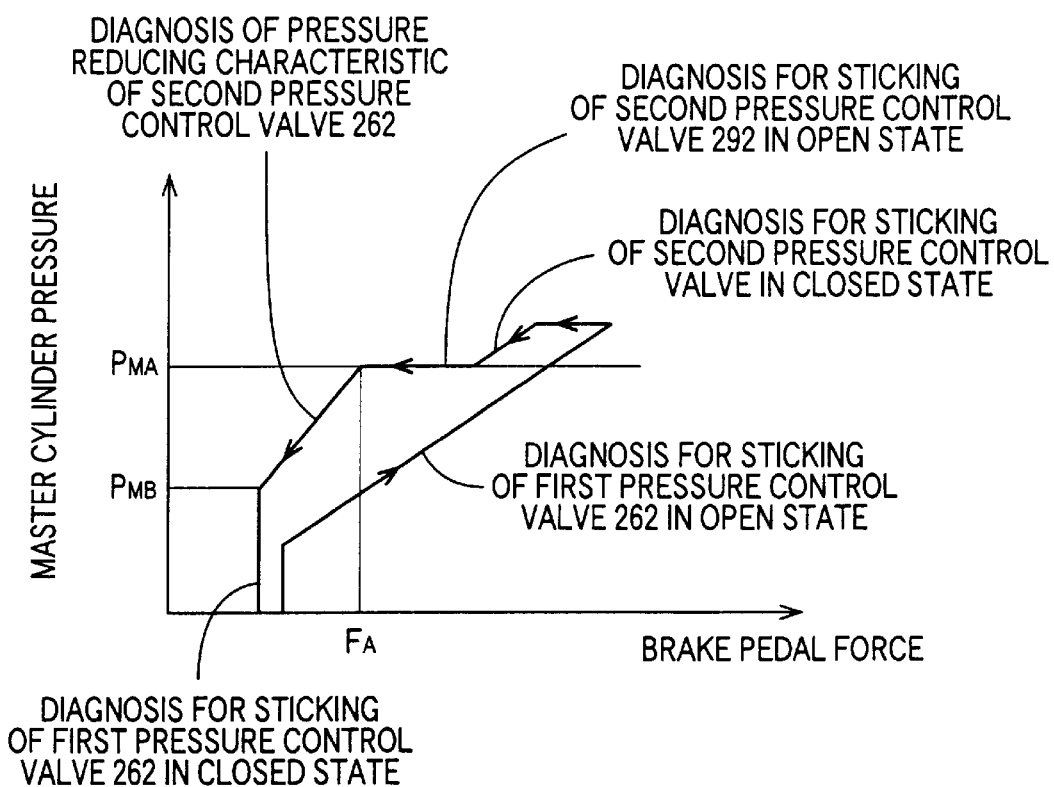
FIG. 16 is a graph for explaining a diagnosis of the first and second solenoid-operated pressure control valves.

When the master cylinder pressure PM has exceeded the threshold PMA, as indicated in the graph of FIG. 16, an affirmative decision (YES) is obtained in step S106, and the control flow goes to step S107 to determine whether a flag f3 is set at "1". When this flag f3 is set at "1", it indicates that the brake operating force F is being reduced after the master cylinder pressure PM has exceeded the threshold PMA. If the flag f3 is not set at "1", a negative decision (NO) is obtained in step S107, and the control flow goes to step S108 to set the flag f2 to "1".

Step S108 is followed by step S109 to determine whether the valve member 272 of first pressure control valve 262 is stuck in the open state. This determination is effected on the basis of the brake operating force F and the master cylinder pressure PM which are detected when step S109 is implemented. That is, the determination in step S109 is effected by determining whether the master cylinder pressure PM generated when the first pressure control valve 262 is commanded to be placed in the fully closed state for disconnection of the back-pressure chamber 208 from the first pressurizing chamber 206 corresponds to the brake operating force F as boosted by the booster 150. The data map representing the predetermined relationship between the brake operating force F and the master cylinder pressure PM is stored in the ROM 326 of the computer 322. If the generated master cylinder pressure PM corresponds to the brake operating force F, it means that the first pressure control valve 262 is normally placed in the fully closed state. In this case, a negative decision (NO) is obtained in step S109. If the generated master cylinder pressure PM is higher than a level corresponding to the brake operating force F, it means that an assisting pressure is generated in the back-pressure chamber 208 due to the communication of the back-pressure chamber 208 with the first pressurizing chamber 206 through the first pressure control valve 262, which is abnormally placed in an open state. In this case, an affirmative decision (YES) is obtained in step S109, and the control flow goes to step S112 in which data indicative of the sticking of the first pressure control valve 262 in the open state are stored in a DIAGNOSTIC RESULT memory 386 provided in the RAM 328. Further, the alarm indicator 348 is activated to indicate this defect of the valve 262, and the DIAGNOSIS COMPLETION flag 368 is set to "1". Once the flag 368 has been set to "1" as a result of detection of the sticking defect of the first pressure control valve 262, the diagnostic routine is terminated without further diagnosing the first and second pressure control valves 262, 292 for other defects.

If the first pressure control valve 262 is normally placed in the closed state, a negative decision (NO) is obtained in step S109, and the control flow goes to step S110 to determine whether the brake operating force F is being reduced. Like the determination in step S11 which has been described, this determination is effected by comparing two values of the brake operating force F which are successively detected at a predetermined time interval longer than the cycle time of the present diagnostic routine. If the brake operating force F is not being reduced, a negative decision (NO) is obtained in step S110, and one cycle of execution of the diagnostic routine is terminated. When step S104 is implemented after the flag f2 was set to "1" in step S108, an affirmative decision (YES) is obtained in step S104, and the control flow goes to step S138 to determine whether a flag f4 is set at "1". When this flag f4 is set at "1", it indicates that the first and second pressure control valves 262, 292 have been commanded to be fully closed, for diagnosing the second pressure control valve 292 for sticking of its valve member 272 in the open state. If the flag f4 is not set at "1", a negative decision (NO) is obtained in step S138, and the control flow goes to step S139 to determine whether the flag f3 is set at "1". If the flag f3 is not set at "1", a negative decision (NO) is obtained in step S139, and the control flow goes to step S110.

When the brake operating force F begins to be reduced, an affirmative decision (YES) is obtained in step S110, and the control flow goes to step S111 in which the first pressure control valve 262 is commanded to be fully closed while the second pressure control valve 292 is commanded to be fully opened, and the flag f3 is set to "1". Further, the master cylinder pressure PM as represented by the output signal of the front master cylinder pressure sensor 336 is stored in a first MASTER CYLINDER PRESSURE memory 380. When step S139 is implemented after the flag f3 was set to "1" in step S111, an affirmative decision (YES) is obtained in step S139, and the control flow goes to step S106 to determine whether the master cylinder pressure PM is higher than the threshold PMA. As long as the master cylinder pressure PM is higher than the threshold PMA even after the brake operating force F has begun to be reduced, step S106 is followed by step S107. Since the flag f3 is set at "1", an affirmative decision (YES) is obtained in step S107, and the control flow goes to step S113 to determine whether a predetermined time has passed after the moment at which the brake operating force F begun to be reduced. When step S113 is implemented for the first time, a negative decision (NO) is obtained in step S113, and one cycle execution of the routine is terminated. The predetermined time used in step S113 is determined to be long enough to confirm that the brake operating force F is in the process of being reduced, but short enough to elapse before the master cylinder pressure PM is reduced to the threshold PMA.

When the predetermined time has passed after the brake operating force F begun to be reduced, an affirmative decision (YES) is obtained in step S113, and the control flow goes to step S114 to determine whether the master cylinder pressure PM has been reduced. This determination is effected to determine whether the second pressure control valve 292 is normally placed in the open state, or abnormally placed in the closed state due to sticking of the valve member 272. The determination is made on the basis of a difference between the master cylinder pressure PM currently detected by the front master cylinder pressure sensor 336 and the master cylinder pressure PM stored in the FIRST MASTER CYLINDER PRESSURE memory 380. Namely, the amount of reduction of the master cylinder pressure PM during the predetermined time after the brake operating force F begun to be reduced is compared with a predetermined threshold. If the amount of reduction is larger than the threshold, it means that the second pressure control valve 292 is normally placed in the fully open state. In this case, an affirmative decision (YES) is obtained in step S114, and one cycle of execution of the present routine is terminated. If the amount of reduction of the master cylinder pressure PM is smaller than the threshold, it means that the second pressure control valve 292 is abnormally closed, with its valve member 272 being stuck in its closed state. In this case, a negative decision (NO) is obtained in step S115 in which data indicative of the abnormal sticking of the valve member 272 of the valve 292 are stored in the DIAGNOSTIC RESULT memory 386, and the alarm indicator 348 is activated. Further, the DIAGNOSIS COMPLETION flag 368 is set to "1". At this time, the first pressure control valve 262 may be restored to its open state.

When the master cylinder pressure PM has been reduced to the threshold PMA as indicated in FIG. 16, a negative decision (NO) is obtained in step S106, and the control flow goes to step S116 to determine whether the flag f2 is set at "1". The master cylinder pressure PM is lower than the threshold PMA in an initial period of a depressing operation of the brake pedal 42 in which the master cylinder pressure PM is increased, and a relatively terminal period of a releasing operation of the brake pedal 42 in which the master cylinder pressure PM is reduced. If it is determined in step S116 that the flag f2 is set at "1", it means that the master cylinder pressure PM has been reduced from a level higher than the threshold PMA, to a level equal to or lower than the threshold PMA.

If an affirmative decision (YES) is obtained in step S116 with the flag f2 being set at "1", the control flow goes to step S117 to command the first and second pressure control valves 262, 292 to be fully closed, and set the flag f4 to "1". As a result, the master cylinder pressure PM is held at a level equal to or slightly lower than the threshold PMA, even if the brake pedal 42 is continuously released. Step S117 is followed by step S118 to determine whether the brake operating force F is equal to or smaller than a predetermined threshold FA. When step S118 is implemented for the first time, a negative decision (NO) is obtained in step S118, and one cycle of execution of the present diagnostic routine is terminated. Since the flag f4 is now set at "1", an affirmative decision (YES) is obtained in step S138, and the control flow goes to step S140 to determine whether a flag f5 is set at "1". When this flag f5 is set at "1", it means that it has been confirmed that the master cylinder pressure PM can maintained with the second pressure control valve 292 being normally placed in the closed state. When step S140 is implemented for the first time, a negative decision (NO) is obtained in step S140, and the control flow goes to step S118. When the brake operating force F has been reduced to or below the threshold FA as indicated in FIG. 16, an affirmative decision (NO) is obtained in step S118, and the control flow goes to S119 to determine whether the master cylinder pressure PM is held constant at a level substantially equal to the predetermined threshold PMA. If the master cylinder pressure PM is not held constant, a negative decision (NO) is obtained in step S119, and the control flow goes to step S121. Since the first pressure control valve 262 has been diagnosed in step S109 to be able to be normally closed without sticking of the valve member 272 in the open state, the negative decision in step S119 means that the second pressure control valve 292 is abnormally open with its valve member 272 being stuck in the open state. In step S121, data indicative of the sticking of the valve member 272 of the valve 292 are stored in the DIAGNOSTIC RESULT memory 386, and the alarm indicator 348 is activated to indicate this defect. Further, the DIAGNOSIS COMPLETION flag 368 is set to "1". At this time, the first pressure control valve may be restored to its open state.

If the master cylinder pressure PM is held constant, it means that the second pressure control valve 292 is normally placed in the closed state. In this case, an affirmative decision (YES) is obtained in step S119, and the control flow goes to step S120 to command the first pressure control valve 262 to be fully closed, and set the flag f5 to "1". Step S120 is followed by step S122 increase the amount of electric current to be applied to the solenoid coil 302 of the second pressure control valve 292, by a predetermined increment of $\Delta I$, and increment a CURRENT INCREASE counter C to count the number of implementations of step S122 to increment the amount of electric current to be applied to the valve 292.

Step S122 is followed by step S123 to determine whether a flag f6 is set at "1". When this flag f6 is set at "1", it indicates that the amount of electric current to be applied to the second pressure control valve 292 has been incremented a predetermined number of times C1. When step S123 is implemented for the first time, a negative decision (NO) is obtained in step S123, and the control flow goes to step S124 to determine whether the amount of electric current for the valve 292 has been incremented the predetermined number of time C1. This number of times C1 represents the amount of electric current currently applied to the second pressure control valve 292, which in turn represents the amount of opening of the valve 292 that determines the rate at which the master cylinder pressure PM is reduced. The number of times C1 is determined so that the master cylinder pressure PM is reduced at a predetermined rate when the amount of electric current has been incremented the predetermined number of times C1. When step S124 is implemented for the first time, a negative decision (NO) is obtained in step S124, and one cycle of execution of the routine is terminated. Since the flag f5 is now set at "1", an affirmative decision (YES) is obtained in step S140, and the control flow goes to step S141 to determine whether a flag f7 is set at "1". When this flag f7 is set at "1", it indicates that the pressure reducing characteristic of the second pressure control valve 292 has been diagnosed to be normal. When step S141 is implemented for the first time, the flag f7 is not set at "1", and a negative decision (NO) is obtained in step S141, so that the control flow goes to step S122.

When the amount of electric current to be applied to the second pressure control valve 292 has been incremented the predetermined number of times C1, an affirmative decision (YES) is obtained in step S124, and the control flow goes to step S125 to detect the master cylinder pressure PM, store the detected pressure PM in a second MASTER CYLINDER PRESSURE memory 382, and set the flag f6 to "1". Since the flag f6 is now set at "1", an affirmative decision (YES) is obtained in step S123, and the control flow goes to step S126 to determine whether the amount of electric current to be applied to the valve 292 has been incremented a predetermined number of times C2, which is larger than the number of times C1. The number of times C2 is large enough to permit the determination as to whether the pressure reducing characteristic of the valve 292 is normal. When step S126 is implemented for the first time, a negative decision (NO) is obtained in step S126, and one cycle of execution of the routine is terminated.

When the amount of electric current to be applied to the valve 292 has been incremented the predetermined number of times C2, an affirmative decision (YES) is obtained in step S126, and the control flow goes to step S127 to detect the master cylinder pressure PM and store the detected pressure PM in a third MASTER CYLINDER PRESSURE memory 384. Step S127 is followed by step S128 to determine whether the pressure reducing characteristic of the second pressure control valve 292 is normal. This determination is effected on the basis of the master cylinder pressure values PM stored in the second and third MASTER CYLINDER PRESSURE memories 382, 384, more precisely, on the basis of a difference of these two pressure values PM, which is obtained by subtracting the pressure value PM stored in the third memory 384 from the pressure value PM stored in the second memory 382. To effect the determination in step S128, the above-indicated difference of the master cylinder pressure values PM is divided by the amount of electric current applied to the valve 292 after the amount of electric current has been incremented the predetermined number of times C1. The determination in step S128 is effected by determining whether a quotient obtained by dividing the pressure difference by the amount of electric current is held within a predetermined permissible range. The amount of electric current applied after the number of times C1 has been reached can be obtained by multiplying the increment ΔI by a difference between the numbers C2 and C1, which difference represents the number of times by which the amount of electric current has been incremented after the number C1 has been reached. The predetermined times C1 and C2 are determined to permit the determination in step S128 to be effected while the master cylinder pressure PM is reduced at the predetermined constant rate as indicated in FIG. 16 if the second pressure control valve 292 has the normal pressure reducing characteristic. If the above-indicated quotient which represents the actual rate of reduction of the master cylinder pressure is held within the predetermined permissible range, it means that the second pressure control valve 292 is capable of reducing the master cylinder pressure PM at the predetermined rate according to the amount of electric current applied thereto, that is, the valve 292 has the normal pressure reducing characteristic. In this case, an affirmative decision (YES) is obtained in step S128, and the control flow goes to step S130 to set the flag f7 to "1". If the rate of reduction of the master cylinder pressure PM is not within the predetermined permissible range, it means that the pressure reducing characteristic of the valve 292 is not normal. In this case, a negative decision (NO) is obtained in step S128, and the control flow goes to step S129 in which data indicative of this defect of the valve 292 are stored in the DIAGNOSTIC RESULT memory 386, and the alarm indicator 348 is activated to indicate this defect. Further, the DIAGNOSIS COMPLETION flag 368 is set to "1". At this time, the first pressure control valve 262 may be restored to the open state.

After the flag f7 has been set to "1" as a result of the determination that the pressure reducing characteristic of the second pressure control valve 292 is normal, the control flow goes to step S131 to command the second pressure control valve 292 to be fully opened. Step S131 is followed by step S132 to determine whether the master cylinder pressure PM has been reduced to or below the predetermined threshold PMB. When step S132 is implemented for the first time, a negative decision (NO) is obtained in step S132, and one cycle of execution of the routine is terminated. Since the flag f7 is now set at "1", an affirmative decision (YES) is obtained in step S141, and the control flow goes to step S142 to determine whether a flag f8 is set at "1". When this flag f8 is set at "1", it indicates that the master cylinder pressure PM has been reduced to or below the threshold PMB, and that the diagnosis of the first pressure control valve 262 for sticking of the valve 272 in the closed state is ready. When step S142 is implemented for the first time, the flag f8 is not set at "1", and a negative decision (NO) is obtained in step S142, so that the control flow goes to step S132.

When the master cylinder pressure PM has been reduced to or below the threshold PMB as indicated in FIG. 16, an affirmative decision (YES) is obtained in step S132, and the control flow goes to step S133 to command the first pressure control valve 262 to be fully opened, command the second pressure control valve 292 to be fully closed, and set the flag f8 to "1". Step S133 is followed by step S134 to determine whether a predetermined time has passed after the first pressure control valve 262 is commanded to be fully opened. When step S134 is implemented for the first time, a negative decision (NO) is obtained in step S134, and one cycle of execution of the routine is terminated. Since the flag f8 is now set at "1", an affirmative decision (YES) is obtained in step S142, and the control flow goes to step S134. When the predetermined time has passed after the valve 262 is commanded to be fully opened, an affirmative decision (YES) is obtained in step S134, and the control flow goes to step S135 to determine whether the master cylinder pressure PM is lower than the threshold PMB.

When the brake pedal 42 is released while the first pressure control valve 262 is fully open and the second pressure control valve 292 is fully closed, the first pressurizing piston 202 is retracted under the biasing action of the return spring 212 while there is maintained an equilibrium of forces based on the pressures in the first pressurizing chamber 206 and the back-up chamber 208. When the second pressure control valve 292 was diagnosed in step S119, for sticking of the valve member 272 in the open state, the first and second valves 262, 292 were fully closed in step S117, to maintain the master cylinder pressure PM irrespective of a decrease of the brake operating force F, so that the first pressurizing piston 202 was not retracted even with a releasing action of the brake pedal 42, causing an increase in the back pressure in the back-pressure chamber 208. Accordingly, when step S135 is implemented to diagnose the first pressure control valve 262 for sticking of the valve member 272 in the closed state, the back pressure in the back-pressure chamber 208 is higher than the master cylinder pressure PM. The back pressure acts on the valve member 272 of the valve 262 in a direction that causes the valve member 272 to be seated on the valve seat 270. However, the set load of the spring 276 is determined so that the valve member 272 is held apart from the valve seat 270 even with the back pressure PS being higher than the master cylinder pressure PM, when the amount of electric current applied to the coil 284 is zero. Therefore, if the first pressure control valve 262 can be normally opened, the pressurizing fluid is fed from the back-pressure chamber 208 into the first pressurizing chamber 206 through the open valve 262.

The first and second pressurizing pistons 202, 204 is retracted as the pressurizing fluid is fed from the back-pressure chamber 208 into the first pressurizing chamber 206, so that the master cylinder pressure PM is reduced. The determination in step S135 is effected by determining whether the amount of reduction of the master cylinder pressure PM from the threshold PMB is larger than a predetermined value. If an affirmative decision (YES) is obtained in step S135, it means that the first pressure control valve 262 does not suffer from sticking of its valve member 272 in its closed state. In this case, the control flow goes to step S136 to set the DIAGNOSIS COMPLETION flag 368 to "1". If the master cylinder pressure PM has not been reduced by more than the predetermined amount from the threshold PMB, a negative decision (NO) is obtained in step S135, and the control flow goes to step S137 in which data indicative of the sticking of the valve member 272 of the valve 262 are stored in the DIAGNOSTIC RESULT memory 386, and the alarm indicator 348 is activated to indicate this defect. Further, the DIAGNOSIS COMPLETION flag 368 is set to "1". Step S137 may be modified to restore the first pressure control valve 262 to the open state and the second pressure control valve 292 to the closed state when the detected master cylinder pressure PM is zero, and then set the flag 368 to "1".

The first pressure control valve 262 may be opened a predetermined time after the brake pedal 42 has been returned to the non-operated position or after the brake operating force F has been reduced below a predetermined value. In this case, the first pressure control valve 262 may or may not be diagnosed for sticking of its valve member 272 in its closed state.

It is noted that if the diagnostic routine of FIGS. 7–9 is executed in the presence of at least one of the defects of the rear braking sub-system and the booster 150, any one of the above-indicated defects of the pressure control valves 262, 292 may be erroneously found in the diagnostic routine. In this sense, the determination in the diagnostic routine that the valve 262 and/or the valve 292 is/are defective indicates that there is a possibility that the valve 262 and/or the valve 292 is/are in fact defective.

The inhibit items checking routine illustrated in the flow chart of FIG. 10 is executed according to the diagnostic results stored in the DIAGNOSTIC RESULT memory 386. The inhibit items checking routine is initiated with step S151 to determine whether there are any items of control that should be inhibited. As described above, the defects of the first and second pressure control valves 262, 292 are: sticking of the valve member 272 of the valve 262 in the open state; sticking of the valve member 272 of the valve 262 in the closed state; sticking of the valve member 272 of the valve 292 in the open state; sticking of the valve member 272 of the valve 292 in the closed state; and abnormal pressure reducing characteristic of the valve 292. Tables of FIGS. 18A–18C show whether the master cylinder pressure PM can be increased or reduced, for each of various combinations of the different defects of the valves 262, 292 in relation to the braking operation in the normal braking mode (in the absence of the defects of the booster 150 and the front braking sub-system), the braking operation in the presence of the defect of the booster 150 and the braking operation in the presence of the defect of the front braking sub-system. In FIGS. 17A–17D, "Δ" indicates that the master cylinder pressure PM can be increased and reduced, but cannot be controlled in the intended manner. Where the master cylinder pressure is increased in the normal braking mode, for instance, the master cylinder pressure is excessively increased due to reduction of the effective diameters of the first and second pressurizing pistons 202, 204. Where the master cylinder is increased when the booster 150 is defective, the master cylinder pressure cannot be sufficiently increased due to insufficient communication between the first pressurizing chamber 206 and the back-pressure chamber 208. Where the master cylinder pressure is increased when the front braking sub-system is defective, the master cylinder pressure cannot be sufficiently increased or is excessively increased, and cannot be controlled in response to a change of the brake operating force F. Where the master cylinder pressure is reduced when the front braking sub-system is defective, the master cylinder pressure can be reduced by fully opening the second pressure control valve 292, but the reduction cannot be controlled.

In the tables of FIGS. 17A–17D, "\*" indicates that even when the valve member 272 of the second pressure control valve 262 is stuck in the closed state, the master cylinder pressure can be reduced by zeroing the amount of electric current to be applied to the solenoid coil 284 to thereby fully open the valve 262, for returning the pressurized fluid from the back-pressure chamber 208 to the first pressurizing chamber 206. This reduction of the master cylinder is possible since the set load of the spring 276 of the valve 262 is determined to be large enough to overcome the expected maximum difference between the master cylinder pressure Pm and the back pressure PS, so as to prevent the valve member 272 from being seated on the valve seat 270, namely, to hold the valve 262 in the open state, even when the back pressure higher than the master cylinder pressure acts on the valve member 272. The master cylinder can be reduced by controlling the back pressure by controlling the valve 262. The master cylinder pressure can be increased in the normal braking mode even when the valve member 272 of the valve 292 is stuck in the closed state, by determining the set load of the spring 276 to be sufficiently large as described above, since the back pressure can be made higher than the master cylinder pressure when the brake pedal 42 is released while the fluid in the first pressurizing chamber 202 is pressurized. Where the booster 150 is defective, the first pressure control valve 262 is fully opened for changing the effective diameters of the first and second pressurizing pistons 202, 204 to the diameter of the piston rod 220. Therefore, for reducing the master cylinder pressure PM when the valve member 272 of the second pressure control valve 292 is stuck in the closed sate, it is not essential to determine the set load of the spring 294 to be large enough to overcome the expected maximum difference between the master cylinder pressure Pm and the back pressure PS, as described above. Namely, the master cylinder pressure PM when the valve member 272 of the valve 292 is stuck in the closed state can be normally reduced by determining the set load of the spring 276 such that the valve member 272 is held apart from the valve seat 270 while the valve member 272 does not receive any electromagnetic force or a force based on the pressure difference across the valve 292. However, the determination of the set load of the spring 276 to be large enough to overcome the maximum pressure difference makes it possible to reduce the master cylinder pressure even when the first pressure control valve 262 is closed for any reason while the fluid in the first pressurizing chamber 206 is pressurized, because the back pressure in the back-pressure chamber 208 can be reduced by opening the closed first pressure control valve 262.

"X" in the tables of FIGS. 17A–17D indicates items of control which should be inhibited. These items of control are: controls to increase the master cylinder pressure where both of the first and second pressure control valves 262, 292 suffer from the sticking of the valve 272 in the open state; and controls to reduce the master cylinder pressure where both of the valves 262, 292 suffer from the sticking of the valve 272 in the closed state. Further, a special control (in steps S3–S10) to increase the master cylinder pressure while the booster 150 or front braking sub-system is inhibited where the second pressure control valve 292 suffers from sticking of the valve 272 in the open state while the first pressure control valve 262 is normal. Where the two valves 262, 292 suffer from the sticking of the valve 272 in the open or closed state, the running of the vehicle is inhibited since the master cylinder pressure cannot be increased or reduced. In these cases, the VEHICLE RUNNING INHIBIT flag 366 in the RAM 328 is set to "1" to inhibit the running of the vehicle, and the alarm indicator 348 is activated. Where the second pressure control valve 292 suffers from the sticking of the valve member 272 in the open state while the first pressure control valve 262 is normal, the braking pressure source device can be operated in the normal braking mode in steps S11–S13 of the braking control routine of FIG. 5, so that the vehicle running is not inhibited. In this case, however, the special control in steps S3–S10 of the braking control routine to increase the master cylinder pressure by utilizing the back pressure in the back-pressure chamber 208 is not implemented, even where the booster 150 or the front braking sub-system is defective. If the first pressure control valve 262 were opened in step S5 or S9 while the second pressure control valve 292 is stuck in the open state, the pressurized fluid would be discharged from the first pressurizing chamber 206 to the reservoir 230 through the open second pressure control valve 292, causing the master cylinder pressure to be lowered to the atmospheric pressure, and resulting in a failure of the braking system to brake the vehicle. To prevent this failure, the SPECIAL CONTROL INHIBIT flag 370 in the RAM 328 is set to "1".

Where the electric power source of the braking system is defective, the first pressure control valve 262 is placed in the open state, while the second pressure control valve 292 is placed in the closed state. However, the master cylinder pressure can be increased and reduced, and the vehicle can be braked, in the normal braking mode or in the presence of the defect of the booster 150 or front braking sub-system, as indicated in FIG. 17C.

Referring back to the flow chart of FIG. 10, step S151 is provided to check the contents of the DIAGNOSTIC RESULT memory 386, that is, the results of the diagnostic routine of FIGS. 7–9 executed for diagnosing the first and second pressure control valves 262, 292. Step S151 is followed by step S152 to determine whether there are any items of control that should be inhibited while the booster 150 or the front braking sub-system is defective, for instance. The items of control that should be inhibited include inhibition of the vehicle running. If the vehicle running should be inhibited, or if the special control in steps S3–S10 where the booster 150 or front braking sub-system is defective should be inhibited, an affirmative decision (YES) is obtained in step S152, and the control flow goes to step S153 to set the VEHICLE RUNNING INHIBIT flag 366 and/or the SPECIAL CONTROL INHIBIT flag 370. If the vehicle running should be inhibited, the flag 366 is set. If the special control should be inhibited, the flag 370 is set. If the SPECIAL CONTROL flag 370 is set at "1", the affirmative decision (YES) is obtained in step S2, and steps S3–S10 (to effect the special control for increasing the master cylinder pressure using the back-pressure in the back-pressure chamber 208) are not implemented even where the booster 150 or the front braking sub-system is defective. Where the VEHICLE RUNNING INHIBIT flag 366 is set at "1", the vehicle drive device is not operated, to inhibit the running of the vehicle. In this case, therefore, the braking system need not be controlled. Accordingly, only the SPECIAL CONTROL INHIBIT flag 370 is checked in step S2. However, step S2 may be formulated to determine whether at least one of the flags 366, 370 is set at "1". As indicated in FIG. 17A, only the two items of control are inhibited, although there are many cases in which at least one of the first and second pressure control valves 262, 292 is defective. In the other cases, the master cylinder pressure can be increased and reduced, although the valves 262, 292 cannot be controlled as commanded to perform their intended functions. However, the special control to effect fluid communication between the first pressurizing chamber 206 and the back-pressure chamber 208 may be inhibited when at least one of the first and second pressure control valves 262, 292 is defective, irrespective of the specific defect.

It will be understood from the foregoing description of the present embodiment that a portion of the computer 322 of the ECU 320 assigned to implement steps S5, S9, S10, S12 and S13 constitutes a current control portion operable to control the amount of electric current to be applied to the first solenoid-operated pressure control valve 262, and a portion of the computer 322 assigned to implement steps S51–S54, S57 and S59–S64 constitutes a booster defect detecting portion operable to detect a defect of the booster 150, while a portion of the computer 322 assigned to implement step S5 constitutes a first communication control portion operable upon detection of the defect of the booster 150, to control fluid communication between the first pressurizing chamber 206 and the back-pressure chamber 208. It will also be understood that a portion of the computer 322 assigned to implement steps S51–S54, S57 and S58 constitutes a front braking sub-system defect detecting portion operable to detect a defect of the front braking sub-system, and a portion of the computer 322 assigned to implement step S9 constitutes a second communication control portion operable upon detection of the defect of the front braking sub-system, to control fluid communication between the first pressurizing chamber 206 and the back-pressure chamber 208. It will further be understood that a portion of the computer 322 assigned to implement steps S5, S9–S13, S51–S54 and S57–S64 constitutes a control valve control device operable to control the first and second pressure control valves 262, 292, a first control valve control device operable to control the first pressure control valve 262, and a second control valve control device operable to control the second pressure control valve 292. It will also be understood that a portion of the computer 322 assigned to implement steps S102–S142 constitutes a first diagnostic portion operable to diagnose the first and second pressure control valves 262, 292 for any defect thereof, and a portion of the computer 322 assigned to implement step S153 constitutes a defect treating portion operable to effect an operation to treat the detected defect of the braking system, and a control inhibiting portion operable to inhibit the special control in steps S3–S10 when the booster 150 or front braking sub-system is defective. It will further be understood that the operating rod 44 and the booster 150 constitute a brake operating force transmitting device operable to transmit the brake operating force F of the brake pedal 42 to the master cylinder 152.

Referring next to FIGS. 18–21, there will be described a hydraulically operated braking system including a braking pressure source device constructed according to a second embodiment of this invention. The present braking system is arranged to detect an abrupt brake application to the vehicle, and generate an assisting pressure in the back-pressure chamber 208 upon detection of the abrupt brake application, so that the master cylinder pressure is made higher in the abrupt brake application than in a normal brake application. The hydraulic arrangement in the present braking system is identical with that in the braking system shown in FIG. 1. The same reference signs as used in the first embodiment will be used in the present second embodiment, to identify the same elements.

Figure 18:
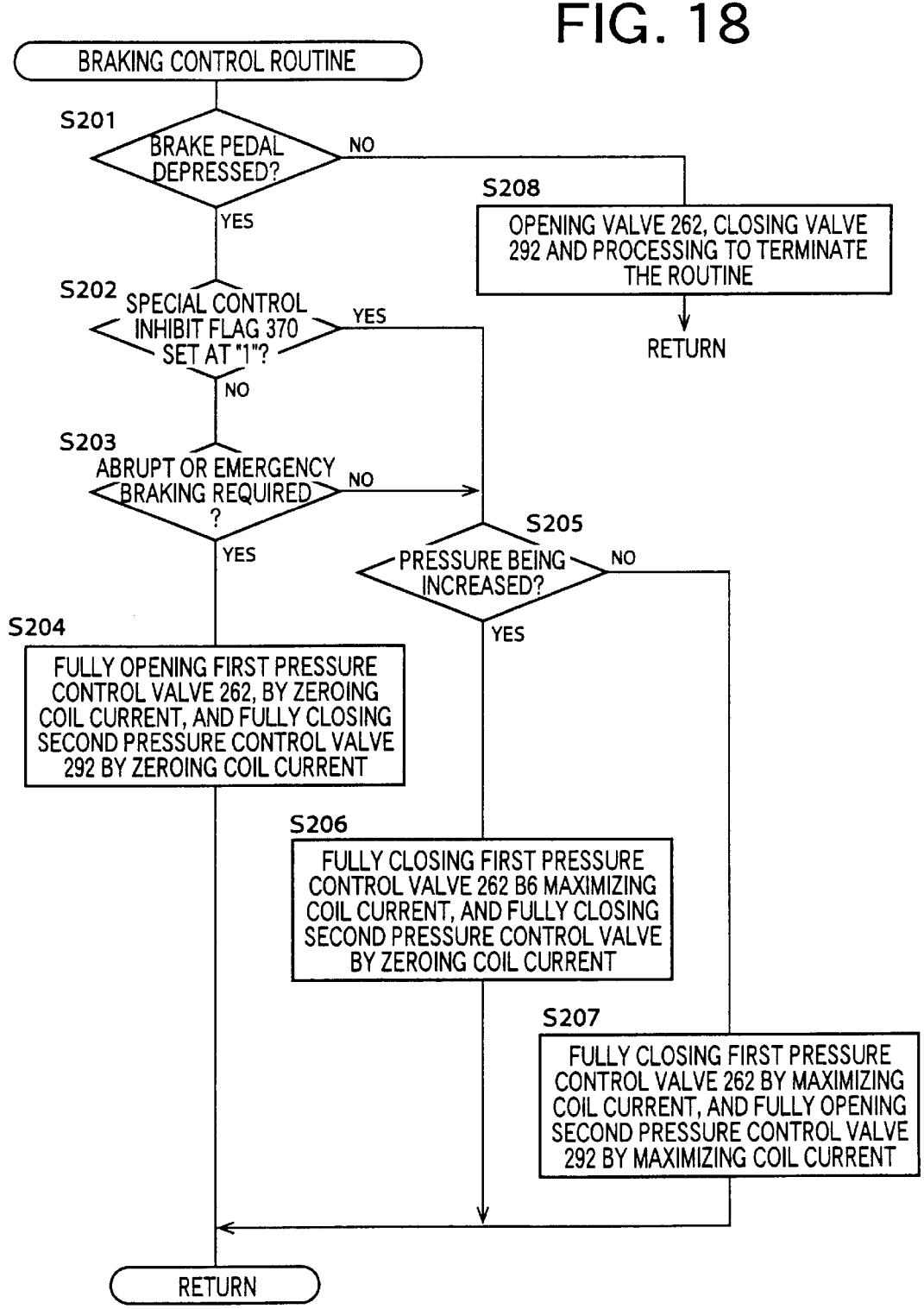
FIG. 18 is a flow chart illustrating a braking control routine executed according to a control program stored in a ROM of a computer of an electronic control unit provided in a braking pressure source device according to another embodiment of the invention.
Figure 19:
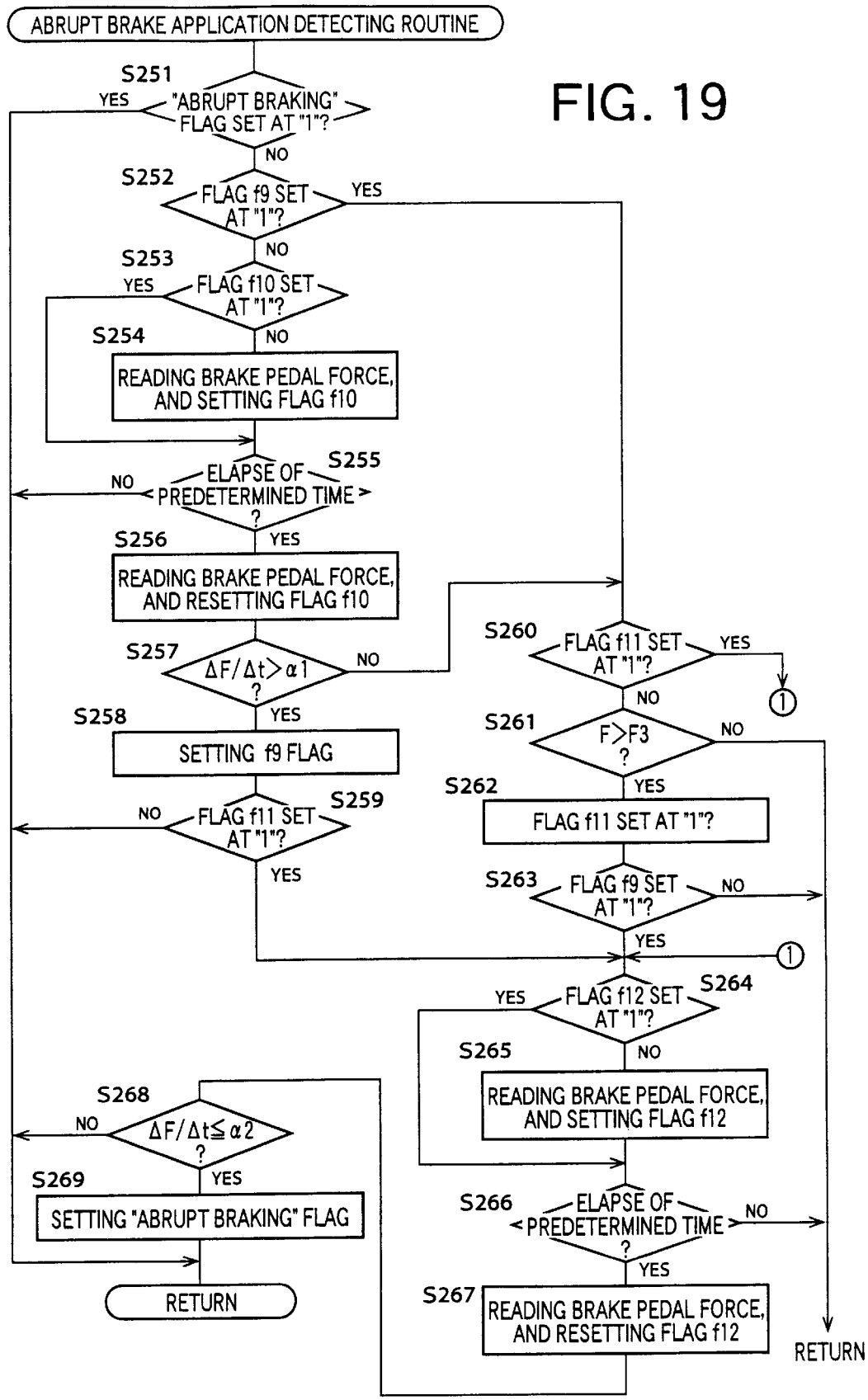
FIG. 19 is a flow chart illustrating an abrupt brake application detecting routine executed in step S204 of the braking control routine of FIG. 18, according to a control program stored in the ROM of the computer.

The ROM 326 of the ECU 220 provided in the present braking system stores control programs for executing a braking control routine illustrated in the flow chart of FIG. 18 and an abrupt brake application detecting routine illustrated in the flow chart of FIG. 19. Referring to these figures, there will be described the manner of detecting the abrupt brake application to the vehicle, and the manner of controlling the braking system for abrupt brake application to the vehicle. The braking control routine of FIG. 18 is initiated when the electric system of the vehicle is turned on. The routine is initiated with step S201 to determine whether the brake pedal 42 is in operation. If the brake pedal 42 is not in operation, a negative decision (NO) is obtained in step S201, and the control flow goes to step S208 to open the first pressure control valve 262, close the second pressure control valve and effect processing to terminate the routine.

Figure 20:
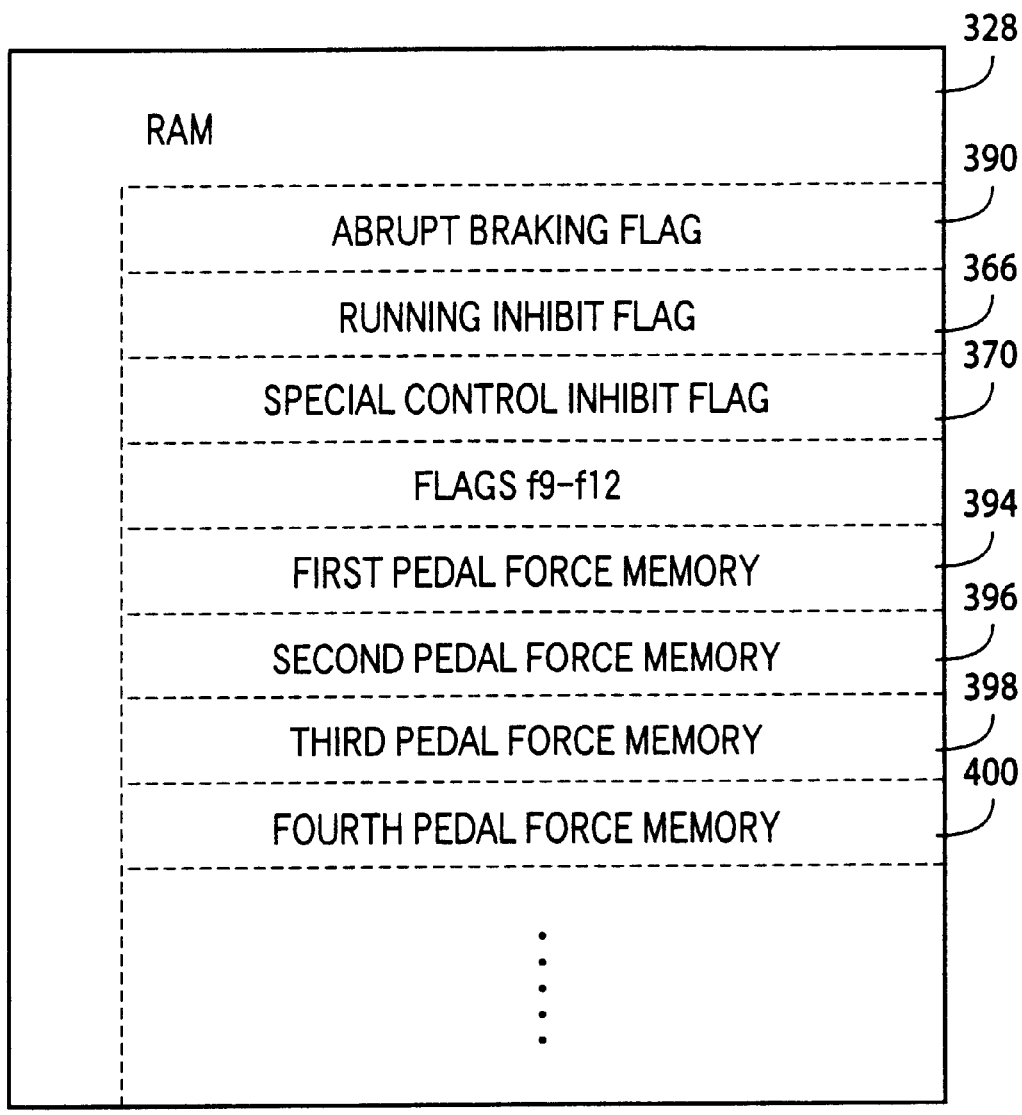
FIG. 20 is a block diagram indicating an arrangement of a portion of a RAM of the computer which is used for executing the routines of FIGS. 18 and 19.
Figure 21:
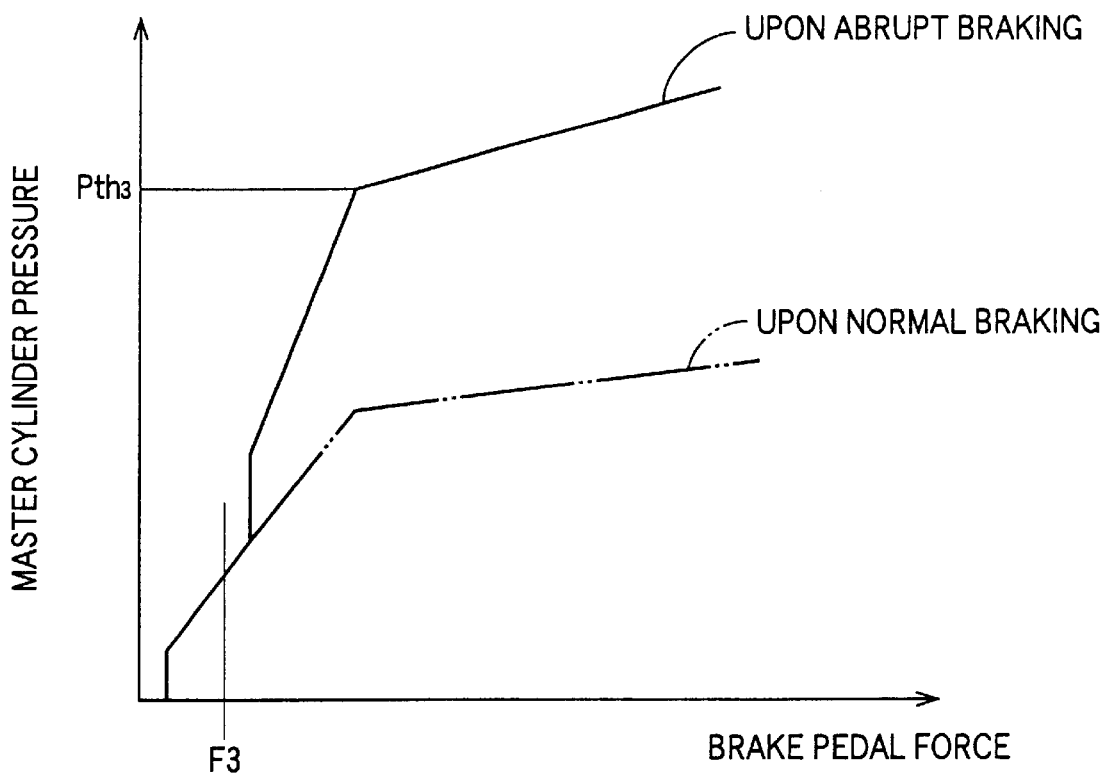
FIG. 21 is a graph showing master cylinder pressure when the first pressure control valve is controlled upon abrupt brake application.

When the brake pedal 42 is in operation, an affirmative decision (YES) is obtained in step S201, and the control flow goes to step S202 to determine whether the SPECIAL CONTROL INHIBIT flag 370 is set at "1". In this second embodiment, a special control in step S204 (which will be described) is inhibited even where an abrupt brake application is detected, if the SPECIAL CONTROL INHIBIT flag 370 is set at "1". As in the first embodiment, the flag 370 is set to "1" when the valve member 272 of the second pressure control valve 292 is stuck in the open state while the first pressure control valve 262 is normal. If the flag 370 is not set at "1", that is, if the special control in step S204 is not inhibited, a negative decision (NO) is obtained in step S202, and the control flow goes to step S203 to determine whether an abrupt brake application is being effected. This determination is effected by determining whether an ABRUPT BRAKING flag 390 provided in the RAM 328 as shown in FIG. 20 is set at "1". The ABRUPT BRAKING flag 390 is set to "1" when an abrupt brake application is detected in the abrupt brake application detecting routine.

The abrupt brake application detecting routine will be described by reference to the flow chart of FIG. 19. The present second embodiment is arranged to determine that an abrupt brake is being applied, when the rate of increase of the brake operating force F acting on the brake pedal 42 is higher than a predetermined threshold $\alpha 1$, and when the brake operating force F is larger than a predetermined threshold F3. If the rate of increase of the brake operating force F exceeds the threshold before the brake operating force F exceeds the threshold F3, then a determination is made as to whether the brake operating force F becomes larger than the threshold F3. If the brake operating force F exceeds the threshold F3 before the rate of increase of the brake operating force F exceeds the threshold $\alpha 1$, then a determination as to whether the rate of increase becomes higher than the threshold $\alpha 1$. Even if the above-indicated condition is satisfied, the ABRUPT BRAKING flag 390 will not be set to "1" immediately after the condition has been satisfied. Namely, the flag 390 is set to "1" only after the rate of increase of the brake operating force F is subsequently reduced below a predetermined second threshold $\alpha 2$.

The abrupt brake application detecting routine of FIG. 19 is initiated with step S251 to determine whether the ABRUPT BRAKING flag 390 is set at "1". As indicated above, this flag 390 is set to "1" when the rate of increase of the brake operating force F is reduced below the predetermined second threshold $\alpha 2$ after the rate of increase has once exceeded the predetermined first threshold a1 and after the brake operating force F has exceeded the threshold F3. When the flag 390 is set at "1", it indicates that the special control in step S204 in the braking control routine of FIG. 18 is permitted and is to be effected. If the flag 390 is not set at "0", a negative decision (NO) is obtained in step S251, and the control flow goes to step S252 to determine whether a flag f9 is set at "1". When this flag f9 is set at "1", it indicates that the rate of increase of the brake operating force F has exceeded the first threshold $\alpha 1$. If the flag f9 is not set at "1", a negative decision (NO) is obtained in step S22, and the control flow goes to step S253 to determine whether a flag f10 is set at "1". When this flag f10 is set at "1", it indicates that the brake operating force F has been detected.

If the flag f10 is not set at "1", a negative decision (NO) is obtained in step S253 and the control flow goes to step S254 to detect the brake operating force F and store the detected force F in a FIRST PEDAL FORCE memory 394 provided in the RAM 328, and then set the flag f10 to "1".

Step S254 is followed by step S255 to determine whether a predetermined time has passed after the brake operating force F has been stored in the memory 394. When step S255 is implemented for the first time, a negative decision (NO) is obtained in step S255, and one cycle of execution of the routine of FIG. 19 is terminated. Since the flag f10 is now set at "1", an affirmative decision (YES) is obtained in step S253 when this step S253 is implemented in the next cycle, and the control flow goes to step S256, while skipping sep S254. When the predetermined time has passed after the brake operating force F has been stored in the memory 394, an affirmative decision (YES) is obtained in step S255, and the control flow goes to step S256 to detect the brake operating force F and store the detected force F in a SECOND PEDAL FORCE memory 396, and reset the flag f10 to "0". Step S256 is followed by step S257 to determine whether the rate of increase ($\Delta F/\Delta t$) of the brake operating force F is higher than the predetermined first threshold $\alpha 1$. The rate of increase ($\Delta F/\Delta t$) can be calculated by dividing a difference between the brake operating force values F stored in the two PEDAL FORCE memories 394, 396, by the predetermined time used in step S255. The difference indicated above is obtained by subtracting the force value F stored in the FIRST PEDAL FORCE memory 394, from the force value F stored in the SECOND PEDAL FORCE memory 396.

When the brake pedal 42 is abruptly or rapidly operated to apply an abrupt brake to the vehicle, the rate of increase ($\Delta F/\Delta t$) of the brake operating force F is relatively large. The first threshold $\alpha 1$ of the rate of increase ($\Delta F/\Delta t$) is determined to be higher than that in a normal brake application, such that the rate of increase exceeds the first threshold when the brake pedal 42 is operated to apply an abrupt brake application. In other words, when the rate of increase ($\Delta F/\Delta t$) is not higher than the first threshold $\alpha 1$, the vehicle is not braked abruptly. In this case, a negative decision (NO) is obtained in step S257, and the control flow goes to step S260 to determine whether a flag f11 is set at "1". When this flag f11 is set at "1", it indicates that the brake operating force F has exceeded the predetermined threshold F3. If the brake operating force F has not exceeded the threshold F3, that is, if the flag f11 is not set at "1", a negative decision (NO) is obtained in step S260, and the control flow goes to step S262 to determine whether the brake operating force F is larger than the threshold F3. If the force F is not larger than the threshold F3, a negative decision (NO) is obtained in step S261, and one cycle of execution of the routine is terminated.

If the rate of increase ($\Delta F/\Delta t$) of the brake operating force F has exceeded the first threshold $\alpha 1$ before the force F has exceeded the threshold F3, an affirmative decision (YES) is obtained in step S257, and the control flow goes to step S258 to set the flag f9 to "1", and then to step S259 to determine whether the flag f11 is set at "1". At this point of time, the flag f11 is set at "0", and a negative decision (NO) is obtained in step S259, and one cycle of execution of the routine is terminated.

Since flag f9 is now set at "1", an affirmative decision (YES) is obtained in step S252 when this step S252 is implemented in the next cycle. In this case, the control flow goes to step S260. Since the flag f11 is not set at "1", the negative decision (NO) is obtained in step S260, and the control flow goes to step S261. When the brake operating force F has exceeded the threshold F3, an affirmative decision (YES) is obtained in step S261, and the control flow goes to step S262 to set the flag f11 to "1". Step S262 is followed by step S263 to determine whether the flag f9 is set at "1". Since the rate of increase ($\Delta F/\Delta t$) of the force F has already exceeded the threshold $\alpha 1$, and the flag f9 is set at "1", an affirmative decision (YES) is obtained in step S263, and the control flow goes to step S264 to determine whether a flag f12 is set at "1". When this flag f11 is set at "1", it indicates that the brake operating force F has been detected after the force F exceeded the threshold F3. If a negative decision (NO) is obtained in step S264, the control flow goes to step S65 to detect the brake operating force F and store the detected force F in a THIRD PEDAL FORCE memory 398, and set the flag f12 to "1". Step S265 is followed by step S266 to determine whether a predetermined time has passed. When step S266 is implemented for the first time, a negative decision (NO) is obtained in step S266, and one cycle of execution of the routine is terminated.

Since the flags f9 and f11 are now set at "1", an affirmative decision (YES) is obtained in steps S252 and S260 when these steps are implemented in the next cycle, and the control flow goes to step S264. Since the flag f12 is also set at "1", an affirmative decision (YES) is obtained in step S264, and the control flow goes to step S266. When the predetermined time has passed after the force F was stored in the memory 398, an affirmative decision (YES) is obtained in step S266, and the control flow goes to step S267 to store the detected force F in a FOURTH PEDAL FORCE memory 400, and reset the flag f12 to "0". Step S267 is followed by step S268 to determine whether the rate of increase ($\Delta F/\Delta t$) of the force F is equal to or lower than the predetermined second threshold $\alpha 1$. The rate of increase ($\Delta F/\Delta t$) can be calculated by dividing a difference between the brake operating force values F stored in the two PEDAL FORCE memories 398, 400, by the predetermined time used in step S266. The difference indicated above is obtained by subtracting the force value F stored in the THIRD PEDAL FORCE memory 398, from the force value F stored in the FOURTH PEDAL FORCE memory 400. The determination in step S267 is effected to determine whether the vehicle operator has depressed the brake pedal 42 to a position close to the fully operated position. The second threshold $\alpha 1$ is lower than the first threshold $\alpha 2$. If the rate of increase ($\Delta F/\Delta t$) is higher than the threshold $\alpha 2$, a negative decision (NO) is obtained in step S268, and one cycle of execution of the routine is terminated.

Steps S251, S252, S260 and S264–S268 are repeatedly implemented until the rate of increase ($\Delta F/\Delta t$) has been reduced to or below the second threshold $\alpha 2$. If the rate of increase ($\Delta F/\Delta t$) has been reduced to or below the second threshold $\alpha 2$, an affirmative decision (YES) is obtained in step S268, and the control flow goes to step S269 to set the ABRUPT BRAKING flag 390 to "1". Since the flag 390 is now set at "1", an affirmative decision (YES) is obtained in step S251 when step S251 is implemented in the next cycle, and the detection of the abrupt brake application is no more effected.

In the specific example described above, the rate of increase ($\Delta F/\Delta t$) of the brake operating force F has exceeded the first threshold value $\alpha 1$ before the force F has exceeded the threshold F3, the force F may exceed the threshold F3 before the rate of increase ($\Delta F/\Delta t$) has exceeded the threshold $\alpha 1$. In this case, the flag f11 is set to "1" when the force F has exceeded the threshold F3, so that the affirmative decision (YES) is obtained in step S259 when the rate of increase ($\Delta F/\Delta t$) has exceeded the threshold $\alpha 1$, and steps S264–S268 are implemented. Then, steps S251, S252, S260 and S264–S268 are repeatedly implemented until the rate of increase ($\Delta F/\Delta t$) has been reduced to or below the second threshold $\alpha 2$.

With the ABRUPT BRAKING flag 390 set at "1", an affirmative decision (YES) is obtained in step S203 of the braking control routine of FIG. 18, and the control flow goes to step S204 in which the first pressure control valve 262 is fully opened by zeroing the amount of electric current to be applied to its solenoid coil 284, and the second pressure control valve 292 is fully closed by zeroing the amount of electric current to be applied to its solenoid coil 302. As a result, the first pressurizing chamber 206 and the back-pressure chamber 208 are communicated with each other, so that the effective diameters of the first and second pressurizing pistons 202, 204 are reduced to the diameter of the piston rod 22. Consequently, the pressurized fluid generated in the first pressurizing chamber 206 during an increase of the master cylinder pressure PM is delivered into the back-pressure chamber 208, so as to generate an assisting pressure in the back-pressure chamber 208. As a result, the master cylinder pressure is made higher during the abrupt brake application than during a normal braking application, as indicated by solid line in the graph of FIG. 21. Thus, the master cylinder pressure is controlled to provide a relatively large braking force suitable for applying the abrupt brake to the vehicle.

When the brake operating force F has reached the boosting limit of the booster 140, the master cylinder pressure is increased at a rate determined by the reduction of the effective diameters of the first and second pressurizing pistons 202, 204, that is, at a rate at which the fluid pressure in the pressurizing chamber 206 is increased by an advancing movement of a pressurizing piston which has the pressure-receiving surface area equal to the transverse cross sectional area of the piston rod 220 which has a smaller diameter than that of the first pressurizing piston 202. Since the first pressure control valve 262 is fully open while the second pressure control valve 292 is fully closed, a releasing action of the brake pedal 42 causes the pressurizing fluid to be returned to the first pressurizing chamber 206, permitting the first and second pressurizing pistons 202, 204, so that the master cylinder pressure is reduced with a decrease in the brake operating force F.

When the ABRUPT BRAKING flag 390 is set at "0", that is, when an abrupt brake application is not detected, a negative decision (NO) is obtained in step S203, and the control flow goes to step S205–S207 in which the first and second pressure control valves 262, 292 are controlled in the normal mode as in steps S11–S14 of the braking control routine of FIG. 5 in the first embodiment. The ABRUPT BRAKING flag 390 and the PEDAL FORCE memories 394, 396, 398, 400 are reset in step S208.

If the SPECIAL CONTROL INHIBIT flag 370 is set at "1", an affirmative decision (NO) is obtained in step S202, the control flow goes to steps S205–S207. Thus, the special control in step S204 is inhibited even when an abrupt brake application is detected, if the SPECIAL CONTROL INHIBIT flag 370 is set at "1", that is, if the valve member 272 of the second pressure control valve 292 is stuck in the open state while the first pressure control valve 262 is normal.

It will be understood from the above description of the second embodiment that a portion of the computer 322 of the ECU 320 assigned to implement steps S252–S258 and S260–S262 constitutes an abrupt brake application detecting portion operable to detect that the brake pedal 42 is operated to apply an abrupt brake to the vehicle, and a portion of the computer 322 assigned to implement steps S259, S263–S268 and S204 constitutes a third communication control portion operable upon detection of an abrupt brake application to the vehicle.

In the abrupt brake application detecting routine of FIG. 19, the rate of increase of the brake operating force F may be replaced by a rate of increase of the operating stroke of the brake pedal 42.

A third embodiment of this invention will be described by reference to FIGS. 22 and 23. The braking system including a braking pressure source device according to this embodiment is adapted to fully open the first pressure control valve 262 when the coefficient of friction of the road surface on which the vehicle is running is lower than a predetermined threshold. With the valve 262 placed in the fully open state, an assisting pressure is generated in the back-pressure chamber 208, so that the rate of increase of the master cylinder pressure with an increase in the operating stroke of the brake pedal 42 is made lower than in the normal braking operation, permitting an intricate control of the brake operating force F. The hydraulic arrangement of the present braking system is identical with that of the preceding embodiments. The same reference signs as used in the first embodiment will be used in the third embodiment, to identify the same elements.

Figure 22:
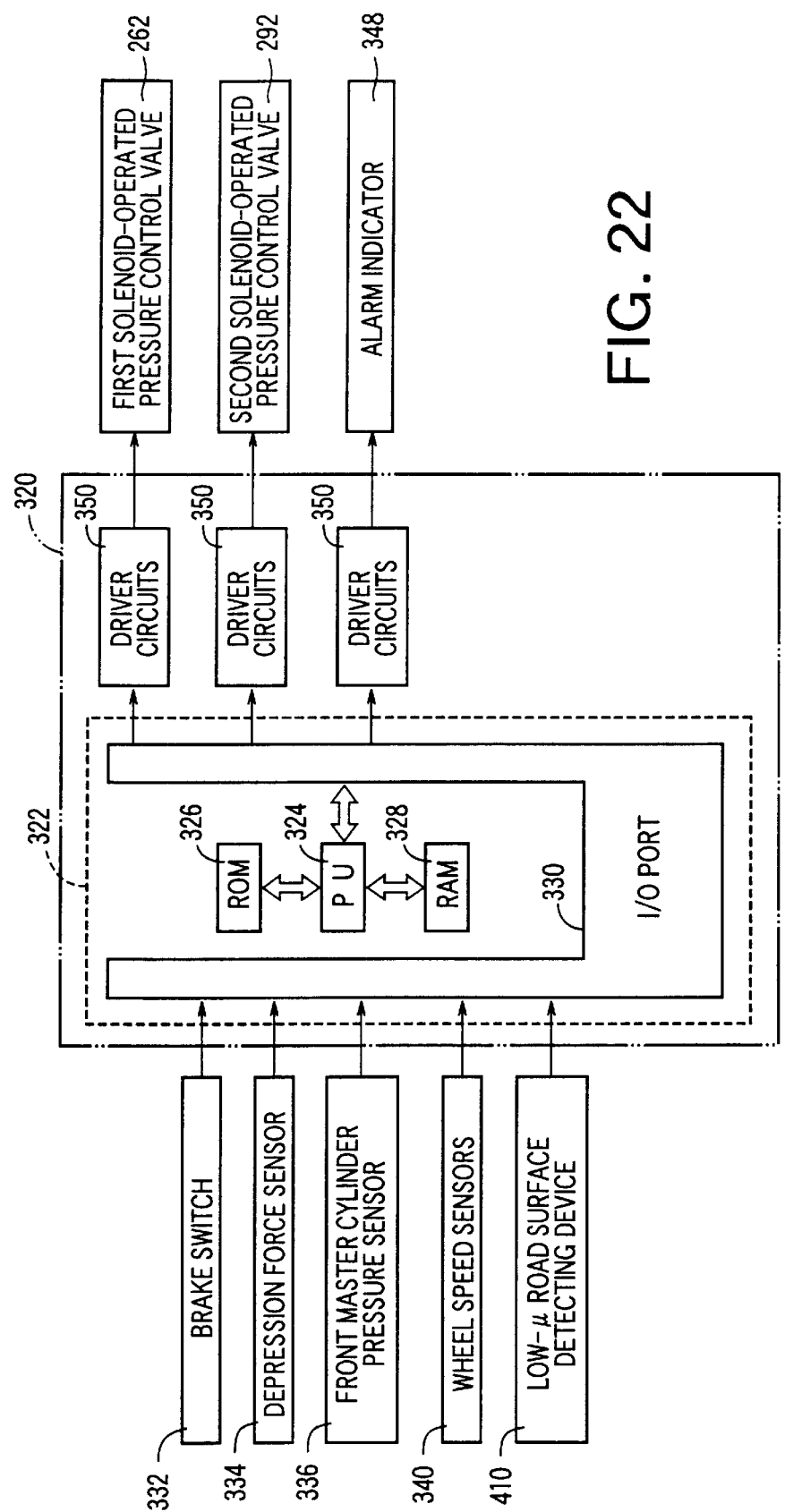
FIG. 22 is a block diagram schematically illustrating an arrangement of an electronic control unit of a braking pressure source device according to a further embodiment of this invention.

As shown in FIG. 22, the present braking system includes a low-$\mu$ road surface detecting device 410 for detecting that the road surface on which the vehicle is running has a relatively low coefficient of friction. The low-$\mu$ road surface detecting device 410 includes a light emitter and a light receiver. The light emitter emits a light beam toward the road surface, and the light receiver receives a component of the light beam which is reflected by the road surface. Where the road surface is a frozen surface, for instance, an iced surface, the friction coefficient of the road surface is relatively low. In particular, the friction coefficient of the road surface is considerably low where the road surface is covered by a frozen layer of snow compressed by vehicle tires so as to have a mirror surface. In this case, a relatively large portion of the light beam emitted from the light emitter is received by the light receiver, so that the amount of the light received by the light receiver is larger than a predetermined threshold, indicating that the road surface is a frozen surface having a low friction coefficient. When the road surface is not a frozen surface, the amount of the light received by the light receiver is smaller than the threshold, indicating that the friction coefficient of the road surface is not so low. The output signal of the light receiver which indicates the amount of the received light is applied to the computer 322, so that the computer 322 can determine whether the friction coefficient of the road surface is lower than a predetermined threshold or not.

Figure 23:
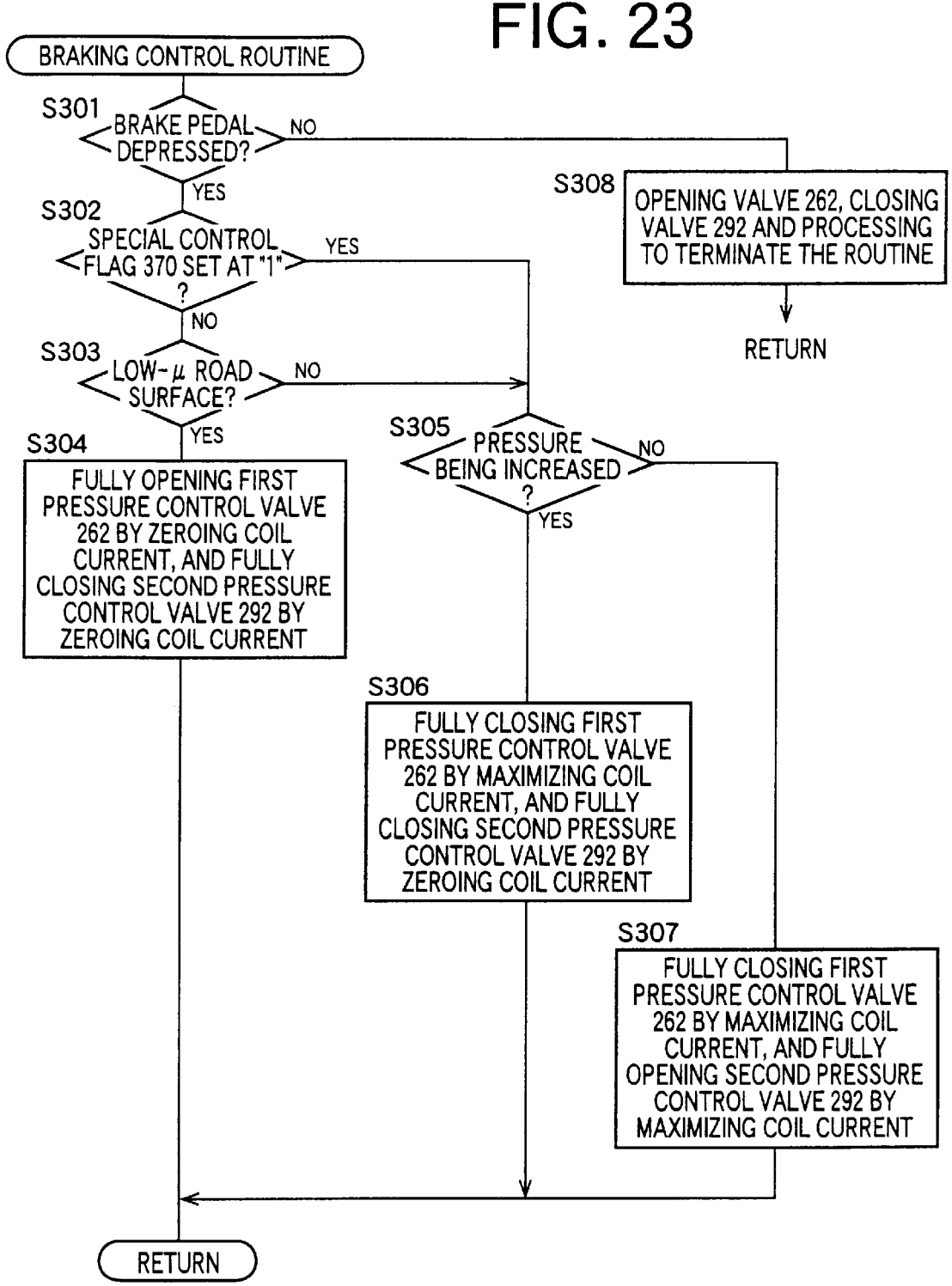
FIG. 23 is a flow chart illustrating a braking control routine executed according to a ROM of a computer of the electronic control unit of FIG. 22.

The ROM 326 of the ECU 320 stores a control program for executing a braking control routine illustrated in the flow chart of FIG. 23. This braking control routine is initiated with step S301 to determine whether the brake pedal 42 is in operation. If an affirmative decision (YES) is obtained in step S301, the control flow goes to step S302 to determine whether the SPECIAL CONTROL INHIBIT flag 370 is set at "1". In this third embodiment, a special control in step S304 (which will be described) is inhibited even where the friction coefficient of the road surface is lower than the predetermined threshold, if the SPECIAL CONTROL INHIBIT flag 370 is set at "1". As in the first and second embodiments, the flag 370 is set to "1" when the valve member 272 of the second pressure control valve 292 is stuck in the open state while the first pressure control valve 262 is normal. If the flag 370 is not set at "1", that is, if the special control in step. S304 is not inhibited, a negative decision (NO) is obtained in step S302, and the control flow goes to step S303 to determine whether the friction coefficient of the road surface is lower than the predetermined threshold. This determination is effected by determining whether the amount of the light received by the light receiver of the low-$\mu$ road surface detecting device 410 is larger than the predetermined threshold. If the amount of the received light is larger than the threshold, it indicates that the friction coefficient of the road surface is lower than the threshold, indicating that the road surface is frozen, for instance. In this case, an affirmative decision (YES) is obtained in step S303, and the control flow goes to step S304 to zeroing the amounts of electric current to be applied to the solenoid coils 284, 302 for fully opening the first pressure control valve 262 and fully closing the second pressure control valve 292.

Accordingly, the first pressurizing chamber 206 and the back-pressure chamber 208 are communicated with each other, so that the effective diameters of the first and second pressurizing pistons 202, 204 are reduced to that of the piston rod 220. In this state, the brake operating force F may be intricately controlled. Where the road surface has a low friction coefficient, the master cylinder pressure PM need not be so high. Rather, the operating stroke of the brake pedal 42 required to generate a given mater cylinder pressure is required to be relatively large, so that the master cylinder pressure is increased at a relatively low rate with an increase in the brake operating stroke, in order to permit an intricate control of the brake operating force F when the friction coefficient of the road surface is relatively low. In the present special control wherein the first pressure control valve 262 is fully open while the second pressure control valve 292 is fully closed, the pressurized fluid is delivered from the back-pressure chamber 208 into the first pressurizing chamber 206 when the master cylinder pressure is reduced with a decrease in the brake operating force F. Thus, the master cylinder pressure can be suitably reduced as the brake operating force F is reduced.

Where the friction coefficient of the road surface is not lower than the predetermined threshold, a negative decision (NO) is obtained in step S303, and the control flow goes to steps S305–S307, so that the master cylinder pressure is controlled in the braking normal mode, as in steps S11–S14 and S205–S207 in the first and second embodiments. No further description of steps S305–S307 is deemed necessary.

It will be understood from the foregoing description of the third embodiment that a portion of the computer 322 of the ECU 320 assigned to implement step S303 constitutes a low-friction-coefficient detecting portion for detecting that the friction coefficient of the road surface is lower than a predetermined threshold, and that a portion of the computer 322 assigned to implement step S304 constitutes a fourth communication control portion operable upon detection by the low-friction-coefficient detecting portion that the friction coefficient of the road surface is lower than the predetermined threshold.

Referring next to FIGS. 24–31, there will be described a fourth embodiment of this invention. The braking system including the braking pressure source device according to the present embodiment is arranged to detect a moment at which the boosting limit of the booster 150 has been reached, and effect the communication between the first pressurizing chamber 206 and the back-pressure chamber 208 at that moment, for delivering the pressurized fluid from the chamber 206 to the chamber 208, so that the master cylinder pressure after that moment is increased at the rate before that moment. A brake operating force transmitting device provided in the present braking system includes a boosting ratio changing portion adapted to change the ratio at which the brake operating force F acting on the brake pedal 42 is boosted into an input force of the booster 150, over the entire range of the operating stroke of the brake pedal 42. In the other aspects of the construction, the present fourth embodiment is identical with the preceding embodiments. The same reference signs as used in the preceding embodiments will be used in the present embodiment to identify the corresponding components, the description of which is dispensed with in the present embodiment.

The brake operating force transmitting device provided in the present fourth embodiment will be described by reference to FIGS. 24 and 25.

The present braking system includes a brake operating device 440 having a construction similar to that of a brake operating force transmitting device disclosed in Japanese Patent Application No. 2000-14541 filed by the assignee of the present application, which has not been laid open at the time the present invention was made. The device 440 includes a brake pedal 442, an operating rod 444, and the above-indicated boosting ratio changing portion interposed between the brake pedal 442 and the operating rod 444. The boosting ratio changing portion is provided to boost the operating force of the brake pedal 442, so that the thus boosted brake operating force is transmitted from the operating rod 444 to the booster 150. The brake pedal 442 is attached through a fixed support shaft 452 to a pedal bracket 450 fixed to a body 448 of the vehicle. The brake pedal 442 is attached to the pedal bracket 450 such that the brake pedal 442 is pivotable about the support shaft 452. For easier manufacture, the pedal racket 450 consists of a plurality of members which are assembled together into a unit and which includes a pair of plate-like support portions 456 by which the support shaft 452 is supported at its opposite ends. The brake pedal 442 generally extends downwards from the support shaft 452, and has a pedal pad 438 fixed at its lower free end. When the brake pedal 442 is depressed by the vehicle operator, a brake operating force is applied to the brake pedal 442 through the pedal pad 438.

A return spring (not shown) is interposed between the brake pedal 442 and the pedal bracket 450 so that the brake pedal 442 is biased by the return spring toward its original or non-operated position, which is determined by a stop (not shown) provided on the vehicle body 448. Namely, the brake pedal 442 is placed in its non-operated position with abutting contact with the stop under a biasing action of the return spring.

To the fixed support shaft 452, there is attached a force detecting lever 464 such that the force detecting lever 464 is pivotable about the support shaft 452. The force detecting lever 464 has a pair of parallel plate-like support portions 466, at which the lever 464 is supported pivotally about the support shaft 452. The support portions 466 extend from the support shaft 452 toward the vehicle body 448, and are connected together by a connecting portion 468 at their ends remote from the support shaft 452. An elastic member functioning as a biasing device in the form of a tensile coil spring 470 is interposed between the pedal bracket 450 and the ends of the support portions 466 on the side of the connecting portion 468, so that the force detecting lever 464 is biased by the tensile coil spring 470 in a direction that causes the connecting portion 468 to move upwards.

The connecting portion 468 has a flat surface perpendicular to a line of tangent with respect to a circular arc which has a center at the axis of pivoting of the force detecting lever 464. To this flat surface is fixed an engaging device 480, which includes a holding member 482 and an engaging member 464. The holding member 482 is a generally cylindrical member having engaging portions 486, 488 at its opposite ends. These engaging portions 486, 488 respectively engage the connecting portion 468 and a support member 490 fixed to the underside of the connecting portion 468, such that the engaging portions 486, 488 are movable relative to each other in the axial direction of the holding member 482. The holding member 482 is supported by the force detecting lever 464 such that the holding member 482 is movable in a direction which is perpendicular to the planes of the plate-like members of the connecting portion 468 and which is parallel to the line of tangent to the circular arc indicated above. An elastic member functioning as a biasing device in the form of a tensile coil spring 494 is interposed between a spring seat 492 provided on the holding member 482, and the support member 490. The spring seat 492 is a flange extending radially outwardly from the circumferential surface of the holding member 482. The holding member 482 is biased by the tensile coil spring 494 in an upward direction from the connecting member 468. The uppermost position of the holding member 482 biased by the spring 494 is determined by abutting contact of the spring seat 492 with the underside of the connecting portion 468. Thus, the spring seat 492 also functions as a stop. On the other hand, the engaging portion 488 of the holding member 482 which engages the support member 490 is chamfered and has a rectangular shape in transverse cross section. The engaging portion 488 engages an elongate hole formed through the support member 490, so that the holding member 482 is prevented from rotating about its axis.

The engaging member 484 has an externally threaded portion engaging an internally threaded portion of the holding member 482, and is fixed to the holding member 482 by a nut 496 which also engages the externally threaded portion. The engaging member 484 further has an engaging portion 498 at its end remote from the holding member 482. The engaging portion 498 has a larger diameter than the externally threaded portion engaging the holding member 482. The amount of projection of the engaging portion 498 from the connecting portion 468 upon abutting contact of the spring seat 492 of the holding member 482 with the connecting portion 468 can be adjusted by adjusting the axial position of the engaging member 484 relative to the holding member 482.

A force detector 500 is located above and opposed to the engaging device 480 fixed to the pedal bracket 450. This force detector 500 cooperates with the force detecting lever 464 to constitute a force detecting device 502. The force detector 500 provided in this embodiment includes a housing 504, a detecting probe 506 movably accommodated in the housing 504, and a sheet spring which is formed integrally with the detecting probe 506 and which functions as an elastic member which is relatively easily elastically deformable with a force applied thereto. The force detector 500 incorporates a strain gage and a bridge circuit which convert the amount of elastic deformation into an electric signal. The force detector 500 is fixed to and positioned relative to the pedal bracket 450 such that the detecting probe 506 lies on an arcuate locus of the engaging member 484 to be taken when the force detecting lever 464 is pivoted about the support shaft 452, and such that the detecting probe 506 is oriented in the downward direction along a line of tangent to the arcuate locus indicated above. The detecting probe 506 is normally held in abutting contact with the engaging portion 498 of the engaging member 484, under a biasing action of the spring 470.

The sheet spring of the force detector 500 is elastically deformed by a force applied from the engaging member 484 to the detecting probe 506, and the bridge circuit generates an electric signal representative of the force applied to the detecting probe 506. This signal is fed to the computer 322 of the ECU 320. Since the sheet spring is easily elastically deformable, so that the amount of change in the value of the electric signal with respect to the amount of deformation of the sheet spring, that is, with respect to the distance of movement of the detecting probe 506, is made sufficiently small, assuring a high degree of stability in the accuracy of detection of the force applied to the detecting probe 506. In the presence of the spring 470 biasing the engaging member 484 for abutting contact with the detecting probe 506 even while the brake pedal 441 is placed in its non-operated position, an initial load acts on the detecting probe 506 in the non-operated position of the brake pedal 442. Accordingly, the force applied from the engaging member 484 to the detecting probe 506 when the brake pedal 442 is depressed is represented by a difference between the value of an electric signal generated when the brake pedal 442 is depressed, and the value of an electric signal which is generated when the brake pedal 442 is placed in its non-operated position and which represents the initial load.

The pair of support portions 466 of the force detecting lever 464 carry a movable support shaft 510 between the fixed support shaft 452 and a part at which the engaging device 480 is provided. The movable support shaft 510 is attached to the support portions 466 such that the movable support shaft 510 is parallel to the fixed support shaft 452 and is movable relative to the pedal bracket 450 in its radial direction. As shown in FIG. 25, a pivotable member in the form of an intermediate lever 512 is attached to the movable support shaft 510 such that the intermediate lever 512 is pivotable about the movable support shaft 510 and is interposed between the pair of support portions 466 of the force detecting lever 464. Thus, the intermediate lever 512 is pivotally supported by the pedal bracket 450 through the movable support shaft 510, the force detecting lever 464 and the fixed support shaft 452.

Figure 24:
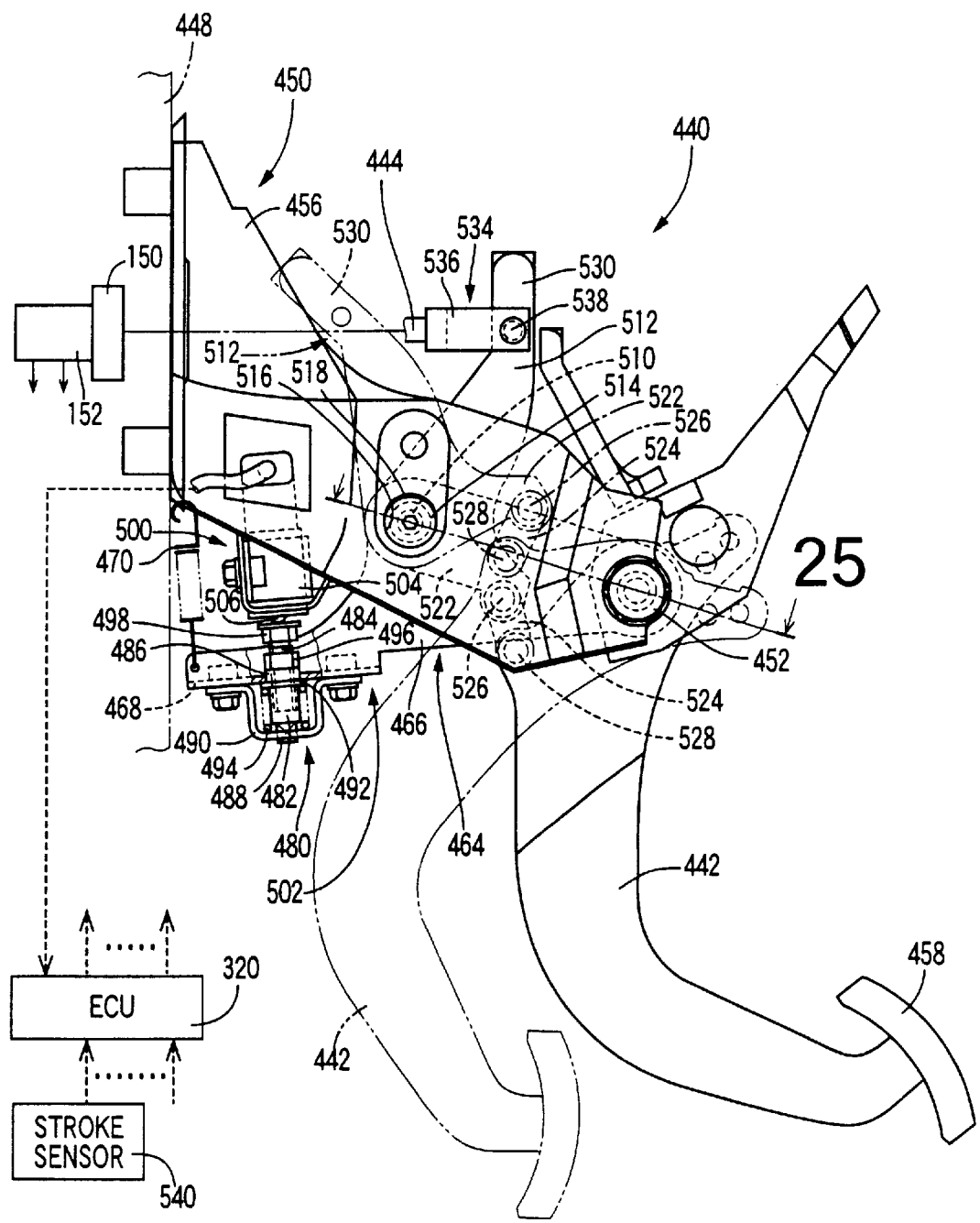
FIG. 24 is a front elevational view of a brake operating device and a brake operating force transmitting device in a braking pressure source device according to a still further embodiment of this invention.
Figure 25:
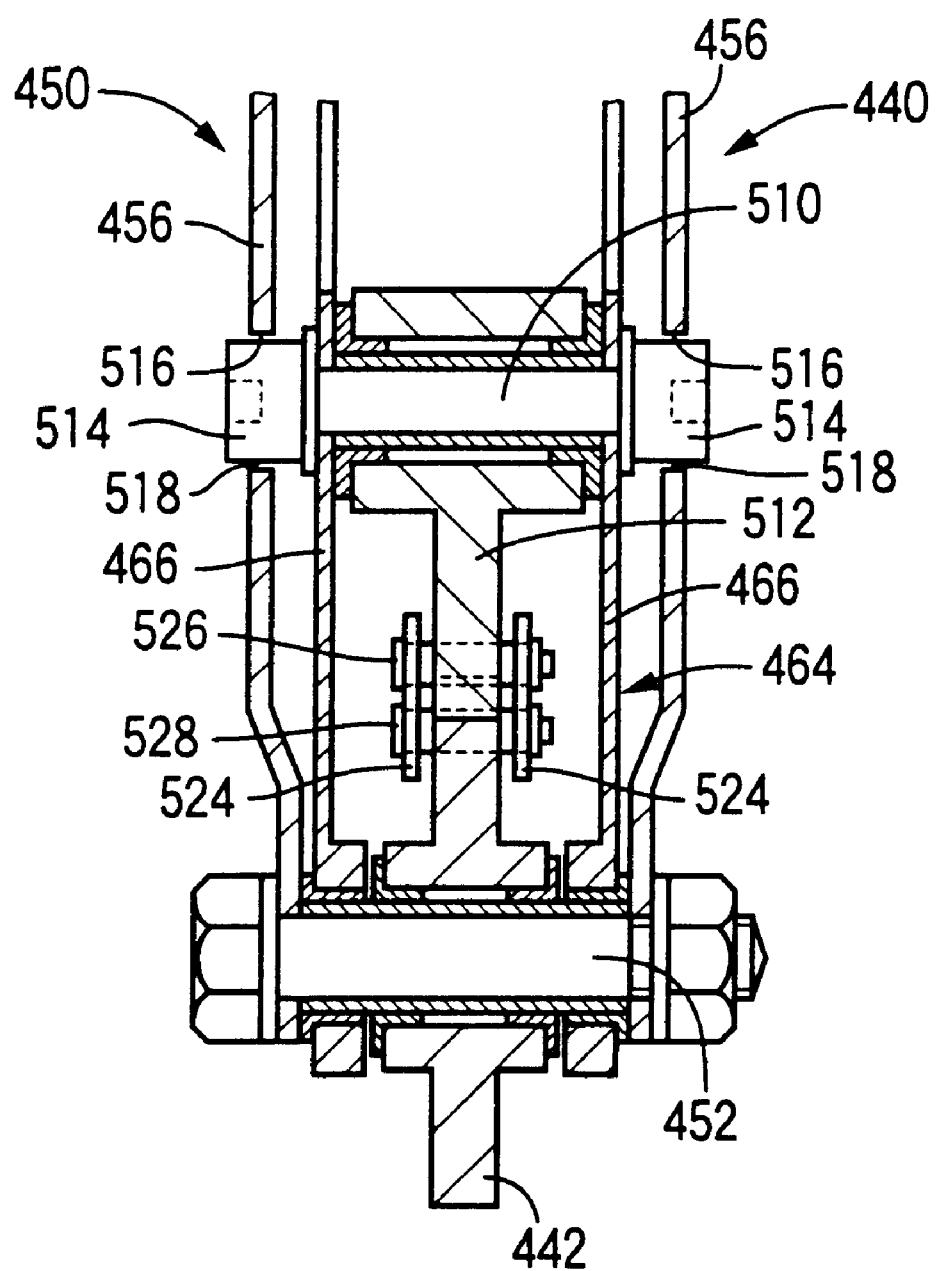
FIG. 25 is a cross sectional view taken along line 25—25 of FIG. 24.

As shown in FIG. 24, the intermediate lever 512 is a generally L-shaped member, which is pivotally supported by the movable support shaft 510 at a point of bend of the L-shape. The movable support shaft 510 has a pair of cylindrical engaging portions 514 at its opposite axial ends, as shown in FIG. 25. The engaging portions 514 are located on the outer sides of the respective support portions 466 and have a larger diameter than an axially intermediate portion of the movable support shaft 510 which is located between the support portions 466. The engaging portions 514 of the movable support shaft 510 extend through respective holes 516 formed through the respective support portions 456 of the pedal bracket 450. Each hole 516 has a larger diameter than the diameter of the engaging portions 514, so that there is left a clearance 518 between the outer circumferential surface of the engaging portion 514 and the inner circumferential surface of the hole 516. Accordingly, the movable support shaft 510 is movable in the radial direction relative to the pedal bracket 450, by a predetermined distance which is equal to the diameter of the hole 516 minus the diameter of the engaging portion 514.

The intermediate lever 512 has an arm portion 522 extending from the above-indicated point of bend of the L-shape. The arm portion 522 carries a pin 526 extending therethrough, while the brake pedal 442 carries a pin 528 extending therethrough. The pins 526, 528 are connected to each other at their opposite ends by respective two connecting links 524 disposed on the opposite sides of the arm portion 522 and brake pedal 442. Each of the connecting links 524 is pivotally connected at its opposite ends to the corresponding end of each pin 526, 528. The two pins 526, 528 extend in parallel with the fixed support shaft 452. The intermediate lever 512 has another arm portion 530 also extending from the above-indicated point of bend of the L-shape. This arm portion 530 is connected to one end portion of the operating rod 444 through a clevis 534 such that the arm portion 530 is pivotable relative to the clevis 534. The clevis 534 is U-shaped in cross section, having a pair of side wall portions 536 located on the opposite sides of the arm portion 530. The side wall portions 536 carry a pin 538 extending therebetween through the arm portion 530 and parallel to the fixed support shaft 452, such that the arm portion 530 is pivotable about the pin 538.

The output signal of the force detector 500 is fed to the computer 322 of the ECU 320, so that the computer 322 calculates the brake operating force acting on the brake pedal 442, on the basis of the output signal of the force detector 500. It will be understood that the computer 322 adapted to calculate the brake operating force cooperates with the force detecting device 502 to constitute a brake operating amount detecting device for detecting the operating force of the brake pedal 442 as the operating amount of a brake operating member. The ROM 326 of the computer 322 stores control programs for executing a braking control routine illustrated in the flow chart of FIG. 27 and a boosting limit detecting routine illustrated in the flow chart of FIG. 28. The RAM 328 of the computer 322 includes a BOOSTING LIMIT flag 420, a BOOSTING LIMIT INPUT FORCE memory 422, a BOOSTING LIMIT MASTER CYLINDER PRESSURE memory 423 and a FULL VALVE OPENING INPUT FORCE memory 424, as well as a working memory, as indicated in FIG. 29.

When the brake pedal 442 is depressed by the vehicle operator and pivoted in the clockwise direction as viewed in FIG. 24, the connecting links 524 are moved so as to pivot the intermediate lever 512 about the movable support shaft 510 in the counterclockwise direction, so that the operating rod 444 is advanced by the brake operating force transmitted thereto from the brake pedal 442 through the intermediate lever 512. A force transmitted to the operating rod 44 is boosted by the booster 150, and the boosted force is transmitted to the first pressurizing piston 202 of the master cylinder 152, so that the first and second pressurizing pistons 202, 204 are advanced to pressurize the fluid masses in the first and second pressurizing chambers 206, 210, whereby the front wheel brakes 20, 22 and the rear wheel brakes 24, 26 are operated to brake the vehicle wheels 10, 12, 14, 16. It is noted that the brakes 20–26, first and second solenoid-operated pressure control valves 262, 292, reservoir 230, etc. are not shown in FIG. 24.

The brake operating force applied to the pedal pad 458 of the brake pedal 442 is boosted by the connecting links 524 and the intermediate lever 512, and the boosted brake operating force is transmitted to the operating rod 444. As the intermediate lever 512 is pivoted, a direction in which the force is transmitted through the connecting links 524 (which direction is perpendicular to the axes of the two pins 526, 528) varies. As a result, the distance between the line of force transmission through the links 524 and the axis of pivoting of the intermediate lever 512 varies during the pivotal movement of the brake pedal 442, so that the ratio at which the brake operating force is boosted into the input force of the operating rod 444 is changed with a change in the operating stroke of the brake pedal 442. In the present embodiment, the connecting links 524 and the intermediate lever 512 constitute the boosting ratio changing portion, and cooperate with the operating rod 444 to constitute a brake operating force transmitting device. The boosting ratio to be established by the boosting ratio changing portion increases with an increase in the distance between the line of force transmission through the connecting links 524 and the axis of the movable support shaft 510 about which the intermediate lever 512 is pivoted.

Figure 26:
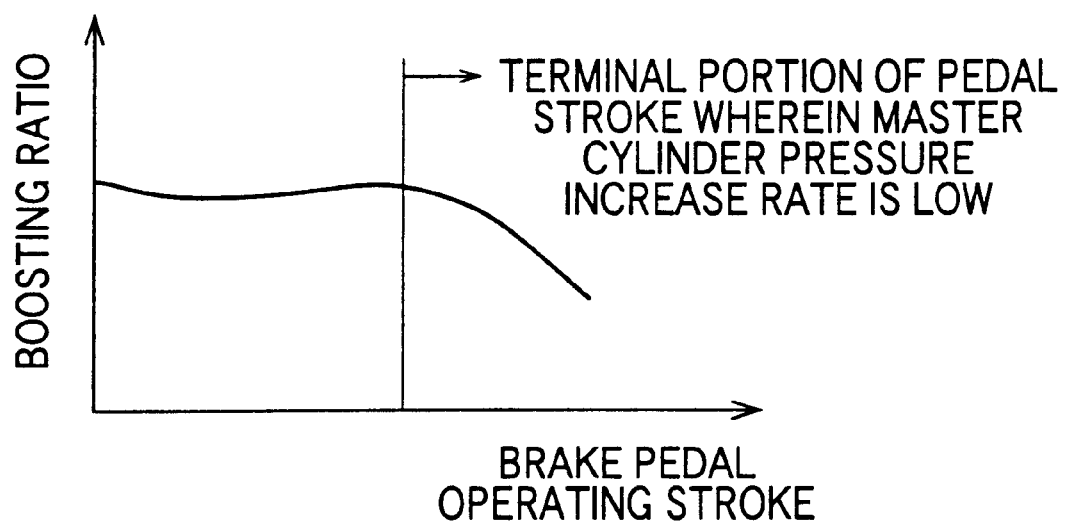
FIG. 26 is a graph indicating a relationship between operating force and stroke of the brake pedal force in the braking pressure source device having the brake operating force transmitting device of FIG. 24.

As the brake pedal 442 is depressed, the connecting links 524 are moved from a position indicated by broken line in FIG. 24 to a position indicated by two-dot chain line. As the connecting links 524 are moved, the direction in which the brake operating force is transmitted through the connecting links 524 varies, so that the distance between the line of force transmission through the connecting links 524 and the pivoting axis of the intermediate lever 512 is changed as the operating stroke of the brake pedal 442 is changed, whereby the ratio at which the force acting on the brake pedal 442 is boosted into the input force of the operating rod 444 changes with a change in the operating stroke of the brake pedal 442. A pattern of change of the boosting ratio over the entire range of the operating stroke of the brake pedal 442 can be determined as desired by suitably determining the positions of the pins 526, 528 and the movable support shaft 510 relative to each other. In the present embodiment, the boosting ratio changes with the operating stroke of the brake pedal 442, over the entire range of the operating stroke, as indicated in FIG. 26. In this specific example, the boosting ratio is lower in the terminal portion of the operating stroke range, than in the initial and intermediate portions of the range, and is higher in the intermediate portion. This arrangement permits the wheel cylinders 30–36 to be operated with the pressurized fluid whose pressure is high enough to stop the vehicle without a trouble, even in the event of a failure of the booster 150. Further, the present arrangement wherein the boosting ratio is relatively low in the terminal portion of the operating stroke range, the brake operating device 440 assure a relatively hard operating feel of the brake pedal as felt by the vehicle operator after the boosting ratio is made relatively low in the terminal portion of the brake operating stroke. Since the boosting ratio of the brake operating device 440 varies with a change of the operating stroke of the brake pedal 442, the braking system is equipped with a stroke sensor 540 for detecting the operating stroke of the brake pedal 442, and the output signal of the stroke sensor 540 is fed to the computer 322 of the ECU 320.

It is noted that the boosting ratio of the brake operating device 440 including the boosting ratio changing portion 512, 524 is more or less changed by a change in the distance between a line of force transmission from the operating rod 444 to the input piston 184 of the booster 150 and the axis of pivoting of the intermediate lever 512, but is changed primarily by a change in the distance between the line of force transmission through the connecting links 524 and the pivoting axis of the intermediate lever 512.

The boosted operating force of the brake pedal 442 transmitted to the operating rod 444 is further boosted by the booster 150 into an input force of the first pressurizing piston 202, so that the master cylinder 152. During operation of the master cylinder 152, a reaction force is transmitted from the master cylinder 152 to the intermediate lever 512 through the operating rod 444, so that a pivotal movement of the intermediate lever 512 about the axis of the movable support shaft 510 is stopped. In this state, the force detecting lever 464 is structurally integral with the brake pedal 442 through the movable support shaft 510, intermediate lever 512 and connecting links 524, so that the force detecting lever 464 is pivoted with the brake pedal 442. Accordingly, the support member 490 fixed to the force detecting lever 464 is moved to force the engaging member 484 through the spring 494, applying a force to the detecting probe 506 of the force detector 500. As a result an output electric signal indicative of this force is fed from the force detector 500 to the ECU 320. While the force acting on the detecting probe 506 is smaller than a set load of the spring 494, the spring 494 cooperates with the support member 490 to force the engaging member 484, as if the spring 494 is a rigid body. Since the movable support shaft 510 is disposed radially movably relative to the pedal bracket 450, the movable support shaft 510 transmits the operating force of the brake pedal 442 to the force detecting lever 464 while the movable support shaft 510 is radially moved. Accordingly, a force corresponding to a force of movement of the movable support shaft 510 is detected by the force detector 500.

Thus, the operating force of the brake pedal 442 is boosted into the input force of the operating rod 444, and the boosting ratio at this time is changed with a change in the distance between the axis of pivoting of the intermediate lever 512 and the line of force transmission through the connecting links 524. The force applied to the movable support shaft 510 is not influenced by the above-indicated distance, so that the force detected by the force detector 500 is not influenced by the boosting ratio. This arrangement permits the force as represented by the output signal of the force detector 500 to be accurately proportional to the operating force which is actually applied by the vehicle operator to the brake pedal 442, so that the actual brake operating force can be easily and accurately calculated by the ECU 320, on the basis of the output signal of the force detector 500.

The present arrangement has a further advantage that the force detector 500 is protected against a damage due to an excessively large force applied thereto, since the radial movement of the movable support shaft 510 is limited by abutting contact of the engaging portions 514 with the surfaces of the holes 516 formed through the pedal bracket 450. It will be understood that portions of the pedal bracket 540 which have the holes 516 serve as a stop for limiting the radial movement of the movable support shaft 510. When the brake pedal 442 is moved after the radial movement of the movable support shaft 510 is prevented by the abutting contact of the engaging portions 514 with the surfaces of the holes 516, the brake operating force is boosted by the connecting links 524 and the intermediate lever 512, and the thus boosted brake operating force is transmitted to the operating rod 444, to increase the master cylinder pressure, while the output signal of the force detector 500 is held at its maximum value, with the movable support shaft 510 kept stationary.

In the present embodiment, the amount of the clearance 518 between the engaging portions 516 and the holes 516 of the pedal bracket 450 (which serve as the above-indicated stop) is determined to limit the radial movement of the movable support shaft 510 relative to the pedal bracket 450 such that the force detector 500 is able to detect the brake operating force within a range which corresponds a range of 0–1 G of the deceleration value of the vehicle when the vehicle is braked with the brake operating force. Thus, the force detector 500 does not detect an excessively large amount of the brake operating force which is not used for controlling the master cylinder pressure. Namely, the force detector 500 is adapted to accurately detect the brake operating force within a range in which the master cylinder pressure is controlled.

The detecting probe 506 does not normally receive an excessively large force before the radial movement of the movable support shaft 510 is stopped by the abutting contact of the engaging portions 514 with the surfaces of the holes 516. If this happens by any chance, the force detecting lever 464 is moved against the biasing force of the spring 494, relative to the engaging member 484 and the holding member 482, so that the force detector 500 is protected against its damage due to such an excessively large force. The set load of the spring 494 is determined to be slightly larger than the largest force intended to be detected by the force detector 500, and is smaller than the permissible largest force to be applied to the detecting probe 506. If the force applied to the detecting probe 506 exceeds the set load of the spring 494, the force detecting lever 464 is moved relative to the holding member 482 and the engaging member 484, while compressing the spring 494, making it possible to protect the force detector 500 against its damage due to the excessively large force.

When the vehicle wheels 10–16 are braked upon an operation of the brake pedal 442, the first and second solenoid-operated pressure control valves 262, 292 are both closed to increase the master cylinder pressure (fluid pressure in the wheel brake cylinders 30–36), and the second pressure control valve 292 is fully opened to reduce the master cylinder pressure. When the boosting limit of the booster 150 has been reached, the first pressure control device 262 is fully opened for fluid communication of the first pressurizing chamber 206 with the back-pressure chamber 208, for delivering the pressurizing fluid from the first pressurizing chamber 206 to the back-pressure chamber 208, so that the master cylinder pressure after the boosting limit has been reached is increased at the rate at which the master cylinder pressure was increased before the boosting limit has been reached. Thus, the overall boosting ratio of the booster 150 and the master cylinder 152 is kept constant before and after the boosting limit of the booster 150 has been reached. There will be described operations of the ECU 320 to control the first and second pressure control valves 262, 292 after the boosting limit has been reached, and operations of the ECU 320 to detect the boosting limit, by reference to the flow chart of FIG. 27 illustrating the braking control routine and the flow chart of FIG. 28 illustrating the boosting limit detecting routine.

Figure 27:
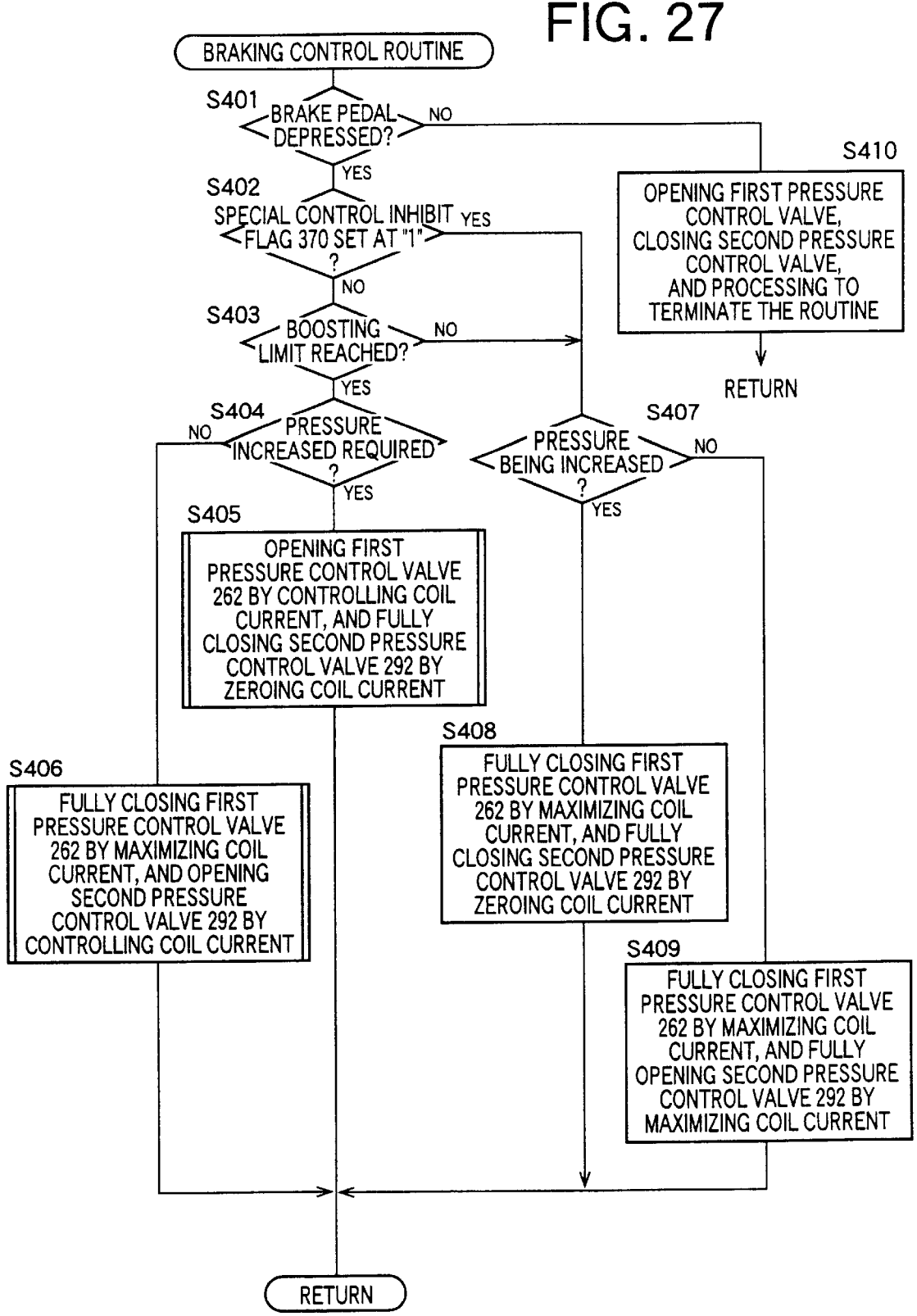
FIG. 27 is a flow chart illustrating a braking control routine executed according to a control program stored in a ROM of a computer of an electronic control unit of a braking pressure source device of FIG. 24.

The braking control routine of FIG. 27 is initiated with step S401 to determine whether the brake pedal 442 is in operation. If an affirmative decision (YES) is obtained in step S401, the control flow goes to step S402 to determine whether the SPECIAL CONTROL INHIBIT flag 370 is set at "1", that is, whether the valve member 272 of the second pressure control valve 292 is stuck in its open state while the first pressure control valve 262 is normal. If the flag 370 is set at "1", the special control in step S405 is inhibited even after the boosting limit of the booster 150 has been reached. If the flag 370 is set at "1", a negative decision (NO) is obtained in step S402, and the control flow goes to step S403 to determine whether the boosting limit of the booster 150 has been reached. This determination in step S403 is effected by determining whether the BOOSTING LIMIT flag 420 provided in the RAM 328 of the computer 322 as indicated in FIG. 29 is set at "1". This flag 420 is set to "1" when the boosting limit of the booster 150 has been detected according to the boosting limit detecting routine of FIG. 28.

Figure 28:
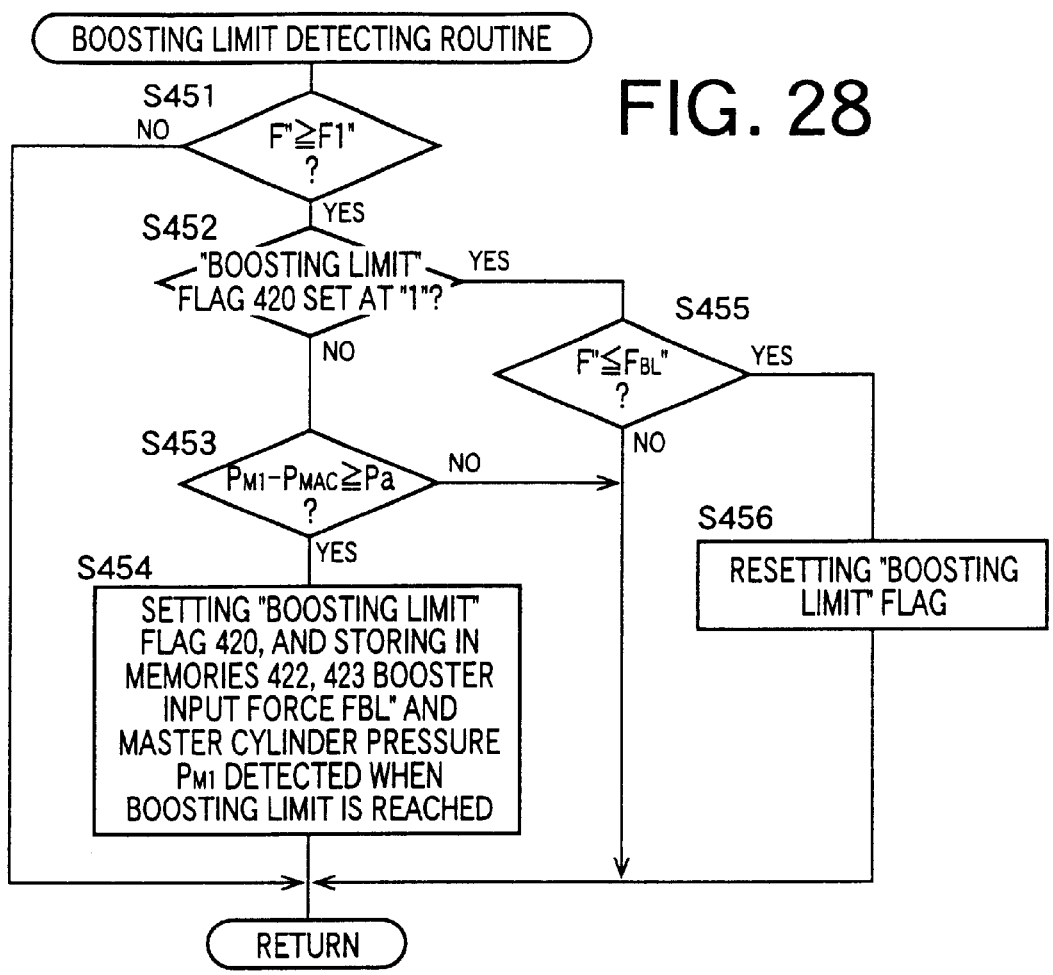
FIG. 28 is a flow chart illustrating a boosting limit detecting routine executed in step S403 of the braking control routine of FIG. 27, for detecting that the boosting limit has been reached.
Figure 29:
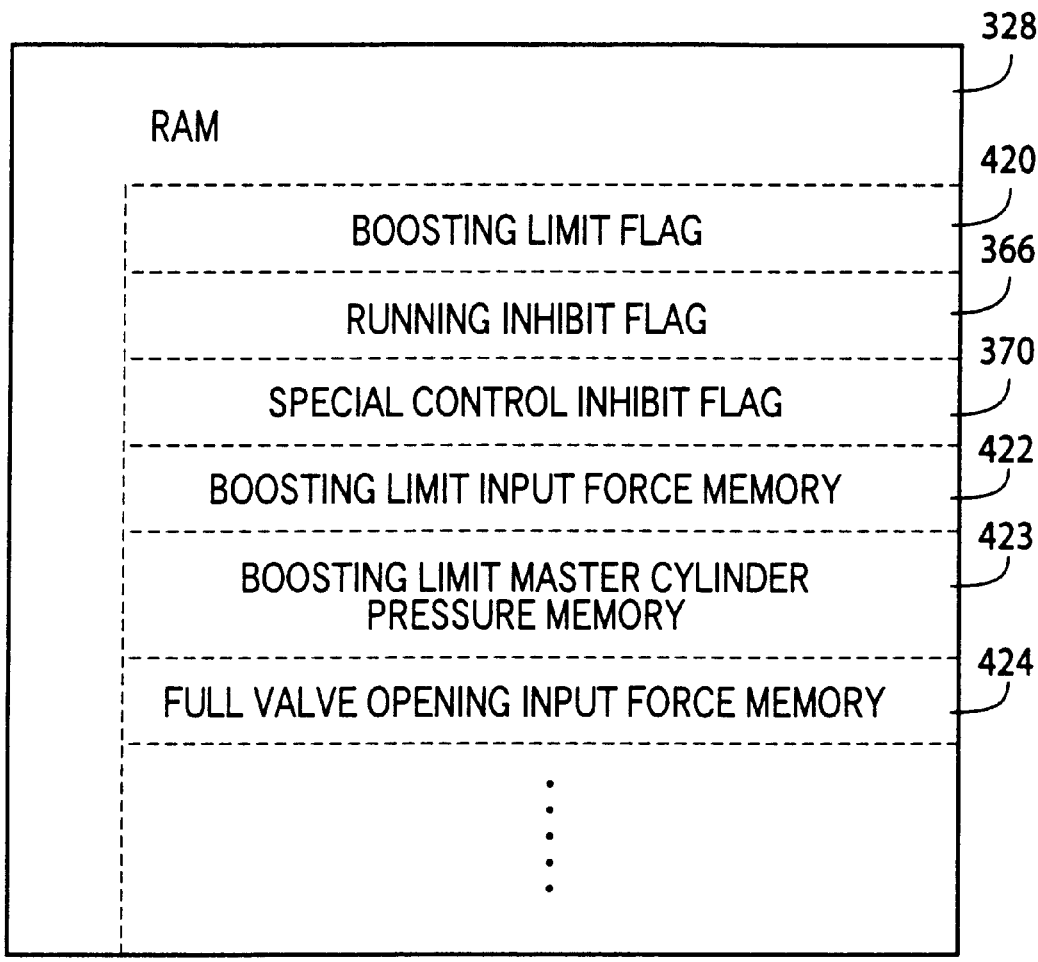
FIG. 29 is a view indicating a portion of a RAM of the computer which is used in the braking control routine of FIG. 27.

The boosting limit detecting routine of FIG. 28 is initiated with step S451 to determine whether a booster input force F" is equal to or larger than a predetermined threshold F1". In the present embodiment, the ratio at which the operating force of the brake pedal 442 is boosted by the brake operating device 440 is changed by the boosting ratio changing portion 512, 524 depending upon the operating stroke of the brake pedal 442, as indicated in FIG. 26, and the input force F" of the booster 150 is proportional to the brake operating force. However, the relationship between the brake operating force and the booster input force F" changes with the brake operating stroke (boosting ratio). While the relationship between the booster input force F" and the master cylinder pressure is kept constant irrespective of a change of the boosting ratio of the brake operating force, the relationship between the brake operating force and the master cylinder pressure changes with a change of the boosting ratio of the brake operating force. In view of this, the booster input force F" rather than the operating force of the brake pedal 442 is used to control the master cylinder pressure, for eliminating an influence of the change of the boosting ratio of the brake operating force on the master cylinder pressure. To this end, the boosting ratio of the brake operating force is obtained on the basis of the operating stroke of the brake pedal 442 as detected by the stroke sensor 540, and the booster input force F" is obtained on the basis of the brake operating force and the obtained boosting force of the brake operating force. A data map representing a predetermined relationship between the brake operating stroke and the boosting ratio of the brake operating force as indicated in FIG. 26 is stored in the ROM 326 of the computer 322. The booster input force F" is obtained on the basis of the boosting ratio and the brake operating force, and according to a predetermined relationship among these three parameters. The predetermined threshold F"1 is a value of the booster input force F" at which the boosting limit of the booster 150 is expected to be reached. If the obtained booster input force F" is smaller than the threshold F"1, a negative decision (NO) is obtained in step S451, and one cycle of execution of the booster limit detecting routine is terminated.

When the obtained booster input force F" has increased to the predetermined threshold F"1, an affirmative decision (YES) is obtained in step S451, and the control flow goes to step S452 to determine whether the BOOSTING LIMIT flag 420 is set at "1". When this flag 420 is set at "1", it indicates that the boosting limit of the booster 150 has been reached. If the boosting limit has not been reached, a negative decision (NO) is obtained in step S452, and the control flow goes to step S453 to determine whether the boosting limit of the booster 150 has been reached. The determination in step S453 is effected a pressure difference (PM1–PMAC) of the master cylinder pressure PM is equal to or larger than a predetermined threshold Pa. The value PM1 is an ideal value of the master cylinder pressure PM which corresponds to the booster input force F", while the value PMAC is an actual value of the master cylinder pressure PM. The ideal master cylinder pressure PM1 is the master cylinder pressure PM corresponding to the booster input force F" when the booster 150 is operable to boost the booster input force F". A data map representing a predetermined relationship between the booster input force F" and the ideal master cylinder pressure PM1 is stored in the ROM 326 of the computer 322. In step S453, the ideal master cylinder pressure PM1 is obtained on the basis of the booster input force F", and the difference (PM1–PMAC) is obtained by subtracting the actual master cylinder pressure PMAC (as detected by the front master cylinder pressure sensor 336 from the ideal master cylinder pressure PM1. The thus obtained pressure difference is compared with the threshold Pa. If the pressure difference is equal to or larger than the threshold Pa, that is, if the boosting limit of the booster 150 is found to have been reached, the booster input force F" is not longer boosted, so that the rate of increase of the actual master cylinder pressure PMAC is reduced as indicated by one-dot chain line in the graph of FIG. 30A, and the pressure difference (PM1−PMAC) becomes equal to or larger than the threshold Pa. Thus, it is found in step S453 that the boosting limit of the booster 150 has been reached. The present fourth embodiment is not arranged to diagnose the booster 150 and the front braking sub-system for any abnormality, and is not arranged to control the first and second pressure control valves 262, 292 depending upon a result of this diagnosis. Therefore, only the front master cylinder pressure sensor 336 is provided to detect the actual master cylinder pressure PMCA, and the determination in step S453 is based on the master cylinder pressure detected by this master cylinder pressure 336. However, the actual master cylinder pressure PMAC may be detected by a rear master cylinder pressure. Alternatively, an average of the detected front and rear master cylinder pressure values may be used as the actual master cylinder pressure PMAC.

If the master cylinder pressure difference (PM1−PMAC) is smaller than the threshold Pa, it means that the boosting limit of the booster 150 has not yet been reached. In this case, a negative decision (NO) is obtained in step S453, and one cycle of execution of the routine of FIG. 28 is terminated. If the master cylinder pressure difference becomes equal to or larger than the threshold Pa, it means that the boosting limit has been reached. In this case, an affirmative decision (YES) is obtained in step S453, and the control flow goes to step S454 to set the BOOSTING LIMIT flag 420 to "1", thus storing in the RAM 328 data indicative that the boosting limit of the booster 150 has been reached.

Figure 30A:
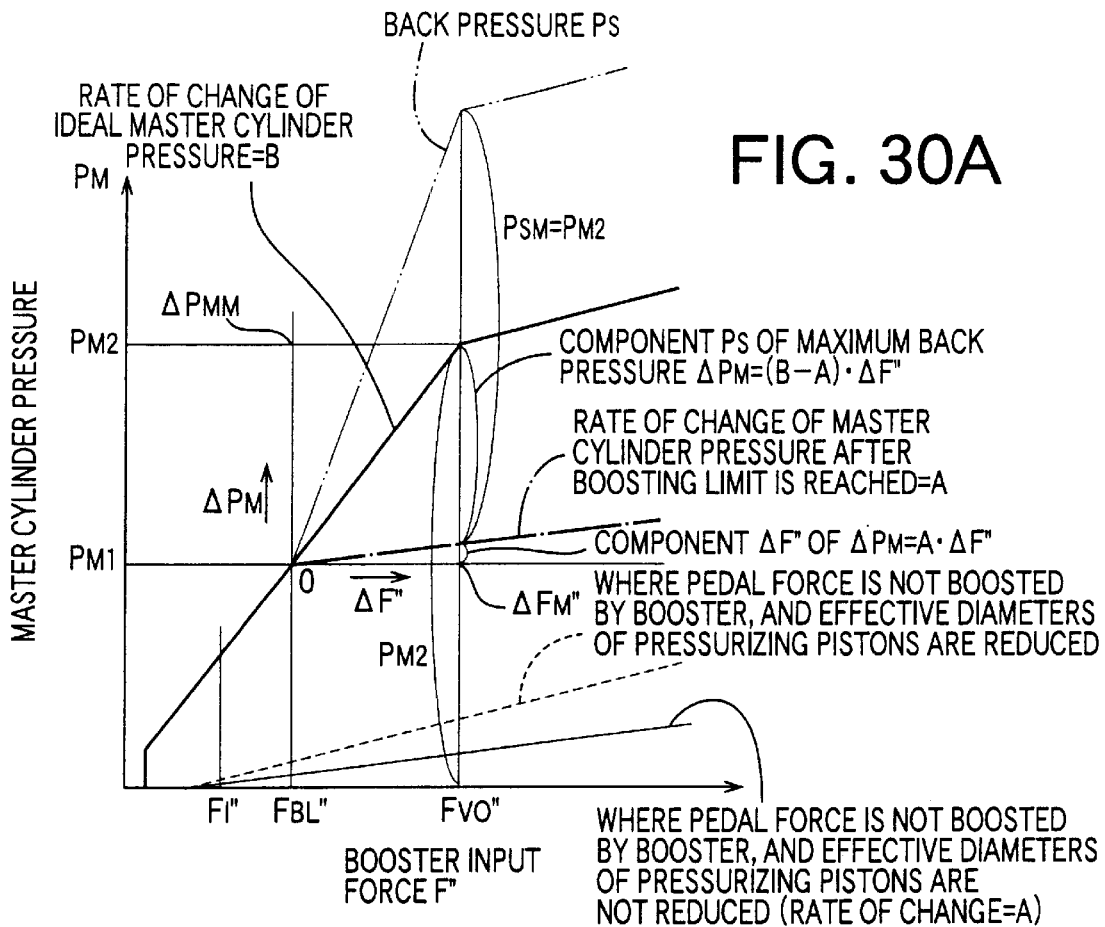
FIGS. 30A and 30B are graphs master cylinder pressure established by controlling the first solenoid-operated pressure control valve when the boosting limit is reached, in the braking pressure source device of FIG. 24 including the brake operating force transmitting device.
Figure 30B:
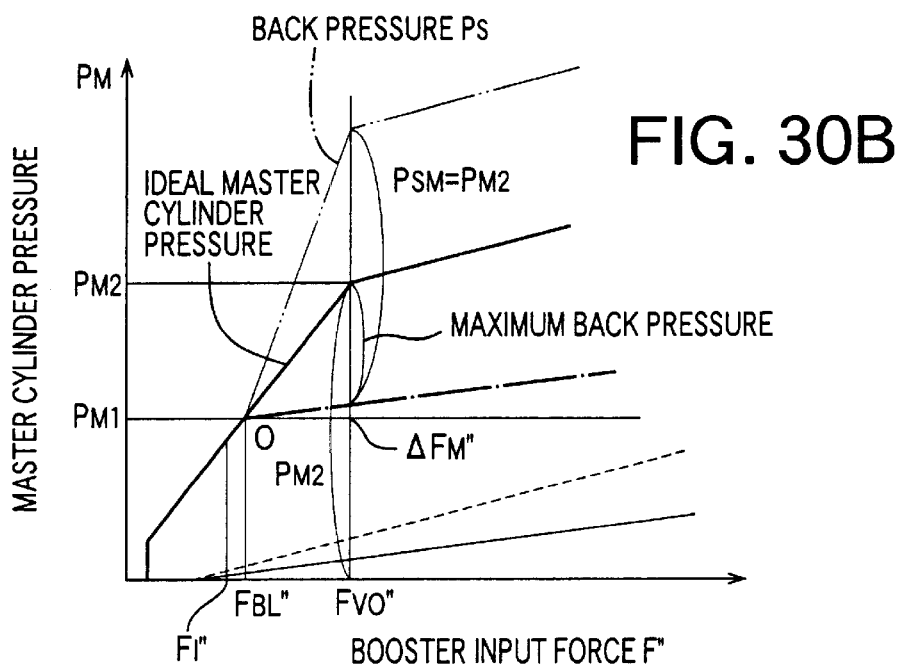

As indicated in FIGS. 30A and 30B, an input force FBL" of the booster 150 at which the boosting limit has been reached varies with the negative pressure in the low-pressure chamber 164. Described more specifically, when the negative pressure in the low-pressure chamber 164 is relatively close to the atmospheric pressure in the case of FIG. 30B, the booster input force FBL" at which the boosting limit has been reached is smaller than when the negative pressure is relatively close to the absolute vacuum in the case of FIG. 30A. In view of this, the threshold F1" is determined such that the booster input force F" can be equal to or larger than the threshold F1" even when the booster input force FBL" is relatively small. When the affirmative decision (YES) is obtained in step S453, step S454 is implemented to not only set the BOOSTING LIMIT flag 420 to "1", but also store the booster input force FBL" and the master cylinder pressure PM1 detected when the boosting limit has been reached, in the BOOSTING LIMIT INPUT FORCE memory 422 and the BOOSTING LIMIT MASTER CYLINDER PRESSURE memory 423 of the RAM 328, respectively.

When the boosting limit of the booster 150 has been detected according to the boosting limit detecting routine of FIG. 28, an affirmative decision (YES) is obtained in step 403 of the braking control routine of FIG. 27, and the control flow goes to step S404 to determine whether it is necessary to increase the master cylinder pressure PMAC. The determination in this step S404 is effected in the same manner as in step S11 of the braking control routine of FIG. 5 in the first embodiment. If an affirmative decision (YES) is obtained in step S404, the control flow goes to step S405 to determine the amount of electric current to be applied to the solenoid coil 284 for opening the first pressure control valve 262 to increase the master cylinder pressure, and zero the amount of electric current to be applied to the solenoid coil 302 for fully closing the second pressure control valve 292. The driver circuits 350 are controlled by the computer 322 to suitably open the first pressure control valve 262 and fully close the second pressure control valve 292.

Figure 31:
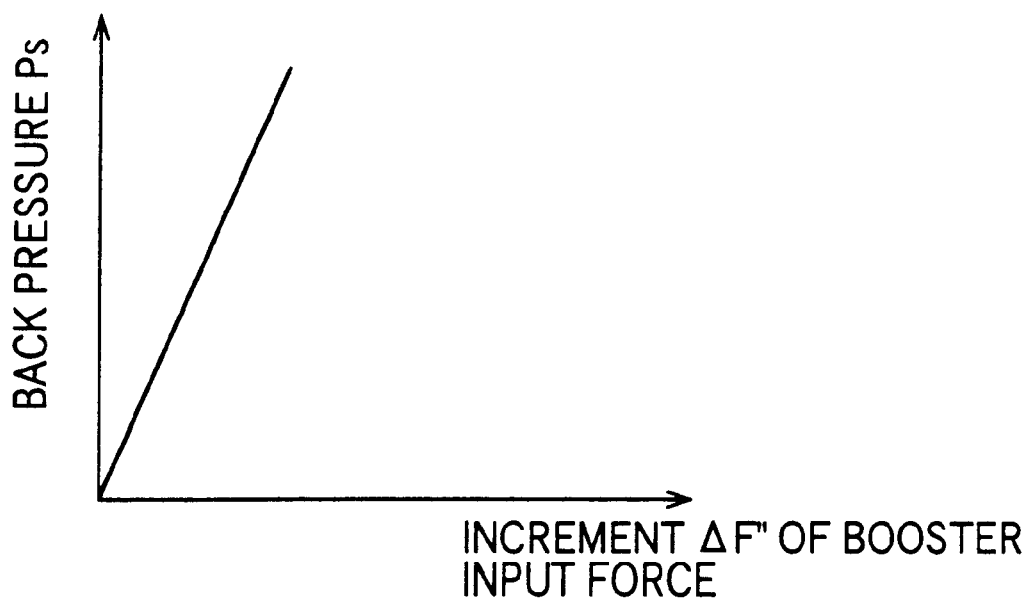
FIG. 31 is a graph indicating a relationship between assisting pressure to be added to master cylinder pressure and an increment of booster input force, after the boosting limit is reached, in the braking pressure source device of FIG. 24 including the brake operating force transmitting device.

The determination of the amount of electric current to be applied to the first pressure control valve 262 will be described in the case of FIG. 30A. The amount of electric current it to be applied to the solenoid coil 284 of the first pressure control valve 262 is determined so as to generate a back pressure PS in the back-pressure chamber 208, which back pressure PS permits the master cylinder pressure PM to be increased at the same rate as before the boosting limit has been reached, as indicated by solid line in FIG. 30A. That is, to maintain the boosting ratio constant before and after the boosting limit has been reached, the back pressure PS in the back-pressure chamber 208 is added to the master cylinder pressure as generated in the first pressurizing chamber 206 based on only the input force applied to the first pressurizing piston 202. This back pressure PS is determined so that the master cylinder pressure after the boosting limit has been reached is increased at the rate at which the master cylinder pressure was increased before the boosting limit has been reached. The amount of electric current to be applied to the solenoid coil 284 is determined to open the first pressure control valve 262 by an amount that permits the determined back pressure PS to be generated in the back-pressure chamber 208. The amount of electric current to generate the back pressure PS after the boosting limit has been reached is determined so that the mater cylinder pressure after the boosting limit has been reached is increased with an increase in an increment ΔF" of the force F" from the booster input pressure FBL", at the same rate as before the boosting limit has been reached. This back pressure PS to be generated in the back-pressure chamber 208 is linearly proportional to the increment ΔF" from the booster input pressure PBL", as indicated in the graph of FIG. 31.

The master cylinder pressure PM after the boosting limit of the booster 150 has been reached is represented by the following equations (3) and (4) wherein "A" represents a rate of increase of the master cylinder pressure PM where the booster input force F" is not boosted by the booster 150 after the boosting limit has been reached, while "B" represents a rate of increase of the ideal master cylinder pressure PM:

$$PM=PM1+B \cdot \Delta F" \quad (3)$$

$$PM=PM1+A \cdot \Delta F"+\{(S1-S2)/S1\} \cdot PS \quad (4)$$

Accordingly, once the increment ΔF" of the booster input force F" has been determined, the master cylinder pressure PM can be determined on the basis of the master cylinder pressure PM1 which was detected when the boosting limit was reached (and which is stored in the BOOSTING LIMIT MASTER CYLINDER PRESSURE memory 423), and according to the above equation (3). Further, the back pressure PS can be determined on the basis of the values PM1, ΔF" and PM and according to the above equation (4). The increment ΔF" of the booster input force F" can be obtained by subtracting the booster input force FBL" when the boosting limit was reached, from the brake operating force as presently detected on the basis of the output signal of the force detector 500.

To obtain the master cylinder pressure PM and the back pressure PS determined by the above equations (3) and (4)

including the increment ΔF" of the booster input force F", the pressure difference (PM–PS) across the first pressure control valve 262 and the amount of electric current I to be applied to its solenoid coil 284 must satisfy the following equation (5) wherein "SV1" represents the pressure-receiving area of the valve member 272 of the valve 262 which receives the master cylinder pressure PM, and "K1" represents a predetermined constant.

$$(PM-PS) \cdot SV1 = K1 \cdot I \tag{5}$$

It will be understood that the amount of electric current I to be applied to the solenoid coil 284 is determined by the values PM, PS, SV1 and K1 and according to the above equation (5). With the thus determined current I applied to the solenoid coil 284, the back pressure PS corresponding to the increment ΔF" is generated in the back-pressure chamber 208, so that the master cylinder pressure PM is controlled to the ideal value corresponding to the present booster input force F", that is, controlled to a value which would be establish if the present booster input force F" were boosted by the booster 150. On the other hand, the amount of electric current to be applied to the solenoid coil 302 of the second pressure control valve 292 is zeroed, to hold the valve 292 in the fully closed state.

In the present embodiment, the driver circuit 350 for the first pressure control valve 262 is arranged to feed-back control the amount of electric current on the basis of the master cylinder pressure as detected by the front master cylinder pressure sensor 336, such that the detected maser cylinder pressure PM corresponds to the amount of electric current I which has been determined on the basis of the brake operating force. The feedback control may be effected by the computer 322, which determines from time to time the amount of electric current to be applied to the first pressure control valve 262, on the basis of the detected master cylinder pressure vis-à-vis the specific amount of electric current.

When the back pressure PS has become equal to the master cylinder pressure PM, the amount of electric current I to be applied to the solenoid coil 284 is zeroed, to fully open the first pressure control valve 262. Accordingly, the moment at which the back pressure PS has become equal to the master cylinder pressure PM can be detected by detecting that the amount of electric current I has been zeroed. However, the above-indicated moment can be detected on the basis of an increment ΔFM" of the booster input force F" or a value PM2 of the master cylinder pressure PM, which increment ΔFM" or value PM2 is expected when the back pressure PS has become equal to the master cylinder pressure PM. Namely, the increment ΔFM" is obtained according to the following equation (6), or the master cylinder pressure value PM2 is obtained according to the following equation (7):

$$\{(S2/S1) \cdot PM2 - PM1\}/A = \Delta FM" \tag{6}$$

$$PM2 - PM1 = B \cdot \Delta FM" \tag{7}$$

The moment at which the back pressure PS has become equal to the master cylinder pressure PM can be detected by detecting that the increment ΔF" of the booster input force F" has become equal to the increment ΔFM", or by detecting that the master cylinder pressure PM has become equal to the value PM2.

A booster input force FV0" when the first pressure control valve 262 is fully opened is stored in the FULL VALVE OPENING INPUT FORCE memory 424 of the RAM 328.

After the first pressure control valve 262 has been fully opened, it is kept in the fully open state, and the master cylinder pressure and the back pressure are increased at the rate which is to be established by reduction of the effective diameters of the first and second pressurizing pistons 202, 204 to the diameter of the piston rod 220. Although the master cylinder pressure and the back pressure after the valve 262 has been fully opened are lower than those which would be established where the booster input force were boosted by the booster 150, the master cylinder pressure and the back pressure are higher than where the effective diameters of the pistons 202, 204 were not reduced (where the valve 262 were not fully opened).

Where the booster input pressure FBL" when the boosting limit of the booster 150 is lower as in the case of FIG. 30B than in the case of FIG. 30A, due to a variation in the negative pressure in the low-pressure chamber 164 of the booster 150, the master cylinder pressure can also be increased at the ideal rate with an increase in the increment ΔF" of the booster input force F", by controlling or determining the amount of electric current I to be applied to the first pressure control valve 262, on the basis of the increment ΔF" and according to the above-indicated equations (3)–(5). The master cylinder pressure value PM1 when the boosting limit of the booster 150 has been reached varies depending upon the booster input force FBL" when the boosting limit has been reached. Accordingly, the booster input force FV0", master cylinder pressure PM2, increment ΔFM" and maximum back-pressure when the valve 262 is fully opened (that is, when the back pressure has become equal to the master cylinder pressure) also vary with the booster input force FBL". However, by determining the amount of electric current I according to the above equations (3)–(5), the master cylinder pressure can be increased at the same rate before and after the boosting limit has been reached.

When the back pressure PS has become equal to the master cylinder pressure PM, the first pressure control valve 262 is fully opened for fluid communication between the first pressurizing chamber 206 and the back-pressure chamber 208, to reduce the effective diameters of the first and second pressurizing pistons 202, 204 to the diameter of the piston rod 220, so that the master cylinder pressure can be increased at a higher rate with an increase in the brake operating force, than where the back-pressure chamber 208 is not provided to generate the back pressure Ps. This arrangement permits a sufficiently large vehicle braking force even after the boosting limit of the booster 150 has been reached, while minimizing an increase in the required brake operating force.

When it is necessary to reduce the master cylinder pressure after the boosting limit of the booster 150 has been reached, a negative decision (NO) is obtained in step S404, and the control flow goes to step S406 in which the first pressure control valve 262 is held in the fully open state until the booster input force F" has been reduced to the value FV0" (at which the valve 262 was fully opened), while the second pressure control valve 292 is held in the fully closed state, so that the pressurized fluid is delivered from the back-pressure chamber 208 to the first pressurizing chamber 206, whereby the master cylinder pressure is lowered. When the booster input force F" has been reduced to the value FV0", the first valve 262 is fully closed, and the second valve 292 is opened with the amount of opening being controlled by controlling the amount of electric current applied to the solenoid coil 302.

The amount of electric current I' to be applied to the second pressure control valve 292 is determined such that the master cylinder pressure is reduced at the rate at which the master cylinder pressure was increased. The increment ΔF''' of the booster input force F''' from the value FBL''' is obtained until the booster input force F''' has been reduced to the value FBL''', and the back pressure PS is obtained on the basis of the increment ΔF''' and according to the above equations (3) and (4). The back pressure PS and the amount of electric current I' to be applied to the solenoid coil 302 of the valve 292 have a relationship represented by the following equation (8), so that the amount of electric current I' can be determined on the basis of the pack pressure PS and according to the equation (8).

$$PS \cdot SV2 + K2 \cdot I' = FS1 \qquad (8)$$

In the above equation (8), "SV2" represents the pressure-receiving surface of the valve member 272 of the valve 292 which receives the back pressure, and "FS1" represents a biasing force of the spring 294 of the valve 292, while "K2" represents a constant. Thus, the amount of electric current I' is determined so as to obtain the back pressure PS which ahs been determined on the basis of the increment ΔF''', etc. By reducing the back pressure PS, the master cylinder pressure is reduced at the rate at which it was increased. The back pressure PS is zeroed when the booster input force F''' has been reduced to the value FBL'''. The back pressure PS can be zeroed when the booster input force FBL''' has been reached, irrespective of the amount of the booster input force FBL'''. At this time, the amount of electric current I' is maximum.

In the boosting limit detecting routine of FIG. 28, the BOOSTER LIMIT flag 420 is set to "1" in step S454 when the boosting limit of the booster 150 has been reached, so that an affirmative decision (YES) is subsequently obtained in step S452, and the control flow goes to step S455 to determine whether the booster input force F''' has been reduced to or below the value FBL'''. When step S455 is implemented for the first time, a negative decision (NO) is obtained in step S455, and one cycle of execution of the routine of FIG. 28 is terminated. When the booster input force F''' has been reduced to or below the value FBL''', an affirmative decision (YES) is obtained in step S455, and the control flow goes to step S456 to reset the BOOSTING LIMIT flag 420 to "0". As a result, a negative decision (NO) is obtained in step S403 of the braking control routine of FIG. 27, and the control flow goes to steps S407–S409 similar to steps S11–S14, for controlling the first and second pressure control valves 262, 292 in the normal braking mode. When the booster input force F''' is equal to or smaller than the value FBL''', the back pressure PS is zero, so that the master cylinder pressure can be controlled in the normal braking mode. Since the BOOSTING LIMIT flag 420 is set at "0", the negative decision (NO) is obtained in step S452 and the control flow goes to step S453, when the brake operating force F''' has been increased to or exceeded the threshold F1''' as a result of subsequent depression of the brake pedal 442 without prior releasing thereof back to the non-operated position. Thus, the determination in step S453 as to whether the boosting limit has been reached is effected upon the subsequent depression of the brake pedal 442.

In the present fourth embodiment, the boosting ratio of the operating force of the brake pedal 442 is changed over the entire range of the operating stroke of the brake pedal 442, such that the boosting ratio in the terminal portion of the range of the brake operating stroke is made lower than in the initial and intermediate portions. According to this arrangement, the brake operating device 440 exhibits high degrees of mechanical strength and operating stability as felt by the vehicle operator when the brake pedal 442 is operated with a relatively large operating force. Namely, the boosting ratio of the operating force of the brake pedal 442 begins to be reduced with the operating stroke falling in the terminal portion of its range, when the rate of increase of the master cylinder pressure begins to be reduced due to generation of the back pressure PS after the boosting limit of the booster 150 is reached. This gives a relatively high degree of operating stability of the brake operating device 440 as felt by the vehicle operator. Since the rate of increase of the master cylinder pressure with an increase in the brake operating force begins to be reduced upon transition of the operating stroke from the intermediate portion to the terminal portion, a decrease in the boosting ratio of the brake operating force does not cause an undesirable effect. Although the flow of the pressurized fluid from the first pressurizing chamber 206 to the back-pressure chamber 208 results in an increase in the operating stroke of the brake pedal 442, the generation of the back pressure in the chamber 208 leads to the increased mechanical strength and operating stability of the brake operating device 440 as felt by the vehicle operator.

It will be understood from the above description of the fourth embodiment that a portion of the ECU assigned to implement step S453 constitutes a boosting limit detecting portion operable to detect that the boosting limit of the booster 150 has been reached.

A fifth embodiment of this invention will be described by reference to FIGS. 32 and 33. The braking system including a braking pressure source device constructed according to this invention is identical with that of the first embodiment, except for the ROM 326 and the RAM 328, and the braking control routine. The ROM 326 stores a braking control routine illustrated in the flow chart of FIG. 32. The braking control routine is formulated to detect a requirement for an abrupt brake application to the vehicle, a road surface having a low friction coefficient, a defect of the booster 150, the boosting limit of the booster and a defect of the front braking sub-system, and upon detection of any one of these states, perform a special control of the first and second pressure control valves 262, 292 wherein the pressurized fluid is delivered from the first pressurizing chamber 206 to the back-pressure chamber 208. The present embodiment is adapted to first determine whether the friction coefficient of the road surface on which the vehicle is running is lower than a predetermined threshold. When the friction coefficient is found lower than the threshold, the first pressurizing chamber 206 and the back-pressure chamber 208 are communicated with each other through the first pressure control valve 262, to effect the special control in step S507 as described below in detail. In this case, the other special controls in steps S505, S514 and S517 are inhibited even if the other states indicated above are detected. Where the friction coefficient of the road surface is low, the required master cylinder pressure is not so high. In the other states, for instance, where the abrupt brake application is required, however, the master cylinder pressure should be controlled to be relatively high. Thus, the special control in step S507 upon detection of the road surface having a friction coefficient lower than the threshold is different from the special controls in steps S505, S514 and S517 upon detection of the other states. Further, while any one of the special controls S505, S510, S512, S514 and S517 is performed, the special control in step S507 will not be performed even if the friction coefficient of the road surface is found lower than the threshold. Where the friction coefficient is relatively low while any one of the special controls in steps S505, S154 and S517 is performed, the vehicle operator is likely to manipulate the brake pedal for controlling the master cylinder pressure so as to meet the low friction coefficient. The determination in step S503 as to whether the friction coefficient of the road surface is lower than the threshold is effected in the same manner as described above with respect to step S303 of FIG. 23. The determination in step S504 as to whether the booster 150 is defective is effected in the same manner as described above with respect to step S3 of FIG. 5. The determination in step S508 as to whether an abrupt brake application to the vehicle is required is effected in the same manner as described above with respect to step S203 of FIG. 18. The determination in step S509 as to whether the front braking sub-system is defective is effected in the same manner as described above with respect to step S6 of FIG. 5. The determination in steps S511 and S516 as to whether the boosting limit of the booster 150 has been reached is effected in the same manner as described above with respect to step S403 of FIG. 27 (boosting limit detecting routine of FIG. 28). When an affirmative decision (YES) is obtained in steps S503, S504, S508, S509 and S516, the appropriate special controls are effected in steps S507, S505, S514 and S517 wherein the amounts of electric current to be applied to the first and second pressure control valves 262, 292 are controlled in the same manner as described above with respect to steps S304, S5, S204, S9, S10, S405, S406. Where two or more of the above-indicated states are detected in steps S504, S508, S509, S511 and S516, the amounts of electric currents to be applied to the two valves 262, 292 are controlled according to a selected one of control patterns which correspond to the respective states detected.

Figure 33:
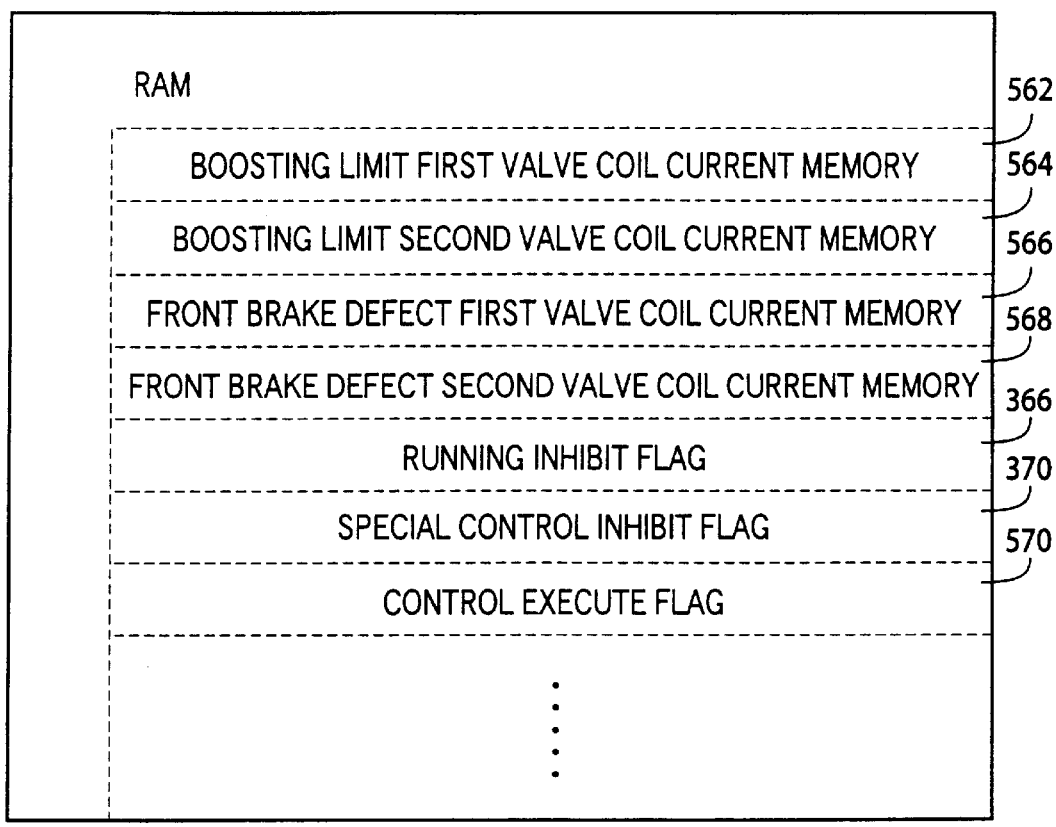
FIG. 33 is view indicating a portion of a RAM of the computer which is used in the braking control routine of FIG. 32.

As shown in FIG. 33, the RAM 328 used in the present embodiment includes a BOOSTING LIMIT FIRST VALVE COIL CURRENT memory 562, a BOOSTING LIMIT SECOND VALVE COIL CURRENT memory 564, a FRONT BRAKE DEFECT FIRST VALVE COIL CURRENT memory 566, a FRONT BRAKE DEFECT SECOND VALVE COIL CURRENT memory 568, and a CONTROL EXECUTE flag 570, as well as THE RUNNING INHIBIT flag 366 and the SPECIAL CONTROL INHIBIT flag 370 which have been described. The RAM 328 includes other flags and memories (as shown in FIG. 20) used for determining whether the abrupt brake application is required. These flags and memories are not shown in FIG. 33.

Figure 32:
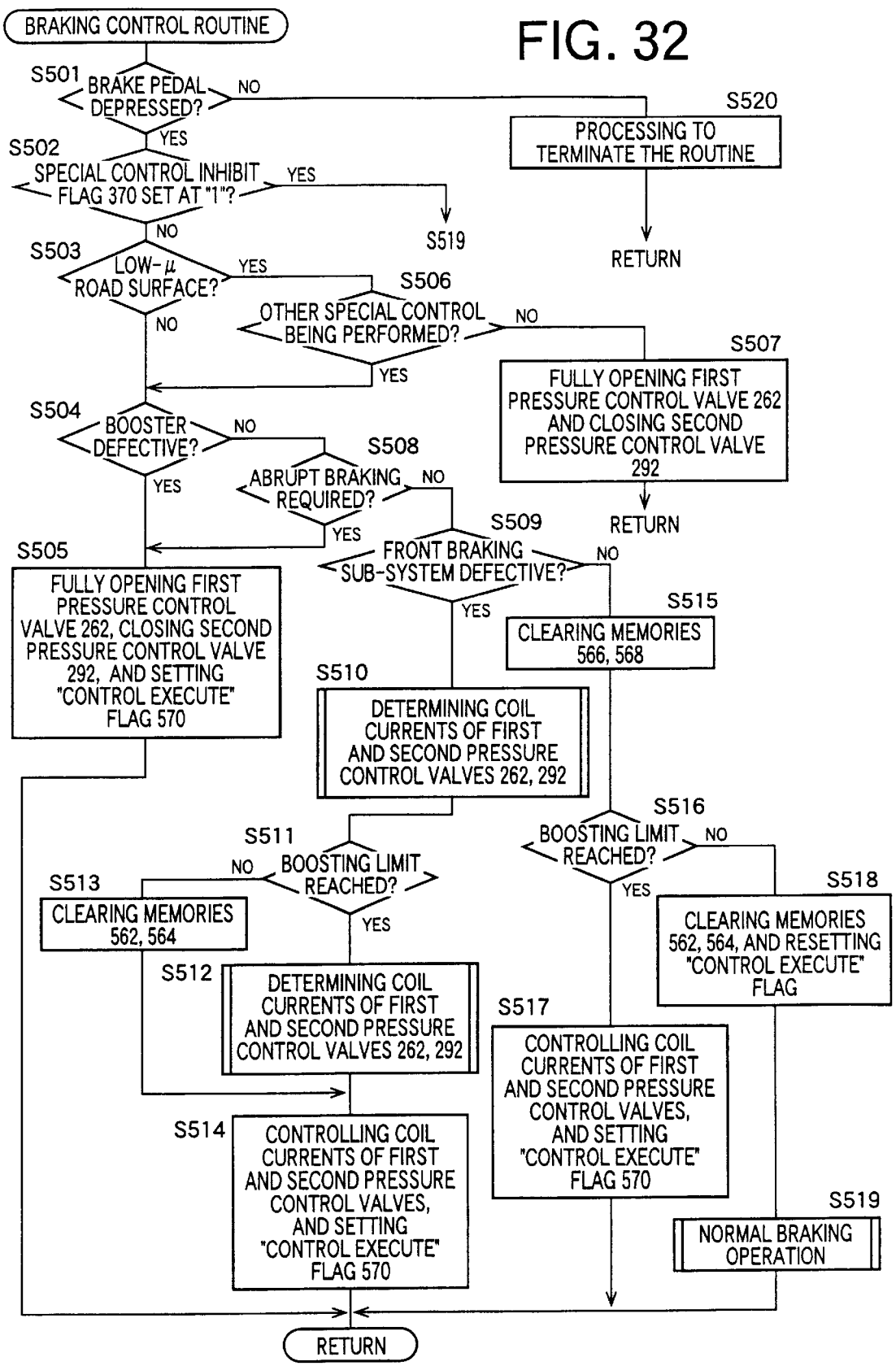
FIG. 32 is a flow chart illustrating a braking control routine executed according to a control program stored in a ROM of a computer of an electronic control unit of a braking pressure source device according to a yet further embodiment of this invention.

The braking control routine of FIG. 32 is initiated with step S501 to determine whether the brake pedal 42 is in operation. If an affirmative decision (YES) is obtained in step S501, the control flow goes to step S502 to determine whether the SPECIAL CONTROL INHIBIT flag 370 is set at "1". As described above, the flag 370 is set to "1" when the valve member 272 of the second pressure control valve 292 is stuck in the open state while the first pressure control valve 262 is normal. In this case, the special controls in steps S507, S505, S514 and S517 are inhibited. If a negative decision (NO) is obtained in step S502, the control flow goes to step S503 to determine whether the friction coefficient of the road surface is lower than the predetermined threshold. This step S503 is the same as the step S303 in the braking control routine of FIG. 23. If an affirmative decision (YES) is obtained in step S503, the control flow goes to step S506 to determine whether any one of the special controls in steps S505, S514 and S517 is performed utilizing a back pressure in the back-pressure chamber 208, as a result of determination that the booster 150 is defective, that an abrupt brake application to the vehicle is required, that the front braking sub-system is defective, or that the boosting limit of the booster 150 has been reached. The determination in step S506 is effected by determining whether the CONTROL EXECUTE flag 570 is set at "1". This flag 570 is set to "1" when the special control has been initiated in step S505, S514 or S516 with the fluid communication between the first pressurizing chamber 206 and the back-pressure chamber 208. If the flag 570 is not set at "1", a negative decision (NO) is obtained in step S506, and the control flow goes to step S507 to effect the special control appropriate for controlling the master cylinder pressure so as to meet the relatively low friction coefficient of the road surface. Namely, the amounts of electric current to be determined to the two pressure control valves 262, 292 are zeroed to fully open the first valve 262 and fully close the second valve 292. Where the low friction coefficient of the road surface is detected before detection of any one of the other states indicated above (that is, a defect of the booster 150 or the front braking sub-system, an abrupt brake application and the boosting limit of the booster 150), steps S501–S503, S506and S507 are repeatedly implemented to continue the special control in step S507 until the friction coefficient of the road surface remains lower than the threshold. In this case, therefore, the other special controls in steps S505, S514, S517 will not be performed even if the other states are subsequently detected.

If the friction coefficient of the road surface is not lower than the threshold, or if the CONTROL EXECUTE flag 570 is set at "1" while the friction coefficient is lower than the threshold, a negative decision (NO) is obtained in step S503, or an affirmative decision (YES) is obtained in step S506, and the control flow goes to step S504 to determine whether the booster 150 is defective. This determination is effected by determining whether the BOOSTER DEFECT flag 360 is set at "1". If an affirmative decision (YES) is obtained in step S504, the control flow goes to step S505 to effect the special control wherein the first pressure control valve 262 is fully opened while the second pressure control valve 292 is fully closed, and the CONTROL EXECUTE flag 570 is set to "1". If a negative decision (NO) is obtained in step S504, the control flow goes to step S508 to determine whether an abrupt brake application to the vehicle is currently required. This determination is effected by determining whether the ABRUPT BRAKING flag 390 is set at "1". If an affirmative decision (YES) is obtained in step S508, the control flow goes to step S505 to effect the special control described above.

If the abrupt brake application to the vehicle is not required, a negative decision (NO) is obtained in step S508, and the control flow goes to step S509 to determine whether the front braking sub-system is defective. This determination is effected by determining whether the FRONT BRAKE DEFECT flag 362 is set at "1". If an affirmative decision (YES) is obtained in step S509, the control flow goes to step S510 to determine the amounts of electric current to be applied to the first and second pressure control valves 262, 292, and store the determined amounts of electric current in the respective FRONT BRAKE DEFECT FIRST VALVE COIL CURRENT memory 566 and the FRONT BRAKE DEFECT SECOND VALVE COIL CURRENT memory 568. In step S510, the amounts of electric current are determined in the same manner as in steps S8–S10 of FIG. 5. Step S510 is followed by step S511 to determine whether the boosting limit of the booster 150 has been reached. This determination is effected by determining whether the BOOSTING LIMIT flag 420 is set at "1". If the boosting limit has been reached, an affirmative decision (YES) is obtained in step S511, and the control flow goes to step S512 to determine the amounts of electric current to be applied to the valves 262, 292, and store the determined amounts of electric current in the respective BOOSTING LIMIT FIRST VALVE COIL CURRENT memory 562 and BOOSTING LIMIT SECOND VALVE COIL CURRENT memory 564. The brake operating force transmitting device 40, 150 provided in the present braking system does not include a boosting ratio changing portion as provided in the braking system of FIG. 24. However, the brake operating device 40 may include such a boosting ratio changing portion. In the absence of the boosting ratio changing portion, the boosting ratio of the operating force of the brake pedal 42 is held constant over the entire range of the operating stroke. Accordingly, the relationship between the brake operating force and the booster input force is held constant irrespective of a change in the brake operating stroke. In the present fifth embodiment, therefore, the detection of the boosting limit of the booster 150 and the determination of the amounts of electric current to be applied to the valves 262, 292 are effected as in the fourth embodiment of FIGS. 24–31, but by replacing the booster input force used in the fourth embodiment with the brake operating force.

Step S512 is followed by step S514 to effect the special control to determine the amounts of electric current to be applied to the valves 262, 292, apply the determined amounts of electric current to the valves 262, 292, and set the CONTROL EXECUTE flag 570 to "1". At this point of time, one set of the electric current amounts for the two valves 262, 292 is stored in the memories 566, 568 as a result of detection of a defect the front braking sub-system, and another set of the electric current amounts is stored in the memories 562, 564 as a result of determination that the boosting limit of the booster 150 has been reached. Step S514 is formulated to select one of the two electric current amounts for each of the valves 262, 292, which one amount causes a higher back pressure to be generated in the back-pressure chamber 208, and control the valves 262, 292 according to the selected amounts of electric current. The application of the thus selected electric current amounts to the valves 262, 292 causes the master cylinder pressure to be controlled to a higher level for applying an abrupt brake application to the vehicle as desired by the vehicle operator. Described in detail, the amount of electric current to be applied to the second pressure control valve 292 is zeroed, while a smaller one of the stored electric current amounts is selected for the first pressure control valve 262, when it is required to increase the master cylinder pressure. When it is required to reduce the master cylinder pressure, the electric current amount for the first pressure control valve 262 is maximized, while a smaller one of the stored electric current amounts is selected for the second pressure control valve 292.

Where the front braking sub-system is found defective but the boosting limit of the booster 150 has not been found, the affirmative decision (YES) is obtained in step S509 and the step S510 is implemented, but a negative decision (NO) is obtained in step S511, so that the control flow goes to step S513 to clear the BOOSTING LIMIT COIL CURRENT memories 562, 564, in order to prevent the electric current amounts stored in the memories 562, 564 when the boosting limit was once reached, from being used in step S514 for the valves 262, 292 after the brake operating force is subsequently reduced below a value corresponding to the boosting limit. In this sense, step S513 is considered to be a step of storing in the memories 562, 564 data indicating that the use of the electric current amounts stored in the memories 562, 564 is inhibited. Step S513 is followed by step S514. In this case, the electric current amounts stored in the FRONT BRAKE DEFECT COIL CURRENT memories 566, 568 (in step S510) are selected, and the valves 262, 292 are controlled according to these selected current amounts.

When the front braking sub-system is not defective, a negative decision (NO) is obtained in step S515 to clear the memories 566, 568, in order to prevent the electric current amounts stored in the memories 566, 568 when a defect of the front braking sub-system was detected, from being used in step S514 for the valves 262, 292 after the defect of the front braking sub-system is eliminated for some reason or other. Step S515 is followed by step S516 to determine whether the boosting limit of the booster 150 has been reached. If an affirmative decision (YES) is obtained in step S516, the control flow goes to step S517 to effect the special control to determine the amounts of electric current for the valves 262, 292, control these valves according to the determined electric current amounts, and set the CONTROL flag 570 to "1". In this case wherein the boosting limit has been reached, without detection of a defect of the front braking sub-system, the electric current amounts for the valves 262, 292 are determined so that the master cylinder pressure after the boosting limit has been reached is increased at the same rate as before the boosting limit has been reached. If a negative decision (NO) is obtained in step S516, the control flow goes to step S518 to clear the memories 562 564 and resets the CONTROL EXECUTE flag 570 to "0". Step S518 is followed by step S519 to control the first and second control valves 262, 292 in the normal braking mode, without generation of a back pressure in the back-pressure chamber 208, as in steps S11–S14. The CONTROL EXECUTE flag 570 is reset to "0" also in step S520 which is implemented to effect the processing to terminate the braking control routine when the brake pedal 42 is returned to the non-operated position.

Step S513, which is implemented where the front braking sub-system is defective without detection that the boosting limit of the booster 150 has been reached, may be modified to apply to the first and second pressure control valves 262, 292 the amounts of electric current which were stored in step S519 in the FRONT BRAKE DEFECT COIL CURRENT memories 566, 568 upon detection of the defect of the front braking sub-system. In this case, one cycle of execution of the braking control routine is terminated with step S513.

Where the booster 150 is defective or where an abrupt brake application is required, the first pressurizing chamber 206 and the back-pressure chamber 208 are communicated with each other to reduce the effective diameters of the first and second pressurizing pistons 202, 204 to the diameter of the piston rod 220. The master cylinder pressure to be established by this reduction of the effective diameters of the pistons 202, 204 by the fluid communication between the chambers 206, 208 is higher than the master cylinder pressure which should be obtained when the front braking sub-system is defective or after the boosting limit of the booster 150 has been reached. Therefore, it is not necessary to determine the amounts of electric current upon detection of a defect of the front braking sub-system or detection of the boosting limit, while the booster 150 is defective or an abrupt brake application is required. For this reason, the determination in step S504 as to whether the booster 150 is defective and the determination in step S508 as to whether the abrupt brake application is required are effected before the determination in step S509 as to whether the front braking sub-system is defective and the determination in steps S511 and S516 as to whether the boosting limit of the booster 150 has been reached, and the determinations in step S509, S511 and S516 and the determinations of the electric current amounts in the following steps S510, S514, S517 are not effected if a defect of the booster 150 or a requirement for an abrupt brake application is detected.

It is also noted that the special control in step S507 is not performed even when the friction coefficient of the road surface is found lower than the threshold, if the special control in step S505 with generation of a back pressure in the back-pressure chamber 208 is performed as a result of detection that the abrupt brake application is required. In this event, the vehicle operator is expected to manipulate the brake pedal 42 for controlling the master cylinder pressure so as to meet the relatively low friction coefficient of the road surface. However, steps S505, S514 and S517 may be modified to reduce the master cylinder pressure if the friction coefficient of the road surface is detected to be lower than the threshold while those steps S505, S514, S517 are implemented. For instance, the first pressure control valve 262 is fully closed, and the amount of electric current to be applied to the second pressure control valve 292 is gradually increased to gradually open the valve 292 for gradually reducing the back pressure, or is rapidly maximized to fully open the valve 292 to rapidly reduce the back pressure.

Figure 34:
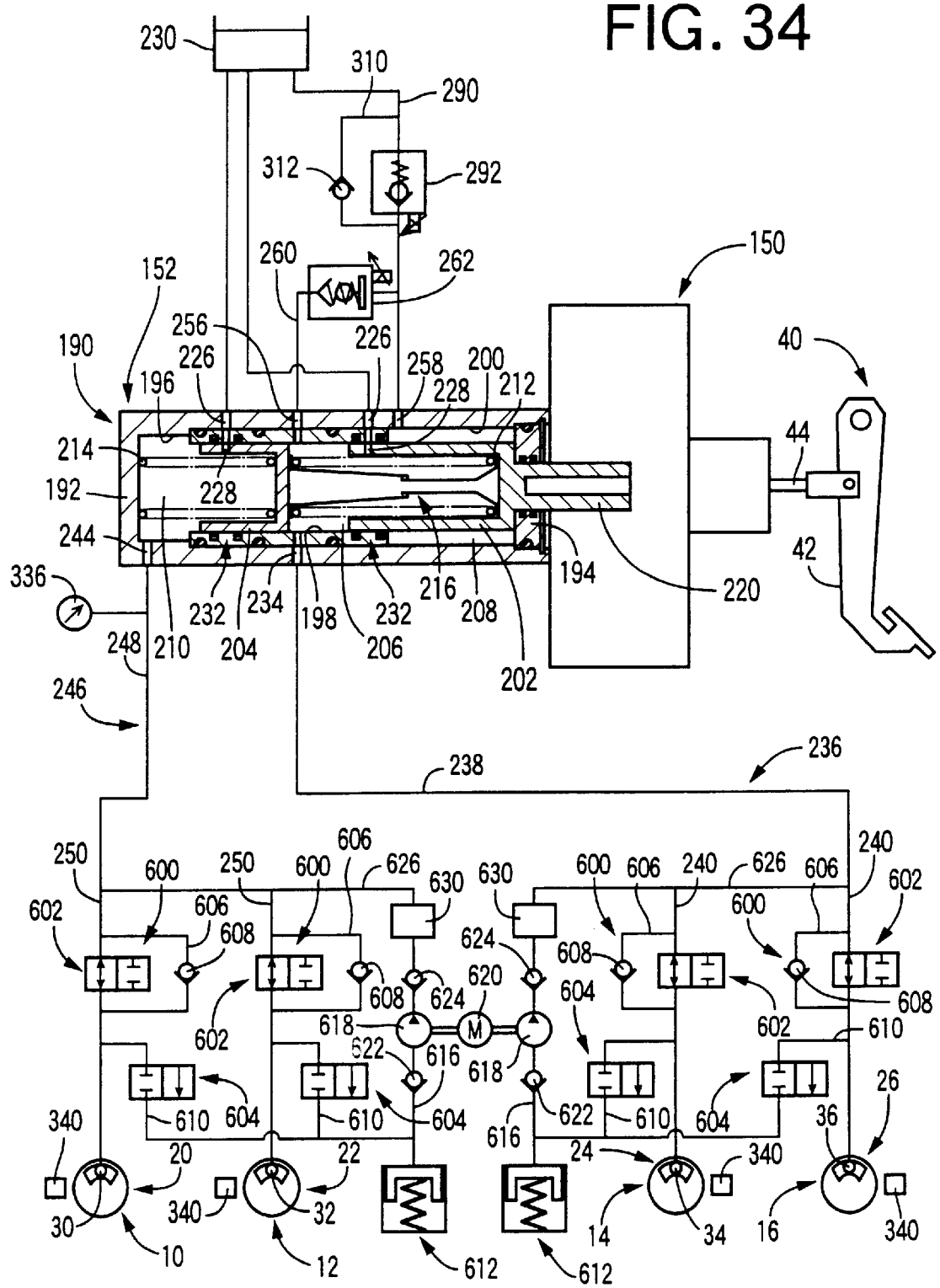
FIG. 34 is a schematic view of a hydraulic braking system including a braking pressure source device according to another embodiment of this invention.
Figure 35:
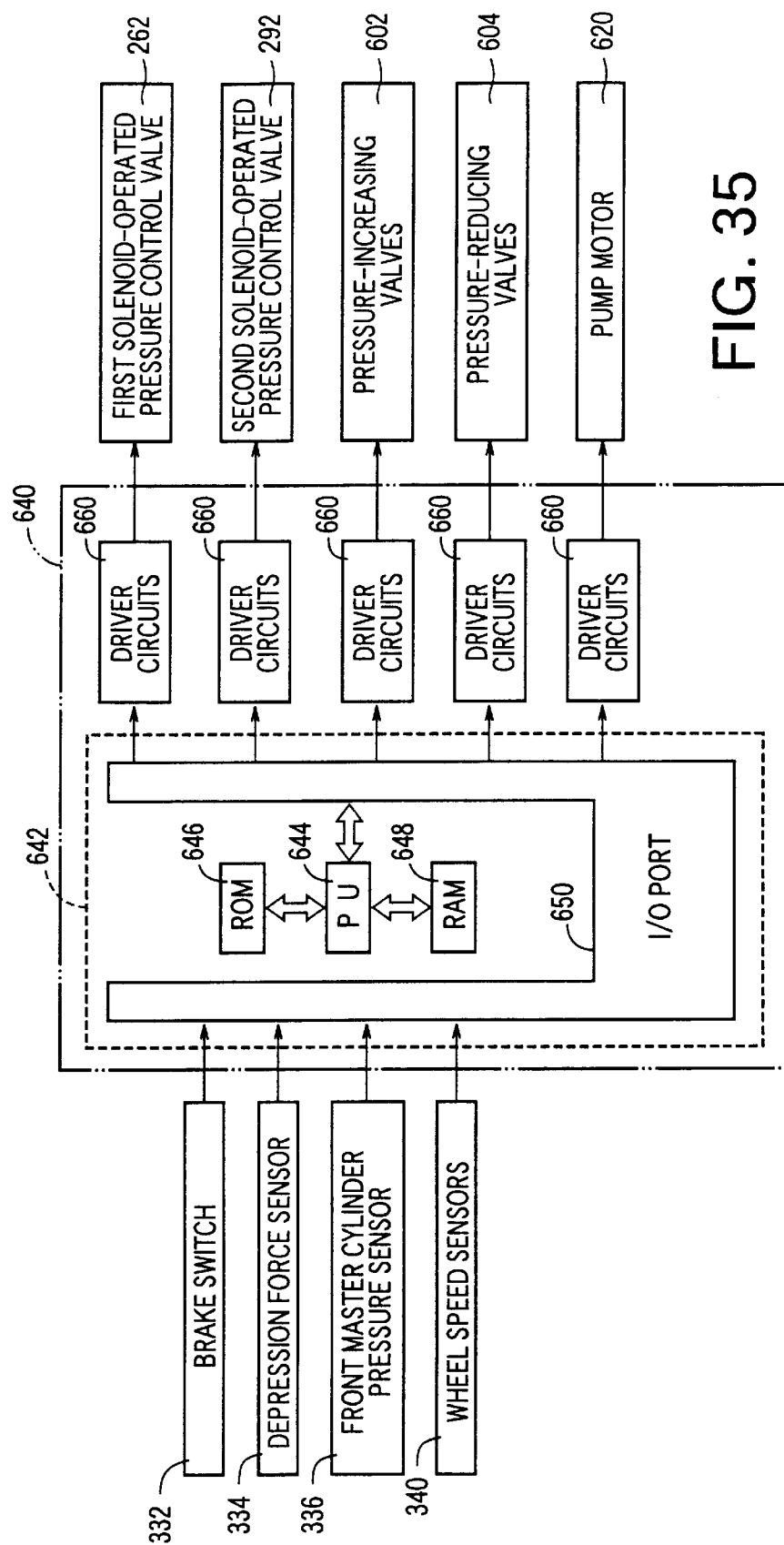
FIG. 35 is a block diagram schematically showing an arrangement of an electronic control unit of the hydraulic braking system of FIG. 34.

Referring next to FIGS. 34–37, there will be described a braking system including a braking pressure source device constructed according to a sixth embodiment of this invention. The present braking system is arranged to effect the fluid communication between the first pressurizing chamber 206 and the back-pressure chamber 208 for reducing the effective diameters of the pistons 202, 204, when an anti-lock braking pressure control is initiated for the front wheels 10, 12. In FIGS. 34 and 35, the same reference signs used in the preceding embodiments will be used to identify the corresponding elements, which will not be described.

In the present braking system, a braking pressure control device 600 in the form of a pressure control valve device is provided for each of the front wheel brake cylinders 30, 32 and the rear wheel brake cylinders 34, 36. Since the four braking pressure control devices 600 have the same construction, the braking pressure control device 600 for the brake cylinder 30 for the front left wheel 10 will be described by way of example.

The braking pressure control device 600 includes a pressure-increasing valve 602 in the form of a normally open solenoid-operated shut-off valve, and a pressure-reducing valve 604 in the form of a normally closed solenoid-operated shut-off valve. The pressure-increasing valve 602 is provided in the branch passage 250, and when placed in its open state, permits the pressurized fluid to be delivered from the master cylinder 152 to the front wheel brake cylinder 30, for increasing the fluid pressure in this front wheel brake cylinder 30. A by-pass passage 606 is connected to the branch passage 250, so as to by-pass the pressure-increasing valve 602, and a check valve 608 is provided in the by-pass passage 606. A reservoir passage 610 is connected at its one end to a portion of the branch passage 250 between the pressure-increasing valve 602 and the front wheel brake cylinder 30, and at the other end to a pressure-reducing reservoir 612. The pressure-reducing valve 604 is provided in the pressure-reducing passage 610, and when placed in the open state, permits the pressurized fluid to be discharged from the front wheel brake cylinder 30 into the pressure-reducing reservoir 612, for reducing the fluid pressure in the front wheel brake cylinder 30.

The pressure-reducing reservoir 612 is connected through a pump passage 616 to the suction side of a pump 618. The pump 618 is driven by a pump motor 620. A suction valve 622 in the form of a check valve is provided in the pump passage 616 connected to the suction side of the pump 618, while a discharge valve 624 in the form of a check valve is provided in an auxiliary fluid passage 626 connected to the delivery side of the pump 618. The auxiliary fluid passage 626 which is connected at its one end to the delivery side of the pump 618 is connected at the other end to the primary fluid passage 246. A fixed damper 630 is provided in the auxiliary fluid passage 626, for reducing pressure pulsation of the pressurized fluid delivered from the pump 618.

In the present braking system, the front brakes 20, 22 and the rear brakes 24, 26 are all disc brakes, and the front brakes 20, 22 have a higher degree of rigidity than the rear brakes 24, 26. Further, the rear wheel brake cylinders 34, 36 have a smaller diameter than that of the front wheel brake cylinders 30, 32, so that the front wheels 10, 12 have a higher ratio of distribution of the braking force than the rear wheels 14, 16, for the reason which will be described.

The present braking system includes an electronic control unit (ECU) 640, as shown in FIG. 35. The ECU 640 is principally constituted by a computer 642, which incorporates a processing unit (PU) 644, a read-only memory (ROM) 646, a random-access memory (RAM) 648, and an input/output port (I/O port) 650. The computer 642 is received output signals of various sensors and switches including the brake switch 332, depression force sensor 334, front master cylinder pressure sensor 336 and wheel speed sensors 340. The computer 642 is adapted to control the first and second pressure control valves 262, 292, pressure-increasing and pressure-reducing valves 602, 604 and pump motor 620 through respective driver circuits 660. The ROM 646 of the computer 642 stores various control programs including control programs for executing a main control routine and an anti-lock braking pressure control routine (which are not shown), and a braking control routine illustrated in the flow chart of FIG. 36. The RAM 648 includes a FRONT LEFT WHEEL ANTI-LOCK CONTROL START flag 670, a FRONT RIGHT WHEEL ANTI-LOCK CONTROL START flag 672, as well as the above-indicated RUNNING INHIBIT flag 366 and SPECIAL CONTROL INHIBIT flag 370, and the working memory.

The anti-lock braking pressure control is well known in the art, and a detailed description of this control is deemed unnecessary. Briefly described, the anti-lock braking pressure control is effected according to the above-indicated anti-lock braking pressure control routine which is initiated when the front left wheel 10 being braked has an excessive slipping tendency due to a fluid pressure in the corresponding wheel brake cylinder 30 which is excessively high with respect to the friction coefficient of the road surface. During the anti-lock braking pressure control, the fluid pressure in the wheel brake cylinder 30 is controlled by selectively placing the brake cylinder pressure control device 600 in one of a pressure-increasing state, a pressure-holding state and a pressure-reducing state, depending upon the rotating speed of the wheel 10 and the vehicle running speed which are monitored on the basis of the wheel speed sensors 340. In the pressure-increasing state, the pressure-increasing valve 602 is placed in the open state while the pressure-reducing valve 604 is placed in the closed state. In the pressure-holding state, the pressure-increasing and pressure-reducing valves 60, 604 are both placed in the closed state. In the pressure-reducing state, the pressure-increasing valve 602 is placed in the closed state while the pressure-reducing valve 604 is placed in the open state. During the anti-lock braking pressure control, the pump 618 is kept operated to pressurize the fluid received from the pressure-reducing reservoir 612, so that the thus pressurized fluid can be used as needed for increasing the fluid pressure in the wheel brake cylinders 30–36. In the present braking system, the FRONT LEFT WHEEL ANTI-LOCK CONTROL START flag 670 is set to "1" when the anti-lock braking pressure control is initiated for the front left wheel 10, and the FRONT RIGHT WHEEL ANTI-LOCK WHEEL ANTI-LOCK CONTROL START flag 672 is set to "1" when the anti-lock braking pressure control is initiated for the front right wheel 12. However, the RAM 648 may include four anti-lock control start flags which are set to "1" when the anti-lock braking pressure control is initiated for the respective wheels 10–16.

The braking control routine of FIG. 36 will be described.

The braking control routine is initiated with step S601 to determine whether the brake pedal 42 is in operation. If an affirmative decision (YES) is obtained in step S601, the control flow goes to step S602 to determine whether the SPECIAL CONTROL INHIBIT flag 370 is set at "1". As in the preceding embodiments, this flag 370 is set to "1" when the valve member 272 of the second pressure control valve 292 is stuck in the open state while the first pressure control valve 262 is normal. If a negative decision (NO) is obtained in step S602, the control flow goes to step S603 to determine whether the anti-lock braking pressure control has been initiated for at least one of the front wheels 10, 12. This determination is effected by determining whether at least one of the FRONT LEFT WHEEL ANTI-LOCK CONTROL START flag 648 and the FRONT RIGHT WHEEL ANTI-LOCK CONTROL START flag 674 is set at "1". If the anti-lock braking pressure control is performed for neither of the front wheels 10, 12, and a negative decision (NO) is obtained in step S603, and the control flow goes to steps S605–S607 to control the first an second pressure control valves 262, 292 in the normal braking mode.

If an affirmative decision (YES) is obtained in step S603, the control flow goes to step S604 to zero the amounts of electric current to be applied to the first and second pressure control valves 262, 292, to fully open the first valve 262 and fully close the second valve 292, so that the first pressurizing chamber 206 and the back-pressure chamber 208 are communicated with each other to reduce the effective diameters of the first and second pressurizing pistons 202, 204. As a result, the master cylinder pressure is increased and reduced as needed, while the chambers 206 and 208 are held in communication with each other.

Where the anti-lock braking pressure control is performed for both of the front left and right wheels 10, 12, the two pressure-increasing valves 602 for the two front wheels 10, 12 are closed to hold or reduce the fluid pressures in the wheel brake cylinders 30, 32. In this case, the fluid pressurized in the second pressurizing chamber 210 is not delivered to the front wheel brake cylinders 30, 32, so that the second pressurizing piston 204 is not advanced, and only the fluid pressure in the first pressurizing chamber 206 is increased by an advancing movement of the first pressurizing piston 202. When the brake cylinder pressure control devices 600 of the front wheel brakes 10, 12 are placed in the pressure-reducing state, therefore, the fluid pressures in the front wheel brake cylinders 30, 32 are reduced, while the fluid pressure in the rear wheel brake cylinders 34, 36 are increased, owing to the reduction of the effective diameter of the piston 202, to a level higher than the level which is to be established when the effective diameter of the piston 202 is not reduced. Accordingly, the total vehicle braking force is made larger by the special control in step S604, than where this special control is not effected. Further, the rate of increase of the master cylinder pressure with an increase in the operating stroke of the brake pedal 42 is reduced, so that the control of the master cylinder pressure can be facilitated. If the fluid pressure in the rear wheel brake cylinders 34, 36 becomes excessively high with respect to the friction coefficient of the road surface, as a result of the increase owing to the reduction of the effective diameter of the first pressurizing piston 202, the anti-lock braking pressure control is initiated for the rear wheels 14, 16. In this case, the anti-lock braking pressure control for the rear wheels 14, 16 is initiated at a larger operating stroke of the brake pedal 42 than when the anti-lock braking pressure control was initiated for the front wheels 10, 12.

In the present braking system wherein the brakes 20–24 are all disc brakes, and the front brakes 20, 22 have a higher degree of rigidity than the rear brakes 24, 26, the front wheel brake cylinders 30, 34 have a larger diameter and a higher ratio of distribution of the braking force than the rear wheel brake cylinders 34, 36. In this arrangement, the anti-lock braking pressure control is initiated when the operating stroke of the brake pedal 42 is relatively small, and the vehicle can be braked with a sufficiently large total braking force during the anti-lock braking pressure control while minimizing an increase in the operating stroke of the brake 42. Since the rigidity of the calipers of the front brakes 20, 22 is higher than that of the rear brakes 24, 26, the front brakes 20, 22 are able to efficiently generate a braking force based on the fluid pressure applied to the wheel brake cylinders 30, 32. Namely, most of the force based on the applied fluid pressure is used to force the friction members of the front brakes 20, 22 against the disc rotors, with a reduced amount of consumption of that force by deformation of the calipers. Further, the front wheel brake cylinders 30, 32 having a relatively large diameter are able to generate a sufficiently large braking force. Although the rear brakes 24, 26 have a lower degree of rigidity than the front brakes 20, 22, the amount of the pressurized fluid not used by the rear wheel brake cylinders 34, 36 for generating a braking force is comparatively small, since a comparatively small amount of the pressurized fluid can be supplied to the rear wheel brake cylinders 34, 36 having a smaller diameter than the front wheel brake cylinders 30, 32, even when the ratio of the fluid amount not used for generating the braking force with respect to the entire amount of the fluid supplied to the rear wheel brake cylinders 34, 36 is relatively high. Accordingly, the required operating stroke of the brake pedal 42 can be reduced.

When the anti-lock braking pressure control is effected for the front wheel 10, 12, the fluid pressure in the first pressurizing chamber 206 is increased owing to the reduction of the effective diameter of the first pressurizing piston 202 by fluid communication of the first pressurizing chamber 206 with the back-up chamber 208, so that the vehicle can be braked with a sufficiently large braking force by the rear wheel brake cylinders 34, 36 having a relatively small diameter, with a relatively small operating stroke of the brake pedal 42.

It will be understood from the foregoing description of the sixth embodiment that a portion of the ECU 640 assigned to implement step S603 constitutes an anti-lock control detecting portion operable to determine whether the anti-lock braking pressure control has been initiated for the front wheel 10, 12, while a portion of the ECU 640 assigned to implement step S604 constitutes a fifth communication control portion operable upon detection of the initiation of the anti-lock braking pressure control, to control the communication between the chambers 106, 208.

Figure 38:
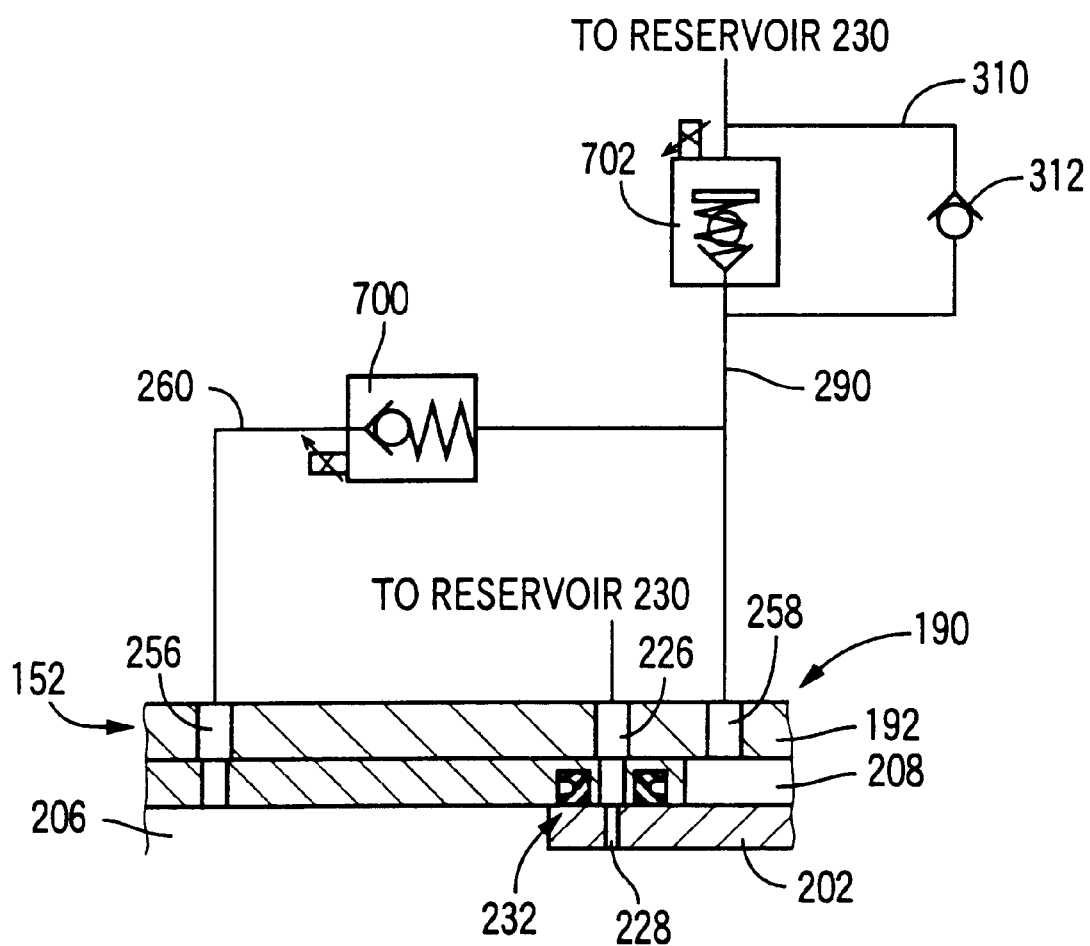
FIG. 38 is a view showing a first and a second solenoid-operated pressure control valve provided in a braking pressure source device according to a further embodiment of the present invention.

In the preceding embodiments, the first solenoid-operated pressure control valve 262 is a normally open valve, while the second solenoid-operated pressure control valve 292 is a normally closed valve. However, the braking system may use a normally closed first solenoid-operated pressure control valve 700 and a normally open second solenoid-operated pressure control valve 702, as shown in FIG. 38. The first pressure control valve 700 has the same construction as the second pressure control valve 292. The set load of the spring 294 of the valve 700 is determined so that the valve 700 is held in the closed state even when the master cylinder pressure is generated in the first pressurizing chamber 206 in the normal braking mode. The second pressure control valve 702 has the same construction as the first pressure control valve 262. The set load of the spring 276 of the valve 702 is determined to be relative small, so that the valve member 272 is held apart from the valve seat 270.

The first and second pressure control valves 700, 702 are controlled to increase and reduce the master cylinder pressure in the same manner as described with respect to the preceding embodiments (in particular, the fifth embodiment of FIG. 32), upon detection of: a defect of the booster 150; a requirement of an abrupt brake application to the vehicle; a road surface having a friction coefficient lower than the threshold; the boosting limit of the booster 150; a defect of the front braking sub-system; and initiation of an anti-lock braking pressure control. That is, the valves 700, 702 are controlled to effect the special controls as described above, such that the master cylinder pressure is increased owing to the fluid communication between the first pressurizing chamber 206 and the back-pressure chamber 208. In the present seventh embodiment of FIG. 38, the first pressure control valve 700 is fully opened by maximizing the amount of electric current applied thereto and is fully closed by zeroing the amount of electric current, while the second pressure control valve 702 is fully opened by zeroing the amount of electric current applied thereto and is fully closed by maximizing the amount of electric current. The back pressure in the back-pressure chamber 208 can be increased or reduced by controlling the amounts of electric current applied to the valves 700, 702.

The first and second pressure control valves 700, 702 are diagnosed for any defects thereof, in the same manner as described above with the first and second pressure control valves 262, 292, by reference to FIG. 17. The diagnosis in the present embodiment is illustrated in the tables of FIGS. 39A–39D, which indicate whether the wheel brake cylinders 30–36 can be increased and reduced, in normal braking mode, and upon detection of a defect of the booster and a defect of the front braking sub-system, in relation to various combinations of defects of the first and second pressure control valves 700, 702 which are detected in the diagnostic routine. It will be understood from the tables that the vehicle running is inhibited where the two pressure control valves 700, 702 are both stuck in the closed state or in the open state, and that the special controls with the fluid communication between the chambers 206, 208 are inhibited where the second pressure control valve 702 is stuck in the open state while the first pressure control valve 700 is normal, since the opening of the first valve 700 will cause the pressurized fluid to be discharged from the first pressurizing chamber 206 to the reservoir 230 through the second valve 702 stuck in the open state, with a result of reduction of the master cylinder pressure. The present embodiment is similar to the first embodiment in the inhibition of the vehicle running and the special controls. However, the present embodiment wherein the first pressure control valve 700 is a normally closed valve is different from the first embodiment, in that the master cylinder pressure can be reduced even where the second valve 702 is stuck in the closed state, by fully opening the first valve 700 by maximizing the amount of electric current applied thereto. For this reason, the set load of the spring 276 of the first valve 700 need not be large enough to deal with the defect of the second valve 702 that its valve member 272 is stuck in the closed state. Where the electric power source is defective, the first valve 700 is placed in the closed state while the second valve 702 is placed in the open state, so that the master cylinder pressure can be increased and reduced.

Irrespective of whether (a) the first and second pressure control valves are normally open and closed valves, respectively (embodiment of FIGS. 17A–17D), or (b) the first and second pressure control valves are normally closed and open valves, respectively (embodiment of FIGS. 39A–39D), the valve members of the normally open and closed valves are comparatively easily stuck in the open state, and the valve member of the normally closed valve is comparatively easily stuck in the closed state, but the normally open valve is less likely to be stuck in the closed state. Therefore, if at least one of the first and second pressure control valves has one of the above-indicated two defects which are comparatively easily encountered (while the valve member of the normally open valve is not stuck in the closed state), the special controls and the vehicle running are inhibited in only one case in both of the above arrangements (a) and (b). It is also noted that where the electric power source is defective, the normal braking operation is possible in both of the arrangements (a) and (b). In the arrangement (a), however, the set load of the spring of the normally open valve must be made large enough to deal with the defect of the normally closed valve.

In all of the preceding embodiments, the first and second control valve devices provided in the communication passage 260 and the connecting passage 290 are principally constituted by the respective first and second solenoid-operated pressure control valves 262, 292, 700, 702 which are arranged to control the fluid pressure difference on their opposite sides. However, at least one of these first and second solenoid-operated pressure control valves may be a solenoid-operated shut-off valve.

Figure 40:
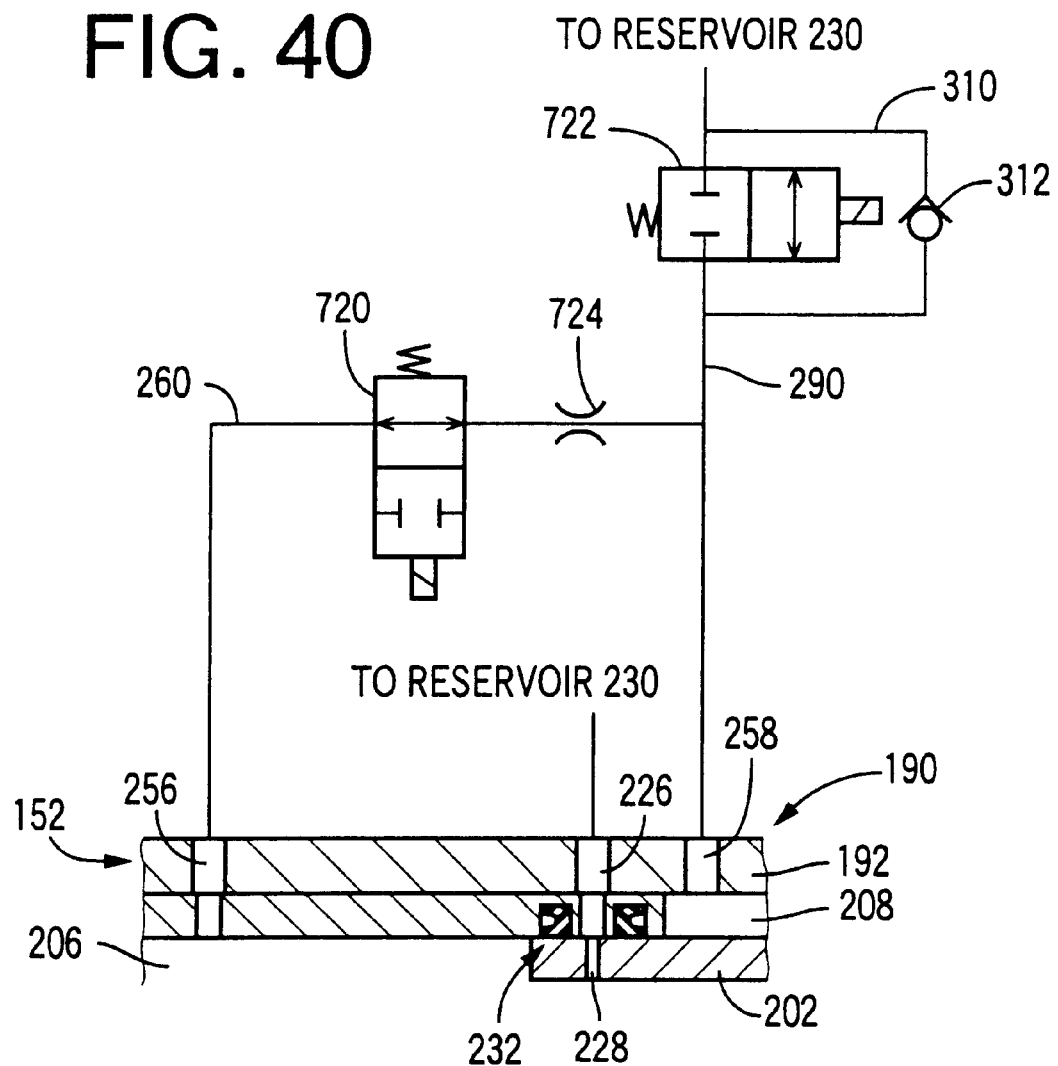
FIG. 40 is a view showing a first and a second control valve device of a braking pressure source device according to a still further embodiment of this invention.

For example, a normally open first solenoid-operated shut-off valve 720 is provided in the communication passage 260, while a normally closed second solenoid-operated shut-off valve 722 is provided in the connecting passage 290, as shown in FIG. 40. In this eighth embodiment, the first shut-off valve 720 is opened for fluid communication between the first pressurizing chamber 206 and the back-pressure chamber 208, when it is required to increase the master cylinder pressure upon detection of a defect of the booster 150. In the present embodiment, it is preferable to provide flow restricting means in the form of an orifice 724 in the communication passage 260. The orifice 724 is disposed between the first shut-off valve 720 and the back-pressure chamber 208, to prevent a rapid flow of the pressurizing fluid from the first pressurizing chamber 206 to the back-pressure chamber 208 when the first shut-off valve 720 is opened. When it is required to increase or reduce the fluid pressure in the back-pressure chamber 208, the amounts of electric current to be applied to the first and second shut-off valves 720, 722 are duty-controlled. It will be understood that the first shut-off valve 720 and the orifice 724 constitute a first control valve device.

The eighth embodiment of FIG. 40 may be modified such that the first solenoid-operated shut-off valve is a normally closed valve while the second solenoid0-operated shut-off valve is a normally open valve. Further, the braking system may be arranged such that one of the first and second control valve devices is principally constituted by a solenoid-operated pressure control valve, and the other of the first and second control valve devices is principally constituted by a solenoid-operated shut-off valve.

Figure 41:
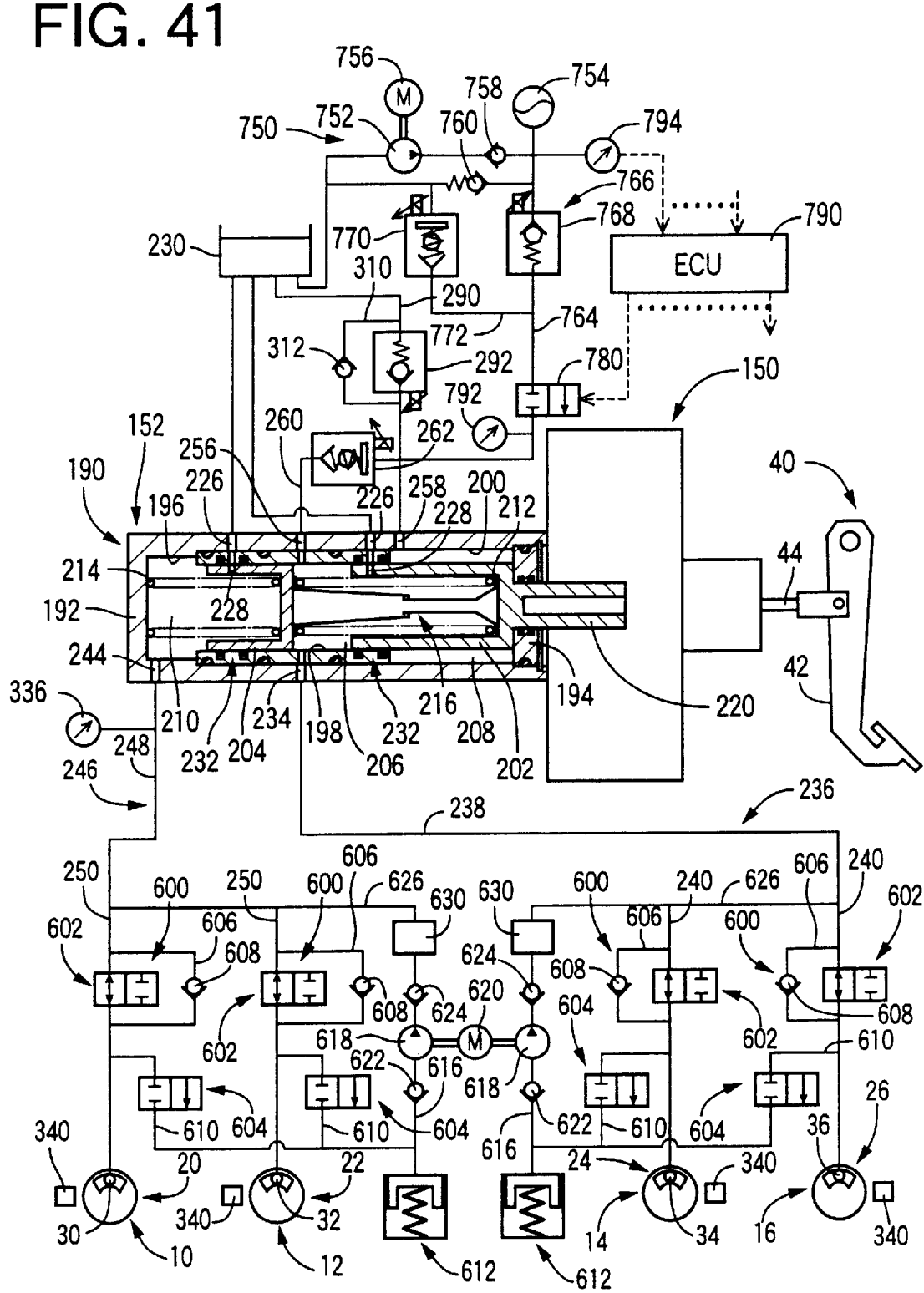
FIG. 41 is a schematic view showing a hydraulically operated braking system including a braking pressure source device according to a yet further embodiment of this invention.
Figure 42:
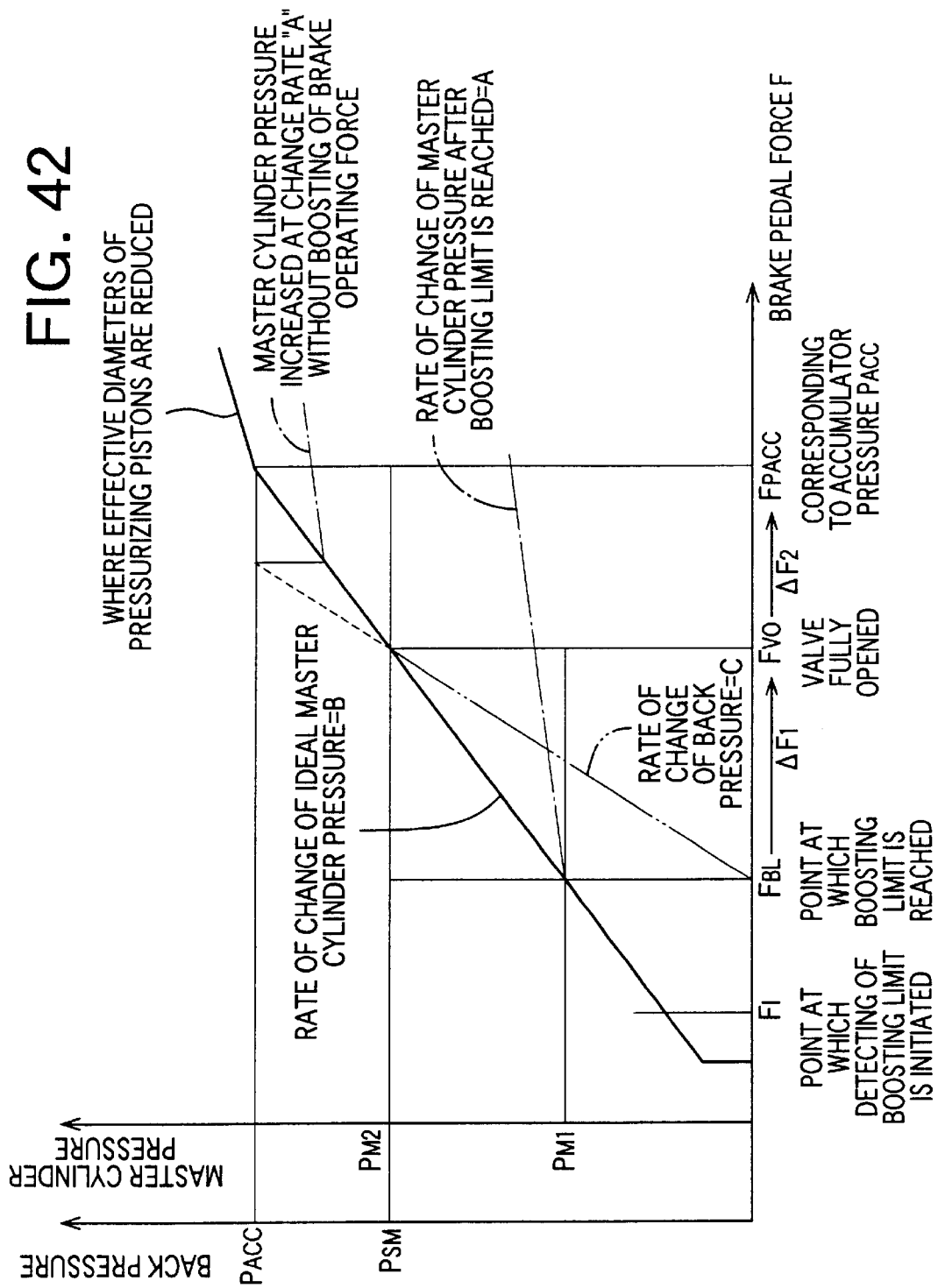
FIG. 42 is a graph for explaining a control to increase master cylinder pressure when the boosting limit is reached, in the braking system of FIG. 41.

While the braking pressure source devices according to the preceding embodiment do not include a power-operated hydraulic pressure source, the braking pressure source device according to the present invention may include a power-operated hydraulic pressure source. An example of this braking pressure source device will be described by reference to FIGS. 41 and 42. The braking system including the braking pressure source device according to this ninth embodiment of FIGS. 41 and 42 is identical in construction with the braking system according to the sixth embodiment of FIG. 34, except that the power-operated hydraulic pressure source is provided in the ninth embodiment. The same reference signs as used in FIG. 34 are used in FIG. 42, to identify the functionally corresponding elements, which will not be described.

The power-operated hydraulic pressure source, which is indicated generally at 750, includes a pump 752 and an accumulator 754. The pump 752 may be a gear pump or a plunger pump. The pump 752 is driven by a drive or power source in the form of an electric motor 756. The pump 752 is operated to pressurize the fluid received from the reservoir 230, and the pressurized fluid delivered from the pump 752 is stored in the accumulator 754 under pressure. To the delivery side of the pump 752, there is connected a check valve 758, to prevent a flow of the delivered fluid back to the pump 752. A pressure relief valve 760 is provided between the accumulator 754 and the reservoir 230, to protect the accumulator 754 from an excessively high pressure of the pressurized fluid.

The power-operated hydraulic pressure source 750 is connected through a fluid passage 764 to the back-pressure chamber 208, and a pressure control valve device 766 is disposed between the power-operated hydraulic pressure source 750 and the back-pressure chamber 208. The pressure control valve device 766 includes a solenoid-operated pressure-increasing valve 768 and a solenoid-operated pressure-reducing valve 770. The pressure-increasing valve 768 is provided in the fluid passage 764. When this valve 768 is opened for fluid communication between the power-operated hydraulic pressure source 750 and the back-pressure chamber 208, the fluid pressure in the back-pressure chamber 208 is increased. The pressure-reducing valve 780 is provided in a reservoir passage 772 which is connected at its one end to a portion of the fluid passage 764 between the pressure-increasing valve 768 and the back-pressure chamber 208, and at the other end to the reservoir 230. When the pressure-reducing valve 770 is opened, the pressurized fluid is permitted to be discharged from the back-pressure chamber 208 to the reservoir 230, so that the fluid pressure in the back-pressure chamber 208 is reduced.

In the present ninth embodiment, the pressure-increasing valve 768 and the pressure-reducing valve 770 are both linear solenoid valves capable of continuously controlling the fluid pressure in the back-pressure chamber 208, with a change in the amount of electric current applied thereto. The pressure-increasing valve 768 is a normally closed solenoid-operated valve, while the pressure-reducing valve 770 is a normally open solenoid-operated valve. The pressure-increasing valve 768 has the same construction as the second solenoid-operated pressure control valve 292 described above, while the pressure-reducing valve 780 has the same construction as the first solenoid-operated pressure control valve 262 described above. Therefore, no detailed description of these valves 768, 770 is deemed necessary. The pressure of the pressurized fluid delivered from the pump 752 or the accumulator 754 to the back-pressure chamber 208 can be controlled by controlling the amount of electric current to be applied to the solenoid coil of the pressure-increasing valve 768. On the other hand, the fluid pressure in the back-pressure chamber 208 can be reduced under control by controlling a rate of flow of the pressurized fluid from the back-pressure chamber 208 to the reservoir 230 through the pressure-reducing valve 770, by controlling the amount of electric current to be applied to the solenoid coil of the pressure-reducing valve 770. The biasing force of the spring which biases the valve member of the pressure-reducing valve 770 in the opening direction is determined to be large enough to hold the valve member apart form the valve seat.

A normally closed solenoid-operated shut-off valve 780 is provided in a portion of the fluid passage 764 between the back-pressure chamber 208 and the pressure-increasing and pressure-reducing valves 768, 770. By opening and closing the solenoid-operated shut-off valve 780, the back-pressure chamber 208 is selectively connected to and disconnected from the power-operated hydraulic pressure source 750 and the pressure control valve device 766.

The braking system including the braking pressure source device described above is provided with an electronic control unit (ECU) 790, which is principally constituted by a computer, like the ECU 640 in the sixth embodiment. To the computer, there are connected various sensors such as a back-pressure sensor 792 for detecting the fluid pressure in the back-pressure chamber 208, an accumulator pressure sensor 794 for detecting the fluid pressure in the accumulator 754 or the delivery pressure of the pump 752, and a depression force sensor (not shown) for detecting the operating force of the brake pedal 42. The computer is arranged to control the pump motor 756, pressure-increasing valve 768, pressure-reducing valve 770 and other electrically operated devices. The ROM of the computer stores various control programs including programs for executing various control routines such as a braking control routine, a boosting limit detecting routine, an anti-lock braking pressure control routine, a traction control routine and a vehicle turning stability control routine. The PU of the computer is adapted to execute those control routines while utilizing a temporary data storage function of the RAM.

In the present ninth embodiment, the pressurized fluid is delivered from the power-operated hydraulic pressure source 750 to the back-pressure chamber 208, not only for boosting the operating force of the brake pedal 42 as described below, but also for performing automatic braking controls such as a traction control and a vehicle turning stability control. The traction control is performed to prevent an excessive slipping tendency of the drive wheels (e.g., front wheels 10, 12) during starting or acceleration of the vehicle. The vehicle turning stability control is performed to improve the vehicle running stability during turning of the vehicle. In the traction and vehicle turning controls, the pump 752 is operated to delivery the pressurized fluid from the power-operated hydraulic pressure source 750 to the back-pressure chamber 208, to advance the first and second pressurizing pistons 202, 204, for thereby pressurizing the fluid masses in the first and second pressurizing chambers 206, 210, to activate the appropriate wheel brake cylinder or cylinders with the pressurized fluid delivered from the chambers 206, 210 for operating the corresponding brake or brakes. In the traction and vehicle turning stability controls, the brake cylinder pressure control device 600 provided for each wheel brake cylinder 30, 32, 34, 36 whose fluid pressure is to be controlled for the traction control or vehicle turning stability is controlled to regulate the fluid pressure. The pressurized fluid delivered from the power-operated hydraulic pressure source 750 to the back-pressure chamber 208 can be used not only for performing the traction control and the vehicle turning stability control, but also for performing other automatic braking controls such as a control to maintain an optimum distance between the vehicle in question and a vehicle running in front of the vehicle in question, and a control to keep the vehicle running at a predetermined speed.

There will next be described the boosting of the operating force of the brake pedal 42 by delivering the pressurized fluid from the first pressurizing chamber 206 and the power-operated hydraulic pressure source 750 to the back-pressure chamber 208, when the brake pedal 42 is operated by the vehicle operator. The present braking system is adapted to deliver the pressurizing fluid from the first pressurizing chamber 206 and the power-operated hydraulic pressure source 750 to the back-pressure chamber 208 only after the boosting limit of the booster 150 has been reached. Where the vehicle braking effect (e.g., vehicle deceleration value) desired by the vehicle operator is not obtained even when the pressure of the fluid pressurized by the power-operated hydraulic pressure source 750 has been raised to the upper limit, the first pressure control valve 262 is opened to reduce the effective diameters of the first and second pressurizing pistons 202, 204, for increasing the master cylinder pressure corresponding to the brake operating force. The present braking system has a front braking sub-system and a rear braking sub-system which are operable independently of each other, and the front brakes 20, 22 have a high ratio of distribution of the braking force than the rear brakes 24, 26, and an according large braking capacity. Therefore, when the front braking sub-system is defective, for instance, the master cylinder pressure for activating the rear wheel brake cylinders 34, 36 of the normal rear brakes 24, 26 must be made higher than usual, in order to provide the operator's desired braking effect. Accordingly, the required brake operating force is larger than the upper limit that can be established in the normal braking operation. In view of this, the first pressure control valve 262 is opened to reduce the effective diameters of the pistons 202, 204 if the operator's desired braking effect cannot be obtained even when the pressure of the pressurized fluid delivered from the power-operated hydraulic power source 750 has been increased to the upper limit. The first pressure control valve 262 may be opened to reduce the effective diameters of the pistons 202, 204, also where the rear braking sub-system becomes defective, and the operator's desired braking effect corresponding to a relatively large brake operating force cannot be obtained at the maximum pressure of the fluid pressurized by the power-operated hydraulic pressure source 750.

The present ninth embodiment is similar to the preceding embodiments, in the manner of control of the first and second pressure control valves 262, 292 in the normal braking mode, while the master cylinder pressure is increased until the boosting limit of the booster 150 has been reached. In the normal braking mode, the first pressure control valve 262 and the solenoid-operated shut-off valve 780 are held in the closed state for disconnecting the back-pressure chamber 208 from both the first pressurizing chamber 206 and the power-operated hydraulic pressure source 750. The fluid is fed from the reservoir 230 into the back-pressure chamber 208 through the by-pass passage 310 and the check valve 312, and the pressurized fluid is discharged from the back-pressure chamber 208 into the reservoir 230 through the second pressure control valve 292 placed in the open state, so that the first and second pressurizing pistons 202, 204 are permitted to be advanced and retracted, permitting the brake operating force to be boosted by the booster 150, whereby the master cylinder pressure is increased as indicated by solid line in the graph of FIG. 42.

When the boosting limit of the booster 150 has been reached, the solenoid-operated shut-off valve 780 is first opened, and the pressure of the pressurized fluid delivered from the accumulator 754 to the back-pressure chamber 208 is controlled by the pressure-increasing valve 768. The fact that the boosting limit of the booster 150 has been reached can be detected in the same manner as in the fourth embodiment of FIGS. 24–31. In the present ninth embodiment, the ratio at which the operating force of the brake pedal 42 is boosted into the input force of the operating rod 44 is held constant over the entire range of the brake operating stroke, and the relationship between the brake operating force and the booster input force is held constant over the entire range of the brake operating stroke. Accordingly, the detection of the boosting limit of the booster 150 and the operations to control the amounts of electric current to be applied to the first and second pressure control valves 262, 292 and the pressure-increasing and pressure-reducing valves 768, 770 are effected on the basis of the operating force of the brake pedal 42. The pump 752 is controlled, that is, turned on and off on the basis of the fluid pressure detected by the accumulator pressure sensor 794, so that the fluid pressure in the accumulator 754 is held within a predetermined range.

The operating force value FBL at which the boosting limit of the booster 150 has been reached is stored in a boosting limit force memory provided in the RAM of the computer, and the amount of electric current I1 to be applied to the pressure-increasing valve 768 is determined on the basis of an increment ΔF1 of the brake operating force from the operating force value FBL. On the other hand, the amount of electric current to be applied to the pressure-reducing valve 770 is maximized, so that the valve 770 is placed in the closed state. The amount of electric current I1 to be applied to the pressure-increasing valve 768 while the brake operating force is increased by the increment ΔF1 after the boosting limit of the booster 150 has been reached is determined so as to generate in the back-pressure chamber 208 a back pressure PS that permits the master cylinder pressure to be increased at a rate B at which the master cylinder pressure was increased before the boosting limit was reached, as indicated in FIG. 42. The back pressure PS is obtained according to the following equation (9), and the amount of electric current I1 is obtained according to the following equation (10):

$$PS = C \cdot \Delta F1 \quad (9)$$

$$(PACC - C \cdot \Delta F1) \cdot SV3 + K3 \cdot I1 = FS2 \quad (10)$$

In the above equations (9) and (10), "PACC" represents the fluid pressure in the accumulator 754 as detected by the accumulator pressure sensor 794, and "SV3" represents a pressure-receiving area of the valve member of the pressure-increasing valve 768 which receives the accumulator pressure, while "K3" represents a constant. Further, "FS2" represents a biasing force of the spring of the pressure-increasing valve 768 which biases the valve member in the valve closing direction, and "C", represents a rate at which the back pressure PS in the back-pressure chamber 208 is increased to increase the ideal master cylinder pressure at the rate B at which the master cylinder pressure was increased before the boosting limit of the booster 150 was reached. The increase rate C of the back pressure PS is obtained according to the following equation (11):

$$C = C1 \cdot (B-A)/(S1-S2) \qquad (11)$$

In the above equation (11), "A" represents a rate at which the master cylinder pressure is changed after the boosting limit of the booster 150 has been reached.

The increment ΔF1 can be obtained by subtracting the brake operating force value FBL from the brake operating force value currently detected on the basis of the output signal of the depression force sensor. The back pressure PS generated in the back-pressure chamber 208 can be obtained on the basis of the constant C and according to the above equation (9), and the amount of electric current I1 can be obtained according to the above equation (10). The amount of electric current I1 can be determined according to the increment ΔF1 and according to a data table which is stored in the ROM of the computer of the ECU 790 and which represents a relationship between the increment ΔF1 and the amount of electric current I1, which relationship was obtained in a suitable manner.

When the back pressure PS has been increased with an increase of the brake operating force to the level of the master cylinder pressure, as indicated by two-dot chain line in FIG. 42, the first pressure control valve 262 is fully opened to effect fluid communication between the first pressurizing chamber 206 and the back-pressure chamber 208, for thereby reducing the effective diameters of the first and second pressurizing pistons 202, 204 to the diameter of the piston rod 220. The moment at which the back pressure PS has been increased to the level of the master cylinder pressure can be detected by detecting the moment at which the back pressure as detected by the back-pressure sensor 792 has become equal to the master cylinder pressure as detected by the front master cylinder pressure 336. Alternatively, the increment ΔF1 of the brake operating force or the back pressure value PS (master cylinder pressure value) at which the back pressure PS has become equal to the master cylinder pressure is calculated, and the braking operating force is monitored to detect the moment at which the detected brake operating force has become equal to a sum of the brake operating force value FBL and the calculated increment ΔF1, or the back pressure PS is monitored to detect the moment at which the detected back pressure PS or master cylinder has become equal to the calculated back pressure value or master cylinder value. A value FV0 of the brake operating force value and a value PSM of the back pressure value PS at which the first pressure control valve 262 is fully opened are stored in respective memories provided in the RAM of the computer of the ECU 790.

When the back pressure PS has become equal to the master cylinder pressure, and the first pressure control valve 262 is fully opened, the back pressure PS has not yet reached the accumulator pressure PACC, and the pressure of the pressurized fluid delivered from the accumulator 754 to the back-pressure chamber 208 is controlled so that the back pressure PS is increased at the same rate as the master cylinder pressure, namely, at the rate B at which the master cylinder pressure was increased before the boosting limit of the booster 150 was reached. This increase rate B is lower than the increase rate C at which the back pressure PS was increased to the level of the master cylinder pressure. An increment ΔPS after the first pressure control valve 262 has been fully opened is represented by the following equation (12), and the back pressure PS is represented by the following equation (13). The back pressure value PSM is stored in the appropriate memory of the RAM.

$$\Delta PS = B \cdot \Delta F2 \qquad (12)$$

$$PS = \Delta PS + PSM \qquad (13)$$

In the above equation (12), "ΔF2" represents an increment of the brake operating force from the value FV0 at which the valve 262 was fully opened. The amount of electric current I2 to be applied to the pressure-increasing valve 768 is determined according to the following equation (14):

$$\{(PACC-(B \cdot \Delta F2+PSM)) \cdot SV3+K3 \cdot I2 = FS2 \qquad (14)$$

When the back pressure PS and the master cylinder pressure have become equal to the accumulator pressure PACC, the boosting limit of the power-operated hydraulic pressure source 750 used as an assisting booster to boost the brake operating force is reached. Thereafter, the master cylinder pressure can be increased by reduction of the effective diameters of the first and second pressurizing piston 202, 204 by fluid communication between the first pressurizing chamber 206 and the back-pressure chamber 208. The moment at which the back pressure PS has reached the accumulator pressure PACC (at which the boosting limit of the power-operated hydraulic pressure source 750 has been reached) can be detected on the basis of the back pressure PS as detected by the back-pressure sensor 792 and the fluid pressure as detected by the accumulator pressure sensor 794. Alternatively, the above-indicated moment can be detected by comparing the back pressure PS calculated according to the above equation (13) with the accumulator pressure PACC. The brake operating force value FPACC at which the back pressure PS has reached the accumulator pressure PACC is stored in the appropriate memory provided in the RAM. When the master cylinder pressure is increased by reduction of the effective diameters of the pistons 202, 204 as described above, the pressure-increasing valve 768 is fully opened so that the pressurized fluid is continuously delivered from the accumulator 754 to the back-pressure chamber 208.

The reduction of the effective diameters of the first and second pressurizing pistons 202, 204 when the first pressure control valve 262 is fully opened at the moment when the back pressure PS and the master cylinder have become equal to each other makes it possible to increase the master cylinder pressure after the boosting limit of the booster 150 is reached, at the same rate B as before the boosting limit is reached. Further, the reduction of the effective diameters of the pistons 202, 204 when the boosting limit of the power-operated hydraulic pressure source 750 has been reached makes it possible to further increase the master cylinder pressure. The first pressure control valve 262 may not be opened when the back pressure PS has become equal to the master cylinder pressure. In this case, the back pressure PS is increased at the rate C at which the back pressure PS was increased to the level of the master cylinder, as indicated by broken line in FIG. 42. In this case, too, the master cylinder pressure is increased at the rate B, but the first pressure control valve 262 is not opened even when the back pressure PS has become equal to the accumulator pressure PACC, since the back pressure PS is higher than the master cylinder pressure. After the back pressure PS has been increased to the accumulator pressure PACC, the master cylinder pressure is increased at the rate A at which the master cylinder pressure is increased without boosting of the brake operating force, as indicated by one-dot chain lines in FIG. 42. If the first pressure control valve 262 were fully opened while the back pressure PS is higher than the master cylinder pressure, the pressurized fluid having the higher back pressure PS would be delivered from the back-pressure chamber 208 to the first pressurizing chamber 206, undesirably resulting in an abrupt increase in the braking force unexpectedly to the vehicle operator. It is also considered possible to gradually open the first pressure control valve 262 rather than instantaneously fully opening this valve 262, when the back pressure PS has been increased to the level of the master cylinder pressure. In this case, the pressurized fluid is slowly delivered from the back-pressure chamber 208 to the first pressurizing chamber 206 so that the master cylinder pressure is gradually made equal to the back pressure PS. However, this arrangement to gradually open the first pressure control valve 262 does not permit efficient use of the back pressure, since the back pressure PS after it has become equal to the master cylinder pressure is higher than the master cylinder pressure, as indicated by the broken line in FIG. 42. On the other hand, fully opening the valve 262 when the back pressure PS has become equal to the master cylinder pressure permits the back pressure PS to be increased at the change rate B of the ideal master cylinder pressure, resulting in efficient use of the back pressure and freedom from an unexpected abrupt increase of the braking force. When the back pressure PS has been increased to the accumulator pressure PACC, the effective diameters of the pistons 202, 204 are reduced to further increase the master cylinder pressure.

When the operating stroke of the brake pedal 42 is reduced, the master cylinder pressure is reduced at the rate at which the master cylinder pressure has been increased. At this time, the first pressure control valve 262 and the pressure-increasing valve 768 are placed in the fully open state, while the second pressure control valve 292 and the pressure-reducing valve 770 are placed in the fully closed state, so that the pressurized fluid is fed from the back-pressure chamber 208 to the first pressurizing chamber 206, causing a reduction of the master cylinder pressure. The pressure-increasing valve 768 is held in the fully open state until the brake operating force has been reduced to the value FPACC corresponding to the accumulator pressure PACC. In this period, the pack pressure PS is equal to the accumulator pressure PACC. When the brake operating force has been reduced to the value FPACC, the pressure-increasing valve 768 is closed, and the pressure-reducing valve 770 is slowly opened with a controlled amount of electric current being applied thereto, so that the pressurizing fluid is discharged from the back-pressure chamber 208 to the reservoir 230. Namely, the amount of electric current applied to the pressure-reducing valve 770 is controlled so that the back pressure PS is reduced at the rate B. In this period, the first pressure control valve 262 is held in the fully open state. The back pressure PS is obtained according to the above equations (12) and (13), and the amount of electric current I2' to be applied to the pressure-reducing valve 770 is determined according to the following equation (15):

$$(B \cdot \Delta F2 + PSM) \cdot SV4 = K4 \cdot I2' \quad (15)$$

In the above equation (15), "SV4" represents a pressure-receiving area of the valve member of the pressure-reducing valve 770 which receives the back pressure PS, and "K4" represents a constant. It is noted that the biasing force of the spring biasing the valve member of the pressure-reducing valve 770 is negligibly small, and is therefore ignored in the above equation (15).

When the brake operating force has been reduced to the value FV0 at which the first pressure control valve 262 was fully opened, the valve 262 is fully closed, and the amount of electric current I1' to be applied to the pressure-reducing valve 770 is determined according to the known relationship between the back pressure PS and the increment ΔF1 of the brake operating force with respect to the value FBL (at which the boosting limit of the booster 150 is reached), so that the back pressure PS is reduced at the rate B (at which the back pressure PS was increased). The back pressure PS is obtained according to the above equation (9), and the amount of electric current I1' is determined according to the following equation (16). The amount of electric current I1' may be determined on the basis of the increment ΔF1 and according to a stored data map representing a predetermined relationship between I1' and ΔF1.

$$C \cdot \Delta F1 \cdot SV4 = K4 \cdot I1' \quad (16)$$

The master cylinder pressure is reduced at the rate B, by closing the first pressure control valve 262 and reducing the back pressure PS at the rate C.

When the brake operating force has been reduced to the value FBL, the control of the back pressure PS through the pressure-reducing valve 770 is terminated, and the master cylinder pressure is further reduced with a decrease in the operating force of the brake pedal 42. At this time, the pressurized fluid may be returned from the back-pressure chamber 208 to the reservoir 230 through the pressure-reducing in valve 770, or through the second pressure control valve 292 placed in the open state.

It is noted that the master cylinder pressure and the brake operating force when the boosting limit of the booster 150 is reached may vary due to a variation in the negative pressure of the booster 150, as described above, so that the brake operating force value FBL when the boosting limit is reached and the brake operating force value FV0 when the first pressure control valve 262 is fully opened may accordingly vary. Even in the presence of the variations of the brake operating force values FBL, FV0, however, the master cylinder pressure can be increased at the rate B (at which the ideal master cylinder pressure is increased) until the back pressure PS has been increased to the accumulator pressure PACC (until the boosting limit of the power-operated hydraulic pressure source 750 has been reached), and thereafter the master cylinder pressure can be further increased by the reduction of the effective diameters of the first and second pressurizing pistons 202, 204, since the amounts of electric current to be applied to the pressure-increasing and pressure-reducing valves 768, 770 are determined based on the increment ΔF1 from the value FBL and the increment ΔF2 from the value FV0.

Where the power-operated hydraulic pressure source 750 is defective, for instance, where this pressure source device 750 is not able to deliver a pressurized fluid due to a leakage from the accumulator 754, the solenoid-operated shut-off valve 780 is held in the closed state. In this case, the first and second pressure control valves 262, 292 are controlled to control the back pressure PS after the boosting limit of the booster 150 is reached, as if the power-operated hydraulic pressure source 750 were not present. Accordingly, the brake operating force can be boosted until the back pressure PS has been increased to the level of the master cylinder pressure, and the master cylinder pressure can be increased by the reduction of the effective diameters of the pistons 202, 204. Further, the present braking system of FIG. 41 may be adapted to perform at least one of the special controls described above, by controlling the first and second pressure control valves 262, 292 to control the fluid communication between the first pressurizing chamber 206 and the back-pressure chamber 208, when at least one of the following states is detected: a defect of the front braking sub-system; a defect of the booster 150; a requirement for an abrupt brake application to the vehicle; a road surface having a friction coefficient lower than the predetermined threshold; and a requirement for an anti-lock braking pressure control.

In the special controls except for the special control to be performed when the friction coefficient of the road surface is lower than the threshold, the power-operated hydraulic pressure source 750 as well as the fluid communication between the pressurizing chamber 206 and the back-pressure chamber 208 may be used to increase the master cylinder pressure, as in the case where the master cylinder pressure is increased after the boosting limit of the booster 150 has been reached, as described above by reference to FIG. 42.

It will be understood from the above description of the present ninth embodiment of this invention that a portion of the ECU 790 assigned to control the pressure control valve device 766 to deliver a pressurized fluid to the back-pressure chamber 208 constitutes a pressure-control-valve-device control portion operable to control the pressure control valve device 766 after the boosting limit of the booster 150 is reached, and that a portion of the ECU 790 assigned to fully open the first pressure control valve 262 for fluid communication between the first pressurizing chamber 206 and the back-pressure chamber 208, to boost the brake operating force, constitutes a sixth communication control portion operable to control the communication between the chambers 206, 208 after the boosting limit of the booster 150 is reached. It will also be understood that the above-indicated pressure-control-valve-device control portion and the sixth communication control portion cooperate to constitute a brake operating force bossing portion operable to boost the operating force of the brake pedal 42 after the boosting limit of the booster 150 is reached.

The braking system of FIG. 41 may be provided with brake defect detecting means for detecting a defect of any brakes 20, 22, 24, 26, so that upon detection of a defect of any brakes, the ECU 790 commands the pressure-increasing valve 602 corresponding to the wheel brake cylinder 30, 32, 34, 36 of the defective brake, to be closed for preventing the wheel brake cylinder in question with the pressurized fluid. For instance, the brake defect detecting means include wheel cylinder pressure sensors for detecting the actual fluid pressures in the wheel brake cylinders, comparing means for comparing the detected actual wheel brake cylinder pressures with desired values which are determined on the basis of the detected brake operating force, and determining means for determining that each brake is defective if the detected actual fluid pressure of the corresponding wheel brake cylinder is lower than the desired value by more than a predetermined amount. Alternatively, the brake defect detecting means include a front braking pressure sensor for detecting the actual front braking pressure in the front wheel brake cylinders 30, 32, a rear braking pressure sensor for detecting the actual rear braking pressure in the rear wheel brake cylinders 34, 36, comparing means for comparing the detected front and rear braking pressures with desired values, and determining means for determining that the front or rear braking sub-system is defective if the detected actual front or rear braking pressure is lower than the desire value by more than a predetermined amount.

The braking pressure source device may be diagnosed depending upon its operating state. An example of this modification will be described by reference to FIGS. 43–45, which shows a tenth embodiment of this invention. The hydraulic circuit of the braking system including the braking pressure source device according to this embodiment is identical with that of the braking system of the sixth embodiment of FIGS. 34–37. The same terms and reference signs as used in the sixth embodiment will be used in the present tenth embodiment. The brake cylinder pressure control device 600 is provided for each of the four wheel brake cylinders 30, 32, 34, 36, to perform an anti-lock braking pressure control of the corresponding wheel brake cylinder. In the present embodiment, the pressure-increasing valve 602 in the form of a normally closed solenoid-operated shut-off valve included in the brake cylinder pressure control device 600 serves as a third pressure control valve device in addition to the first and second control valve devices in the form of the first and second pressure control valves 262, 292.

Figure 43:
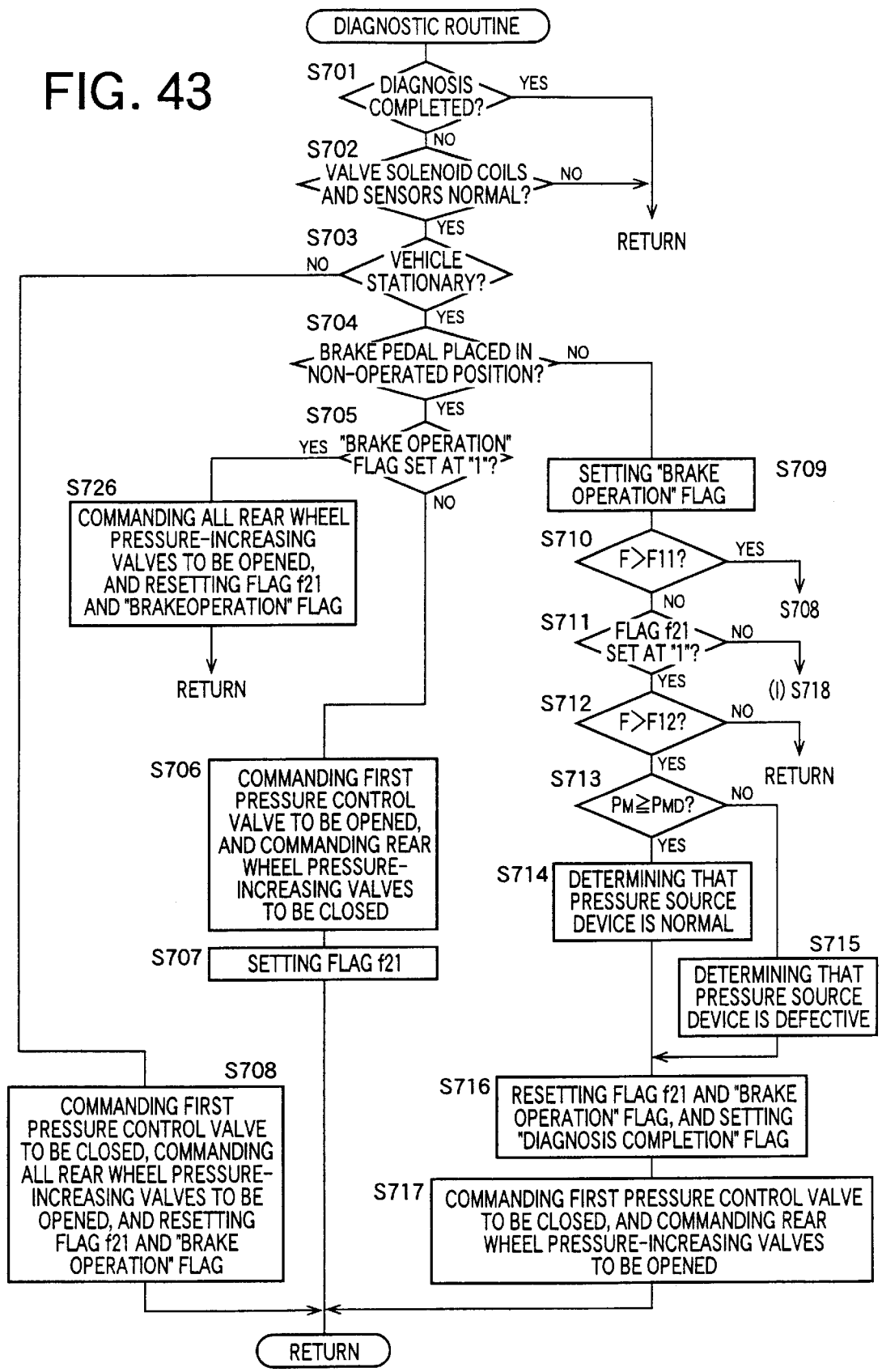
FIG. 43 is a flow chart illustrating a portion of a diagnostic routine executed according to a control program stored in a ROM of a computer of an electronic control unit of a braking pressure source device according to still another embodiment of this invention.
Figure 44:
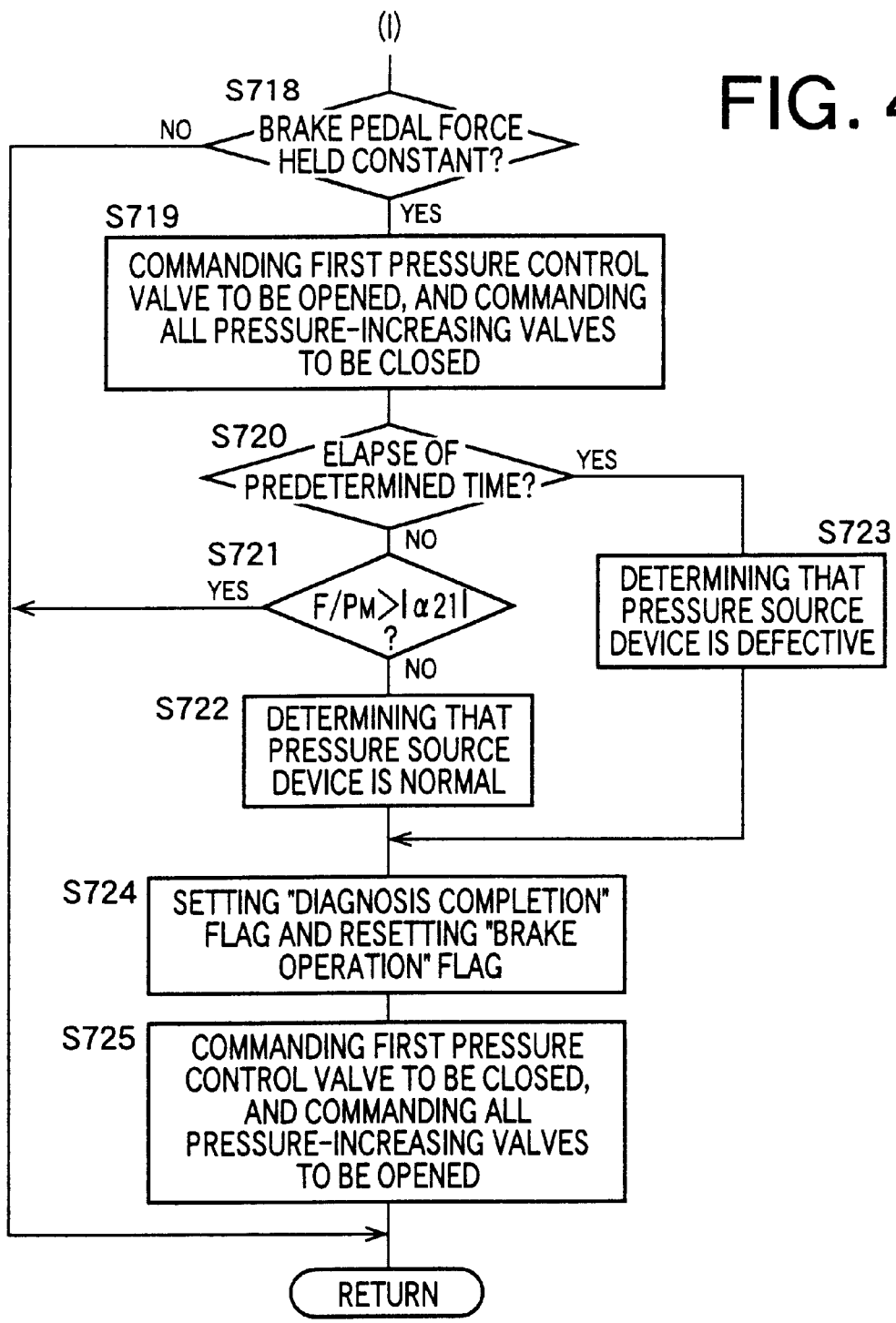
FIG. 44 is a flow chart illustrating the remaining portion of the diagnostic routine of FIG. 43.
Figure 45:
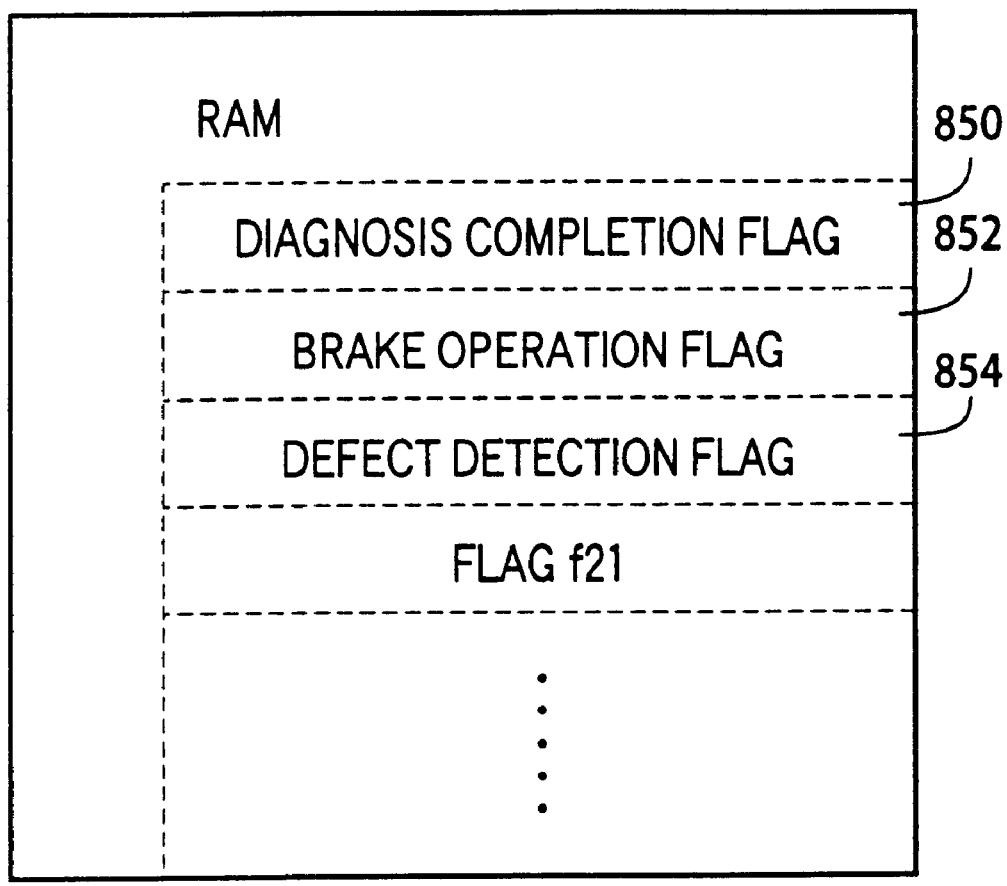
FIG. 45 is a view indicating a portion of a RAM of the computer which is used in the diagnostic routine of FIGS. 43 and 44.

The ROM of the computer of the electronic control unit provided in the present hydraulically operated braking system stores various control programs including a program for executing a diagnostic routine illustrated in the flow chart of FIGS. 43 and 44, as well as programs for executing a main control routine, an anti-lock braking pressure control routine and a braking control routine, which are not shown. The braking control routine may be similar to those described above with respect to the preceding embodiments. As shown in FIG. 45, the RAM of the computer includes a DIAGNOSTIC COMPLETION flag 850, a BRAKE OPERATION flag 852, a DEFECT DETECTION flag 854, and a flag f21. The PU of the computer is adapted to execute the diagnostic routine and the other routines according to the control programs stored in the ROM, while utilizing a temporary data storage function of the RAM. In FIG. 45, only the flags used in the diagnostic routine of FIGS. 43 and 44 are shown by way of example. A diagnosis of the braking pressure source device according to the diagnostic routine will be described referring to the flow chart of FIGS. 43 and 44.

The diagnostic routine is initiated when the electric system of the vehicle is turned on, namely, when the ignition switch is turned on in this embodiment. The diagnostic routine is initiated with step S701 to determine whether the diagnosis of the braking pressure source device has been completed. This determination is effected by determining whether the DIAGNOSIS COMPLETION flag 850 is set at "1". When this flag 850 is set at "1", it indicates that the braking pressure source device has been diagnosed. The DIAGNOSIS COMPLETION flag 850 is reset to "0" upon initial setting of the main control routine. When step S701 is implemented for the first time, the flag 850 is set at "0", and a negative decision (NO) is obtained in step S701, so that the control flow goes to step S702 to determine whether the solenoid coils of the solenoid-operated valves such as the pressure-increasing valve 602 are all normal, whether the front master cylinder pressure sensor 336, depression force sensor 334 and wheel speed sensors 340 are normal, and whether the zero-point compensation of each of the sensors 336, 334, 340 has been completed. The diagnosis of the solenoid coils and the sensors and the zero-point compensation are implemented according to separate routines (not shown) independently of the present diagnostic routine, and-results of the diagnosis and data indicating whether the zero-point compensation has been completed are stored in the RAM. The determination is step S702 is implemented on the basis of the diagnostic results and data stored in the RAM. A negative decision (NO) is obtained in step S702 if the diagnosis of the solenoid coils and the sensors 336, 334, 340 has not been completed, if at least one of the solenoid coils and the sensors in question is found defective, or if the zero-point compensation has not been completed. In this case, one cycle of execution of the present routine is terminated. While the zero-point compensation is effected for all of the sensors 336, 334, 340 in the present embodiment, it may be effected for selected ones of those sensors.

If the solenoid coils and the sensors are all normal and the zero-point compensation has been completed, an affirmative decision (YES) is obtained in step S702, and the control flow goes to step S703 to determine whether the vehicle is stationary. This determination is made by determining whether the vehicle running speed obtained on the basis of the output signals of the wheel speed sensors 340 is substantially zero. In the present embodiment, the wheel speed sensors 340 and a portion of the computer assigned to calculate the vehicle running speed on the basis of the output signals of the wheel speed sensors 340 cooperate to constitute a vehicle speed obtaining device for obtaining the vehicle running speed, and a portion of the computer assigned to implement step S703 constitutes stationary state detecting means for determining whether the vehicle is stationary.

If the vehicle is stationary, an affirmative decision (YES) is obtained in step S703, and the control flow goes to step S704 to determine whether the brake pedal 42 is placed in the non-operated position. This determination is made on the basis of the output signal of the brake switch 332. If the brake pedal 42 is in the non-operated position, an affirmative decision (YES) is obtained in step S704, and the control flow goes to step S705 to determine whether the BRAKE OPERATION flag 852 is set at "1". When this flag 852 is set at "1", it indicates that the brake pedal 42 is in operation.

If the brake pedal 42 is placed in the non-operated position and the BRAKE OPERATION flag 852 is set at "0", a negative decision (NO) is obtained in step S705, and the control flow goes to step S706 to command the first pressure control valve to be fully opened for communication of the chambers 206, 208 through the communication passage 260, and further command the pressure-increasing valves 602 corresponding to the two rear wheel brake cylinders 34, 36, to be closed. As a result, the amount of electric current to be applied to the solenoid coil 286 of the first pressure control valve 262 is zeroed to fully open the valve 262 to effect the fluid communication between the chambers 206, 208 through the communication passage 260, for thereby reducing the effective diameters of the first and second pressurizing pistons 202, 204. The first pressure control valve 262 is a normally open valve. If the valve 262 is in the fully open state when step S706 is implemented, the valve 262 is kept in the fully open state. Further, the pressure-increasing valves 602 for the rear wheel brake cylinders 30, 32 are closed, for disconnecting the rear wheel brake cylinders 230, 32 from the first pressurizing chamber 206. Step S706 is followed by step S707 to set the flag f21 to "1". When this flag f21 is set at "1", it indicates that the electric system of the vehicle has been turned on while the brake pedal 42 is placed in the non-operated position.

If the brake pedal 42 is depressed in the above-indicated state, a negative decision (NO) is obtained in step S704, and the control flow goes to step S709 to set the BRAKE OPERATION flag 852 to "1". The braking control routine executed in the present embodiment is similar to that shown in FIG. 36. This braking control routine is not implemented during execution of the diagnostic routine, and is initiated when the diagnosis has been completed or is interrupted. For instance, the present diagnostic routine is executed after the initial setting in the main control routine, and then the braking control routine and other routines are executed. The determination as to whether the flag f21 is set at "1" and the determination as to whether the BRAKE OPERATION flag 852 is set at "1" are implemented immediately before the braking control routine is initiated. If the flag f21 and the BRAKE OPERATION flag 852 are both set at "0", the braking control routine is executed. If at least one of the flag f21 and the flag 852 is set at "1", the braking control routine is not executed.

Step S709 is followed by step S710 to determine whether the operating force F of the brake pedal 42 is larger than a predetermined threshold value F11. The threshold value F11 is determined such that the brake operating force F larger than the threshold value F11 indicates a vehicle operator's desire or intention to brake the vehicle with a braking force considerably larger than usual. In other words, the threshold value F11 is determined such that the brake operating force F does not exceed the threshold value F11 when the vehicle operator operates the brake pedal 42 with an ordinary depression force. If a negative decision (NO) is obtained I step S710, the control flow goes to step 711.

Step S711 is provided to determine whether the flag f21 is set at "1". Since the flag f21 has been set in step S707, an affirmative decision (YES) is obtained in step S710, and the control flow goes to step S712 and the following steps for diagnosing the braking pressure source device. This diagnosis is effected where the electric system of the vehicle is turned on while the brake pedal 42 is in the non-operated position, and is initiated when the brake pedal 42 which has been held in the non-operated position is operated for the first time. In the present embodiment, the braking pressure source device is diagnosed to be defective or abnormal if the master cylinder pressure PM when the brake operating force F has exceeded a predetermined threshold value F12 is lower than a predetermined threshold PMD. The threshold value F12 is determined to be smaller than the above-indicated threshold F11. With the flag f21 set at "1", the braking control routine is not initiated even when the brake pedal 42 is operated, so that the first pressure control valve 262 remains in the fully open state. When the electric system of the vehicle was turned on without an operation of the brake pedal 42, the chambers 206, 208 were communicated with each other through the fully open first pressure control valve 262. Accordingly, when the brake pedal 42 is subsequently operated, the effective diameters of the first and second pistons 20, 204 have already been reduced, so that the master cylinder pressure PM when the brake operating force F has exceeded the threshold value F12 will become equal to or exceed the predetermined threshold PMD, owing to an effect of the reduction of the effective diameter of the pistons 20, 204, provided the braking pressure source device is normally functioning. In other words, the threshold PMD is determined to be slightly smaller than the master cylinder pressure PM which is expected to be generated when the brake operating force F has exceeded the threshold value F12 while the chambers 206, 208 are held in communication with each other through the communication passage 260, if the braking pressure source device is normal. Since the determination as to whether the master cylinder pressure PM is equal to or higher than the threshold PMD is effected when the brake operating force F is larger than the threshold F12, it is possible to avoid an erroneous determination that the braking pressure source device is defective, which erroneous determination would be made due to a small brake operating force (which does not cause the master cylinder pressure PM to be equal to or exceed the threshold PMD)) even while the braking pressure source device per se is normal.

Described in more detail, step S712 is provided to determine whether the brake operating force F is larger than the predetermined threshold value F12. If a negative decision (NO) is obtained in step S712, one cycle of execution of the diagnostic routine is terminated. When the brake operating force F has exceeded the threshold value F12, an affirmative decision (YES) is obtained in step S712, and the control flow goes to step S713 to determine whether the master cylinder pressure PM is equal to or higher than the predetermined threshold PMD. If an affirmative decision (YES) is obtained in step S713, it means that the braking pressure source device is normal. In this case, the control flow goes to step S714 to determine that the braking pressure source device is normal, and store in the RAM data indicating that the braking pressure source device is normal. For instance, the DEFECT DEFECTION flag 854 in the RAM is reset to "0".

Step S714 is followed by step S716 to reset the flag f21 and the BRAKE OPERATION flag 852 to "0", and set the DIAGNOSIS COMPLETION flag 850 to "1", so that the braking control routine is initiated. Step S716 is followed by step S717 to command the first pressure control valve 262 to be fully closed for disconnecting the first pressurizing chamber 206 and the back-pressure chamber 208 from each other, and further command the pressure-increasing valves 602 corresponding to the rear wheel brake cylinders 34, 36, to be opened. As a result, the first pressure control valve 262 is fully closed to cancel the reduction of the effective diameters of the first and second pressurizing pistons 202, 204, and the pressure-increasing valves 602 are opened for fluid communication between the first pressurizing chamber 206 and the rear wheel brake cylinders 34, 36. In this condition, the braking pressure source device is operable in the normal braking mode. Namely, the first and second pressure control valves 262, 292 are controlled in the normal braking mode according to the braking control routine, to operate the brakes 20, 22, 24, 26 with the brake pedal 42 being depressed. If necessary, a suitable processing to terminate the diagnostic routine may be implemented in step S717. Since the DIAGNOSIS COMPLETION flag 850 is set to "1", in step S717, an affirmative decision (YES) is obtained in step S701 when this step S701 is implemented in the next control cycle. Accordingly, the control flow does not go to step S702 and the subsequent steps. It will be understood that the diagnosis of the braking pressure source device is effected only once each time the electric system of the vehicle is turned on.

If the master cylinder pressure PM when the brake operating force F has exceeded the threshold value F12 is lower than the threshold PMD, it indicates that the braking pressure source device is defective for some reason or other. In this case, a negative decision (NO) is obtained in step S713, and the control flow goes to step S715 to determine that the braking pressure source device is defective, and store in the RAM data indicating that the braking pressure source is defective. For instance, the DEFECT DETECTION flag 854 in the RAM is set to "1". Step S715 is followed by steps S716 and S717 described above, so that the first pressure control valve 262 is closed, and the pressure-increasing valves 602 are opened. In the present embodiment, the rear wheel brake cylinders 34, 36 are disconnected from the first pressurizing chamber 206 when steps S712 and S713 are implemented to diagnose the braking pressure source device, but the front wheel brake cylinders 30, 32 are communicated with the second pressurizing chamber 210, so that an increase of the operating stroke of the brake pedal 42 due to the fluid communication between the first pressurizing chamber 206 and the back-pressure chamber 208 is reduced, and the vehicle can be braked by the front wheel brakes 20, 22 while the diagnosis is effected. The braking control routine may be formulated such that the reduction of the effective diameters of the pistons 202, 204 by the fluid communication between the chambers 206, 208 is not effected where the braking pressure source device is diagnosed to be defective according to the diagnostic routine. For instance, the braking control routine illustrated in FIG. 36 is modified such that if the negative decision (NO) is obtained in step S602, a step is implemented before step S603, to determine whether the DEFECT DETECTION flag 854 is set at "1", and if the flag 854 is set at "1", the control flow goes to steps S605–S607, without implementing steps S603 and S604.

There will be described a diagnosis to be performed where the ignition switch is turned on to turn on the electric system of the vehicle while the brake pedal 42 is in operation. In this case, the affirmative decision (YES) is obtained in step S704 when this step is implemented for the first time, since the brake pedal 42 is not placed in the non-operated position. That is, the brakes 20, 22, 24, 26 are placed in operated states when the step S704 is implemented for the first time after the ignition switch is turned on. Accordingly, the control flow goes to step S709 to set the BRAKE OPERATION flag 852, and then to step S710. If the brake operating force F is not larger than the threshold value F11, a negative decision (NO) is obtained in step S710, and the control flow goes to step S711 to determine whether the flag f21 is set at "1". Since the flag f21 is currently set at "0", a negative decision (NO) is obtained in step S711, and the control flow goes to step S718 and the following steps illustrated in FIG. 44, to diagnose the braking pressure source device.

In the present case, the diagnosis is effected while the vehicle is braked while the operating force F of the operated brake pedal 42 is held substantially constant. Namely, step S718 is provided to determine whether the brake operating force F is held substantially constant. For example, this determination is effected by determining whether the absolute value of a rate of change of the brake operating force F is smaller than a predetermined positive value. For instance, the rate of change of the brake operating force F may be obtained as an amount of change of the brake operating force F during the cycle time of the present diagnostic routine. To this end, the currently detected brake operating force F is stored in a suitable depression force memory in the RAM each time step S718 is implemented, and the amount of change of the brake operating force F during the cycle time is obtained as the absolute value of a difference between the value in the present control cycle and the value stored in the depression force memory in the last control cycle. If this absolute value is smaller than the predetermined positive value, it means that the brake operating force F is held substantially constant. If the absolute value of the difference is not smaller than the predetermined positive value, a negative decision (NO) is obtained in step S718, and one cycle of execution of the routine is terminated. The determination in step S718 may be based on a difference between two values of the brake operating force F which are obtained at respective points of time which have a time interval larger than the cycle time of the diagnostic routine.

If the brake operating force F is substantially constant, an affirmative decision (YES) is obtained in step S718, and the control flow goes to step S719 to command the first pressure control valve 262 to be fully opened, and further command the pressure-increasing valves 602 corresponding to all of the four wheel brake cylinders 30, 32, 34, 36 to be fully closed. As a result, the first pressure control piston 262 is fully opened for fluid communication between the chambers 206, 208 through the communication passage 260, and the four wheel brake cylinders 30, 32, 34, 36 are disconnected from the first and second pressurizing chambers 206, 210. Since the BRAKE OPERATION flag 852 was set to "1" in step S709, the braking control routine is not executed, and the first valve 262 remains in the fully open state.

Step S719 is followed to by step S720 and the following steps to diagnose the braking pressure source device. This diagnosis is effected by determining whether a ratio of the brake operating force F to the master cylinder pressure PM has been reduced to or below a predetermined positive value α21, within a predetermined time after the four wheel brake cylinders 30, 32, 34, 36 have been disconnected from the first and second pressurizing chambers 206, 210 and the chambers 206, 208 have been communicated with each other. That is, if the braking pressure source device is normal, the above-indicated ratio F/PM will be reduced to or below the predetermined positive value α 21 as a result of an increase of the master cylinder pressure PM while the chambers 206, 208 are held in communication with each other for reduction of the effective diameters of the pistons 202, 204 and the four wheel brake cylinders 30, 32, 34, 36 are disconnected from the pressurizing chambers 206, 210 while the brake operating force F is held substantially constant. The predetermined time is determined to be longer than a time which is required for completion of the reduction of the effective diameters of the pistons 202, 204 and during which the operating state of the braking pressure source device is not expected to vary, for instance, the brake operating force F is not expected to be reduced. Accordingly, the ratio F/PM is expected to be reduced to or below the predetermined value α21 within the predetermined time, provided the braking pressure source device is normally functioning.

Step S720 is provided to determine whether the predetermined time has passed. For instance, this determination is effected using a timer. When the step S720 is implemented for the first time, a negative decision (NO) is obtained in step S720, and the control flow goes to step S721 to determine whether the ratio F/PM of the brake operating force F to the master cylinder pressure is higher than the predetermined value |α21|. If the ratio F/PM is higher than the predetermined value |α21|, an affirmative decision (YES) is obtained in step S731, and one cycle of execution of the diagnostic routine is terminated. If the ratio F/PM has been reduced to or below the value |α21| before the predetermined time has passed, it means that the braking pressure source device is normal. In this case, a negative decision (NO) is obtained in step S721, and the control flow goes to step S722 similar to step S714 described above, to determine that the braking pressure source device is normal. Step S722 is followed by steps S724 and S725 to set the DIAGNOSIS COMPLETION flag 850 to "1", reset the BRAKE OPERATION flag 852 to "0", command the first pressure control valve 262 to be closed, further command all of the pressure-increasing valves 602 to be opened, clear the depression force memory used in step S718, and effect the other processing necessary to terminate the diagnosis. Since the diagnosis is effected while the brake operating force F is held substantially constant, as described above, the rate of change of the master cylinder pressure PM is not influenced by an increase in the brake operating force F, so that the diagnosis can be performed with high accuracy on the basis of a change of the master cylinder pressure PM which is based on an effect of the reduction of the effective diameters of the pistons 202, 204. Further, since all of the pressure-increasing valves 602 are held in the closed state during the diagnosis, the effect of the reduction of the effective diameters of the pistons 202, 204 is highly stabilized, assuring improved reliability of the diagnosis. It is also noted that the brake operating force F upon operation of the brake pedal 42 when the ignition switch is turned on is usually kept almost constant. Therefore, the vehicle operator would not feel uneasy even if the brake pedal 42 cannot be further depressed while the four pressure-increasing valves 602 are closed to inhibit the fluid flows from the pressurizing chambers 206, 210 to the wheel brake cylinders 30, 32, 34, 36. Further, the diagnosis is effected after a suitable braking force has been generated to brake the vehicle, since the pressure-increasing valves 602 are closed only after the brake pedal 42 has been depressed to activate the wheel brakes 20, 22, 24,26.

If the predetermined time has passed before the ratio F/PM has been reduced to the predetermined value |α21|, it means that the braking pressure source device is defective for some reason or other. In this case, an affirmative decision (YES) is obtained in step S720, and the control flow goes to step S723 similar to step S715 described above, to determine that the braking pressure source device is defective. As described above, the present tenth embodiment of FIGS. 43–45 is adapted to effect a diagnosis where the vehicle electric system is turned on while the brake pedal 42 is not in operation, and a diagnosis where the vehicle electric system is turned on while the brake pedal 42 is in operation. Thus, the braking pressure source device can be diagnosed when the electric system is turned on, irrespective of whether brake pedal 42 is in operation or not upon initiation of the diagnosis.

A negative decision (NO) is obtained in step S703 if the vehicle is moved while the diagnosis in steps S712–S715 is effected, while the diagnosis in steps S720–S723 is effected, or while steps S704–S707 are repeatedly implemented after the electric system is turned on with the brake pedal 42 placed in the non-operated position. In this case, the control flow goes to step S708 to interrupt the diagnosis and restore the braking pressure source device to the initial state in which the braking pressure source device is operable in the normal braking mode. For instance, the vehicle is run by operation of an engine, or moved down a downhill road surface by gravity. In either case, the vehicle running speed becomes higher than zero, and the negative decision (NO) is obtained in step S703. Step S708 is provided to command the first pressure control valve 262 to be fully closed, command all of the pressure-increasing valves 602 to be opened, reset the BRAKE OPERATION flag 852 and the flag f21 to "0", clear the depression force memory used in step S718, and effect the other processing to terminate the diagnostic routine. If the brake pedal 42 is in operation when the vehicle movement is initiated, the braking control routine is initiated with the first pressure control valve 262 placed in the fully closed state, so that the vehicle is braked in the normal braking mode. If the brake pedal 42 is in the non-operated position when the vehicle movement is initiated, the first pressure control valve 262 is opened during execution of the braking control routine. The diagnostic routine and the braking control routine may be modified so as not to command the first pressure control valve 262 to be fully closed in step S708, and to open or close the first pressure control valve 262 in the braking control routine, depending upon whether the brake pedal 42 is in operation or not.

An affirmative decision (YES) is obtained in step S710 if the brake operating force F has exceeded the predetermined threshold value F11 while the diagnosis in steps S712–S715 or the diagnosis in steps S720–S723 is effected. In this case, the control flow goes to step S708 to interrupt the diagnosis. That is, the diagnosis performed while the brake pedal 42 is in operation with the vehicle held in a stationary state is interrupted when the brake operating force F has exceeded the threshold value F11 above which the vehicle operator is considered to have a strong desire to brake the vehicle. In this case, the braking pressure source device is restored to the initial state in which the four wheel brakes 20, 22, 24, 26 are operable in the normal braking mode. If the brake pedal 42 is returned to the non-operated position during the diagnosis in steps S712–S715 or in steps S720–S723, the affirmative decision (YES) is obtained in steps S704 and S705, and the control flow goes to step S726 to interrupt the diagnosis. In step S726, the four pressure-increasing valves 706 are all commanded to be opened, the flag f21 and the BRAKE OPERATION flag 852 are reset to "0", and the depression force memory is cleared. In the present embodiment wherein the first pressure control valve 262 is a normally open valve, the valve 262 is placed in the fully open state when the brake pedal 42 is returned to the non-operated position. That is, the valve 262 remains in the fully open state even after the diagnosis is interrupted.

Where the diagnosis reveals that the braking pressure source device is defective for some reason or other, a suitable treatment is taken. For instance, a further diagnosis is performed to check the appropriate elements of the braking pressure source device for any abnormality. For example, a diagnosis similar to the diagnosis performed in the first embodiment of FIGS. 1–17 is performed. This diagnosis includes a checking whether the first pressure control valve 262 is defective. The diagnosis similar to the diagnosis performed in the first embodiment of FIGS. 1–17 may be performed concurrently with the diagnostic routine of FIGS. 43 and 44. Alternatively, a suitable alarm indicator may be activated to inform the vehicle operator that the braking pressure source device is defective.

It will be understood from the foregoing description of the tenth embodiment of the present invention that a portion of the computer of the electronic control unit assigned to implement step S718 constitutes a constant-brake-operating-force detecting portion operable to determine whether the brake operating force F is held substantially constant, and that this constant-brake-operating-force detecting portion cooperates with a portion of the computer assigned to implement steps S703–S717 and S719–S726, to constitute a second diagnosing portion operable to diagnose the braking pressure source device.

Figure 46:
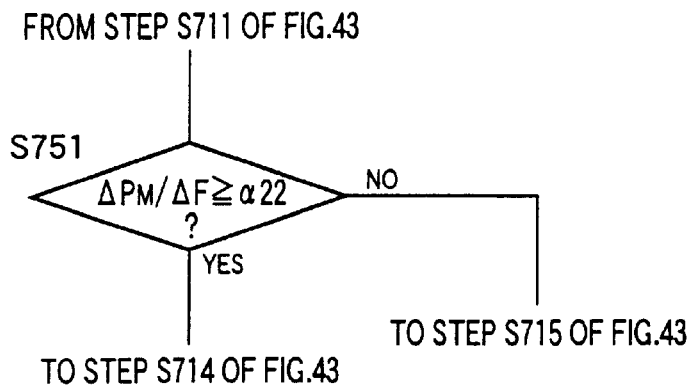
FIG. 46 is a flow chart illustrating a portion of a diagnostic routine executed according to a control program stored in a ROM of a computer of an electronic control unit of a braking pressure source device according to yet another embodiment of this invention.

In the tenth embodiment of FIGS. 43–45, the diagnosis performed where the vehicle electric system is turned on while the brake pedal 42 is not in operation is effected depending upon whether the master cylinder pressure PM when the brake operating force F has exceeded the predetermined threshold F12 is higher or lower than the predetermined threshold PMD. However, this diagnosis may be effected depending upon whether a rate of increase $\Delta PM$ of the master cylinder pressure PM to a rate of increase $\Delta F$ of the brake operating force F is higher or lower than a predetermined threshold $\alpha 22$, which is a positive value. In this case, steps S712 and S713 of the diagnostic routine of FIG. 43 are replaced by step S751, as indicated in the partial flow chart of FIG. 46.

For instance, the rate of increase of the master cylinder pressure PM and the rate of increase of the brake operating force F may be obtained as an amount of increase of the master cylinder pressure PM and an amount of increase of the brake operating force F during the cycle time of the diagnostic routine. Each time step S751 is implemented, the currently detected master cylinder pressure value PM is stored a master cylinder pressure memory in the RAM, so that the two master cylinder pressure values detected in the last and present control cycles are stored in the memory. Further, a difference is obtained by subtracting the master cylinder force value PM detected in the last control cycle from that detected in the present control cycle. This difference represents the rate of increase $\Delta PM$. Similarly, the rate of increase $\Delta F$ of the brake operating force F can be obtained. The rate of increase $\Delta PM$, $\Delta F$ may be obtained from a difference between two master cylinder pressure values PM or brake operating force values F, which are detected at respective points of time which have a time interval longer than the cycle time of the diagnostic routine. Alternatively, the rate of increase $\Delta PM$ may be obtained from a first average value of a plurality of master cylinder pressure values PM detected in a first period, and a second average value of a plurality of master cylinder pressure values PM detected in a second period. Similarly, the rate of increase $\Delta F$ of the brake operating force F may be obtained.

When the braking pressure source device is normal, the rate of increase $\Delta PM$ of the master cylinder pressure PM is determined by the effect of the reduction of the effective diameters of the first and second pressurizing pistons 202, 204, and the ratio $\Delta PM/\Delta F$ of the increase rate $\Delta PM$ to the increase rate $\Delta F$ will be equal to or higher than the predetermined threshold $\alpha 22$. Accordingly, an affirmative decision (YES) is obtained in step S751, and the control flow goes to step S714 of FIG. 43. When the braking pressure source device is defective or abnormal, the ratio $\Delta PM/\Delta F$ will be lower than the predetermined threshold $\alpha 22$, and the negative decision (NO) is obtained in step S751, so that step S715 of FIG. 43 is implemented.

Figure 47:
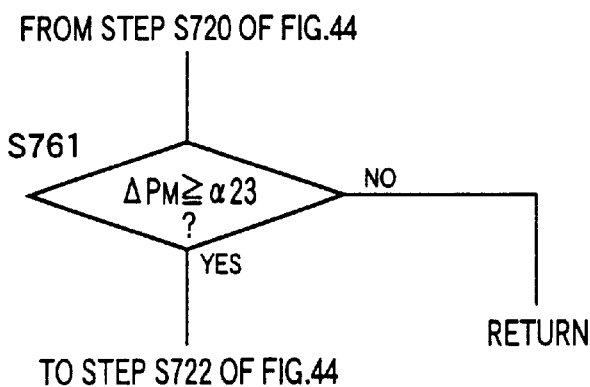
FIG. 47 is a flow chart illustrating a portion of a diagnostic routine executed in a still further embodiment of this invention.

In the embodiment of FIGS. 43–45, the diagnosis performed where the electric system is turned on while the brake pedal 42 is in operation is effected depending upon whether the ratio of the brake operating force F to the master cylinder pressure PM is higher or lower than the predetermined positive value. However, this diagnosis may be effected depending upon whether a rate of increase $\Delta PM$ of the master cylinder pressure PM is higher or lower than a predetermined threshold $\alpha 23$. In this case, step S721 of FIG. 44 is replaced by step S761 indicated in the partial flow chart of FIG. 47. When the braking pressure source is normal, the master cylinder pressure PM is increased at a relatively high rate owing to the effect of the reduction of the effective diameters of the pistons 202, 204, while the brake operating force F is held substantially constant and while the wheel brake cylinders 30, 32, 34, 36 are disconnected from the master cylinder 152. Accordingly, the rate of increase $\Delta PM$ will become equal or exceed the predetermined positive value $\alpha 23$ within the predetermined time.

For instance, the rate of increase $\Delta PM$ of the master cylinder pressure PM is obtained as an amount of increase of the master cylinder pressure PM during the cycle time of the diagnostic routine. If the rate of increase $\Delta PM$ has become equal to or exceeded the predetermined value $\alpha 23$ before the predetermined time has passed after the brake operating force F was held substantially constant, it means that the braking pressure source device is normal. In this case, an affirmative decision (YES) is obtained in step S761 of FIG. 47, and the control flow goes to step S722 of FIG. 44. If the rate of increase $\Delta PM$ is lower than the predetermined value $\alpha 23$, a negative decision (NO) is obtained in step S761, and one cycle of execution of the routine is terminated. If the predetermined time after the brake operating force F was held substantially constant has passed before the rate of increase $\Delta PM$ has become equal to or exceeded the predetermined value $\alpha 23$, it means that the braking pressure source device is defective.

While the first pressure control valve 262 in the tenth embodiment of FIGS. 43–45 is a normally open valve, this valve 262 may be a normally closed valve, like the first pressure control valve 700 used in the seventh embodiment of FIG. 38. Where the first pressure control valve 262 is a normally closed valve, the braking pressure source device can be diagnosed in the same manner as where the valve 262 is a normally open valve. In this case, step S708 is implemented if the affirmative decision (YES) is obtained in step S705, as indicated in the partial flow chart of FIG. 48, that is, when the brake pedal 42 is returned to the non-operated position during the diagnosis while the brake pedal 42 is in operation. That is, the normally closed first pressure control valve 262 which has been held in the open state for the diagnosis is restored to its initial closed state.

Although the embodiment of FIGS. 43–34 is adapted to effect a diagnosis where the vehicle electric system is turned on while the brake pedal 42 is not in operation and a diagnosis where the electric system is turned on while the brake pedal 42 is in operation, it is not essential to effect both of these diagnoses, and at least one of these diagnoses may be effected.

While the embodiment of FIGS. 43–45 is adapted to turn on the vehicle electric system by turning on the ignition switch, the electric system may be turned on by operating a brake operating member.

Although the embodiment of FIGS. 43–45 is arranged to diagnose the braking pressure source device each time the electric system is turned on, the diagnosis may be initiated when a predetermined condition is satisfied while the vehicle is stationary. For instance, the diagnosis is effected each time the brake pedal 42 is operated, or each time the vehicle is brought into the stationary state, or after a predetermined time has passed after the last diagnosis.

In the ninth embodiment of FIG. 41, the power-operated hydraulic pressure source 750 is provided in the hydraulically operated braking system equipped with the brake cylinder pressure control device 600 which is disposed between the master cylinder 152 and each wheel brake cylinder 30, 32, 34, 36, to control the braking pressure in the corresponding wheel brake cylinder. However, the power-operated hydraulic pressure source 750 may be provided in a hydraulically braking system not equipped with such a brake cylinder pressure control device.

A normally closed solenoid-operated shut-off valve or a normally closed solenoid-operated pressure control valve may be provided between the second solenoid-operated pressure control valve 292, 702 or the second solenoid-operated shut-off valve 722 (FIG. 40) and the reservoir 230. In this case, the operating reliability of the braking system is improved. That is, the normally closed solenoid-operated shut-off valve or pressure control valve disposed between the second pressure control valve 292 and the reservoir 230, for instance, prevents a fluid leakage into the reservoir 230 where the first solenoid-operated pressure control valve 262, 700 or the second solenoid-operated shut-off valve 720, and the second solenoid-operated pressure control valve 292, 702, 722 are stuck in its open state.

In the preceding embodiments, the determinations as to whether the booster 150 and the front braking sub-system are defective and the determination as to whether the boosting limit of the booster 150 has been reached are effected after the operating force of the brake pedal 42, 442 has been increased to a predetermined value. However, these determinations may be effected after the operating stroke of the brake pedal has been increased to a predetermined value. In this case, a pedal stroke sensor is provided to detect the operating stroke of the brake pedal provided as a brake operating member, and the specific determinations are effected when the detected operating stroke has been increased to respective predetermined values. Further, the determination as to whether an abrupt brake application to the vehicle is required may be effected on the basis of the operating stroke of the brake pedal rather than the operating force.

The braking systems other than that of the fourth embodiment of FIGS. 24–31 may include provided with the boosting ratio changing portion so that the ratio of boosting of the brake operating force can be changed with a change in the brake operating stroke.

In the second embodiment of FIG. 18 and the fifth embodiment of FIG. 32, the abrupt brake application is effected while the first pressurizing chamber 206 and the back-pressure chamber 208 are held in communication with each other to reduce the effective diameter of the pistons 202, 204 for thereby increasing the master cylinder pressure. However, the abrupt brake application may be effected by controlling the fluid pressure across the first pressure control valve 262, 700 to regulate the back pressure in the back-pressure chamber 208, so that the back pressure is added as an additional or assisting pressure to the master cylinder pressure which is to be established by only the brake operating force as boosted by the booster 150. In this case, a portion of the electronic control unit assigned to control the first pressure control valve 262, 700 as described above may be considered to be the third communication control portion operable upon detection of a requirement for an abrupt brake application, to control the fluid communication between the chambers 206, 208. The assisting pressure may be adjusted depending upon the required degree of the abrupt brake application, or may be a predetermined constant value irrespective of the required degree of the abrupt brake application. In the former case, the assisting pressure may be increased with an increase in the rate of increase of the brake operating force which indicates the required degree of the abrupt brake application. The assisting pressure may be changed in steps or continuously.

In the illustrated embodiments, the first pressurizing chamber 206 and the back-pressure chamber 208 are communicated with each other through a pressure control valve device in the form of the first pressure control valve provided in the communication passage 260. However, not only the first pressurizing chamber 206 but also the second pressurizing chamber 210 may be communicated with the back-pressure chamber. In this case, the second pressurizing chamber 210 is communicated with the back-pressure 208 through another pressure control valve device provided in a communication passage connecting the chambers 210, 208. This modification makes it possible to deal with a defect of either one of the front and rear braking sub-systems, by opening the pressure control valve device provided in the communication passage which connects the back-pressure chamber 208 and the pressurizing chamber of the non-defective front or rear braking sub-system, so that the fluid pressure in the pressurizing chamber of the non-defective braking sub-system is increased by reduction of the effective diameter of the corresponding pressurizing piston. Accordingly, this modification makes it possible to reduce the amount of reduction of the vehicle braking force due to the defect of one of the front and rear braking sub-systems. Further, the present modification makes it possible to deal with a defect of the solenoid-operated pressure control device or shut-off valve of one of the two pressure control valve devices, since the normal operation of the other pressure control valve device permits the special control to increase the master cylinder pressure upon detection of a defect of one of the front and rear braking sub-systems or the booster 150, upon detection of the boosting limit of the booster 150, or upon detection of a requirement for an abrupt brake application to the vehicle or an anti-lock braking pressure control, and further permits the special control to facilitate the braking pressure control in the anti-lock mode or upon braking on a road surface having a low friction coefficient.

In the illustrated embodiments, the second pressurizing chamber 210 located on the front side of the master cylinder 152 is connected to the front wheel brake cylinders 30, 32, while the first pressurizing chamber 206 located on the rear side of the master cylinder 152 is connected to the rear wheel brake cylinders 34, 36. However, it is possible that the second pressurizing chamber 210 are connected to the rear wheel brake cylinders 34, 36 while the first pressurizing chamber 206 are connected to the front wheel brake cylinders 30, 32.

In the third and fifth embodiments of FIGS. 23 and 32 wherein the chambers 206, 208 are communicated to each other upon detection of the road surface having a low friction coefficient, the determination as to whether the friction coefficient is lower than the predetermined threshold is effected on the basis of the output signal of the low-$\mu$ road surface detecting device 410 while the brake pedal 42 is in operation. However, this determination may be effected even while the brake pedal 42 is not in operation. In this case, a low-$\mu$ road surface flag indicating whether the friction coefficient is lower than the threshold or not is provided in the RAM, and the determination as to whether the special control should be performed is effected depending upon whether the low-$\mu$ road surface flag is set at "1", or not.

Figure 36:
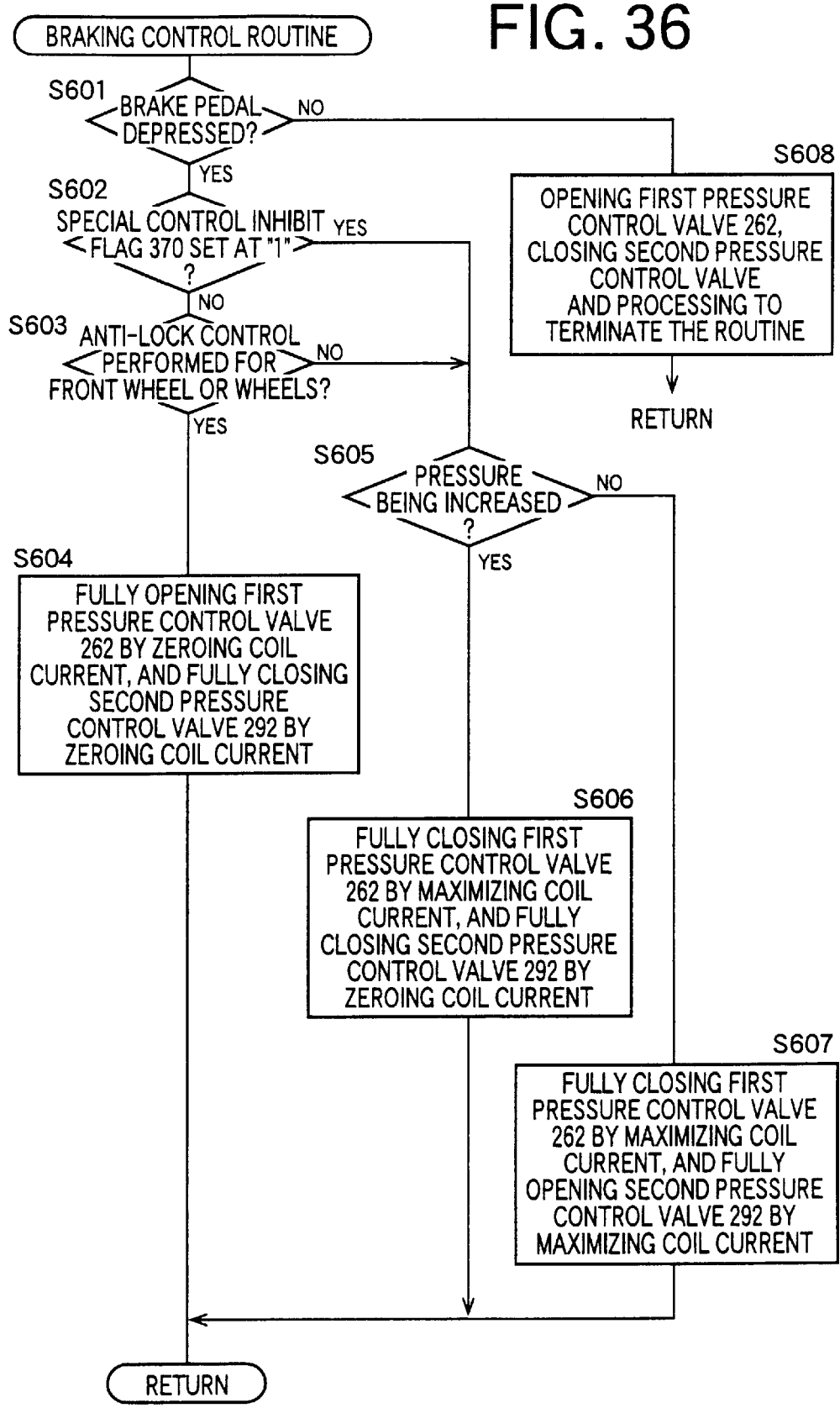
FIG. 36 is a flow chart illustrating a braking control routine executed according to a control program stored in a ROM of a computer of the electronic control unit of FIG. 35.
Figure 37:
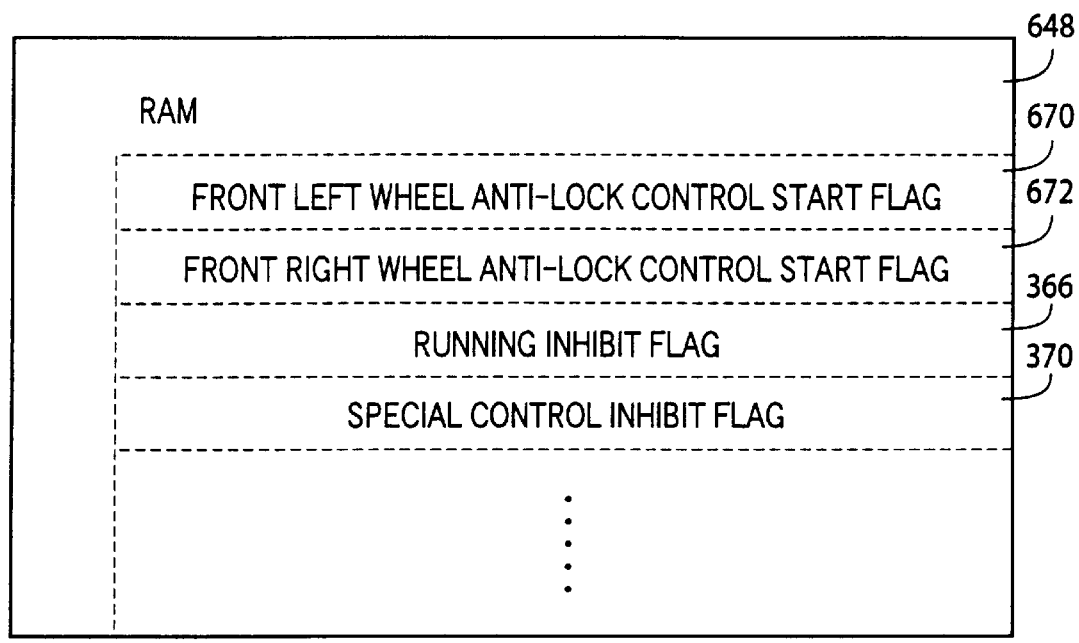
FIG. 37 is a view indicating a portion of a RAM of the computer of the electronic control unit of FIG. 35.

The braking pressure source device of the sixth embodiment of FIG. 36 is adapted to effect the special control for a fluid communication between the chambers 206, 208 upon detection of a requirement for an anti-lock braking pressure control. This embodiment may be adapted to effect at least one of the other special controls as effected in the fifth embodiment of FIGS. 32 and 33, for instance, the special control upon detection of a requirement for an abrupt brake application. Since the anti-lock braking pressure control requires the fluid communication between the chambers 206,208 through the communication passage 260, the determination as to whether the anti-lock braking pressure control is required, as well as the determination as to whether the abrupt brake application is required, should be effected before the other determinations, such as the determination as to whether the front braking sub-system is defective.

The embodiments of FIGS. 1–33 may be provided with a brake cylinder pressure control device between the first or second pressuring chamber 206, 210 and each of the wheel brake cylinders 30, 32, 34, 36, so that the fluid pressure in each wheel brake cylinder can be controlled by the brake cylinder pressure control device. For instance, each of these brake cylinder pressure control devices has the same arrangement as the brake cylinder pressure control device 600 provided in the sixth embodiment of FIGS. 34–37. These brake cylinder pressure control devices may be used for the anti-lock braking pressure control, for example.

In the braking pressure source device of the braking system capable of performing the anti-lock braking pressure control, the determination as to whether the friction coefficient of the road surface is lower than the predetermined threshold may be effected by determining whether the anti-lock braking pressure control has been initiated. In this respect, it is noted that the anti-lock braking pressure control is usually performed when the friction coefficient of the road surface is relatively low.

In the braking pressure source device wherein the braking force transmitting device does not include a boosting ratio changing portion, the special control for fluid communication between the chambers 206, 208 can be effected to boost the brake operating force, upon detection that the boosting limit of the booster 150 has been reached, irrespective of whether the braking pressure source device is provided with a power-operated hydraulic pressure source.

The special control by delivering the pressurized fluid from the pressurizing chamber to the back-pressure chamber 208 to reduce the effective diameters of the pressurizing pistons 202, 204 may be effected when the braking force generated by any one of the brakes 20, 22, 24, 26 is smaller than usual, even while the booster 150 and the front and rear braking sub-systems are not defective. For instance, the braking forces generated by the brakes 20–26 may be reduced when the friction coefficient of the friction members used in the brakes is lowered due to a so-called "water fade" or "heat fade". In this case, the master cylinder pressure is required to be increased by the reduction of the effective diameters of the pistons 202, 204. To this end, a friction coefficient detecting device may be used to determine whether the deceleration value of the vehicle is lower by more than a predetermined amount than a predetermined lower limit determined by the presently detected brake operating force. The braking force to be applied to the wheel may be reduced by a factor other than the friction coefficient of the friction member of the brake. For instance, the braking force may be reduced with a decrease in the friction coefficient of the road surface. In view of this, it is desirable to monitor the output signal of the low-$\mu$ road surface detecting device, as well as the output signal of the friction coefficient detecting device, for confirming that the reduction of the braking force is caused by the reduction of the friction coefficient of the friction member of the brake.

In the ninth embodiment of FIG. 41, the power-operated hydraulic pressure source 750 includes the accumulator 754, the provision of this accumulator 754 is not essential. In the absence of the accumulator 754, the pump motor 756 is controlled by a suitable motor control device, to control at least one of the pressure and flow rate of the fluid pressurized by the pump 752, for controlling the back pressure in the back-pressure chamber 208. A back-pressure control device for directly controlling the back pressure in the back-pressure chamber 208 may be provided in place of or in addition to the motor control device.

In the illustrated embodiments, the back pressure in the back-pressure chamber 208 which has been increased by controlling the amount of opening of the first pressure control valve 262 is reduced by opening the second pressure control valve 292. However, the back pressure may be reduced by controlling the first pressure control valve 262. In this case, the set load of the spring 276 of the first pressure control valve 262 must be determined so that the valve 262 is held in the open state with the solenoid coil current being zero, even in the presence of the maximum pressure difference between the master cylinder and the higher back pressure, which difference is expected to be generated when the operating stroke of the brake pedal 42 is reduced while the first and second pressure control valves 262, 292 are in the closed state as a result of closing the valve 266 while the fluid in the pressurizing chamber 206 is pressurized.

Where the back pressure in the back-pressure chamber 208 which has been increased by controlling the amount of opening of the first pressure control valve 262 is reduced by opening the second pressure control valve 292, the first pressure control valve 262 is required to be opened to reduce the back pressure if the second valve 292 is stuck in the closed state. If this requirement in the event of a failure of the second valve 292 need not be satisfied, the set load of the spring 276 need not be determined to be large enough to overcome the force based on the expected maximum pressure difference indicated above, provided the valve member 272 is normally spaced apart from the valve seat 270.

While the first pressure control valve 262 is placed in the fully open state for reduction of the effective diameters of the pistons 202, 204, the back pressure and the master cylinder pressure are equal to each other, that is, the back pressure is not higher than the master cylinder pressure as in the case described above, so that the set load of the spring 276 may be determined to merely hold the valve member 272 apart from the valve seat 270 in the absence of a fluid pressure difference or an electromagnetic force acting on the valve member 272. Namely, the set load of the spring 276 may be determined to be relatively small, if the braking pressure source device is not arranged to diagnose the first pressure control valve 262 for sticking of its valve member 272 in the closed state, or to increase the back pressure by controlling the amount of opening of the first pressure control device 262. Where the first pressure control valve 262 is diagnosed for sticking of the valve member 272 in the closed state, or where the back pressure is increased by controlling the amount of opening of the first valve 262, the back pressure may be higher than the master cylinder pressure, so that the back pressure must be reduced in this case, by opening the first valve 262 if the second valve 292 is stuck in the closed state.

Where the special control upon detection of a defect of the front braking sub-system is effected to increase the rear wheel braking force, the special control after the boosting limit of the booster 150 has been reached may be effected in combination of the former special control. In this case, for instance, the electronic control device is adapted to detected the rate of increase of the rear wheel brake cylinder pressure with an increase in the brake operating force, determine that the boosting limit has been reached, when the detected rate of increase of the rear wheel brake cylinder pressure begins to be reduced, and control the back pressure such that the rear wheel brake cylinder pressure after the boosting limit has been reached is increased at the same rate as before the boosting limit has been reached. Where the front braking sub-system is defective, the first pressure control valve 262 may be held in the fully open state for increasing the rear wheel brake cylinder pressure.

In the sixth embodiment of FIG. 36, the first pressure control valve 262 is fully opened when the anti-lock braking pressure control is initiated for at least one of the front left and right wheels 10, 12. However, the first valve 262 may be fully opened when the anti-lock braking pressure control is initiated for at least one of the rear left and right wheels 14, 16, or for at least one of the four wheels 10–16.

Where the master cylinder pressure is increased with the chambers 206,208 communicated with each other through the first pressure control valve 262, the back pressure may be reduced by controlling the amount of opening of the second pressure control valve 262 while the first valve 262 is held in the closed state. For instance, the brake operating force and the master cylinder pressure when the first pressure control valve 262 is commanded to be fully opened to reduce the effective diameters of the pistons 202, 204 are stored in the RAM, and when the brake operating force has been reduced to the value stored in the RAM, the second pressure control valve 292 is commanded to be opened to reduce the back pressure for reducing the master cylinder pressure down to the value stored in the RAM. Alternatively, the second valve 292 may be commanded to be opened when the brake operating force has been reduced to a value detected when the master cylinder pressure begins to be increased while the booster 150 is normal. In this case, the back pressure may be reduced to reduce the master cylinder pressure to a value corresponding to the detected value of the brake operating force.

The first control valve control device provided for controlling the first control valve device 262, etc. may be adapted to control the first control valve device on the basis of the fluid pressure in the pressurizing chamber 206, rather than the brake operating force, or on the basis of both the brake operating force and the fluid pressure in the pressurizing chamber. Since the brake operating force and the fluid pressure in the pressurizing chamber have a known relationship, the first control valve device may be controlled on the basis of the fluid pressure in the pressurizing chamber. Similar modification is applicable to the second control valve control device and the second control valve device 292, etc.

While each of the braking systems described above has the front braking sub-system and the rear braking sub-system, the principle of the present invention is equally applicable to a braking system of a diagonal type having a first braking sub-system wherein the fluid pressurized in one of the two pressurizing chambers 206, 210 is delivered to the front left wheel brake cylinder 30 and the rear right wheel brake cylinder 36, and a second braking sub-system wherein the fluid pressurized in the other pressurizing chamber is delivered to the front right wheel brake cylinder 32 and the rear left wheel brake cylinder 34.

In the illustrated embodiments, the various equations representing the relationships among the two or more parameters are used for determining the desired physical quantities such as the amounts of electric current to be applied to the first and second pressure control valves 262, 292. However, those equations may be replaced by corresponding data tables or maps. Conversely, the various data tables representing the relationships may be replaced by corresponding equations. In the fourth embodiment of FIGS. 24–31, the amount of electric current I' to be applied to the second pressure control valve 292 for reducing the back pressure may be determined on the basis of the increment $\Delta F''$ of the booster input force $F''$ and according to a predetermined relationship between I' and $\Delta F''$, which relationship is represented by a data table stored in the RAM 328.

In the embodiments of FIGS. 43–48, the diagnosis need not be effected while the master cylinder 152 is disconnected from the wheel brake cylinders 30–36, but may be effected while the master cylinder 152 is in communication with all of the wheel brake cylinders. For instance, the braking pressure source device of the first embodiment of FIGS. 1–17 wherein brake cylinder control devices are not provided between the master cylinder 152 and the wheel brake cylinders 30–36 may be diagnosed as illustrated in the flow charts of FIGS. 43, 44 and 46–48, but without disconnection of the wheel brake cylinders from the master cylinder.

While several presently preferred embodiments of this invention and the possible changes and alternations thereof have been described above in detail, for illustrative purpose only, it is to be understood that the present invention may be embodied with various other change and improvements such as those described in the SUMMARY OF THE INVENTION, which may occur to those skilled in the art, without departing from the sprit of the present invention defined in the following claims.

What is claimed is:

1. A braking pressure source device provided in a braking system for an automotive vehicle, said braking system including a brake operating member manually operable with a brake operating force applied thereto, said braking pressure source device comprising:

a master cylinder including a cylinder housing, a pressurizing piston fluid-tightly and slidably received in said cylinder housing and cooperating with said cylinder housing to define a pressurizing chamber and a back-pressure chamber on a front and a rear side of said pressurizing piston, and an input rod which fluid-tightly and slidably extends through a rear end wall of said cylinder housing, said pressurizing piston being advanced by said brake operating force of said brake operating member transmitted thereto through said input rod, to pressurize a working fluid in said pressurizing chamber;

means for defining a communication passage for communication between said pressurizing chamber and said back-pressure chamber;

a first control valve device disposed in said communication passage for controlling the communication between said pressurizing and back-pressure chambers through said communication passage; and a first control valve control device for controlling said first control valve device, and wherein said first control valve control device controls said first control valve device on the basis of at least one of an operating state of said brake operating member, a running state of said automotive vehicle and a state of a road surface on which said automotive vehicle is running.

2. A braking pressure source device according to claim 1, further comprising:

a reservoir for storing the working fluid at a pressure substantially equal to an atmospheric pressure;

a connecting passage connecting said reservoir and said back-pressure chamber; and a check valve disposed in said connecting passage which permits a flow of the fluid in a first direction from said reservoir toward said back-pressure chamber and inhibits a flow of the fluid in a second direction opposite to said first direction.

3. A braking pressure source device according to claim 1, wherein said first control valve device includes a solenoid-operated pressure control valve capable of controlling a fluid pressure difference across said solenoid-operated pressure control valve, according to an amount of electric current applied thereto, and said first control valve control device includes a current control portion operable to control the amount of electric current to be applied to said solenoid-operated pressure control valve on the basis of at least one of said operating state of said brake operating member, said running state of the automotive vehicle and said state of said road surface.

4. A braking pressure source device according to claim 1, further comprising flow restricting means provided in said communication passage.

5. A braking pressure source device according to claim 1, further comprising:

a reservoir for storing the working fluid at a pressure substantially equal to an atmospheric pressure;

a connecting passage connecting said reservoir and said back-pressure chamber; and a second control valve device disposed in said connecting passage and capable of controlling a fluid pressure difference across said second control valve device, according to an amount of electric current applied thereto.

6. A braking pressure source device according to claim 1, wherein said braking system includes a front wheel brake for braking a front wheel of the automotive vehicle, and a rear wheel brake for braking a rear wheel of the automotive vehicle, and said master cylinder includes a first pressurizing piston and a second pressurizing piston which are disposed in series with each other in said cylinder housing and cooperate with said cylinder housing to define a first pressurizing chamber and a second pressurizing chamber, respectively, on front sides of said first and second pressurizing pistons, respectively, one of said first and second pressurizing chambers being connected to said front wheel brake while the other of said first and second pressurizing chambers being connected to said rear wheel brake, and wherein said other pressurizing chamber is connected to said back-pressure chamber through said communication passage.

7. A braking pressure source device according to claim 6, wherein said front wheel brake has a front wheel brake cylinder for braking said front wheel, and said rear wheel brake has a rear wheel brake cylinder for braking said rear wheel, said first control valve control device including:

a front-wheel anti-lock control detecting portion for detecting initiation of an anti-lock braking pressure control for controlling said front wheel brake cylinder so as to prevent an excessive tendency of slipping of said front wheel on a road surface which takes place, during an operation of said front wheel brake, due to a fluid pressure in said front wheel brake cylinder which is excessively high in relation to a friction coefficient of said road surface; and a communication control portion operable upon detection by said front-wheel anti-lock control detecting portion of the initiation of said anti-lock braking pressure control, to command said first control valve device to effect the fluid communication between said other pressurizing chamber and said back-pressure chamber through said communication passage.

8. A braking pressure source device according to claim 1, wherein said braking system includes a wheel brake having a wheel brake cylinder for braking a wheel of the automotive vehicle, and said first control valve control device includes:

an anti-lock control detecting portion for detecting initiation of an anti-lock braking pressure control for controlling said wheel brake cylinder so as to prevent an excessive tendency of slipping of said wheel on a road surface which takes place, during an operation of said wheel brake, due to a fluid pressure in said wheel brake cylinder which is excessively high in relation to a friction coefficient of said road surface; and a communication control portion operable upon detection by said anti-lock control detecting portion of the initiation of said anti-lock braking pressure control, to command said first control valve device to effect the fluid communication between said pressurizing chamber and said back-pressure chamber through said communication passage.

9. A braking pressure source device according to claim 1, wherein said first control valve control device includes:

an abrupt-brake-application detecting portion operable to detect a requirement for an abrupt brake application to the automotive vehicle; and a communication control portion operable upon detection by said abrupt-brake-application detecting portion of said requirement for said abrupt brake application, to command said first control valve to effect the fluid communication between said pressurizing chamber and said back-pressure chamber through said communication passage.

10. A braking pressure source device according to claim 9, wherein said communication control portion commands said first control valve device to effect the fluid communication between said pressurizing chamber and said back-pressure chamber when a rate of increase of said operating force of said brake operating member has been reduced below a predetermined threshold after said requirement for said abrupt brake application is detected by said abrupt-brake-application detecting portion.

11. A braking pressure source device according to claim 1, wherein said first control valve control device includes:
  a low-friction-coefficient detecting portion operable to detect that a friction coefficient of a road surface on which the automotive vehicle is running is lower than a predetermined threshold; and
  a communication control portion operable upon when said low-friction-coefficient detecting portion has detected that said friction coefficient is lower than said predetermined threshold, to command said first control valve device to effect the fluid communication between said pressurizing chamber and said back-pressure chamber through said communication passage.

12. A braking pressure source device according to claim 1, further comprising a booster for boosting said brake operating force and transmitting the boosted brake operating force to said input rod of said master cylinder, and wherein said first control valve control device includes:
  a booster defect detecting portion operable to detect a defect of said booster; and
  a communication control portion operable upon detection of said defect of said booster by said booster defect detecting portion, to command said first control valve device to effect the fluid communication between said pressurizing chamber and said back-pressure chamber through said communication passage.

13. A braking pressure source device according to claim 1, further comprising a booster for boosting said brake operating force and transmitting the boosted brake operating force to said input rod of said master cylinder, and wherein said first control valve control device includes:
  a boosting limit detecting portion operable to detect that a boosting limit of said booster has been reached; and
  a communication control portion operable upon detection by said boosting limit detecting portion that said boosting limit of said booster has been reached, to command said first control valve device to start controlling a fluid pressure difference across said first control valve device.

14. A braking pressure source device according to claim 1, wherein said first control valve control device controls said first control valve device on the basis of at least one of said brake operating force and a pressure of the fluid in said pressurizing chamber, and a rate of change of each of said at least one of said brake operating force and said pressure.

15. A braking pressure source device according to claim 1, wherein said first control valve control device controls said first control valve device on the basis of at least one of said brake operating force and a pressure of the fluid in said pressurizing chamber, and a time which has passed after a moment of detection of: (a) initiation of an anti-lock braking pressure control for controlling a front wheel brake cylinder of the braking system so as to prevent an excessive tendency of slipping of a front wheel of the automotive vehicle on a road surface on which the automotive vehicle is running; (b) initiation of an anti-lock braking pressure control for controlling a wheel brake cylinder of the braking system so as to prevent an excessive tendency of slipping of a wheel of the automotive vehicle on said road surface; (c) a requirement for an abrupt brake application to the automotive vehicle; (d) reduction of a friction coefficient of said road surface below a predetermined threshold; (e) a defect of a booster capable of boosting said brake operating force and transmitting the boosted brake operating force to said input rod of said master cylinder; and (f) a state in which a boosting limit of said booster has been reached.

16. A braking pressure source device according to claim 1, further comprising a brake operating force boosting device operable to boost said brake operating force of said brake operating member and transmitting the boosted brake operating force to said pressurizing piston.

17. A braking pressure source device according to claim 16, wherein said brake operating force boosting device includes a boosting ratio changing portion operable to change a ratio of boosting of said brake operating force, depending upon an operating stroke of said brake operating member.

18. A braking pressure source device according to claim 5, further comprising a first diagnosing portion operable to diagnose at least one of said first control valve device and said second control valve device, during reduction of said brake operating force while the automotive vehicle is stationary.

19. A braking pressure source device according to claim 1, further comprising a second diagnosing portion operable while the automotive vehicle is stationary, to command said first control valve device to effect the fluid communication between said pressuring chamber and said back-pressure chamber through said communication passage, and diagnosing the braking pressure source device on the basis of an operating state of the braking pressure source device after said first control valve device is commanded to effect said fluid communication.

20. A braking pressure source device according to claim 19, wherein said second diagnosing portion commands said first control valve device to effect said fluid communication while a brake pedal of said brake operating member is not in operation, and determines that the braking pressure source device is defective if a degree of increase of the fluid pressure in said pressurizing chamber with an increase of an operating force of said brake pedal operated after said first control valve device is commanded to effect said fluid communication is smaller than a predetermined threshold.

21. A braking pressure source device according to claim 20, wherein said braking system includes a wheel brake for braking a wheel of the automotive vehicle, said wheel brake having a wheel brake cylinder connected to said master cylinder and operable with a pressurized fluid delivered from said master cylinder, said braking pressure source device further comprising a third control valve device operable to disconnect said wheel brake cylinder from said master cylinder,
  and wherein said second diagnosing portion commands said third control valve device to disconnect said wheel brake cylinder from said master cylinder when said second diagnosing portion commands said first control valve device to effect said fluid communication.

22. A braking pressure source device according to claim 21, wherein said master cylinder is a tandem type master cylinder having two mutually independent pressurizing chambers, and the braking system has at least one first wheel brake cylinder connected to one of said two pressurizing chambers, and at least one second wheel brake cylinder connected to the other of said two pressurizing chambers, said third control valve device is disposed between said one pressurizing chamber and said at least one first wheel brake cylinder.

23. A braking pressure source device according to claim 22, wherein said at least one first wheel brake cylinder is at least one rear wheel brake cylinder for braking at least one rear wheel of the automotive vehicle.

24. A braking pressure source device according to claim 20, wherein said second diagnosing portion determines that the braking pressure source device is defective, if the pressure of the fluid in said pressurizing chamber when said operating force of said brake pedal has exceeded a predetermined threshold is lower than a predetermined threshold.

25. A braking pressure source device according to claim 20, wherein said second diagnosing portion determines that the braking pressure source device is defective, if a ratio of a rate of increase of the pressure of the fluid in said pressurizing chamber to a rate of increase of said operating force of said brake pedal is lower than a predetermined threshold.

26. A braking pressure source device according to claim 19, wherein said second diagnosing portion commands said first control valve device to effect the fluid communication between said pressurizing chamber and said back-pressure chamber while a brake pedal as said brake operating member is in operation, and determines that the braking pressure source device is defective, if a degree of increase of the fluid pressure in said pressurizing chamber after said first control valve device is commanded to effect said fluid communication is smaller than a predetermined threshold.

27. A braking pressure source device according to claim 26, wherein said second diagnosing portion determines that the braking pressure source device is defective, if the degree of increase of said fluid pressure is not equal to or larger than said predetermined threshold within a predetermined time after said first control valve device is commanded to effect said fluid communication.

28. A braking pressure source device according to claim 26, wherein said second diagnosing portion commands said first control valve device to effect said fluid communication while an operating force of said brake pedal is held substantially constant.

29. A braking pressure source device according to claim 26, wherein said braking system includes a wheel brake for braking a wheel of the automotive vehicle, said wheel brake having a wheel brake cylinder connected to said master cylinder and operable with a pressurized fluid delivered from said master cylinder, said braking pressure source device further comprising a third control valve device operable to disconnect said wheel brake cylinder from said master cylinder, and wherein said second diagnosing portion commands said third control valve device to disconnect said wheel brake cylinder from said master cylinder when said second diagnosing portion commands said first control valve device to effect said fluid communication.

30. A braking pressure source device according to claim 29, wherein said master cylinder is a tandem type master cylinder having two mutually independent pressurizing chambers, and the braking system has at least one first wheel brake cylinder connected to one of said two pressurizing chambers, and at least one second wheel brake cylinder connected to the other of said two pressurizing chambers, said third control valve device is disposed between each of said two pressurizing chambers and the at least one wheel brake cylinder connected thereto.

31. A braking pressure source device according to claim 26, wherein said second diagnosing portion determines that the braking pressure source device is defective, if a ratio of an operating force of said brake pedal to the fluid pressure in said pressurizing chamber is higher than a predetermined positive threshold valve.

32. A braking pressure source device according to claim 28, wherein said second diagnosing portion determines that the braking pressure source device is defective, if a rate of increase of the fluid pressure in said pressurizing chamber is lower than a predetermined threshold.

33. A braking pressure source device according to claim 19, wherein said braking system includes a wheel brake for braking a wheel of the automotive vehicle, said wheel brake having a wheel brake cylinder connected to said master cylinder and operable with a pressurized fluid delivered from said master cylinder, said braking pressure source device further comprising a third control valve device operable to disconnect said wheel brake cylinder from said master cylinder, and wherein said second diagnosing portion commands said third control valve device to connect said wheel brake cylinder to said master cylinder when the operating force of said brake operating member has exceeded a predetermined threshold, and/or when a movement of the automotive vehicle is initiated.

34. A braking pressure source device according to claim 19, wherein said second diagnosing portion commands said first control valve device to disconnect the pressurizing and back-pressure chambers from each other when the operating force of said brake operating member has exceeded a predetermined threshold and/or when a movement of the automotive vehicle is initiated.

35. A braking pressure source device according to claim 19, wherein said second diagnosing portion commands said first control valve device which has been held in a state for said fluid communication, to be placed in a state for disconnecting said pressurizing and back-pressure chambers from each other, when said brake operating member is returned to a non-operated position thereof.

36. A braking pressure source device according to claim 20, wherein said braking system includes a wheel brake for braking a wheel of the automotive vehicle, said wheel brake having a wheel brake cylinder connected to said master cylinder and operable with a pressurized fluid delivered from said master cylinder, said braking pressure source device further comprising a third control valve device operable to disconnect said wheel brake cylinder from said master cylinder, and wherein said second diagnosing portion commands said third control valve device which has been held in a state for disconnecting said wheel brake cylinder from said master cylinder, to be placed in a state for fluid communication between said wheel brake cylinder and said master cylinder, when said brake operating member is returned to a non-operated position thereof.

37. A braking pressure source device according to claim 19, wherein said second diagnosing portion commands said first control valve device to disconnect said pressurizing and back-pressure chambers from each other when said second diagnosing portion determines that the braking pressure source device is defective.

38. A braking pressure source device according to claim 20, wherein said braking system includes a wheel brake for braking a wheel of the automotive vehicle, said wheel brake having a wheel brake cylinder connected to said master cylinder and operable with a pressurized fluid delivered from said master cylinder, said braking pressure source device further comprising a third control valve device operable to disconnect said wheel brake cylinder from said master cylinder, and wherein said second diagnosing portion commands said third control valve device to be placed in a state for fluid communication between said wheel brake cylinder and said master cylinder, when said second diagnosing portion determines that the braking pressure source device is defective.

39. A braking pressure source device according to claim 1, further comprising a power-operated hydraulic pressure source including a pump and a drive device for operating said pump to deliver a pressurized fluid to said back-pressure chamber.

40. A braking pressure source device according to claim 39, further comprising a pressure control valve device disposed between said power-operated hydraulic pressure source and said back-pressure chamber, said pressure control valve device controlling a pressure of a pressurized fluid delivered from said power-operated hydraulic pressure source to said back-pressure chamber.

41. A braking pressure source device according to claim 40, wherein said pressure control valve device includes a reservoir, a pressure-increasing valve for effecting fluid communication between said power-operated hydraulic pressure source and said back-pressure chamber to increase the pressure of the fluid in said back-pressure chamber, and a pressure-reducing valve for permitting the pressurized fluid to be discharged from said back-pressure chamber to said reservoir to reduce the pressure of the fluid in said back-pressure chamber.

42. A braking pressure source device according to claim 41, wherein at least one of said pressure-increasing and pressure-reducing valves is a linear solenoid valve capable of continuously changing the pressure of the fluid in said back-pressure chamber with a change in an amount of electric power applied thereto.

43. A braking pressure source device according to claim 39, wherein said power-operated hydraulic pressure source further includes an accumulator for storing the pressurized fluid delivered from said pump.

* * * * *